United States Patent
Busacca et al.

(10) Patent No.: US 11,688,908 B2
(45) Date of Patent: Jun. 27, 2023

(54) ELECTRODE ASSEMBLY, SEALED SECONDARY BATTERY CELL, BATTERY PACK AND METHODS

(71) Applicant: Enovix Operations Inc., Fremont, CA (US)

(72) Inventors: Robert S. Busacca, Oakland, CA (US); Brett Kiger, Flowery Branch, GA (US); Ashok Lahiri, Cupertino, CA (US); Robert M Spotnitz, Pleasanton, CA (US); Spencer Gore, Menlo Park, CA (US); Rajeswari Chandrasekaran, Los Althos, CA (US); Murali Ramasubramanian, Fremont, CA (US); John S. Thorne, Mountain View, CA (US); Kang Yao, Fremont, CA (US); Robert Keith Rosen, Lincoln, CA (US)

(73) Assignee: Enovix Corporation, Fremont, CA (US)

( * ) Notice: Subject to any disclaimer, the term of this patent is extended or adjusted under 35 U.S.C. 154(b) by 0 days.

(21) Appl. No.: 17/864,624

(22) Filed: Jul. 14, 2022

(65) Prior Publication Data
US 2023/0031451 A1    Feb. 2, 2023

Related U.S. Application Data

(60) Provisional application No. 63/350,679, filed on Jun. 9, 2022, provisional application No. 63/350,687, filed
(Continued)

(51) Int. Cl.
H01M 10/0585    (2010.01)
H01M 50/191    (2021.01)
(Continued)

(52) U.S. Cl.
CPC ........ *H01M 50/191* (2021.01); *H01M 4/661* (2013.01); *H01M 4/663* (2013.01);
(Continued)

(58) Field of Classification Search
CPC ............... H01M 10/0585; H01M 4/70; H01M 10/0525; H01M 10/613; H01M 10/653;
(Continued)

(56) References Cited

U.S. PATENT DOCUMENTS 8,367,239 B2    2/2013    Hermann
8,758,924 B2    6/2014    Tennessen et al.
(Continued)

FOREIGN PATENT DOCUMENTS

EP    4006090    6/2022
JP    2010528406    8/2010
(Continued)

OTHER PUBLICATIONS

Patent Cooperation Treaty, International Search Report and Written Opinion for PCT/US22/37051, dated Oct. 14, 2022 9 pages.
(Continued)

*Primary Examiner* — Gary D Harris
(74) *Attorney, Agent, or Firm* — Bryan Cave Leighton Paisner LLP

(57) ABSTRACT

A battery pack having a population of secondary battery cells chargeable between a charged state and a discharged state, and a frame to hold secondary battery cells in the battery pack is provided, members of the population of secondary battery cells having an electrode assembly comprising a substantially polyhedral shape, and where the frame holds a cell array comprising a subset of the population of secondary batteries that are arranged adjacent to one another. A sealed secondary battery cell, electrode assembly, and methods of charging are also described.

17 Claims, 40 Drawing Sheets

Related U.S. Application Data on Jun. 9, 2022, provisional application No. 63/350,641, filed on Jun. 9, 2022, provisional application No. 63/221,998, filed on Jul. 15, 2021, provisional application No. 63/222,299, filed on Jul. 15, 2021, provisional application No. 63/222,295, filed on Jul. 15, 2021, provisional application No. 63/222,296, filed on Jul. 15, 2021, provisional application No. 63/222,015, filed on Jul. 15, 2021, provisional application No. 63/222,010, filed on Jul. 15, 2021.

(51) Int. Cl.
| | | |
|---|---|---|
| *H01M 4/66* | (2006.01) | |
| *H01M 10/613* | (2014.01) | |
| *H01M 10/653* | (2014.01) | |
| *H01M 10/6552* | (2014.01) | |
| *H01M 10/6561* | (2014.01) | |
| *H01M 10/6567* | (2014.01) | |
| *H01M 50/531* | (2021.01) | |
| *H01M 4/70* | (2006.01) | |
| *H01M 10/0525* | (2010.01) | |
| *H01M 50/186* | (2021.01) | |
| *H01M 50/198* | (2021.01) | |
| *H01M 50/193* | (2021.01) | |

(52) U.S. Cl.
CPC ......... *H01M 4/70* (2013.01); *H01M 10/0525* (2013.01); *H01M 10/0585* (2013.01); *H01M 10/613* (2015.04); *H01M 10/653* (2015.04); *H01M 10/6552* (2015.04); *H01M 10/6561* (2015.04); *H01M 10/6567* (2015.04); *H01M 50/186* (2021.01); *H01M 50/193* (2021.01); *H01M 50/198* (2021.01); *H01M 50/531* (2021.01)

(58) Field of Classification Search
CPC ......... H01M 10/6552; H01M 10/6561; H01M 10/6567; H01M 50/531
USPC ....................................................... 429/120
See application file for complete search history.

(56) References Cited

U.S. PATENT DOCUMENTS

| | | | |
|---|---|---|---|
| 10,038,214 | B2 | 7/2018 | Rust et al. |
| 10,177,400 | B2 | 1/2019 | Busacca et al. |
| 10,770,760 | B2 | 9/2020 | Castledine et al. |
| 11,081,718 | B2 | 8/2021 | Busacca et al. |
| 11,128,020 | B2 | 9/2021 | Busacca et al. |
| 11,355,816 | B2 | 6/2022 | Ramasubramanian et al. |
| 11,482,738 | B2 | 10/2022 | Jin et al. |
| 2006/0281004 | A1 | 12/2006 | Yata et al. |
| 2009/0023056 | A1 | 1/2009 | Adams et al. |
| 2011/0070474 | A1 | 3/2011 | Lee et al. |
| 2011/0091760 | A1 | 4/2011 | Straubel et al. |
| 2011/0151292 | A1 | 6/2011 | Song |
| 2011/0195288 | A1 | 8/2011 | Harima et al. |
| 2012/0052365 | A1 | 3/2012 | Chang |
| 2013/0216884 | A1 | 8/2013 | Takasaki et al. |
| 2014/0178722 | A1 | 6/2014 | Straubel et al. |
| 2016/0344071 | A1 | 11/2016 | Zheng et al. |
| 2017/0162922 | A1 | 6/2017 | Sumpf, Jr. et al. |
| 2017/0256830 | A1 | 9/2017 | Qiu et al. |
| 2017/0373338 | A1 | 12/2017 | Teranishi et al. |
| 2018/0269545 | A1 | 9/2018 | Liu et al. |
| 2019/0207264 | A1* | 7/2019 | Busacca ................ H01M 50/40 |
| 2019/0312270 | A1 | 10/2019 | Yoshioka et al. |
| 2019/0319294 | A1* | 10/2019 | Busacca ............ H01M 10/0585 |
| 2020/0313146 | A1 | 10/2020 | Busacca et al. |
| 2020/0350633 | A1 | 11/2020 | Busacca et al. |
| 2021/0005934 | A1 | 1/2021 | Yoda et al. |
| 2021/0344074 | A1 | 11/2021 | Jung et al. |
| 2022/0271365 | A1 | 8/2022 | Cai et al. |
| 2022/0289891 | A1 | 9/2022 | Yang et al. |
| 2022/0328861 | A1 | 10/2022 | Armstrong et al. |

FOREIGN PATENT DOCUMENTS

| | | |
|---|---|---|
| WO | 2008156737 | 12/2008 |
| WO | 2021034099 | 2/2021 |
| WO | 2022212132 | 10/2022 |

OTHER PUBLICATIONS

Patent Cooperation Treaty, International Search Report and Written Opinion for PCT/US22/37054, dated Oct. 14, 2022 9 pages.
Insideeevs Article: Tesla Model S Plaid Battery: Clever New Advancements Discovered dated Feb. 8, 2022. https://insideevs.com/news/566047/tesla-models-clever-battery-advancements/ 10 pages.
Patent Cooperation Treaty, International Search Report and Written Opinion for PCT/US22/37049, dated Jan. 25, 2023.

* cited by examiner

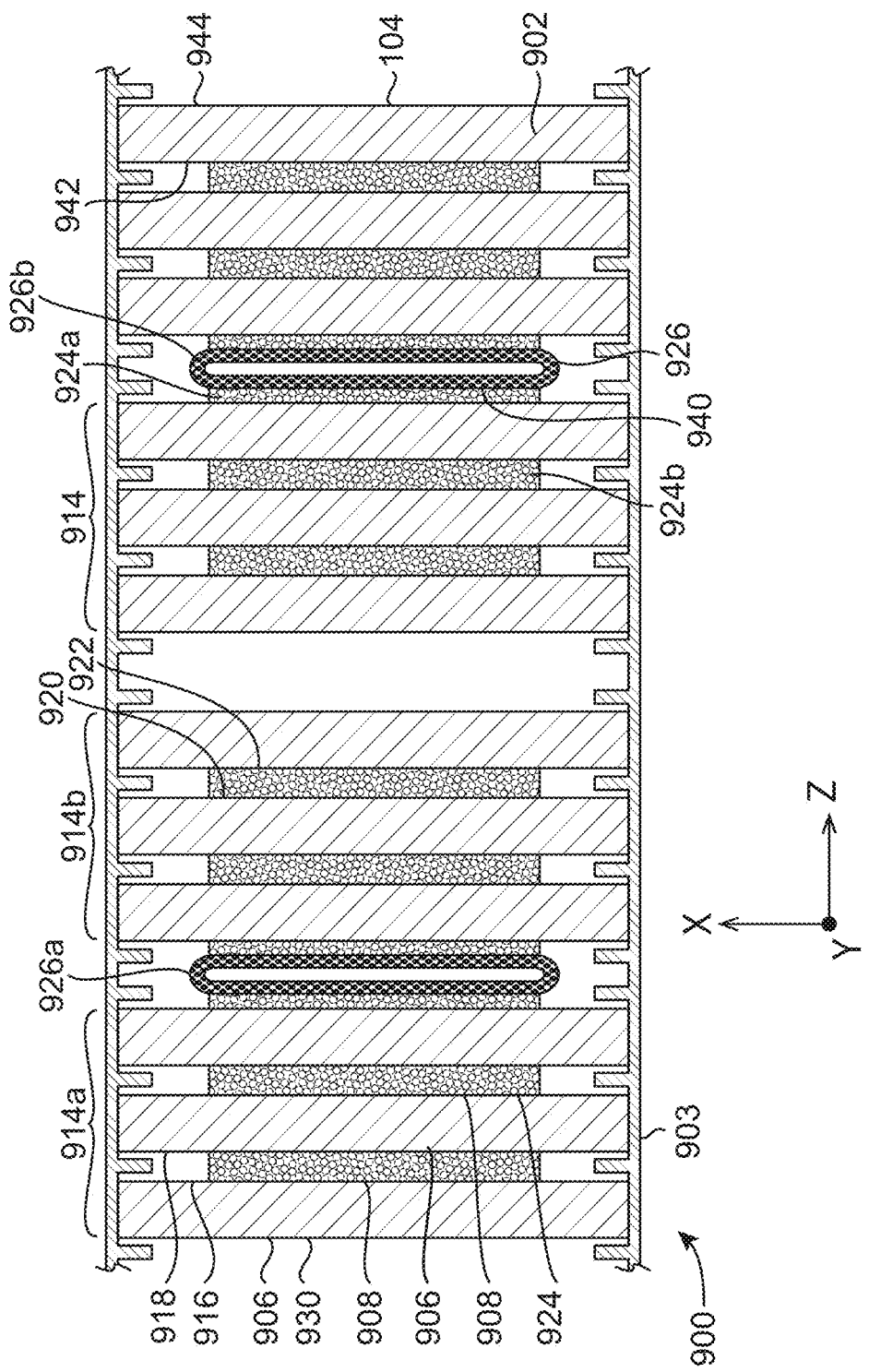

| Charge rate | 0→80% SOC (min) | 0→90% SOC (min) | 0→99% SOC (min) |
|---|---|---|---|
| 2C | 25.6 | 28.7 | 36.2 |
| 3C | 17.0 | 19.2 | 26.1 |
| 4C | 12.8 | 14.5 | 20.5 |
| 5C | 10.3 | 11.7 | 17.2 |
| 6C | 8.6 | 9.9 | 14.9 |
| 7C | 7.3 | 8.5 | 13.3 |
| 8C | 6.4 | 7.6 | 11.9 |
| 9C | 5.7 | 6.8 | 10.8 |
| 10C | 5.2 | 6.2 | 9.9 |

NMC-622 CELL DATA
    267 mAh (29 mm x 17 mm x 3.4 mm)
    541 Wh/l packaged energy density (889 Wh/l core)
    695 Wh/l modeled packaged energy density for 55Ah cell
    4.2 – 2.5V Cell Voltage

FIG. 29

| Charge rate | 0→80% SOC (min) | 0→90% SOC (min) | 0→99% SOC (min) |
|---|---|---|---|
| 6C | 8.6 | 9.9 | 9.9 |

ELECTRODE ASSEMBLY, SEALED SECONDARY BATTERY CELL, BATTERY PACK AND METHODS

CROSS REFERENCE TO RELATED APPLICATIONS

The present application claims benefit of U.S. Provisional Patent Application Ser. Nos. 63/222,015, 63/222,295, 63/221,998, 63/222,296, 63/222,010, and 63/222,299, filed on Jul. 15, 2021, and U.S. Provisional Patent Application Ser. Nos. 63/350,641, 63/350,679, and 63/350,687, filed on Jun. 9, 2022, which applications are incorporated by reference herein in their entireties.

FIELD OF THE INVENTION

This disclosure generally relates to battery packs for energy storage devices such as secondary battery cells, as well as secondary battery cells, electrode assemblies, and other structures for use in battery packs, and methods of charging.

BACKGROUND

Rocking chair or insertion secondary batteries are a type of energy storage device in which carrier ions, such as lithium, sodium, potassium, calcium or magnesium ions, move between a positive electrode and a negative electrode through an electrolyte. The secondary battery may comprise a single battery cell, or two or more battery cells that have been electrically coupled to form the battery, with each battery cell comprising a positive electrode, a negative electrode, a microporous separator, and an electrolyte.

In rocking chair battery cells, both the positive and negative electrodes comprise materials into which a carrier ion inserts and extracts. As a cell is discharged, carrier ions are extracted from the negative electrode and inserted into the positive electrode. As a cell is charged, the reverse process occurs: the carrier ion is extracted from the positive and inserted into the negative electrode.

One of the persistent challenges with secondary batteries resides in the fact that charging and discharging of the secondary batteries generates a significant amount of heat in the battery, which can cause damage to and even catastrophic failure of the secondary battery if not suitably controlled.

Therefore, there remains a need for controlling the temperature of secondary batteries and providing for the transfer of heat therefrom to improve reliability and cycle life of the battery.

SUMMARY

Briefly, therefore, aspects of the disclosure relate to a battery pack comprising a population of secondary battery cells chargeable between a charged state and a discharged state, and a frame to hold secondary battery cells in the battery pack. Members of the secondary battery cell population have a rated capacity and comprise a hermetically sealed enclosure and an electrode assembly within the hermetically sealed enclosure. The electrode assembly has substantially polyhedral shape mutually perpendicular transverse, longitudinal and vertical axes corresponding to the x, y and z axes, respectively, of an imaginary three-dimensional Cartesian coordinate system. The electrode assembly comprises opposing longitudinal surfaces that are substantially flat and are separated from each other in the longitudinal direction, and a lateral surface surrounding an electrode assembly longitudinal axis $A_{EA}$ and connecting the opposing longitudinal end surfaces, the lateral surface having opposing vertical surfaces that are substantially flat and are separated from each other in the vertical direction on opposing vertical sides of the longitudinal axis, and opposing transverse surfaces that are substantially flat and are separated from each other in the transverse direction on opposing transverse sides of the longitudinal axis, wherein the opposing longitudinal surfaces have a combined surface area, $L_{SA}$, the opposing transverse surfaces have a combined surface area, $T_{SA}$, the opposing vertical surfaces have a combined surface area, $V_{SA}$, and the ratio of $V_{SA}$ to each of $L_{SA}$ and $T_{SA}$ is at least 5:1. The electrode assembly further comprises an electrode structure population, an electrically insulating separator population, and a counter-electrode structure population, wherein members of the electrode structure, electrically insulating separator and counter-electrode structure populations are arranged in an alternating sequence in the longitudinal direction within the electrode assembly. The frame holds a cell array comprising a subset of the population of secondary battery cells that are arranged adjacent to one another, with the members being arranged in the cell array such that opposing vertical surfaces of adjacent members in the cell array face each other to form an adjacent facing pair of vertical surfaces, each adjacent facing pair of vertical surfaces in the cell array comprising adjacent facing regions thereof that are (i) separated by less than 1 mm from each other, and (ii) in thermal contact with one another via a thermally conductive pathway having thermally conductive material that has a thermal conductivity of at least 1 W/m K.

Another aspect of the present disclosure provides a sealed secondary battery cell that is chargeable between a charged state and a discharged state. The sealed secondary battery cell comprises a hermetically sealed enclosure comprising a polymer enclosure material, an electrode assembly enclosed by the hermetically sealed enclosure, a set of electrode constraints, and a rated capacity of at least 100 mAmp·hr. The electrode assembly has a substantially polyhedral shape with mutually perpendicular transverse, longitudinal and vertical axes corresponding to the x, y and z axes, respectively, of an imaginary three-dimensional Cartesian coordinate system, opposing longitudinal end surfaces that are substantially flat and separated from each other in the longitudinal direction, and a lateral surface surrounding an electrode assembly longitudinal axis $A_{EA}$ and connecting the first and second longitudinal end surfaces, the lateral surface having opposing vertical surfaces that are substantially flat and are separated from each other in the vertical direction on opposing vertical sides of the longitudinal axis, opposing transverse surfaces that are substantially flat and are separated from each other in the transverse direction on opposing transverse sides of the longitudinal axis, wherein the opposing longitudinal surfaces have a combined surface area, $L_{SA}$, the opposing transverse surfaces have a combined surface area, $T_{SA}$, the opposing vertical surfaces have a combined surface area, $V_{SA}$, and the ratio of $V_{SA}$ to each of $L_{SA}$ and $T_{SA}$ is at least 5:1. The electrode assembly further comprises an electrode structure population, an electrically insulating separator population, and a counter-electrode structure population, wherein members of the electrode structure, electrically insulating separator and counter-electrode structure populations are arranged in an alternating sequence. The set of electrode constraints comprises a vertical constraint system comprising first and second vertical growth constraints that are separated from each other in the vertical direction, the first and second vertical growth constraints being connected to members of the population of electrode structures and/or members of the population of counter-electrode structures, and the vertical constraint system being capable of restraining growth of the electrode assembly in the vertical direction, wherein members of the population of electrode structures and/or members of the population of counter-electrode structures that are connected to the first and second vertical growth constraints have (i) a thickness as measured in the longitudinal direction that is in a range of between 5 and 50 µm, and (ii) a yield strength of greater than 100 MPa. The charged state is at least 75% of a rated capacity of the secondary battery cell, and the discharged state is less than 25% of a rated capacity of the secondary battery cell. The hermetically sealed enclosure comprises opposing external vertical surfaces separated from each other in the vertical direction. A thickness of the sealed secondary battery cell as measured in the vertical direction between vertically opposing regions of the external vertical surfaces of the hermetically sealed enclosure is at least 1 mm, and a thermal conductivity of the secondary battery cell along a thermally conductive path between the vertically opposing regions of the external vertical surfaces of the hermetically sealed enclosure in the vertical direction is at least 2 W/m·K.

Still another aspect of the present disclosure provides a sealed secondary battery cell chargeable between a charged state and a discharged state. The sealed secondary battery cell comprises a hermetically sealed case, an electrode assembly enclosed by the hermetically sealed case, and a rated capacity of at least 100 mAmp·hr. The electrode assembly has a substantially polyhedral shape with mutually perpendicular transverse, longitudinal and vertical axes corresponding to the x, y and z axes, respectively, of an imaginary three-dimensional Cartesian coordinate system, opposing longitudinal end surfaces that are substantially flat and separated from each other in the longitudinal direction, and a lateral surface surrounding an electrode assembly longitudinal axis $A_{EA}$ and connecting the first and second longitudinal end surfaces, the lateral surface having opposing vertical surfaces that are substantially flat and separated from each other in the vertical direction on opposing vertical sides of the longitudinal axis, and opposing transverse surfaces that are substantially flat and separated from each other in the transverse direction on opposing transverse sides of the longitudinal axis, wherein the opposing longitudinal surfaces have a combined surface area, $L_{SA}$, the opposing transverse surfaces have a combined surface area, $T_{SA}$, the opposing vertical surfaces have a combined surface area, $V_{SA}$, and the ratio of $V_{SA}$ to each of $L_{SA}$ and $T_{SA}$ is at least 5:1. The electrode assembly further comprises an electrode structure population, an electrically insulating separator population, and a counter-electrode structure population, wherein members of the electrode structure, electrically insulating separator and counter-electrode structure populations are arranged in an alternating sequence, the hermetically sealed case has opposing first and second case ends separated in the longitudinal direction, and a case sidewall that connects the first and second case ends, the opposing first and second case ends and case sidewall forming a hermetic seal about the electrode assembly, wherein the case sidewall comprises upper and lower sidewalls separated from each other in the vertical direction, and first and second transverse sidewalls that are separated from each other in the transverse direction, wherein members of the electrode structure population and/or counter-electrode structure population comprise upper and lower end surfaces in the vertical direction, that are connected to the upper and lower sidewalls of the hermetically sealed case to restrain growth of the electrode assembly in the vertical direction during cycling of the secondary battery cell between the charged and discharged states, wherein members of the population of electrode structures and/or members of the population of counter-electrode structures that are connected to the upper and lower sidewalls have (i) a thickness as measured in the longitudinal direction that is in a range of between 5 and 50 µm, and (ii) a yield strength of greater than 100 MPa, the charged state is at least 75% of a rated capacity of the secondary battery cell, and the discharged state is less than 25% of a rated capacity of the secondary battery cell. A thickness of the secondary battery as measured in the vertical direction between vertically opposing regions of external vertical surfaces of the upper and lower sidewalls of the hermetically sealed case, is at least 1 mm, and a thermal conductivity of the secondary battery cell along a thermally conductive path between the vertically opposing regions of the external vertical surfaces of the upper and lower sidewalls of the hermetically sealed case in the vertical direction is at least 7.5 W/m·K.

Other aspects, features and embodiments of the present disclosure will be, in part, discussed and, in part, apparent in the following description and drawings.

BRIEF DESCRIPTION OF THE DRAWING

FIG. 7A illustrates a cross section of an embodiment of a battery pack having sealed secondary battery cells and cooling tubes.

FIG. 29 is a chart showing charge rate and minutes to state of charge.

Figure 1A:
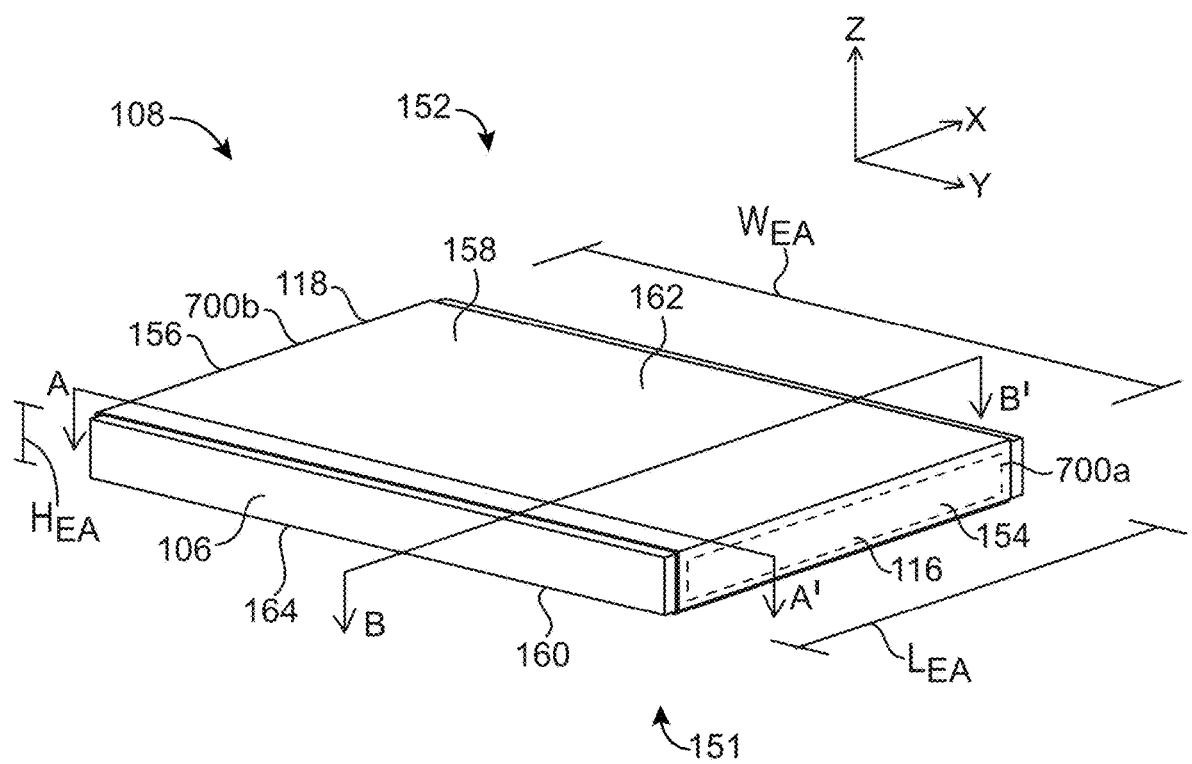
FIG. 1A is a perspective view of one embodiment of an electrode assembly with a set of electrode constraints.

Other aspects, embodiments and features of the inventive subject matter will become apparent from the following detailed description when considered in conjunction with the accompanying drawing. The accompanying figures are schematic and are not intended to be drawn to scale. For purposes of clarity, not every element or component is labeled in every figure, nor is every element or component of each embodiment of the inventive subject matter shown where illustration is not necessary to allow those of ordinary skill in the art to understand the inventive subject matter.

Definitions

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 μm would include 225 μm to 275 μm. By way of further example, in one instance, about 1,000 μm would include 900 μm to 1,100 μm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Charged state" as used herein in the context of the state of a secondary battery refers to a state where the secondary battery is charged to at least 75% of its rated capacity. For example, the battery may be charged to at least 80% of its rated capacity, at least 90% of its rated capacity, and even at least 95% of its rated capacity, such as 100% of its rated capacity.

"C-rate" as used herein refers to a measure of the rate at which a secondary battery is discharged, and is defined as the discharge current divided by the theoretical current draw under which the battery would deliver its nominal rated capacity in one hour. For example, a C-rate of 1 C indicates the discharge current that discharges the battery in one hour, a rate of 2 C indicates the discharge current that discharges the battery in ½ hours, a rate of C/2 indicates the discharge current that discharges the battery in 2 hours, etc.

"Discharged state" as used herein in the context of the state of a secondary battery refers to a state where the secondary battery is discharged to less than 25% of its rated capacity. For example, the battery may be discharged to less than 20% of its rated capacity, such as less than 10% of its rated capacity, and even less than 5% of its rated capacity, such as 0% of its rated capacity.

A "cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Feret diameter" as referred to herein with respect to the electrode assembly is defined as the distance between two parallel planes restricting the electrode assembly measured in a direction perpendicular to the two planes. For example, a Feret diameter of the electrode assembly in the longitudinal direction is the distance as measured in the longitudinal direction between two parallel planes restricting the electrode assembly that are perpendicular to the longitudinal direction. As another example, a Feret diameter of the electrode assembly in the transverse direction is the distance as measured in the transverse direction between two parallel planes restricting the electrode assembly that are perpendicular to the transverse direction. As yet another example, a Feret diameter of the electrode assembly in the vertical direction is the distance as measured in the vertical direction between two parallel planes restricting the electrode assembly that are perpendicular to the vertical direction.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the inventive subject matter herein are not limited to the particular axis or axes used to describe three-dimensional orientations of the elements. Alternatively stated, the axes may be interchangeable when referring to three-dimensional aspects of the inventive subject matter.

"Longitudinal direction," "transverse direction," and "vertical direction," as used herein, refer to mutually perpendicular directions (i.e., each are orthogonal to one another). For example, the "longitudinal direction," "transverse direction," and the "vertical direction" as used herein may be generally parallel to the longitudinal axis, transverse axis and vertical axis, respectively, of a Cartesian coordinate system used to define three-dimensional aspects or orientations.

"Repeated cycling" as used herein in the context of cycling between charged and discharged states of the secondary battery refers to cycling more than once from a discharged state to a charged state, or from a charged state to a discharged state. For example, repeated cycling between charged and discharged states can including cycling at least 2 times from a discharged to a charged state, such as in charging from a discharged state to a charged state, discharging back to a discharged state, charging again to a charged state and finally discharging back to the discharged state. As yet another example, repeated cycling between charged and discharged states at least 2 times can include discharging from a charged state to a discharged state, charging back up to a charged state, discharging again to a discharged state and finally charging back up to the charged state By way of further example, repeated cycling between charged and discharged states can include cycling at least 5 times, and even cycling at least 10 times from a discharged to a charged state. By way of further example, the repeated cycling between charged and discharged states can include cycling at least 25, 50, 100, 300, 500 and even 1000 times from a discharged to a charged state.

"Rated capacity" as used herein in the context of a secondary battery refers to the capacity of the secondary battery to deliver a specified current over a period of time, as measured under standard temperature conditions (25° C.). For example, the rated capacity may be measured in units of Amp·hour, either by determining a current output for a specified time, or by determining for a specified current, the time the current can be output, and taking the product of the current and time. For example, for a battery rated 20 Amp·hr, if the current is specified at 2 amperes for the rating, then the battery can be understood to be one that will provide that current output for 10 hours, and conversely if the time is specified at 10 hours for the rating, then the battery can be understood to be one that will output 2 amperes during the 10 hours. In particular, the rated capacity for a secondary battery may be given as the rated capacity at a specified discharge current, such as the C-rate, where the C-rate is a measure of the rate at which the battery is discharged relative to its capacity. For example, a C-rate of 1 C indicates the discharge current that discharges the battery in one hour, 2 C indicates the discharge current that discharges the battery in ½ hours, C/2 indicates the discharge current that discharges the battery in 2 hours, etc. Thus, for example, a battery rated at 20 Amp·hr at a C-rate of 1 C would give a discharge current of 20 Amp for 1 hour, whereas a battery rated at 20 Amp·hr at a C-rate of 2 C would give a discharge current of 40 Amps for 1/2 hour, and a battery rated at 20 Amp·hr at a C-rate of C/2 would give a discharge current of 10 Amps over 2 hours.

"Maximum width" (WEA) as used herein in the context of a dimension of an electrode assembly corresponds to the greatest width of the electrode assembly as measured from opposing points of longitudinal end surfaces of the electrode assembly in the longitudinal direction.

"Maximum length" (LEA) as used herein in the context of a dimension of an electrode assembly corresponds to the greatest length of the electrode assembly as measured from opposing points of a lateral surface of the electrode assembly in the transverse direction.

"Maximum height" (HEA) as used herein in the context of a dimension of an electrode assembly corresponds to the greatest height of the electrode assembly as measured from opposing points of the lateral surface of the electrode assembly in the transverse direction.

"Substantially polyhedral shape" as used herein in the context of an electrode assembly is a shape that has 6 or more flat surfaces, and in certain embodiments may contain curved surface area regions, such as at the corners or vertices of the shape.

Furthermore, as used herein, for each embodiment that describes a material or structure using the term "electrode" such as an "electrode structure" or "electrode active material," it is to be understood that such structure and/or material may in certain embodiments correspond that of a "negative electrode", such as a "negative electrode structure" or "negative electrode active material." Similarly, as used herein, for each embodiment that describes a material or structure using the term "counter-electrode" such as a "counter-electrode structure" or "counter-electrode active material," it is to be understood that such structure and/or material may in certain embodiments correspond to that of a "positive electrode," such as a "positive electrode structure" or "positive electrode active material." That is, where suitable, any embodiments described for an electrode and/or counter-electrode may correspond to the same embodiments where the electrode and/or counter-electrode are specifically a negative electrode and/or positive electrode, including their corresponding structures and materials, respectively.

DETAILED DESCRIPTION

Aspects of the present disclosure are directed to an electrode assembly for a secondary battery, a sealed secondary battery, and a battery pack having any of the sealed secondary battery and electrode assembly. An embodiment of a battery pack 900 is shown for example in FIGS. 7-9. The battery pack 900 may be for one or more storage devices 100, such as a secondary battery 102, as shown for example in FIGS. 1A-1D and 2, that cycles between a charged and a discharged state. According to certain embodiments, the secondary battery 102 includes a secondary battery cell 902 (see FIGS. 7-9) including a battery enclosure 104, an electrode assembly 106, and carrier ions. According to certain embodiments, a non-aqueous liquid electrolyte can also be held within the battery enclosure. In certain embodiments, the secondary battery 102 also includes a constraint system 108 that restrains growth of the electrode assembly 106. The growth of the electrode assembly 106 that is being constrained may be a macroscopic increase in one or more dimensions of the electrode assembly 106.

Figure 1B:
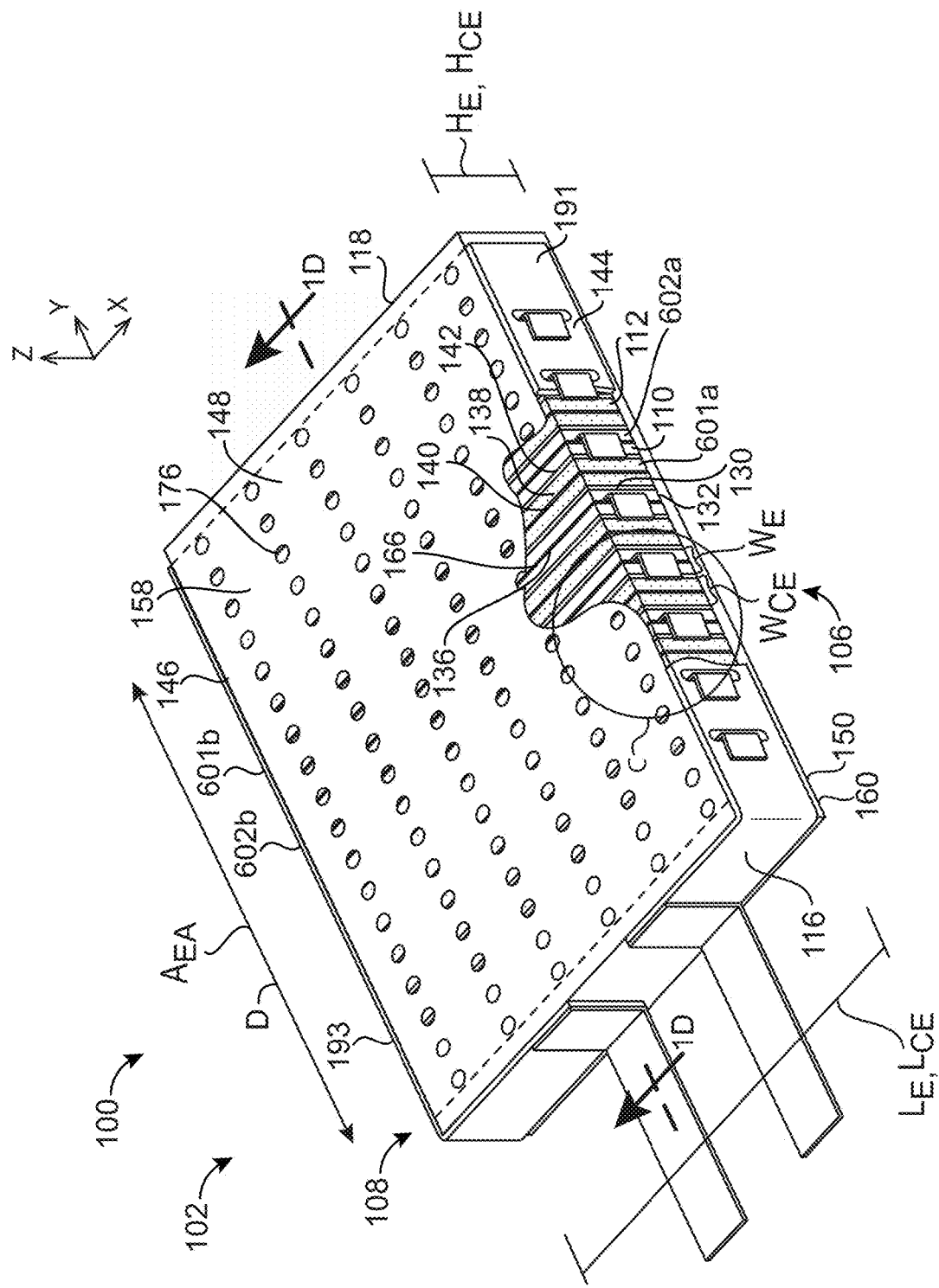
FIG. 1B is a schematic of one embodiment of a three-dimensional electrode assembly for a secondary battery.
Figure 1C:
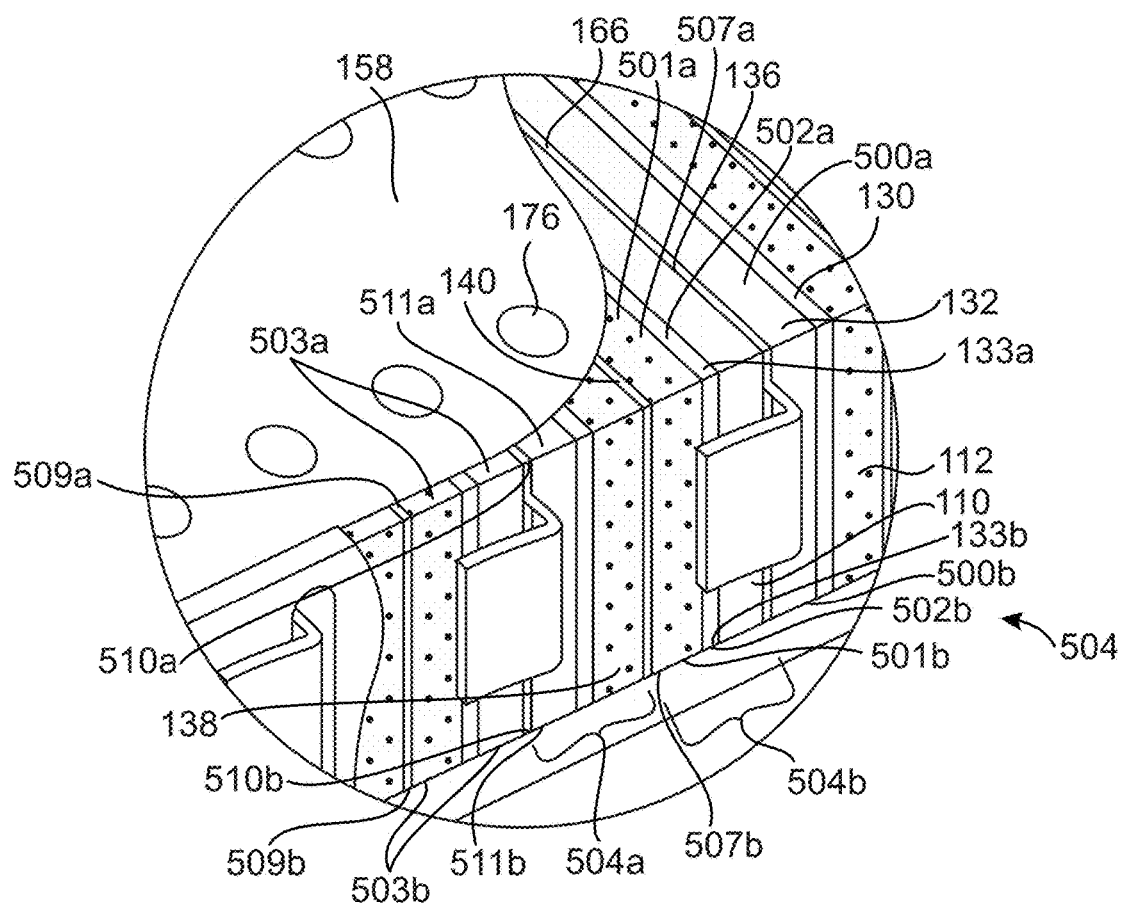
FIG. 1C is an inset cross-sectional view of the electrode assembly of FIG. 1B.
Figure 1D:
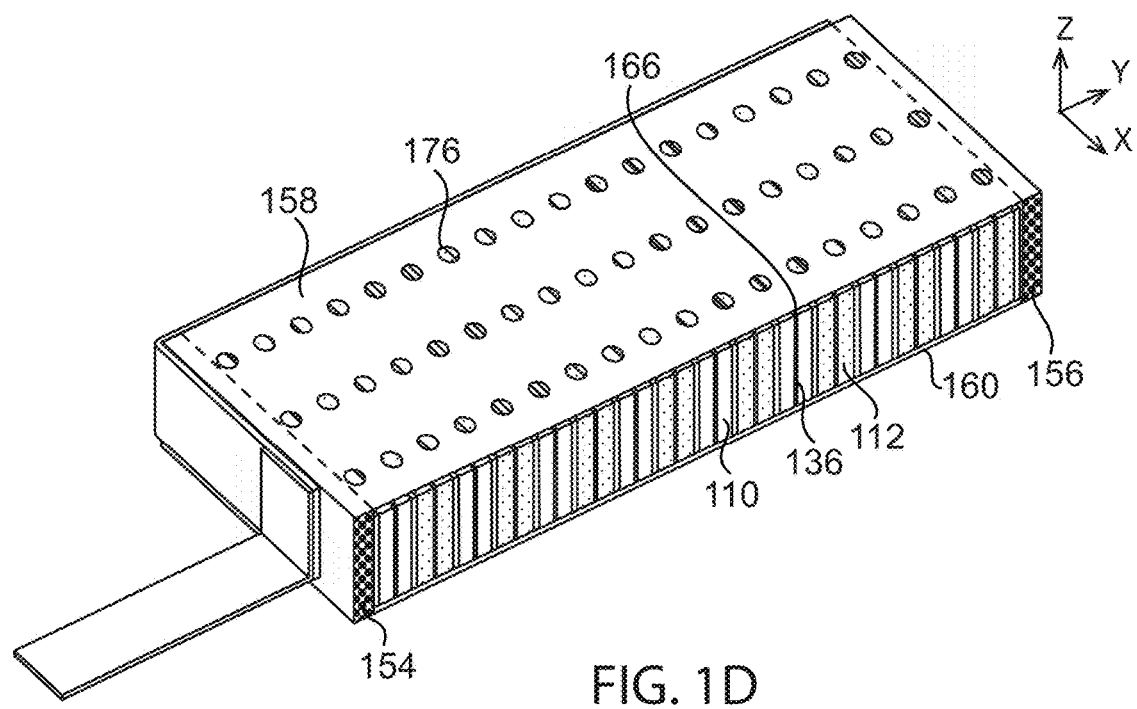
FIG. 1D is a cross-sectional view of the electrode assembly of FIG. 1B, taken along line D in FIG. 1B.

Referring to FIGS. 1A-1D, in one embodiment, the electrode assembly 106 includes a population of unit cells 504 stacked in series in a stacking direction (i.e. stacking direction D in FIG. 1B). Each member of the unit cell population comprises an electrode structure 110, a counter-electrode structure 112, and an electrically insulating separator 130 between the electrode and counter-electrode structures, to electrically insulate the electrode and counter-electrode structures 110, 112 from one another. In one example, as shown in FIG. 1B, the electrode assembly comprises a series of stacked unit cells 504 comprising the electrode structures 110 and counter-electrode structures in an alternating arrangement. FIG. 1C is an inset showing the secondary battery with electrode assembly 106 of FIG. 1B, and FIG. 1D is a cross-section of the secondary battery with electrode assembly 106 of FIG. 1B. Other arrangements of the stacked series of unit cells 504a, 504b, can also be provided. Accordingly, the electrode assembly can comprise a population of electrode structures, a population of counter-electrode structures, and a population of electrically insulating separator materials electrically separating members of the electrode and counter-electrode populations, where each member of the unit cell population comprises an electrode structure, a counter-electrode structure, and an electrically insulating separator between the electrode and counter-electrode structures.

In one embodiment, the electrode structure 110 comprises an electrode active material layer 132, and an electrode current collector 136, as shown for example in FIGS. 1A-1D. For example, the electrode structure can comprise an electrode current collector 136 disposed between one or more electrode active material layer 132s. According to one embodiment, the electrode active material layer 132 comprises anode active material, and the electrode current collector 136 comprises an anode current collector. Similarly, in one embodiment, counter-electrode structures 112 comprise a counter-electrode active material layer 138, and a counter-electrode current collector 140. For example, the counter-electrode structure 112 can comprise a counter-electrode current collector 140 disposed between one or more counter-electrode active material layers 138. According to one embodiment, the counter-electrode active material layer 138 comprises cathode active material, and the counter-electrode current collector 140 comprises a cathode current collector. Furthermore, it should be understood that the electrode and counter-electrode structures 110 and 112, respectively, are not limited to the specific embodiments and structures described herein, and other configurations, structures, and/or materials other than those specifically described herein can also be provided to form the electrode structures 110 and counter-electrode structures 112. According to certain embodiments, each unit cell 504a, 504b in the unit cell population comprises, in the stacked series, a unit cell portion of the electrode current collector 136, an electrode structure 110 comprising an electrode active material layer 132, an electrically insulating separator 130 between the electrode and counter-electrode active material layers, a counter-electrode structure 113 comprising a counter-electrode active material layer 138, and a unit cell portion of a counter-electrode current collector 140. In certain embodiments, the order of the unit cell portion of the electrode current collector, electrode active material layer, separator, counter-electrode active material layer, and the unit cell portion of the counter-electrode current collector will be reversed for unit cells that are adjacent to one another in the stacked series, with portions of the electrode current collector and/or counter-electrode current collector being shared between adjacent unit cells, as shown for example in FIG. 1C.

According to the embodiment as shown in FIGS. 1A-1D, the members of the electrode and counter-electrode structure populations 110 and 112, respectively, are arranged in alternating sequence, with a direction of the alternating sequence corresponding to the stacking direction D. The electrode assembly 106 according to this embodiment further comprises mutually perpendicular longitudinal, transverse, and vertical axes, with the longitudinal axis $A_{EA}$ generally corresponding or parallel to the stacking direction D of the members of the electrode and counter-electrode structure populations. As shown in the embodiment in FIG. 1B, the longitudinal axis $A_{EA}$ is depicted as corresponding to the Y axis, the transverse axis is depicted as corresponding to the X axis, and the vertical axis is depicted as corresponding to the Z axis. According to embodiments of the disclosure herein, the electrode structures 110, counter-electrode structures 112 and electrically insulating separators 130 within each unit cell 504 of the unit cell population have opposing upper and lower end surfaces separated in a vertical direction that is orthogonal to the stacking direction of the unit cell population. For example, referring to FIGS. 1C and 4, the electrode structures 110 in each member of the unit cell population can comprise opposing upper and lower end surfaces 500a, 500b separated in the vertical direction, the counter-electrode structures 110 in each member of the unit cell population can comprise opposing upper and lower end surfaces 501a, 501b separated in the vertical direction, and the electrically insulating separator 130 can comprise opposing upper and lower end surfaces 502a, 502b separated in the vertical direction.

Referring to FIGS. 1A-1D, according to one embodiment, the electrode assembly 106 has mutually perpendicular transverse, longitudinal and vertical axes corresponding to the x, y and z axes, respectively, of an imaginary three-dimensional cartesian coordinate system, a first longitudinal end surface 116 and a second longitudinal end surface 118 separated from each other in the longitudinal direction, and a lateral surface 142 surrounding an electrode assembly longitudinal axis $A_{EA}$ and connecting the first and second longitudinal end surfaces 116, 118. In one embodiment, the surface area of the first and second longitudinal end surfaces 116, 118 is less than 33% of the surface area of the electrode assembly 106. For example, in one such embodiment, the sum of the surface areas of the first and second longitudinal end surfaces 116, 118, respectively, is less than 25% of the surface area of the total surface of the electrode assembly 106. By way of further example, in one embodiment, the sum of the surface areas of the first and second longitudinal end surfaces 116, 118, respectively, is less than 20% of the surface area of the total surface of the electrode assembly. By way of further example, in one embodiment, the sum of the surface areas of the first and second longitudinal end surfaces 116, 118, respectively, is less than 15% of the surface area of the total surface of the electrode assembly. By way of further example, in one embodiment, the sum of the surface areas of the first and second longitudinal end surfaces 116, 118, respectively, is less than 10% of the surface area of the total surface of the electrode assembly.

In one embodiment, the lateral surface 142 comprises first and second regions on opposite sides of the longitudinal axis and separated in a first direction that is orthogonal to the longitudinal axis. For example, the lateral surface 142 can comprise opposing surface regions 144, 146 in the X direction (i.e., the side surfaces of the rectangular prism) and opposing surface regions 148, 150 in the Z direction. In yet another embodiment, the lateral surface can comprise a cylindrical shape. The electrode assembly 106 can further comprise a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction. In one embodiment, a ratio of the maximum length $L_{EA}$ to the maximum height $H_{EA}$ may be at least 2:1. By way of further example, in one embodiment a ratio of the maximum length $L_{EA}$ to the maximum height $H_{EA}$ may be at least 5:1. By way of further example, in one embodiment, the ratio of the maximum length $L_{EA}$ to the maximum height $H_{EA}$ may be at least 10:1. By way of further example, in one embodiment, the ratio of the maximum length $L_{EA}$ to the maximum height $H_{EA}$ may be at least 15:1. By way of further example, in one embodiment, the ratio of the maximum length $L_{EA}$ to the maximum height $H_{EA}$ may be at least 20:1. The ratios of the different dimensions may allow for optimal configurations within an energy storage device to maximize the amount of active materials, thereby increasing energy density.

In some embodiments, the maximum width $W_{EA}$ may be selected to provide a width of the electrode assembly 106 that is greater than the maximum height $H_{EA}$. For example, in one embodiment, a ratio of the maximum width $W_{EA}$ to the maximum height $H_{EA}$ may be at least 2:1. By way of further example, in one embodiment, the ratio of the maximum width $W_{EA}$ to the maximum height $H_{EA}$ may be at least 5:1. By way of further example, in one embodiment, the ratio of the maximum width $W_{EA}$ to the maximum height $H_{EA}$ may be at least 10:1. By way of further example, in one embodiment, the ratio of the maximum width $W_{EA}$ to the maximum height $H_{EA}$ may be at least 15:1. By way of further example, in one embodiment, the ratio of the maximum width $W_{EA}$ to the maximum height $H_{EA}$ may be at least 20:1.

According to one embodiment, a ratio of the maximum width $W_{EA}$ to the maximum length $L_{EA}$ may be selected to be within a predetermined range that provides for an optimal configuration. For example, in one embodiment, a ratio of the maximum width $W_{EA}$ to the maximum length $L_{EA}$ may be in the range of from 1:5 to 5:1. By way of further example, in one embodiment a ratio of the maximum width $W_{EA}$ to the maximum length $L_{EA}$ may be in the range of from 1:3 to 3:1. By way of yet a further example, in one embodiment a ratio of the maximum width $W_{EA}$ to the maximum length $L_{EA}$ may be in the range of from 1:2 to 2:1.

According to embodiments of the present disclosure, each electrode structure 110 of members of the unit cell population comprise a length LE as measured in the transverse direction between first and second opposing transverse end surfaces 601a, 601b of the electrode structure 110, and a height $H_E$ as measured in the vertical direction between upper and lower opposing vertical end surfaces 500a, 500b of the electrode structure, and a width $W_E$ as measured in the longitudinal direction between first and second opposing surfaces 603a, 603b of the electrode structure, and each counter-electrode structure of members of the unit cell population comprises a length $L_{CE}$ as measured in the transverse direction between first and second opposing transverse end surfaces 602a, 602b of the counter-electrode structure, a height $H_{CE}$ as measured in the vertical direction between upper and lower second opposing vertical end surfaces 501a, 501b of the counter-electrode structure, and a width $W_{CE}$ as measured in the longitudinal direction between first and second opposing surfaces 604a, 604b of the counter-electrode structure.

According to one embodiment, a ratio of LE to each of $W_E$ and $H_E$ is at least 5:1, respectively, and a ratio of $H_E$ to $W_E$ is in the range of about 2:1 to about 100:1, for electrode structures of members of the unit cell population, and the ratio of $L_{CE}$ to each of $W_{CE}$ and $H_{CE}$ is at least 5:1, respectively, and a ratio of $H_{CE}$ to $W_{CE}$ is in the range of about 2:1 to about 100:1, for counter-electrode structures of members of the unit cell population. By way of further example, in one embodiment the ratio of LE to each of $W_E$ and $H_E$ is at least 10:1, and the ratio of $L_{CE}$ to each of $W_{CE}$ and $H_{CE}$ is at least 10:1. By way of further example, in one embodiment, the ratio of LE to each of $W_E$ and $H_E$ is at least 15:1, and the ratio of $L_{CE}$ to each of $W_{CE}$ and $H_{CE}$ is at least 15:1. By way of further example, in one embodiment, the ratio of LE to each of $W_E$ and $H_E$ is at least 20:1, and the ratio of $L_{CE}$ to each of $W_{CE}$ and $H_{CE}$ is at least 20:1.

In one embodiment, the ratio of the height ($H_E$) to the width ($W_E$) of the electrode structures is at least 0.4:1, respectively. For example, in one embodiment, the ratio of $H_E$ to $W_E$ will be at least 2:1, respectively, for each electrode structure of members of the unit cell population. By way of further example, in one embodiment the ratio of $H_E$ to $W_E$ will be at least 10:1, respectively. By way of further example, in one embodiment the ratio of $H_E$ to $W_E$ will be at least 20:1, respectively. Typically, however, the ratio of $H_E$ to $W_E$ will generally be less than 1,000:1, respectively. For example, in one embodiment the ratio of $H_E$ to $W_E$ will be less than 500:1, respectively. By way of further example, in one embodiment the ratio of $H_E$ to $W_E$ will be less than 100:1, respectively. By way of further example, in one embodiment the ratio of $H_E$ to $W_E$ will be less than 10:1, respectively. By way of further example, in one embodiment the ratio of $H_E$ to $W_E$ will be in the range of about 2:1 to about 100:1, respectively, for each electrode structure of members of the unit cell population.

In one embodiment, the ratio of the height ($H_{CE}$) to the width ($W_{CE}$) of the counter-electrode structures is at least 0.4:1, respectively. For example, in one embodiment, the ratio of $H_{CE}$ to $W_{CE}$ will be at least 2:1, respectively, for each counter-electrode structure of members of the unit cell population. By way of further example, in one embodiment the ratio of $H_{CE}$ to $W_{CE}$ will be at least 10:1, respectively. By way of further example, in one embodiment the ratio of $H_{CE}$ to $W_{CE}$ will be at least 20:1, respectively. Typically, however, the ratio of $H_{CE}$ to $W_{CE}$ will generally be less than 1,000:1, respectively. For example, in one embodiment the ratio of $H_{CE}$ to $W_{CE}$ will be less than 500:1, respectively. By way of further example, in one embodiment the ratio of $H_{CE}$ to $W_{CE}$ will be less than 100:1, respectively. By way of further example, in one embodiment the ratio of $H_{CE}$ to $W_{CE}$ will be less than 10:1, respectively. By way of further example, in one embodiment the ratio of $H_{CE}$ to $W_{CE}$ will be in the range of about 2:1 to about 100:1, respectively, for each counter-electrode structure of members of the unit cell population.

In one embodiment, the unit cell populations can comprise alternating sequence of electrode and counter-electrode structures 110 and 112, and, may include any number of members, depending on the energy storage device 100 and the intended use thereof. By way of further example, in one embodiment, and stated more generally, the population of electrode structures 110 and the population of counter-electrode structures 112 each have N members, each of N−1 electrode structure members 110 is between two counter-electrode structure members 112, each of N−1 counter-electrode structure members 112 is between two electrode structure members 110, and N is at least 2. By way of further example, in one embodiment, N is at least 4. By way of further example, in one embodiment, N is at least 5. By way of further example, in one embodiment, N is at least 10. By way of further example, in one embodiment, N is at least 25. By way of further example, in one embodiment, N is at least 50. By way of further example, in one embodiment, N is at least 100 or more.

In one embodiment, the electrode assembly 106 is enclosed within a volume V defined by the constraint system 108 that restrains overall macroscopic growth of the electrode assembly 106, as illustrated for example in FIGS. 1A and 1B. The constraint system 108 may be capable of restraining growth of the electrode assembly 106 along one or more dimensions, such as to reduce swelling and deformation of the electrode assembly 106, and thereby improve the reliability and cycling lifetime of an energy storage device 100 having the constraint system 108. Without being limited to any one particular theory, it is believed that carrier ions traveling between the electrode structures 110 and counter electrode structures 112 during charging and/or discharging of a secondary battery 102 and/or electrode assembly 106 can become inserted into electrode active material, causing the electrode active material and/or the electrode structure 110 to expand. This expansion of the electrode structure 110 can cause the electrodes and/or electrode assembly 106 to deform and swell, thereby compromising the structural integrity of the electrode assembly 106, and/or increasing the likelihood of electrical shorting or other failures. In one example, excessive swelling and/or expansion and contraction of the electrode active material layer 132 during cycling of an energy storage device 100 can cause fragments of electrode active material to break away and/or delaminate from the electrode active material layer 132, thereby compromising the efficiency and cycling lifetime of the energy storage device 100. In yet another example, excessive swelling and/or expansion and contraction of the electrode active material layer 132 can cause electrode active material to breach the electrically insulating microporous separator 130, thereby causing electrical shorting and other failures of the electrode assembly 106. Accordingly, the constraint system 108 inhibits this swelling or growth that can otherwise occur with cycling between charged and discharged states to improve the reliability, efficiency, and/or cycling lifetime of the energy storage device 100.

In one embodiment, a constraint system 108 comprising a primary growth constraint system 151 is provided to mitigate and/or reduce at least one of growth, expansion, and/or swelling of the electrode assembly 106 in the longitudinal direction (i.e., in a direction that parallels the Y axis), as shown for example in FIG. 1A. For example, the primary growth constraint system 151 can include structures configured to constrain growth by opposing expansion at longitudinal end surfaces 116, 118 of the electrode assembly 106. In one embodiment, the primary growth constraint system 151 comprises first and second primary growth constraints 154, 156, that are separated from each other in the longitudinal direction (stacking direction), and that can operate in conjunction with at least one primary connecting member 162 that connects the first and second primary growth constraints 154, 156 together to restrain growth in the electrode assembly 106 in the stacking direction. For example, the first and second primary growth constraints 154, 156 may at least partially cover first and second longitudinal end surfaces 116, 118 of the electrode assembly 106, and may operate in conjunction with connecting members 162, 164 connecting the primary growth constraints 154, 156 to one another to oppose and restrain any growth in the electrode assembly 106 that occurs during repeated cycles of charging and/or discharging.

According to embodiments herein, the primary constraint system 151 restrains growth of the electrode assembly 106 in the longitudinal direction such that any increase in the Feret diameter of the electrode assembly 106 in the longitudinal direction over 20 consecutive cycles (cycles between charged and discharges states) of the secondary battery 102 is less than 20%, or over 10 consecutive cycles of the secondary battery is less than 10%, or over 5 consecutive cycles is less than 10%, or is less than 1% per cycle of the battery. In one embodiment, any increase in the Feret diameter of the electrode assembly in the stacking direction over 20 consecutive cycles and/or 50 consecutive cycles of the secondary battery is less than 3% and/or less than 2%.

According to one embodiment, a projection of members of the electrode structure population 110 and the counter-electrode structure population 112 onto the first longitudinal surface circumscribes a first projected area 700a and a projection of the members of the electrode structure population 110 and the counter-electrode structure population 112 onto the second longitudinal surface circumscribes a second projected area 700b, and wherein the first and second primary growth constraints 154, 156 comprises first and second compression members that overlie the first and second projected areas 700a, 700b.

In addition, repeated cycling through charge and discharge processes in a secondary battery 102 can induce growth and strain not only in a longitudinal direction of the electrode assembly 106 (e.g., Y-axis in FIG. 1A), but can also induce growth and strain in directions orthogonal to the longitudinal direction, as discussed above, such as the transverse and vertical directions (e.g., X and Z axes, respectively, in FIG. 1A). Furthermore, in certain embodiments, the incorporation of a primary growth constraint system 151 to inhibit growth in one direction can even exacerbate growth and/or swelling in one or more other directions. For example, in a case where the primary growth constraint system 151 is provided to restrain growth of the electrode assembly 106 in the longitudinal direction, the intercalation of carrier ions during cycles of charging and discharging and the resulting swelling of electrode structures can induce strain in one or more other directions. In particular, in one embodiment, the strain generated by the combination of electrode growth/swelling and longitudinal growth constraints can result in buckling or other failure(s) of the electrode assembly 106 in the vertical direction (e.g., the Z axis as shown in FIG. 1A), or even in the transverse direction (e.g., the X axis as shown in FIG. 1A). Accordingly, in one embodiment of the present disclosure, a secondary growth constraint system 152 is provided that may operate in conjunction with the primary growth constraint system 151 to restrain growth of the electrode assembly 106 along multiple axes of the electrode assembly 106. For example, in one embodiment, the secondary growth constraint system 152 may be configured to interlock with, or otherwise synergistically operate with, the primary growth constraint system 151, such that overall growth of the electrode assembly 106 can be restrained to impart improved performance and reduced incidence of failure of the secondary battery having the electrode assembly 106 and primary and secondary growth constraint systems 151 and 152, respectively.

In one embodiment, a secondary constraint system 152 comprising the first and second connecting member 158, 160 restrains growth of the electrode assembly 106 in the vertical direction, such that any increase in the Feret diameter of the electrode assembly in the vertical direction over 20 consecutive cycles of the secondary battery is less than 20%, or over 10 consecutive cycles of the secondary battery is less than 10%, or over 5 consecutive cycles is less than 10%, or is less than 1% per cycle of the battery. In one embodiment, any increase in the Feret diameter of the electrode assembly in the vertical direction over 20 consecutive cycles and/or 50 consecutive cycles of the secondary battery is less than 3% and/or less than 2%.

Figure 6A:
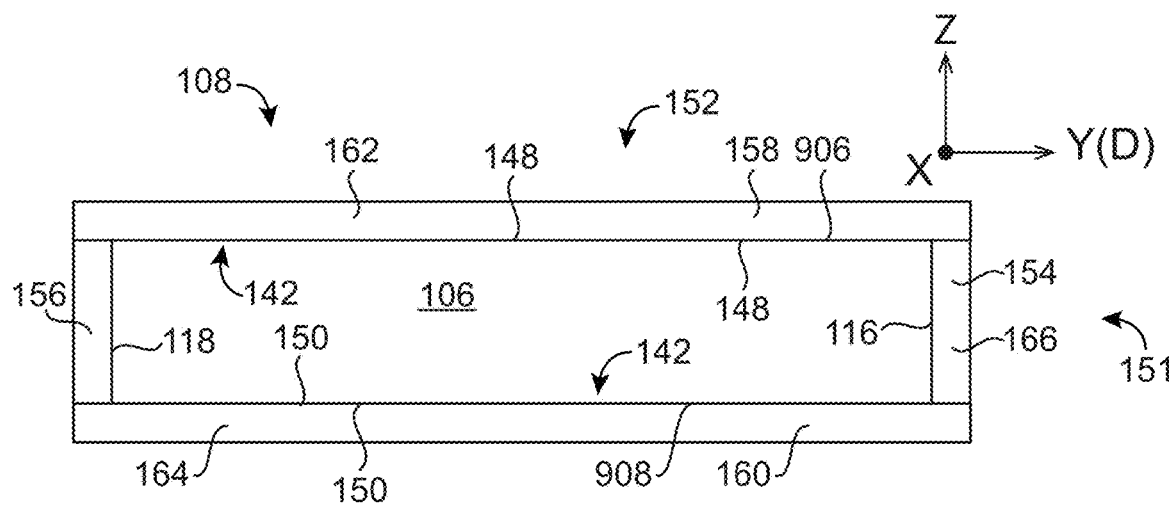
FIG. 6A illustrates a cross-section of an embodiment of the electrode assembly taken along the line A-A' as shown in FIG. 1A, and illustrates elements of embodiments of primary and secondary growth constraint systems.
Figure 6B:
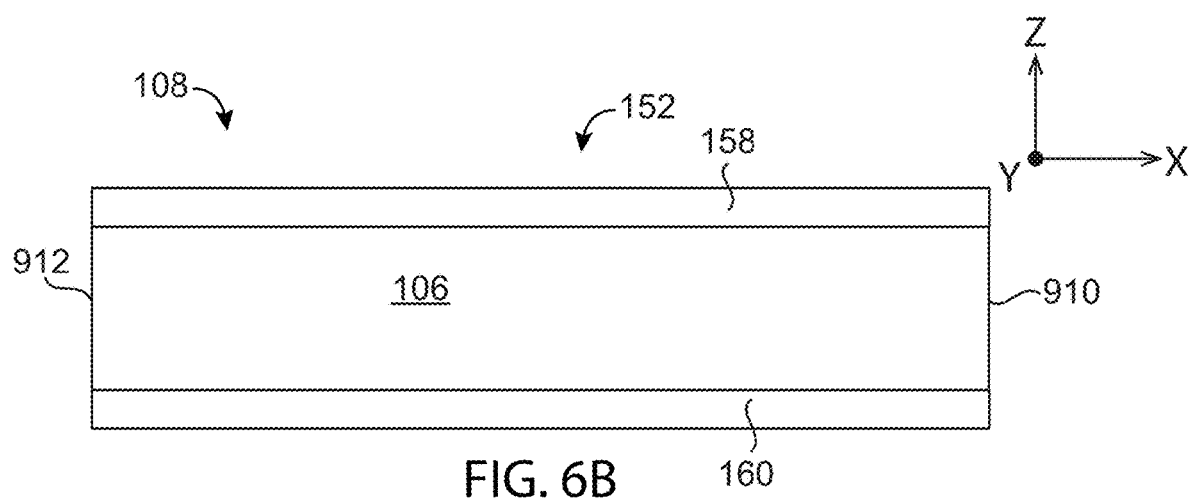
FIG. 6B illustrates a cross-section of an embodiment of the electrode assembly taken along the line B-B' as shown in FIG. 1A, and illustrates elements of embodiments of primary and secondary growth constraint systems.
Figure 6C:
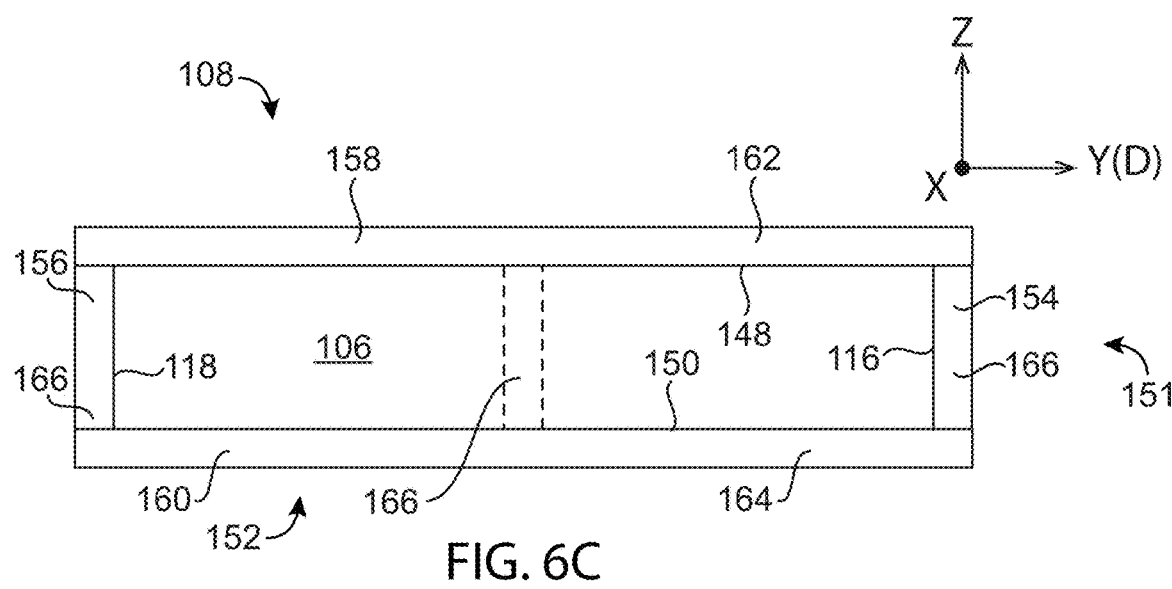
FIG. 6C illustrates a cross section of an embodiment of the electrode assembly taken along the line A-A' as shown in FIG. 1A and illustrates further elements of embodiments of primary and secondary growth constraint systems.

Referring to FIGS. 6A-6C, an embodiment of a constraint system 108 is shown having the primary growth constraint system 151 and the secondary growth constraint system 152 for an electrode assembly 106. FIG. 6A shows a cross-section of the electrode assembly 106 in FIG. 1A taken along the longitudinal axis (Y axis), such that the resulting 2-D cross-section is illustrated with the vertical axis (Z axis) and longitudinal axis (Y axis). FIG. 6B shows a cross-section of the electrode assembly 106 in FIG. 1A taken along the transverse axis (X axis), such that the resulting 2-D cross-section is illustrated with the vertical axis (Z axis) and transverse axis (X axis). As shown in FIG. 6A, the primary growth constraint system 151 can generally comprise first and second primary growth constraints 154, 156, respectively, that are separated from one another along the longitudinal direction (Y axis). For example, in one embodiment, the first and second primary growth constraints 154, 156, respectively, comprise a first primary growth constraint 154 that at least partially or even entirely covers a first longitudinal end surface 116 of the electrode assembly 106, and a second primary growth constraint 156 that at least partially or even entirely covers a second longitudinal end surface 118 of the electrode assembly 106. In yet another version, one or more of the first and second primary growth constraints 154, 156 may be interior to the longitudinal end surfaces 116, 118 of the electrode assembly 106, such as when one or more of the primary growth constraints comprise an internal structure of the electrode assembly 106. The primary growth constraint system 151 can further comprise at least one primary connecting member 162 that connects the first and second primary growth constraints 154, 156, and that may have a principal axis that is parallel to the longitudinal direction. For example, the primary growth constraint system 151 can comprise first and second primary connecting members 162, 164, respectively, that are separated from each other along an axis that is orthogonal to the longitudinal axis, such as along the vertical axis (Z axis) as depicted in the embodiment. The first and second primary connecting members 162, 164, respectively, can serve to connect the first and second primary growth constraints 154, 156, respectively, to one another, and to maintain the first and second primary growth constraints 154, 156, respectively, in tension with one another, so as to restrain growth along the longitudinal axis of the electrode assembly 106.

Further shown in FIGS. 6A-6C, the constraint system 108 can further comprise the secondary growth constraint system 152, that can generally comprise first and second secondary growth constraints 158, 160, respectively, that are separated from one another along a second direction orthogonal to the longitudinal direction, such as along the vertical axis (Z axis) in the embodiment as shown. For example, in one embodiment, the first secondary growth constraint 158 at least partially extends across a first region 148 of the lateral surface 142 of the electrode assembly 106, and the second secondary growth constraint 160 at least partially extends across a second region 150 of the lateral surface 142 of the electrode assembly 106 that opposes the first region 148. In yet another version, one or more of the first and second secondary growth constraints 154, 156 may be interior to the lateral surface 142 of the electrode assembly 106, such as when one or more of the secondary growth constraints comprise an internal structure of the electrode assembly 106. In one embodiment, the first and second secondary growth constraints 158, 160, respectively, are connected by at least one secondary connecting member 166, which may have a principal axis that is parallel to the second direction, such as the vertical axis. The secondary connecting member 166 may serve to connect and hold the first and second secondary growth constraints 158, 160, respectively, in tension with one another, so as to restrain growth of the electrode assembly 106 along a direction orthogonal to the longitudinal direction, such as for example to restrain growth in the vertical direction (e.g., along the Z axis). In the embodiment depicted in FIG. 6A, the at least one secondary connecting member 166 can correspond to at least one of the first and second primary growth constraints 154, 156. However, the secondary connecting member 166 is not limited thereto, and can alternatively and/or in addition comprise other structures and/or configurations.

According to one embodiment, the primary and secondary growth constraint systems 151, 152, respectively, are configured to cooperatively operate such that portions of the primary growth constraint system 151 cooperatively act as a part of the secondary growth constraint system 152, and/or portions of the secondary growth constraint system 152 cooperatively act as a part of the primary growth constraint system 151. For example, in the embodiment shown in in FIGS. 6A and 6B, the first and second primary connecting members 162, 164, respectively, of the primary growth constraint system 151 can serve as at least a portion of, or even the entire structure of, the first and second secondary growth constraints 158, 160 that constrain growth in the second direction orthogonal to the longitudinal direction. In yet another embodiment, as mentioned above, one or more of the first and second primary growth constraints 154, 156, respectively, can serve as one or more secondary connecting members 166 to connect the first and second secondary growth constrains 158, 160, respectively. Conversely, at least a portion of the first and second secondary growth constraints 158, 160, respectively, can act as first and second primary connecting members 162, 164, respectively, of the primary growth constraint system 151, and the at least one secondary connecting member 166 of the secondary growth constraint system 152 can, in one embodiment, act as one or more of the first and second primary growth constraints 154, 156, respectively. In yet another embodiment, at least a portion of the first and second primary connecting members 162, 164, respectively, of the primary growth constraint system 151, and/or the at least one secondary connecting member 166 of the secondary growth constraint system 152 can serve as at least a portion of, or even the entire structure of, the first and second tertiary growth constraints 157, 159, respectively, that constrain growth in the transverse direction orthogonal to the longitudinal direction. Accordingly, the primary and secondary growth constraint systems 151, 152, respectively, can share components and/or structures to exert restraint on the growth of the electrode assembly 106.

In one embodiment, the constraint system 108 can comprise structures such as the primary and secondary growth constraints, and primary and secondary connecting members, that are structures that are external to and/or internal to the battery enclosure 104, or may be a part of the battery enclosure 104 itself. In certain embodiments, the battery enclosure 104 may be a sealed enclosure, for example to seal liquid electrolyte therein, and/or to seal the electrode assembly 106 from the external environment. In one embodiment, the constraint system 108 can comprise a combination of structures that includes the battery enclosure 104 as well as other structural components. In one such embodiment, the battery enclosure 104 may be a component of the primary growth constraint system 151 and/or the secondary growth constraint system 152; stated differently, in one embodiment, the battery enclosure 104, alone or in combination with one or more other structures (within and/or outside the battery enclosure 104, for example, the primary growth constraint system 151 and/or a secondary growth constraint system 152) restrains growth of the electrode assembly 106 in the electrode stacking direction D and/or in the second direction orthogonal to the stacking direction, D. In one embodiment, one or more of the primary growth constraints 154, 156 and secondary growth constraints 158, 160 can comprise a structure that is internal to the electrode assembly. In another embodiment, the primary growth constraint system 151 and/or secondary growth constraint system 152 do not form any part of the battery enclosure 104, and instead one or more discrete structures (within and/or outside the battery enclosure 104) other than the battery enclosure 104 restrains growth of the electrode assembly 106 in the electrode stacking direction, D, and/or in the second direction orthogonal to the stacking direction, D. In another embodiment, the primary and secondary growth constraint systems, are within the battery enclosure, which may be a sealed battery enclosure, such as a hermetically sealed battery enclosure. The electrode assembly 106 may be restrained by the constraint system 108 at a pressure that is greater than the pressure exerted by growth and/or swelling of the electrode assembly 106 during repeated cycling of an energy storage device 100 or a secondary battery having the electrode assembly 106.

In one exemplary embodiment, the primary growth constraint system 151 includes one or more discrete structure(s) within the battery enclosure 104 that restrains growth of the electrode structure 110 in the stacking direction D by exerting a pressure that exceeds the pressure generated by the electrode structure 110 in the stacking direction D upon repeated cycling of a secondary battery 102 having the electrode structure 110 as a part of the electrode assembly 106. In another exemplary embodiment, the primary growth constraint system 151 includes one or more discrete structures within the battery enclosure 104 that restrains growth of the counter-electrode structure 112 in the stacking direction D by exerting a pressure in the stacking direction D that exceeds the pressure generated by the counter-electrode structure 112 in the stacking direction D upon repeated cycling of a secondary battery 102 having the counter-electrode structure 112 as a part of the electrode assembly 106. The secondary growth constraint system 152 can similarly include one or more discrete structures within the battery enclosure 104 that restrain growth of at least one of the electrode structures 110 and counter-electrode structures 112 in the second direction orthogonal to the stacking direction D, such as along the vertical axis (Z axis), by exerting a pressure in the second direction that exceeds the pressure generated by the electrode or counter-electrode structure 110, 112, respectively, in the second direction upon repeated cycling of a secondary battery 102 having the electrode or counter electrode structures 110, 112, respectively.

In yet another embodiment, the first and second primary growth constraints 154, 156, respectively, of the primary growth constraint system 151 restrain growth of the electrode assembly 106 by exerting a pressure on the first and second longitudinal end surfaces 116, 118 of the electrode assembly 106, meaning, in a longitudinal direction, that exceeds a pressure exerted by the first and second primary growth constraints 154, 156 on other surfaces of the electrode assembly 106 that would be in a direction orthogonal to the longitudinal direction, such as opposing first and second regions of the lateral surface 142 of the electrode assembly 106 along the transverse axis and/or vertical axis. That is, the first and second primary growth constraints 154, 156 may exert a pressure in a longitudinal direction (Y axis) that exceeds a pressure generated thereby in directions orthogonal thereto, such as the transverse (X axis) and vertical (Z axis) directions. For example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D, by a factor of at least 3. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D by a factor of at least 4. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 in at least one, or even both, of the two directions that are perpendicular to the stacking direction D, by a factor of at least 5.

Referring now to FIG. 6C, an embodiment of an electrode assembly 106 with a constraint system 108 is shown, with a cross-section taken along the line A-A' as shown in FIG. 1A. In the embodiment shown in FIG. 6C, the primary growth constraint system 151 can comprise first and second primary growth constraints 154, 156, respectively, at the longitudinal end surfaces 116, 118 of the electrode assembly 106, and the secondary growth constraint system 152 comprises first and second secondary growth constraints 158, 160 at the opposing first and second surface regions 148, 150 of the lateral surface 142 of the electrode assembly 106. According to this embodiment, the first and second primary growth constraints 154, 156 can serve as the at least one secondary connecting member 166 to connect the first and second secondary growth constrains 158, 160 and maintain the growth constraints in tension with one another in the second direction (e.g., vertical direction) that is orthogonal to the longitudinal direction. However, additionally and/or alternatively, the secondary growth constraint system 152 can comprise at least one secondary connecting member 166 that is located at a region other than the longitudinal end surfaces 116, 118 of the electrode assembly 106. Also, the at least one secondary connecting member 166 can be understood to act as at least one of a first and second primary growth constraint 154, 156 that is internal to the longitudinal ends 116, 118 of the electrode assembly, and that can act in conjunction with either another internal primary growth restraint and/or a primary growth restraint at a longitudinal end 116, 118 of the electrode assembly 106 to restrain growth. Referring to the embodiment shown in FIG. 6C, a secondary connecting member 166 can be provided that is spaced apart along the longitudinal axis away from the first and second longitudinal end surfaces 116, 118, respectively, of the electrode assembly 106, such as toward a central region of the electrode assembly 106. The secondary connecting member 166 can connect the first and second secondary growth constraints 158, 160, respectively, at an interior position from the electrode assembly end surfaces 116, 118, and may be under tension between the secondary growth constraints 158, 160 at that position. In one embodiment, the secondary connecting member 166 that connects the secondary growth constraints 158, 160 at an interior position from the end surfaces 116, 118 is provided in addition to one or more secondary connecting members 166 provided at the electrode assembly end surfaces 116, 118, such as the secondary connecting members 166 that also serve as primary growth constraints 154, 156 at the longitudinal end surfaces 116, 118. In another embodiment, the secondary growth constraint system 152 comprises one or more secondary connecting members 166 that connect with first and second secondary growth constraints 158, 160, respectively, at interior positions that are spaced apart from the longitudinal end surfaces 116, 118, with or without secondary connecting members 166 at the longitudinal end surfaces 116, 118. The interior secondary connecting members 166 can also be understood to act as first and second primary growth constraints 154, 156, according to one embodiment. For example, in one embodiment, at least one of the secondary connecting members 166 located at interior position(s) can comprise at least a portion of an electrode or counter electrode structure 110, 112, as described in further detail below.

More specifically, with respect to the embodiment shown in FIG. 6C, the secondary growth constraint system 152 may include a first secondary growth constraint 158 that overlies an upper region 148 of the lateral surface 142 of electrode assembly 106, and an opposing second secondary growth constraint 160 that overlies a lower region 150 of the lateral surface 142 of electrode assembly 106, the first and second secondary growth constraints 158, 160 being separated from each other in the vertical direction (i.e., along the Z-axis). Additionally, secondary growth constraint system 152 may further include at least one interior secondary connecting member 166 that is spaced apart from the longitudinal end surfaces 116, 118 of the electrode assembly 106. The interior secondary connecting member 166 may be aligned parallel to the Z axis and connects the first and second secondary growth constraints 158, 160, respectively, to maintain the growth constraints in tension with one another, and to form at least a portion of the secondary constraint system 152. In one embodiment, the at least one interior secondary connecting member 166, either alone or with secondary connecting members 166 located at the longitudinal end surfaces 116, 118 of the electrode assembly 106, may be under tension between the first and secondary growth constraints 158, 160 in the vertical direction (i.e., along the Z axis), during repeated charge and/or discharge of an energy storage device 100 and/or a secondary battery 102 having the electrode assembly 106, to reduce growth of the electrode assembly 106 in the vertical direction. Furthermore, in the embodiment as shown in FIG. 6C, the constraint system 108 further comprises a primary growth constraint system 151 having first and second primary growth constraints 154, 156, respectively, at the longitudinal ends 117, 119 of the electrode assembly 106, that are connected by first and second primary connecting members 162, 164, respectively, at the upper and lower lateral surface regions 148, 150, respectively, of the electrode assembly 106. In one embodiment, the secondary interior connecting member 166 can itself be understood as acting in concert with one or more of the first and second primary growth constraints 154, 156, respectively, to exert a constraining pressure on each portion of the electrode assembly 106 lying in the longitudinal direction between the secondary interior connecting member 166 and the longitudinal ends 117, 119 of the electrode assembly 106 where the first and second primary growth constraints 154, 156, respectively, can be located.

Figure 3A:
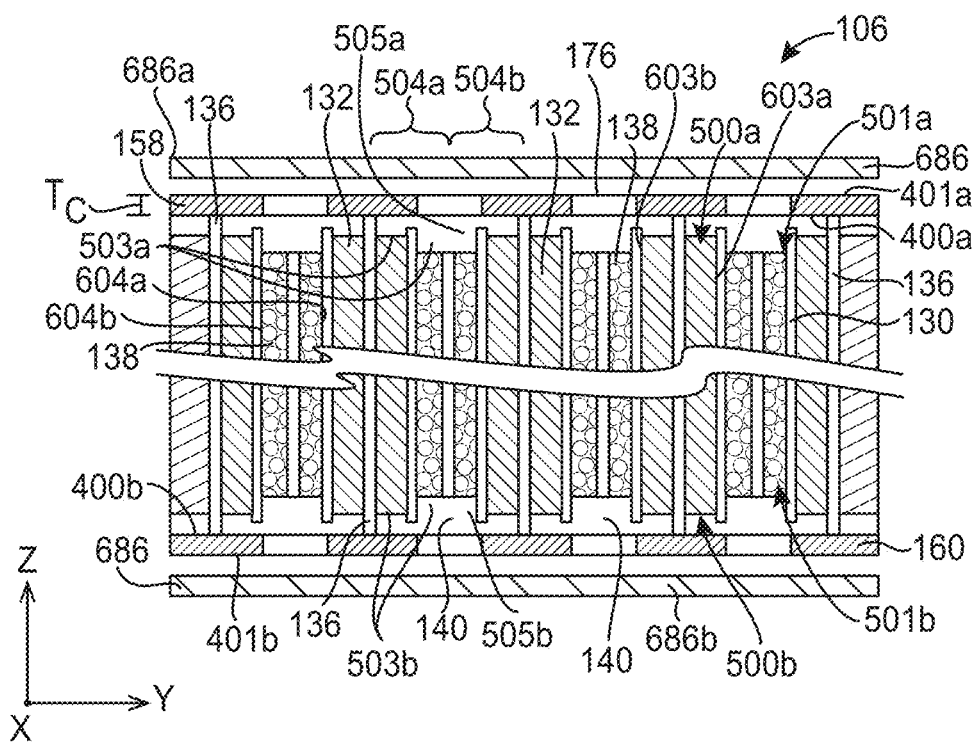
FIG. 3A illustrates a cross-section in a Z-Y plane, of embodiments of an electrode assembly, with an auxiliary electrodes.
Figure 3B:
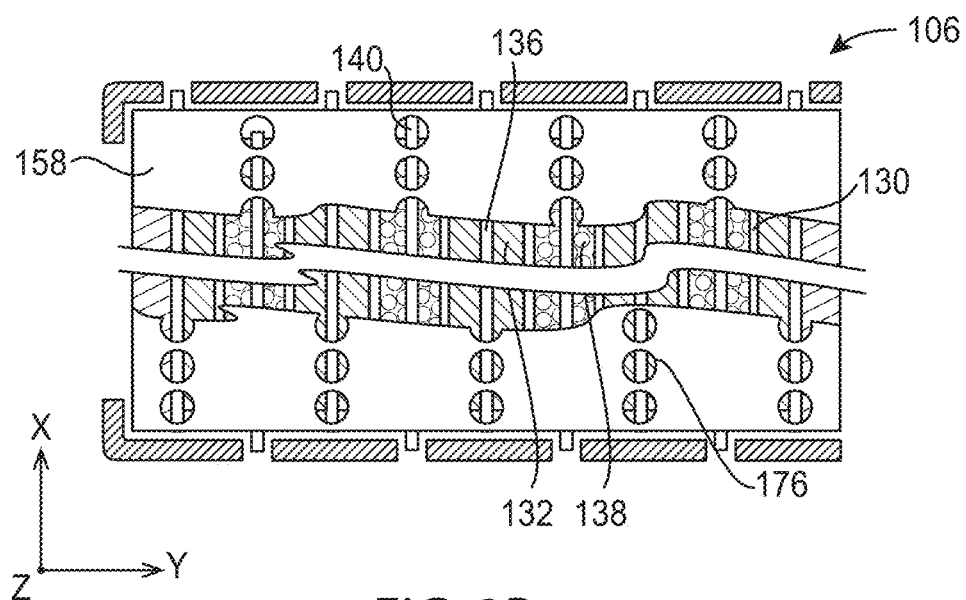
FIG. 3B illustrates a top view in the X-Y plane, of embodiments of an electrode assembly, with a constraint system having apertures therein.
Figure 4:
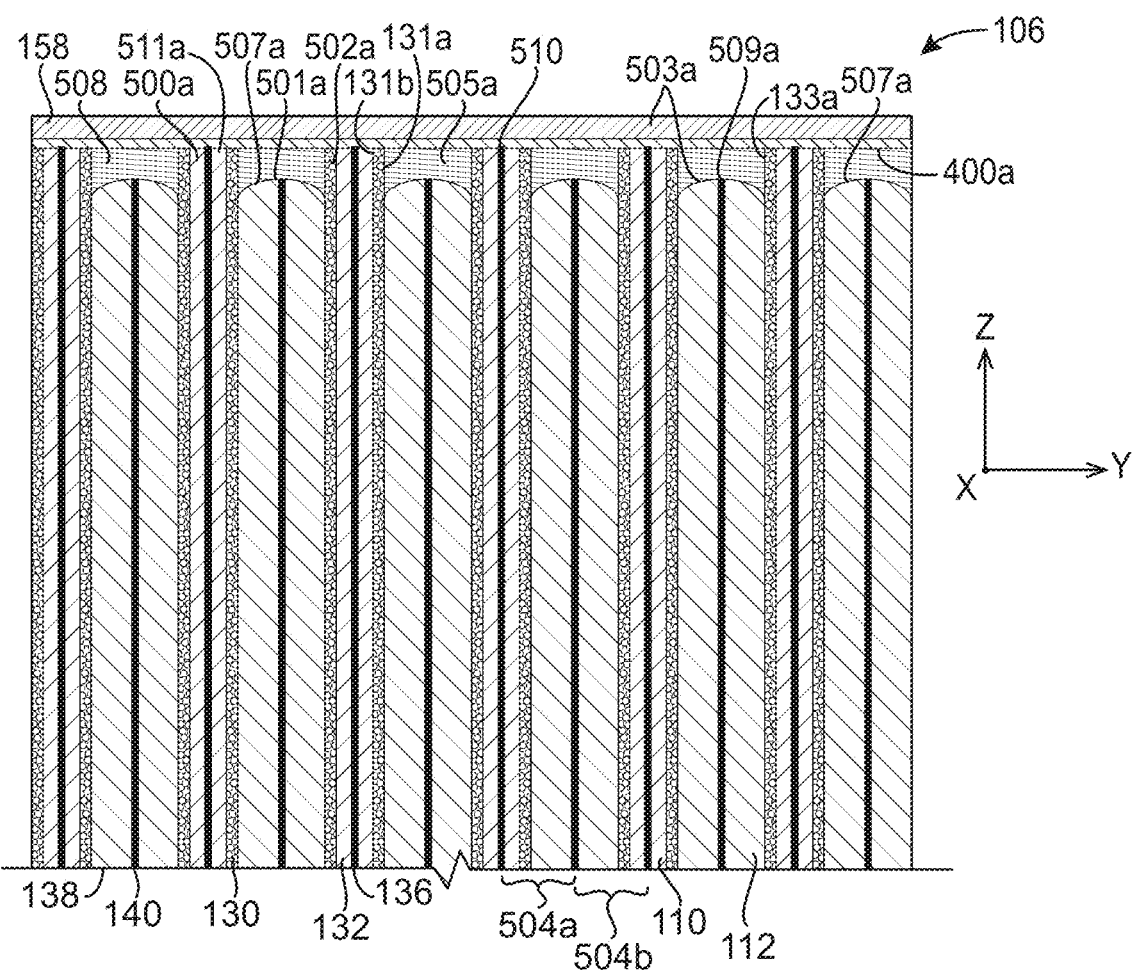
FIG. 4 is a cross-sectional view of an embodiment of an electrode assembly bonded to a constraint system.

According to one embodiment, the first and second primary connecting members 162, 164 (which may be the same as the first and second secondary growth constraints 158, 160), respectively, are connected to a secondary connecting member 166 that comprises at least a portion of an electrode 110 or counter electrode 112 structure, or other interior structure of the electrode assembly 106. In one embodiment, the first primary connecting member 162 (which may be the first secondary growth constraint 158) is connected to the upper end surface(s) 500a, 501a of the electrode and/or counter-electrode structures 110, 112 of a subset 515 of members of the unit cell population 504. In another embodiment, the second primary connecting member 164 (which may be the second secondary growth constraint 160) is connected to the lower end surface(s) 500b, 501b of the electrode or counter-electrode structures 110, 112 of a subset 515 of members of the unit cell population 504. The subset 515 of the unit cell members that are connected at the upper end surface(s) may be the same as the subset of unit cell members that are connected at the lower end surface(s), or may be different subsets. In one embodiment, the first and/or second secondary growth constraints 158, 160 can be connected to other interior structures in the electrode assembly forming the secondary connecting member 166. In one embodiment, the first and/or second secondary growth constraints 158, 160 may be connected to upper and/or lower end surfaces of the electrode structures 110 and/or counter-electrode structures 112 including one or more of the electrode current collector 136, electrode active material layer 132, counter-electrode current collector 140 and counter-electrode active material layer 138, in members of the unit cell population 504. In another example, the first and second secondary growth constraints 158, 160 can be connected to upper and/or lower end surfaces of the electrically insulating separator 130. Accordingly, the secondary connecting member 166 can comprise, in certain embodiments, one or more of the electrode structures 110 and/or counter-electrodes structures 112 including one or more of the electrode current collector 136, electrode active material layer 132, counter-electrode current collector 140 and counter-electrode active material layer 138, in members of the unit cell population 504. Referring to FIGS. 3A-3B, embodiments are shown in which the first and second secondary growth constraints 158, 160 are connected to secondary connecting members 166 comprising the electrode current collectors 136 of subsets of members of the unit cell population. In FIG. 4, the first and second secondary growth constraints 158, 160 are connected to secondary connecting members 166 comprising electrode structures 110 including the electrode current collectors 136. In one embodiment, members of the population of electrode structures 110 comprise electrode current collectors 136 having opposing upper and lower end surfaces 510a, 510b in the vertical direction, and members of the population of counter-electrode structures comprise counter-electrode current collectors 140 having opposing upper and lower end surfaces 509a, 509b in the vertical direction, and wherein the first and second connecting members 162, 164 are connected to vertical end surfaces of the electrode and/or counter-electrode current collectors of the subset of members of the electrode and/or counter-electrode population.

Referring to FIG. 4, in one embodiment, the first and second primary connecting members 162, 164 separated in the vertical direction respectively connect the first and second primary growth constraints 154, 156, and further connect to a subset of the members of the electrode or counter-electrode population 110, 112. According to embodiments herein, the first and second connecting members 158, 160 have opposing upper and lower inner surfaces 400a, 400b to which the upper and lower end surfaces of the subset 500a, 501a, 500b, 501b are adhered, respectively, by an electrically-insulating, thermoplastic, hot-melt adhesive 511. In some embodiments, the hot-melt adhesive 511 comprises a material selected from but not limited to EAA (ethylene-co-acrylic acid), EMAA (ethylene-co-methacrylic acid), functionalized polyethylenes and polypropylenes, and combinations thereof. For example, in one embodiment, the hot melt adhesive comprises a mixture of EAA and EMAA copolymers. In one embodiment, the hot-melt adhesive 511 has a film shape with a thickness in the range of about 10 to about 100 micrometers and a predetermined pattern geometry.

Referring to FIGS. 3A-3B, in one embodiment, the first and/or second primary connecting members 162, 164 (which may be the same or different than the first and/or second secondary growth constraints 158, 160) comprise apertures 176 formed through respective vertical thicknesses Tc thereof. According to embodiments herein, the apertures 176 can provide passages for the flow of carrier ions from an auxiliary electrode 686 through the first and/or second primary connecting members 162, 164 and to members of the unit cell population. For example, for an auxiliary electrode 686 located outside the volume V enclosed by the constraint system 108, e.g. positioned externally to first and/or second primary connecting members 162, 164, the carrier ions provided from the auxiliary electrode 686 can access the unit cell member of the electrode assembly inside the constraints, via passage through the apertures. The auxiliary electrode 686 may be selectively electrically connected or coupled to one or more of the electrode structures 110 and/or the counter-electrode structures 112 of the unit cell members, e.g., by a switch and/or a control unit (not shown). According to certain embodiments, the auxiliary electrode is electrolytically or otherwise coupled to the counter-electrode structure and/or the electrode structure (e.g. through the separator) of members of the unit cell population, to provide a flow of carrier ions from the auxiliary electrode to the electrode and/or counter-electrode structures. By electrolytically coupled, it is meant that the carrier ions can be transferred through electrolyte, such as from the auxiliary electrode to the electrode and/or counter-electrode structures 110, 112, as well as between electrode and counter-electrode structures 110, 112. The auxiliary electrode 686 is also electrically coupled directly or indirectly to the electrode and/or counter-electrode structures, such by a series of wires or other electrical connection.

Figure 5:
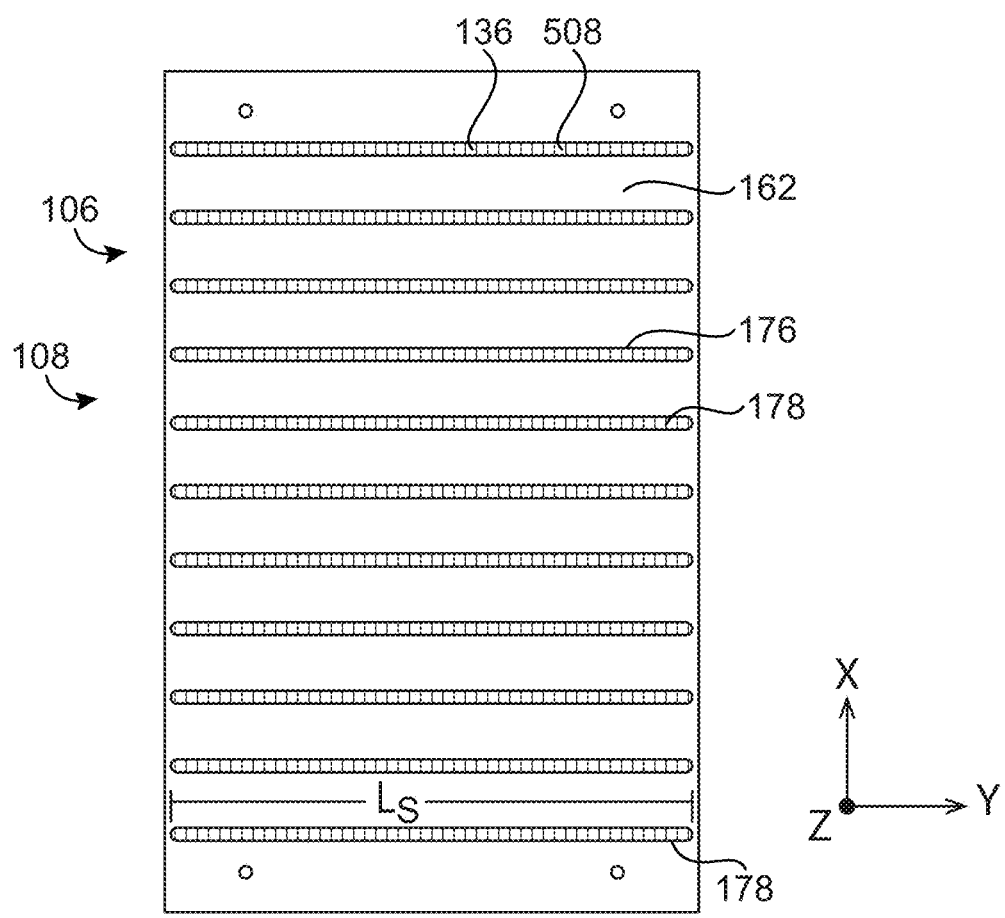
FIG. 5 is a top view of an embodiment of an electrode assembly, showing a constraint system adhered to electrode current collectors.

In the embodiment shown in FIG. 5, which depicts a top view of electrode assembly 106 showing the first primary connecting members 162, the apertures 176 comprise a slot-shape with the elongated dimension oriented in the longitudinal and/or stacking direction (Y-direction), and which extends across a plurality of unit cell members. Other shapes and/or configurations of the apertures 176 may also be provided. For example, in one embodiment, the plurality of apertures comprise a plurality of slots 178 spaced apart from one another in a transverse direction that is orthogonal to the stacking direction and the vertical direction, each slot 178 having a longitudinal axis $L_s$ oriented in the stacking direction, and wherein each slot extends across a plurality of members of the unit cell population. In some embodiments, the first and/or second primary connecting members 162, 164 comprise bonding regions 901a, 901b of the inner surfaces 400a, 400b that are adjacent the apertures 176. The bonding regions 901a, 901b can comprise, for example, regions where adhesive such as the hot melt adhesive 511 is provided for adhering to the subset of the members of the electrode and/or counter-electrode population 110, 112. As shown in FIG. 5, in some embodiments, the apertures 176 comprise a plurality of slots extending in the longitudinal direction, and the bonding regions 901a, 901b that to adhere to the subset of the members of the electrode and/or counter-electrode population 110, 112 are located on inner surface regions 400a, 400b in between the slots of the first and/or second connecting members 158, 160.

Figure 2:
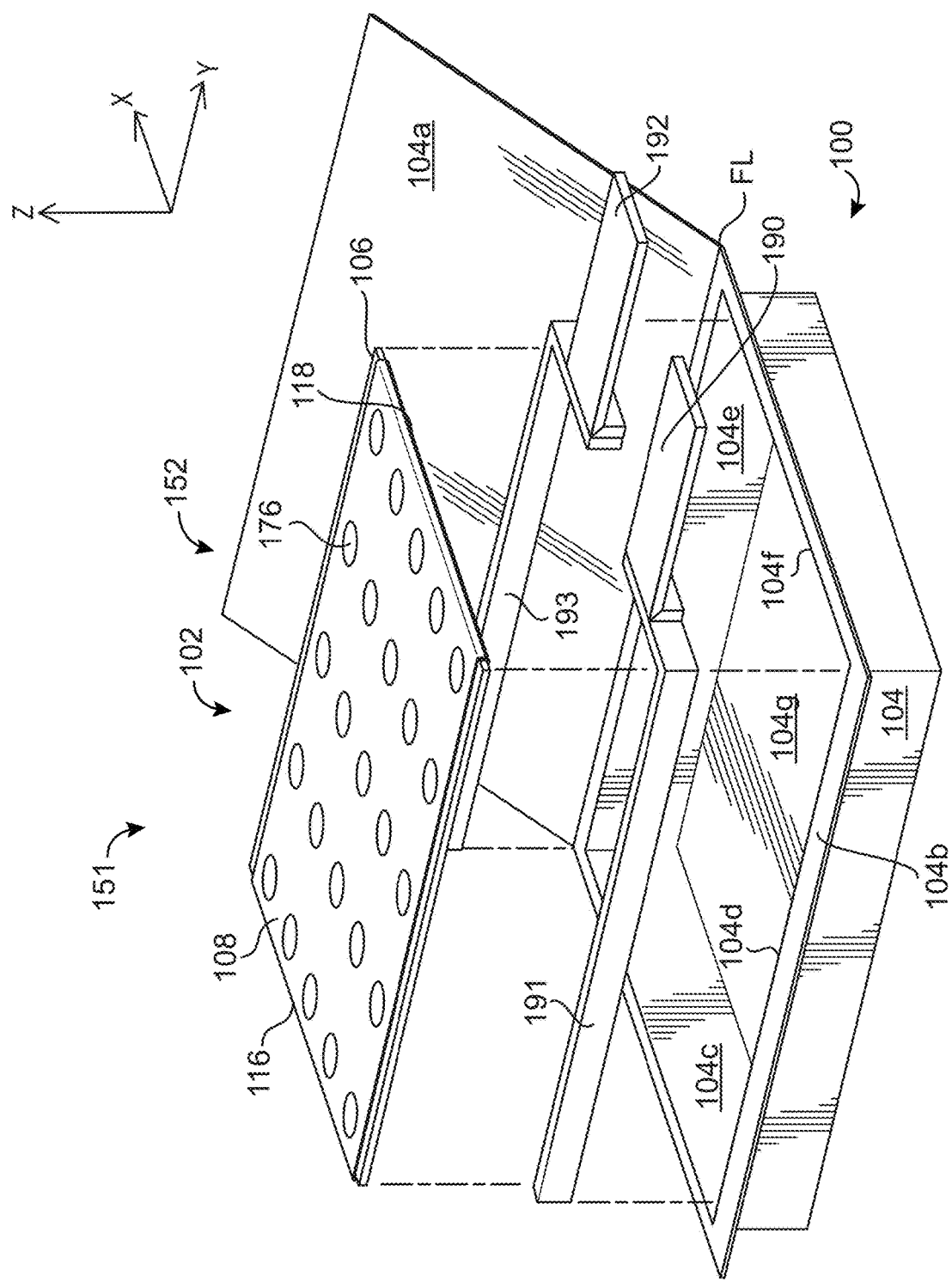
FIG. 2 illustrates an exploded view of an embodiment of an energy storage device or a secondary battery comprising an electrode assembly and set of electrode constraints.

Referring now to FIG. 2, illustrated is an exploded view of one embodiment of a secondary battery 102 comprising a secondary battery cell 902 (see FIGS. 7-9) having a constraint system 108 of the present disclosure. The secondary battery 102 includes a battery enclosure 104 and an electrode assembly 106 within the battery enclosure 104, the electrode assembly 106 having a first longitudinal end surface 116, an opposing second longitudinal end surface 118 (i.e., separated from first longitudinal end surface 116 along the Y axis the Cartesian coordinate system shown), as described above. Alternatively, the secondary battery 102 may comprise just a single electrode assembly 106 with constraints 108. Each electrode assembly 106 includes a population of electrode structures 110 and a population of counter-electrode structures 112, stacked relative to each other within each of the electrode assemblies 106 in a stacking direction D; stated differently, the populations of electrode 110 and counter-electrode 112 structures are arranged in an alternating series of electrodes 110 and counter-electrodes 112 with the series progressing in the stacking direction D between first and second longitudinal end surfaces 116, 118, respectively.

According to the embodiment shown in FIG. 2, tabs 190, 192 project out of the battery enclosure 104 and provide an electrical connection between the electrode assemblies 106 and an energy supply or consumer (not shown). More specifically, in this embodiment tab 190 is electrically connected to tab extension or busbar 191 (e.g., using an electrically conductive glue), and tab extension 191 is electrically connected to the electrodes 110 comprised by each of the electrode assemblies 106. Similarly, tab 192 is electrically connected to tab extension or busbar 193 (e.g., using an electrically conductive glue), and tab extension 193 is electrically connected to the counter-electrodes 112 comprised by each of electrode assemblies 106. The tab extensions 191, 193 may also serve as bus bars that pool current from each of the respective electrode and counter-electrode structures to which they are electrically connected.

Each electrode assembly 106 in the embodiment illustrated in FIG. 2 has an associated primary growth constraint system 151 to restrain growth in the longitudinal direction (i.e., stacking direction D). Alternatively, in one embodiment, a plurality of electrode assemblies 106 may share at least a portion of the primary growth constraint system 151. In the embodiment as shown, each primary growth constraint system 151 includes first and second primary growth constraints 154, 156, respectively, that may overlie first and second longitudinal end surfaces 116, 118, respectively, as described above; and first and second opposing primary connecting members 162, 164, respectively, that may overlie lateral surfaces 142, as described above. First and second opposing primary connecting members 162, 164, respectively, may pull first and second primary growth constraints 154, 156, respectively, towards each other, or alternatively stated, assist in restraining growth of the electrode assembly 106 in the longitudinal direction, and primary growth constraints 154, 156 may apply a compressive or restraint force to the opposing first and second longitudinal end surfaces 116, 118, respectively. As a result, expansion of the electrode assembly 106 in the longitudinal direction is inhibited during formation and/or cycling of the battery 102 between charged and discharged states. Additionally, primary growth constraint system 151 exerts a pressure on the electrode assembly 106 in the longitudinal direction (i.e., stacking direction D) that exceeds the pressure maintained on the electrode assembly 106 in either of the two directions that are mutually perpendicular to each other and are perpendicular to the longitudinal direction (e.g., as illustrated, the longitudinal direction corresponds to the direction of the Y axis, and the two directions that are mutually perpendicular to each other and to the longitudinal direction correspond to the directions of the X axis and the Z axis, respectively, of the illustrated Cartesian coordinate system).

Further, each electrode assembly 106 in the embodiment illustrated in FIG. 2 has an associated secondary growth constraint system 152 to restrain growth in the vertical direction (i.e., expansion of the electrode assembly 106, electrodes 110, and/or counter-electrodes 112 in the vertical direction (i.e., along the Z axis of the Cartesian coordinate system)). Alternatively, in one embodiment, a plurality of electrode assemblies 106 share at least a portion of the secondary growth constraint system 152. Each secondary growth constraint system 152 includes first and second secondary growth constraints 158, 160, respectively, that may overlie corresponding lateral surfaces 142, respectively, and at least one secondary connecting member 166, each as described in more detail above. Secondary connecting members 166 may pull first and second secondary growth constraints 158, 160, respectively, towards each other, or alternatively stated, assist in restraining growth of the electrode assembly 106 in the vertical direction, and first and second secondary growth constraints 158, 160, respectively, may apply a compressive or restraint force to the lateral surfaces 142), each as described above in more detail. As a result, expansion of the electrode assembly 106 in the vertical direction is inhibited during formation and/or cycling of the battery 102 between charged and discharged states. Additionally, secondary growth constraint system 152 exerts a pressure on the electrode assembly 106 in the vertical direction (i.e., parallel to the Z axis of the Cartesian coordinate system) that exceeds the pressure maintained on the electrode assembly 106 in either of the two directions that are mutually perpendicular to each other and are perpendicular to the vertical direction (e.g., as illustrated, the vertical direction corresponds to the direction of the Z axis, and the two directions that are mutually perpendicular to each other and to the vertical direction correspond to the directions of the X axis and the Y axis, respectively, of the illustrated Cartesian coordinate system).

When fully assembled, the sealed secondary battery 102 occupies a volume bounded by its exterior surfaces (i.e., the displacement volume), the secondary battery enclosure 104 occupies a volume corresponding to the displacement volume of the battery (including lid 104a) less its interior volume (i.e., the prismatic volume bounded by interior surfaces 104c, 104d, 104e, 104f, 104g and lid 104a) and each growth constraint 151, 152 occupies a volume corresponding to its respective displacement volume. In combination, therefore, the battery enclosure 104 and growth constraints 151, 152 occupy no more than 75% of the volume bounded by the outer surface of the battery enclosure 104 (i.e., the displacement volume of the battery). For example, in one such embodiment, the growth constraints 151, 152 and battery enclosure 104, in combination, occupy no more than 60% of the volume bounded by the outer surface of the battery enclosure 104. By way of further example, in one such embodiment, the constraints 151, 152 and battery enclosure 104, in combination, occupy no more than 45% of the volume bounded by the outer surface of the battery enclosure 104. By way of further example, in one such embodiment, the constraints 151, 152 and battery enclosure 104, in combination, occupy no more than 30% of the volume bounded by the outer surface of the battery enclosure 104. By way of further example, in one such embodiment, the constraints 151, 152 and battery enclosure 104, in combination, occupy no more than 20% of the volume bounded by the outer surface of the battery enclosure.

In general, the primary growth constraint system 151 and/or secondary growth constraint system 152 will typically comprise a material that has an ultimate tensile strength of at least 10,000 psi (>70 MPa), that is compatible with the battery electrolyte, does not significantly corrode at the floating or anode potential for the battery 102, and does not significantly react or lose mechanical strength at 45° C., and even up to 70° C. For example, the primary growth constraint system 151 and/or secondary growth constraint system 152 may comprise any of a wide range of metals, alloys, ceramics, glass, plastics, or a combination thereof (i.e., a composite). In one exemplary embodiment, primary growth constraint system 151 and/or secondary growth constraint system 155 comprises a metal such as stainless steel (e.g., SS 316, 440C or 440C hard), aluminum (e.g., aluminum 7075-T6, hard H18), titanium (e.g., 6Al-4V), beryllium, beryllium copper (hard), copper ($O_2$ free, hard), nickel; in general, however, when the primary growth constraint system 151 and/or secondary growth constraint system 155 comprises metal it is generally preferred that it be incorporated in a manner that limits corrosion and limits creating an electrical short between the electrodes 110 and counter-electrodes 112. In another exemplary embodiment, the primary growth constraint system 151 and/or secondary growth constraint system 155 comprises a ceramic such as alumina (e.g., sintered or Coorstek AD96), zirconia (e.g., Coorstek YZTP), yttria-stabilized zirconia (e.g., ENrG E-Strate®). In another exemplary embodiment, the primary growth constraint system 151 comprises a glass such as Schott D263 tempered glass. In another exemplary embodiment, the primary growth constraint system 151 and/or secondary growth constraint system 155 comprises a plastic such as polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass, (e.g., Victrex 90HMF40 or Xycomp 1000-04), polyimide (e.g., Kapton®). In another exemplary embodiment, the primary growth constraint system 151 and/or secondary growth constraint system comprises a composite such as E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy. In another exemplary embodiment, the primary growth constraint system 151 and/or secondary growth constraint system 155 comprises fibers such as Kevlar 49 Aramid Fiber, S Glass Fibers, Carbon Fibers, Vectran UM LCP Fibers, Dyneema, Zylon. In yet another embodiment, the primary growth constraint system 151 and/or secondary growth constraint system comprise a coating of insulating material such as insulating polymeric material on inner and/or outer surfaces thereof, such as for example on the inner and outer surfaces 400a, 400b, 401a, 401b of the first and second primary connecting members 162, 164.

Fast Charging Structures and Methods Thereof

Another aspect of the present disclosure is directed to structures including an electrode assembly, a sealed secondary battery cell comprising such electrode assembly, and a battery pack comprising such sealed secondary battery cell, that are capable of fast charging, as well as methods for fast charging such structures.

Accordingly, one embodiment of the present disclosure is an electrode assembly 106 for a secondary battery 102. Referring to FIGS. 1A-1D, in one embodiment, the electrode assembly 106 has mutually perpendicular transverse, longitudinal and vertical axes corresponding to the x, y and z axes, respectively, of an imaginary three-dimensional Cartesian coordinate system, opposing longitudinal end surfaces 116, 118 that are separated from each other in the longitudinal direction, and a lateral surface surrounding an electrode assembly longitudinal axis $A_{EA}$ and connecting the first and second longitudinal end surfaces 116, 118, the lateral surface having opposing vertical surfaces that are separated from each other in the vertical direction on opposing vertical sides of the longitudinal axis, opposing transverse surfaces that are separated from each other in the transverse direction on opposing transverse sides of the longitudinal axis, wherein the opposing longitudinal surfaces have a combined surface area, $L_{SA}$, the opposing transverse surfaces have a combined surface area, $T_{SA}$, the opposing vertical surfaces have a combined surface area, $V_{SA}$. The electrode assembly 106 further comprises an electrode structure population 110, an electrically insulating separator population 130, and a counter-electrode structure population 112, wherein members of the electrode structure, electrically insulating separator and counter-electrode structure populations are arranged in an alternating sequence along the longitudinal direction.

Figure 36:
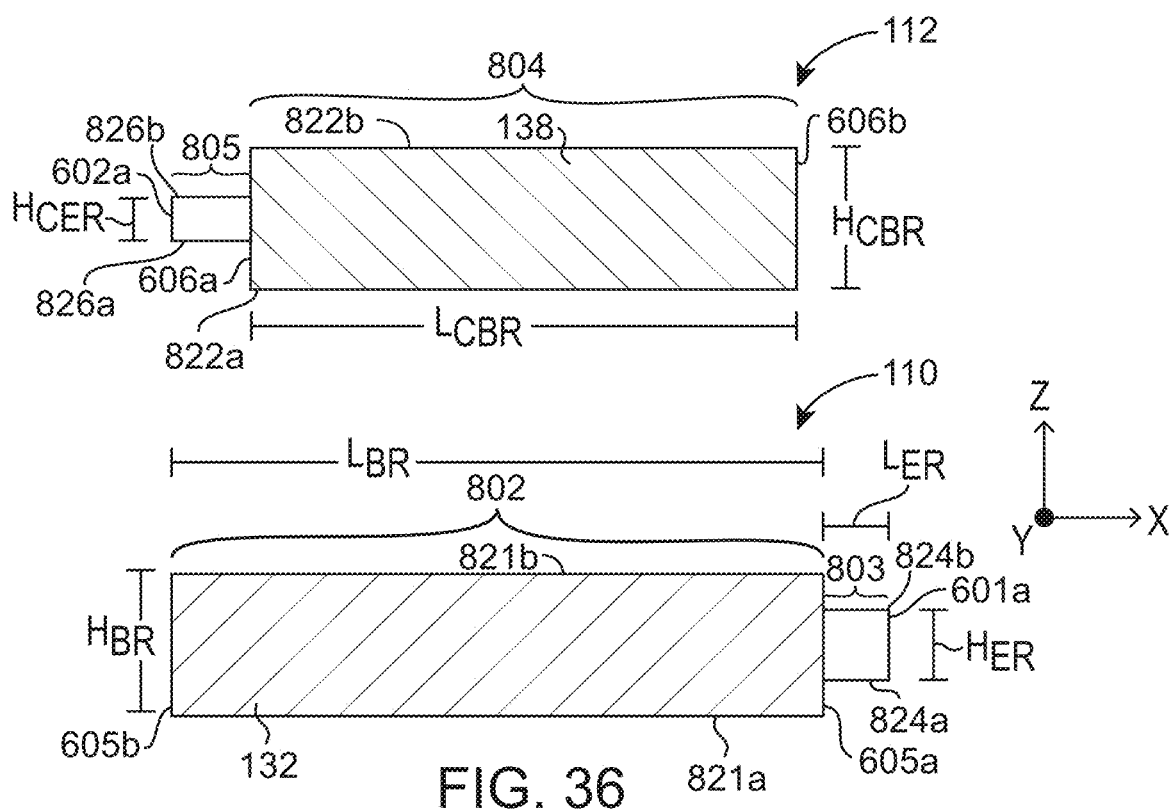
FIG. 36 shows an embodiment of an electrode structure comprising an electrode current collector having an electrode current collector body region and an electrode current collector end region, and an embodiment of a counter-electrode structure comprising a counter-electrode current collector having a counter-electrode current collector body region and a counter-electrode current collector end region, as shown along a cross-section in the X-Z plane.
Figure 37:
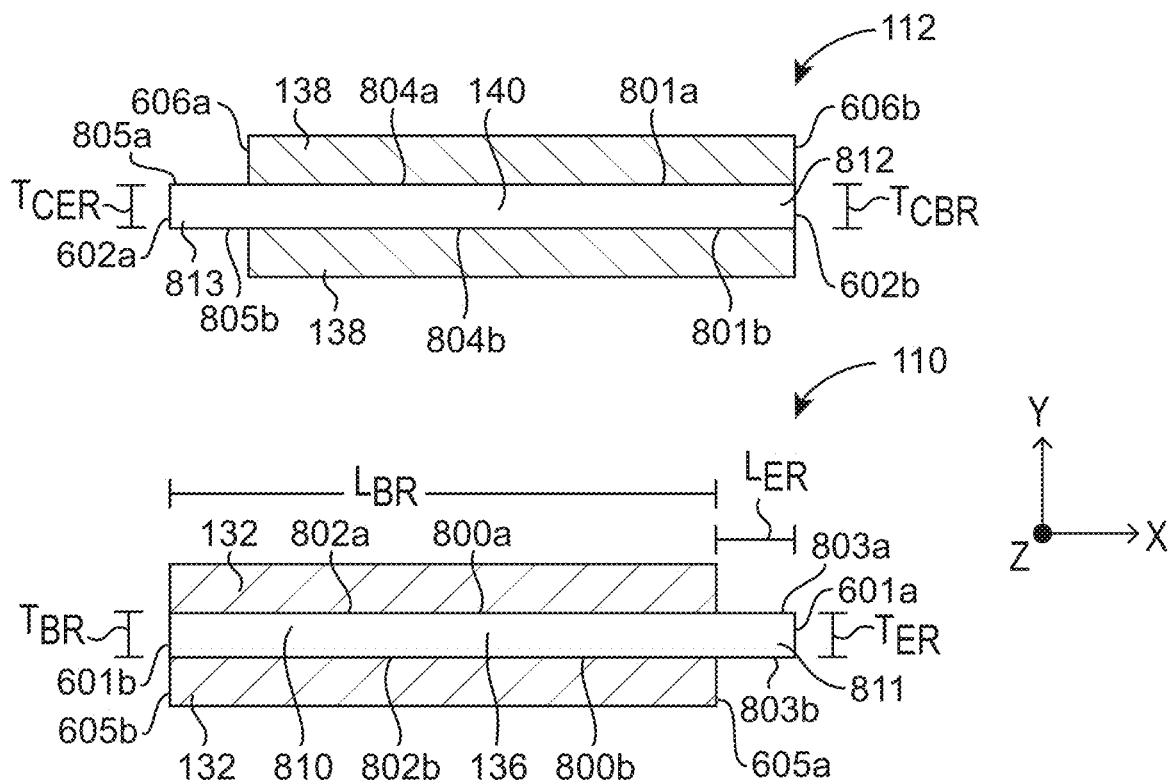
FIG. 37 shows the embodiment of the electrode structure and the embodiment of the counter-electrode structure of FIG. 36, as shown along a cross-section in the Y-X plane.

Referring to FIGS. 36-37, in one embodiment, members of the electrode structure population 110 comprise an electrode current collector 136 adjacent an electrode active material layer 132, the electrode active material layer 132 comprising opposing transverse ends 605a, 605b, and wherein members of the counter-electrode structure population 112 comprise a counter-electrode current collector 140 adjacent a counter-electrode active material layer 138, the counter-electrode active material layer comprising opposing transverse ends 606a, 606b.

Referring to FIG. 1C, in one embodiment, the electrode assembly 106 comprises a population of unit cells 504, each member of the unit cell population comprises, in a stacked series in the longitudinal direction, a unit cell portion of an electrode current collector 136, an electrode active material layer 132, an electrically insulating separator 130, a a counter-electrode active material layer 138, and a unit cell portion of a counter-electrode current collector 140.

Referring to FIGS. 36-37, in one embodiment, the electrode current collectors 136 have opposing electrode current collector surfaces 800a, 800b separated from each other in the longitudinal direction and the counter-electrode current collectors 140 have opposing counter-electrode current collector surfaces 801a, 801b separated from each other in the longitudinal direction, and one of the opposing electrode current collector surfaces comprises a coated region 802 that is covered with the electrode active material layer 132 and an uncoated region 803 that lacks the electrode active material layer, the uncoated region being proximate one of the transverse ends 601a, 601b of the electrode current collector 136.

In one embodiment, the electrode current collectors 136 have opposing electrode current collector surfaces 800a, 800b separated from each other in the longitudinal direction and the counter-electrode current collectors 140 have opposing counter-electrode current collector surfaces 801a, 801b separated from each other in the longitudinal direction, and one of the opposing counter-electrode current collector surfaces comprises a coated region 804 that is covered with the counter-electrode active material layer 138 and an uncoated region 805 that lacks the counter-electrode active material layer, the uncoated region being proximate one of the transverse ends 602a, 602b of the counter-electrode current collector 140.

In one embodiment, the electrode current collectors 136 have opposing electrode current collector surfaces 800a, 800b separated from each other in the longitudinal direction and the counter-electrode current collectors 140 have opposing counter-electrode current collector surfaces 801a, 801b separated from each other in the longitudinal direction, and each of the opposing electrode current collector surfaces comprises a coated region 802a, 802b that is covered with the electrode active material layer 132 and an uncoated region 803a, 803b that lacks the electrode active material layer, the uncoated region being proximate one of the transverse ends 601a, 601b of the electrode current collector 136.

In one embodiment, the electrode current collectors 136 have opposing electrode current collector surfaces 800a, 800b separated from each other in the longitudinal direction and the counter-electrode current collectors 140 have opposing counter-electrode current collector surfaces 801a, 801b separated from each other in the longitudinal direction, and each of the opposing counter-electrode current collector surfaces comprises a coated region 804a, 804b that is covered with the counter-electrode active material layer 132 and an uncoated region 805a, 805b that lacks the counter-electrode active material layer, the uncoated region being proximate one of the transverse ends 602a, 602b of the counter-electrode current collector 140.

Figure 39:
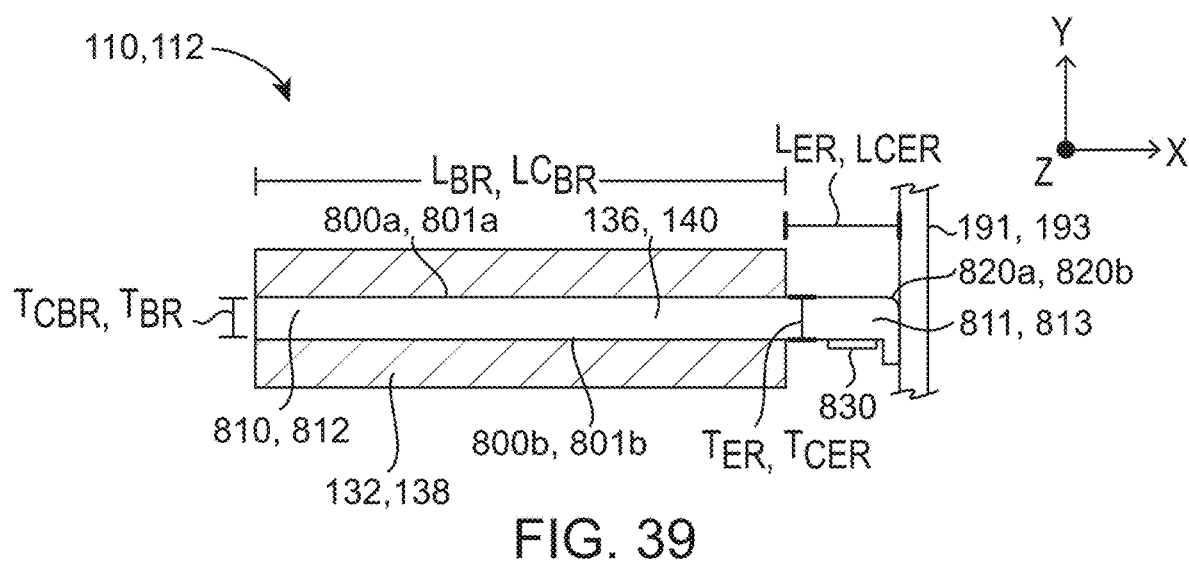
FIG. 39 shows an embodiment of an electrode and/or counter-electrode structure with electrode current collector and/or counter-electrode current collector connected to busbar and/or counter-electrode busbar.

In another embodiment, members of the electrode structure population 110 comprise an electrode current collector 136 adjacent an electrode active material layer 132, the electrode active material layer 132 comprising opposing transverse ends 605a, 605b, and wherein members of the counter-electrode structure population 112 comprise a counter-electrode current collector 140 adjacent a counter-electrode active material layer 138, the counter-electrode active material layer 138 comprising opposing transverse ends 606a, 606b. In one embodiment, each member of the electrode structure population 110 comprises an electrode current collector 136 that is partially coated by the adjacent electrode active material layer 132, the electrode current collector 136 having (i) an electrode current collector body region 810 coated by the adjacent electrode active material layer 132 and extending between the opposing first and second transverse ends 605a, 605b of the adjacent electrode active material layer 132, and (ii) an electrode current collector end region 811 on a first or second transverse end 601a, 601b of the electrode current collector 136, the electrode current collector end region 811 being bounded by and extending past the first or second transverse end 605a, 605b of the adjacent electrode active material layer 132 that is on a same transverse side as the electrode current collector end region 811 In one embodiment, each member of the counter-electrode structure population 112 comprises a counter-electrode current collector 140 that is partially coated by the adjacent counter-electrode active material layer 138, the counter-electrode current collector 140 having (i) a counter-electrode current collector body region 812 coated by the adjacent counter-electrode active material layer 138 and extending between the opposing first and second transverse ends 606a, 606b of the adjacent counter-electrode active material layer 138, and (ii) a counter-electrode current collector end region 813 on a first or second transverse end 602a, 602b of the counter-electrode current collector 140, the counter-electrode current collector end region 813 being bounded by and extending past the first or second transverse end 606a, 606b of the adjacent counter-electrode active material layer 138 that is on a same transverse side as the counter-electrode current collector end region 813. Referring to FIG. 39, in one embodiment, the electrode assembly 106 further comprises an electrode busbar 191 connected to the electrode current collector end regions 811 of the electrode current collectors 136 to electrically pool current from members of the electrode structure population 110. In another embodiment, the electrode assembly further comprises a counter-electrode busbar 193 connected to the counter-electrode current collector end regions 813 of the counter-electrode current collectors 140 to electrically pool current from members of the counter-electrode structure population 112.

Referring to FIGS. 36-37 and 39, in one embodiment, the length of the electrode current collector end region 811 in the transverse direction ($L_{ER}$) is as measured from the first or second transverse end 605a, 605b of the adjacent electrode active material layer 132 that is on a same transverse side as the electrode current collector end region 811, to a region 820a where the electrode current collector end region 811 connects with the electrode busbar 191. In another embodiment, the length of the counter-electrode current collector end region 813 in the transverse direction ($L_{CER}$) is as measured from the first or second transverse end 606a, 606b of the adjacent counter-electrode active material layer 138 that is on a same transverse side as the counter-electrode current collector end region 813, to a region 820b where the counter-electrode current collector end region 813 connects with the electrode busbar 193. In one embodiment, a height of the electrode current collector body region 810 in the vertical direction ($H_{BR}$) is as measured between opposing vertical surfaces 821a, 821b of the electrode current collector body region 810. In one embodiment, a height of the counter-electrode current collector body region 812 in the vertical direction ($H_{CBR}$) is as measured between opposing vertical surfaces 822a, 822b of the counter-electrode current collector body region 812. In one embodiment, a height of the electrode current collector end region 811 in the vertical direction ($H_{ER}$) is as measured between opposing vertical surfaces 824a, 824b of the current collector end region 811. In one embodiment, a height of the counter-electrode current collector end region 813 in the vertical direction ($H_{CER}$) is as measured between opposing vertical surfaces 826a, 826b of the current collector end region 813.

In one embodiment, the length of the electrode current collector end region 811 in the transverse direction ($L_{ER}$)

and the height of the electrode current collector body region in the vertical direction ($H_{BR}$) satisfy the following relationship:

$$L_{ER} < 0.5 \times H_{BR}.$$

In another embodiment, the length of the electrode current collector end region in the transverse direction ($L_{ER}$) and the height of the electrode current collector body region in the vertical direction ($H_{BR}$) satisfy the relationship $L_{ER} < 0.4 \times H_{BR}$. In another embodiment, the length of the electrode current collector end region in the transverse direction ($L_{ER}$) and the height of the electrode current collector body region in the vertical direction ($H_{BR}$) satisfy the relationship $L_{ER} < 0.3 \times H_{BR}$.

In one embodiment, the length of the counter-electrode current collector end region 813 in the transverse direction ($L_{CER}$) and the height of the counter-electrode current collector body region in the vertical direction ($H_{CBR}$) satisfy the following relationship:

$$L_{CER} < 0.5 \times H_{CBR}.$$

In another embodiment, the length of the counter-electrode current collector end region in the transverse direction ($L_{CER}$) and the height of the counter-electrode current collector body region in the vertical direction ($H_{CBR}$) satisfy the relationship $L_{CER} < 0.4 \times H_{BR}$. In another embodiment, the length of the counter-electrode current collector end region in the transverse direction ($L_{CER}$) and the height of the counter-electrode current collector body region in the vertical direction ($H_{CBR}$) satisfy the relationship $L_{CER} < 0.3 \times H_{CBR}$.

In one embodiment, the height of the electrode current collector end region in the vertical direction ($H_{ER}$) and the height of the electrode current collector body region in the vertical direction ($H_{BR}$) satisfy the following relationship:

$$H_{ER} > 0.5 \times H_{BR}.$$

In another embodiment, the height of the electrode current collector end region in the vertical direction ($H_{ER}$) and the height of the electrode current collector body region in the vertical direction ($H_{BR}$) satisfy the following relationship $H_{ER} > 0.7 \times H_{BR}$. In another embodiment, the height of the electrode current collector end region in the vertical direction ($H_{ER}$) and the height of the electrode current collector body region in the vertical direction ($H_{BR}$) satisfy the relationship $H_{ER} > 0.9 \times H_{BR}$.

In one embodiment, the height of the counter-electrode current collector end region in the vertical direction ($H_{CER}$) and the height of the counter-electrode current collector body region in the vertical direction ($H_{CBR}$) satisfy the following relationship:

$$H_{CER} > 0.5 \times H_{CBR}.$$

In one embodiment, the height of the counter-electrode current collector end region in the vertical direction ($H_{CER}$) and the height of the counter-electrode current collector body region in the vertical direction ($H_{CBR}$) satisfy the relationship $H_{CER} > 0.7 \times H_{CBR}$. In another embodiment, the height of the counter-electrode current collector end region in the vertical direction ($H_{CER}$) and the height of the counter-electrode current collector body region in the vertical direction ($H_{CBR}$) satisfy the relationship $H_{CER} > 0.9 \times H_{CBR}$.

In one embodiment, the length of the electrode current collector end region in the transverse direction ($L_{ER}$) and the height of the electrode current collector end region in the vertical direction ($H_{ER}$) satisfy the following relationship:

$$L_{ER}/H_{ER} < 1$$

In one embodiment, the length of the counter-electrode current collector end region in the transverse direction ($L_{CER}$) and the height of the counter-electrode current collector end region in the vertical direction ($H_{CER}$) satisfy the following relationship:

$$L_{CER}/H_{CER} < 1$$

Referring to FIG. 39, in one embodiment, members of the electrode structure population 110 comprise electrode current collector end regions 811 having opposing surfaces 800a, 800b separated from each other in the longitudinal direction, and wherein at least one of the opposing surfaces of electrode current collector end regions comprise a layer 830 of thermally conductive material disposed thereon. In one embodiment, the electrode current collector end regions 811 electrically connect to the electrode busbar 191 via at least one of the opposing surfaces 800a, 800b, and wherein the layer of thermally conductive material is disposed on the other of the opposing surfaces 800a, 800b. In one embodiment, members of the counter-electrode structure population 112 comprise counter-electrode current collector end regions 813 having opposing surfaces 801a, 801b separated from each other in the longitudinal direction, and wherein at least one of the opposing surfaces 801a, 801b of counter-electrode current collector end regions comprise a layer 830 of thermally conductive material disposed thereon. In one embodiment, the counter-electrode current collector end regions 813 electrically connect to the counter-electrode busbar 193 via at least one of the opposing surfaces 801a, 801b, and wherein the layer 830 of thermally conductive material is disposed on the other of the opposing surfaces 801a, 801b. In one embodiment, the thermally conductive material comprises a thermally conductive ceramic material, such as alumina.

Figure 38:
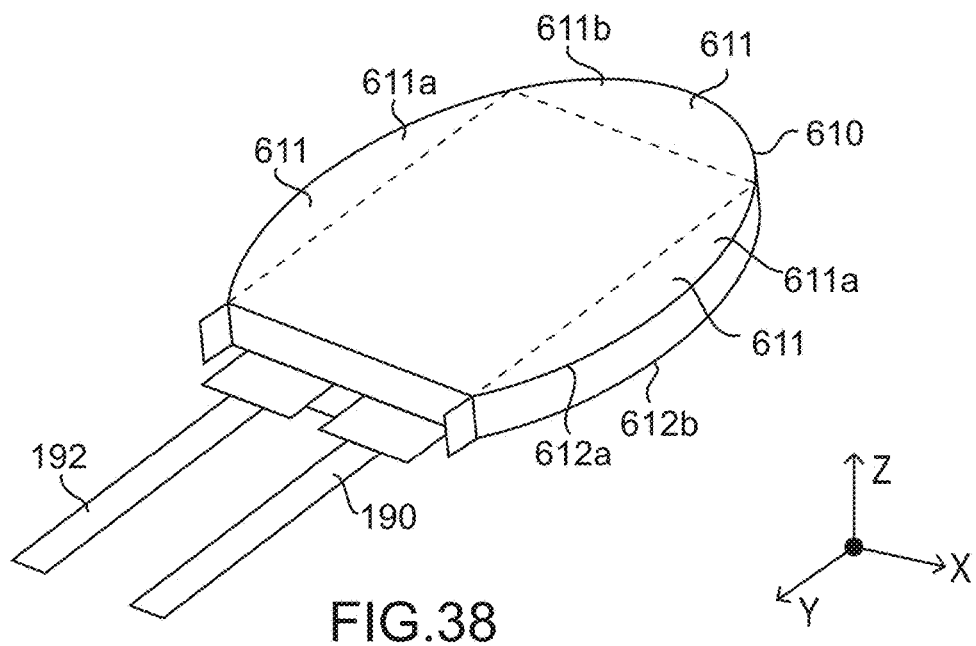
FIG. 38 shows an embodiment of a hermetically sealed secondary battery cell comprising gas containment compartments located on the transverse and longitudinal sides of the electrode assembly.

Another aspect of the present disclosure provides a sealed secondary battery cell comprising the electrode assembly disclosed herein. As shown in FIG. 38, The sealed secondary battery 102 is chargeable between a charged and discharged state, and the sealed secondary battery 102 comprises a hermetically sealed enclosure 610. Referring to FIGS. 1A-1D and 38, in one embodiment, the secondary battery cell 102 comprises one or more gas containment compartments 611 located externally to the electrode assembly 106 and within the hermetically sealed enclosure 610, to contain a gas evolved during charging or discharging of the secondary battery cell. In one embodiment, the one or more gas containment compartments 611 comprise any one or more of (i) a transverse containment compartment 611a located external to the transverse end surfaces 144, 146 of the electrode assembly in the transverse direction to contain the gas between the hermetically sealed enclosure and the electrode assembly on a transverse side of the electrode assembly, and (ii) a longitudinal containment compartment 611b located external to the longitudinal end surfaces 116, 118 of the electrode assembly in the longitudinal direction to contain the gas between the hermetically sealed enclosure 610 and the electrode assembly 106 on a longitudinal side of the electrode assembly. In one embodiment the transverse and longitudinal containment compartments 611a, 611b are configured to contain a volume of gas $V_{X,Y}$ evolved from the electrode assembly during charging or discharging of the secondary battery cell that is greater than any volume $V_Z$ of gas evolved from the electrode assembly during charging or discharging of the secondary battery cell that is contained in between the hermetically sealed enclosure 610 and the electrode assembly 106 on a vertical side 148, 150 of the electrode assembly. In another embodiment, the transverse and longitudinal containment compartments 611a, 611b have a greater volume, either alone or in combination with one another, than any space between the hermetically sealed enclosure and electrode assembly on either vertical side 148, 150 of the electrode assembly. For example, in one embodiment, the volume of gas Vxy is at least 1.5 times, at least 2 times, at least 3 times, at least 5 times, and/or at least 10 times a volume of gas Vz. In another embodiment, substantially no volume of gas Vz is contained on any vertical side of the electrode assembly. In one embodiment, one or more of the transverse and longitudinal containment compartments is configured to contain a volume of gas Vxy that is at least 4% of the volume of the sealed secondary cell. In one embodiment, one or more of the transverse and longitudinal containment compartments is configured to contain a volume of gas Vxy that is at least 5% of the volume of the sealed secondary cell.

In one embodiment, the sealed secondary battery cell 102 comprises a hermetically sealed enclosure 610 comprising a flexible polymer enclosure material, and the one or more transverse and longitudinal containment compartments 611(s) are formed by expansion of the hermetically sealed enclosure in at least one of the transverse and longitudinal directions upon charging or discharging of the sealed secondary battery. In another embodiment, the hermetically sealed enclosure 610 comprises a hermetically sealed case 2020, and the one or more transverse and longitudinal containment compartments 611(s) are formed in a space between walls of the hermetically case and the electrode assembly on one or more transverse and longitudinal sides of the electrode assembly.

Figure 14:
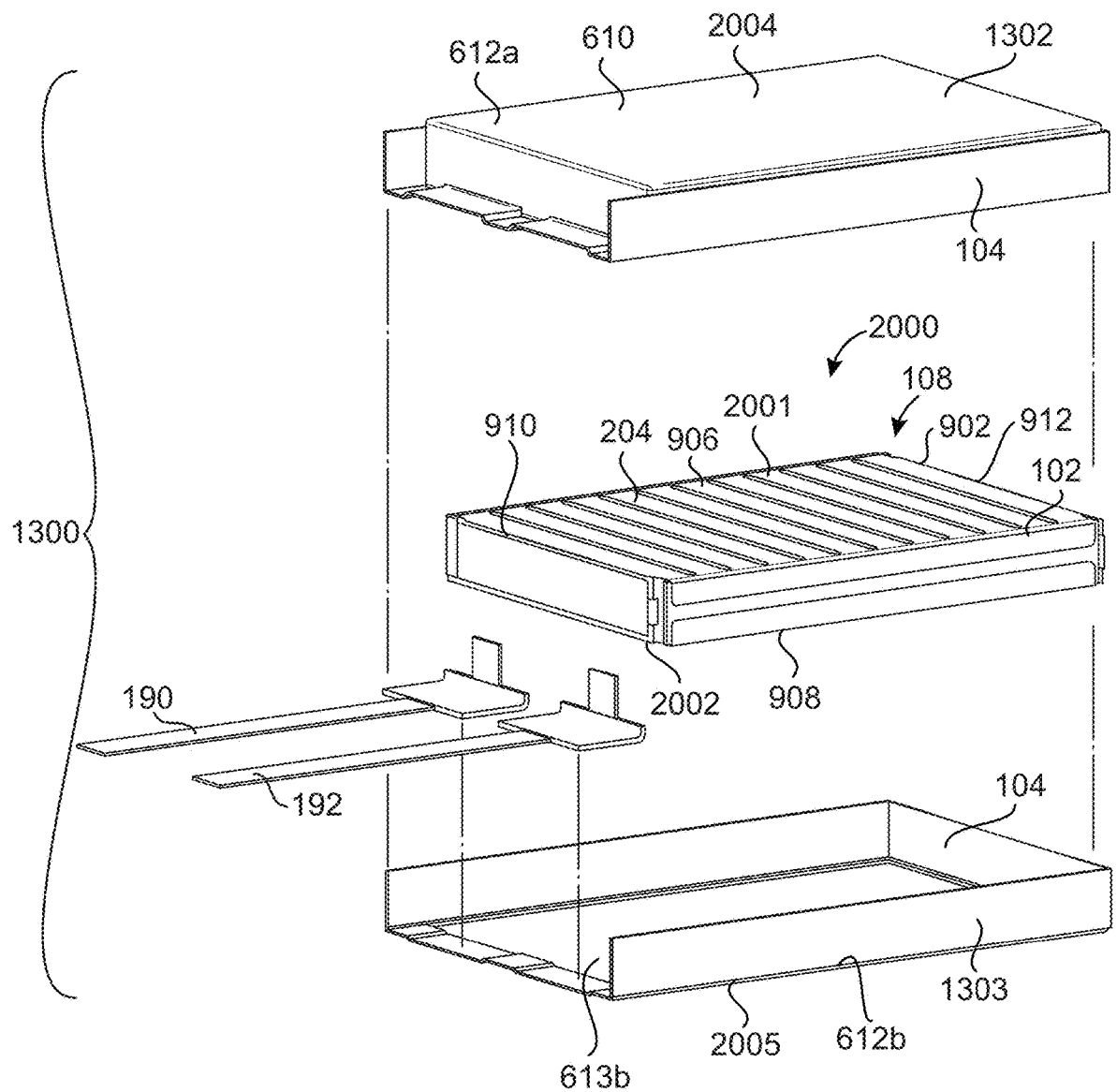
FIG. 14 illustrates an exploded view of an embodiment of the sealed secondary battery cell of FIG. 12.

To restrain growth of the secondary battery cell during charging/discharging cycles, as shown in FIGS. 1-2 and 14, in one embodiment, the sealed secondary battery cell 102 comprises a set of electrode constraints 108, and wherein the set of electrode constraints 108 comprises a vertical constraint system 2000 comprising first and second vertical growth constraints 2001, 2002 that are separated from each other in the vertical direction, the first and second vertical growth constraints 2001, 2002 being connected to members of the population of electrode structures 110 and/or members of the population of counter-electrode structures 112, and the vertical constraint system 2000 being capable of restraining growth of the electrode assembly 106 in the vertical direction.

Figure 15:
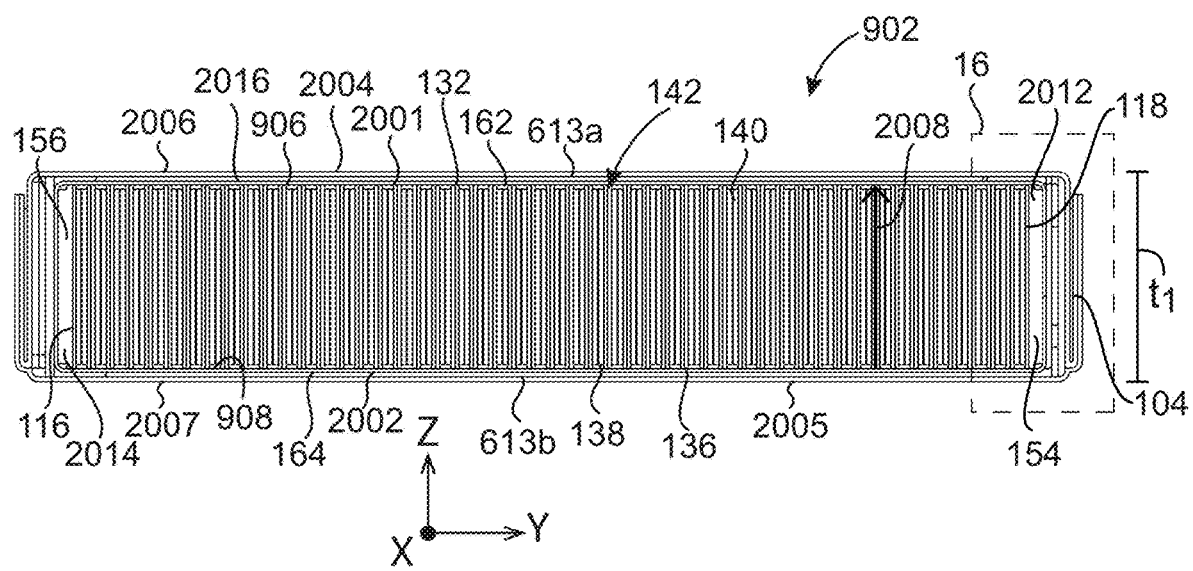
FIG. 15 illustrates a cross-section in a Z-Y plane, of embodiments of a sealed secondary battery cell.
Figure 16:
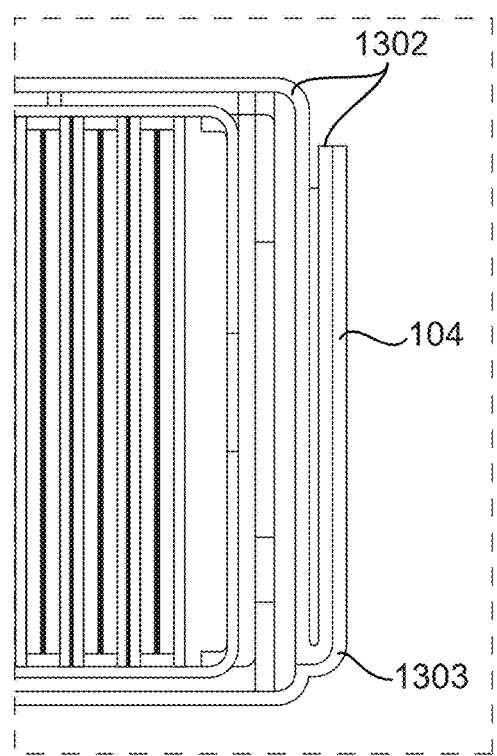
FIG. 16 is the enlarged view of one end of the cross-section of FIG. 15.
Figure 17:
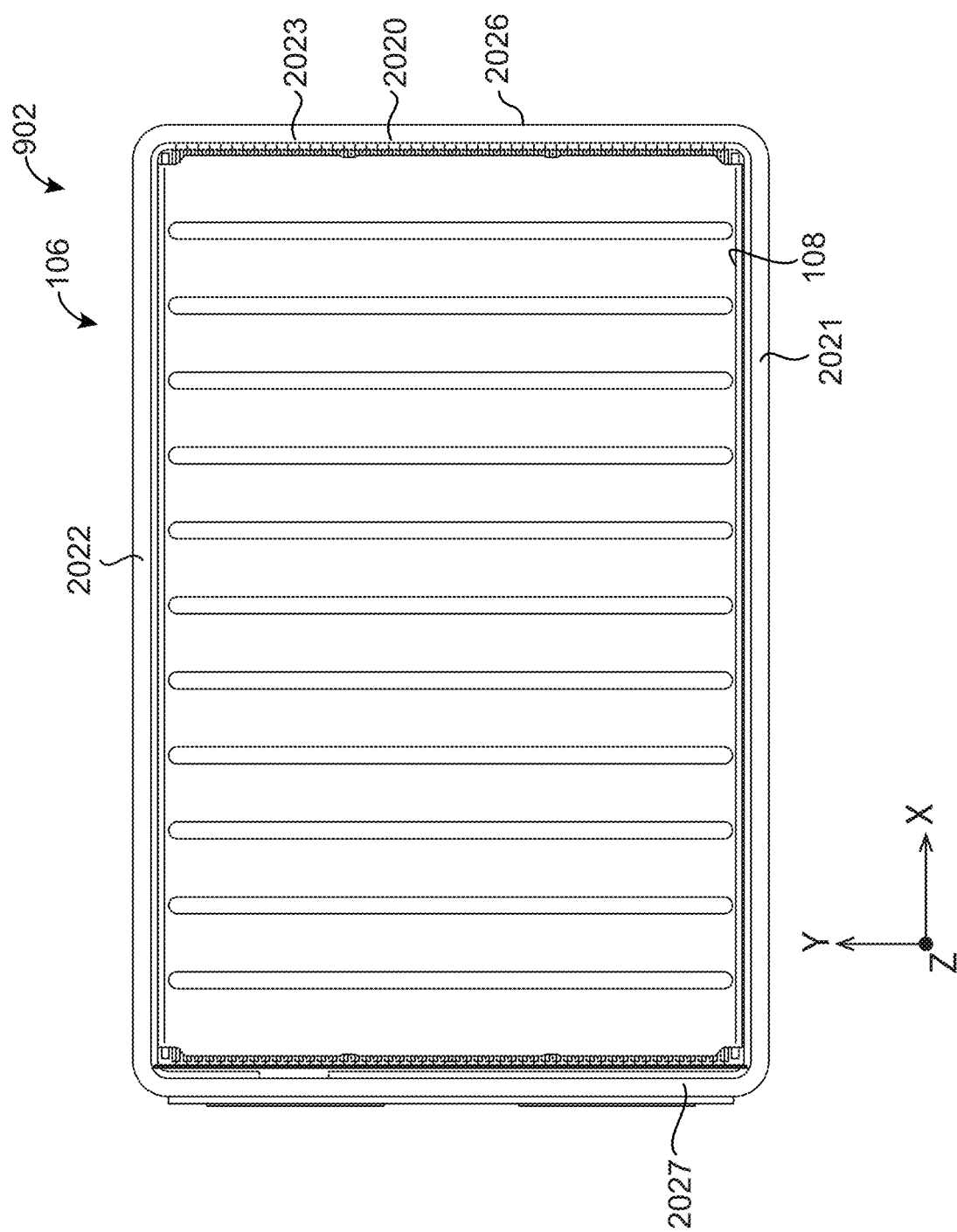
FIG. 17 is a top view of one embodiment of a secondary battery cell in a bottom portion of a hermetically sealed case.
Figure 18:
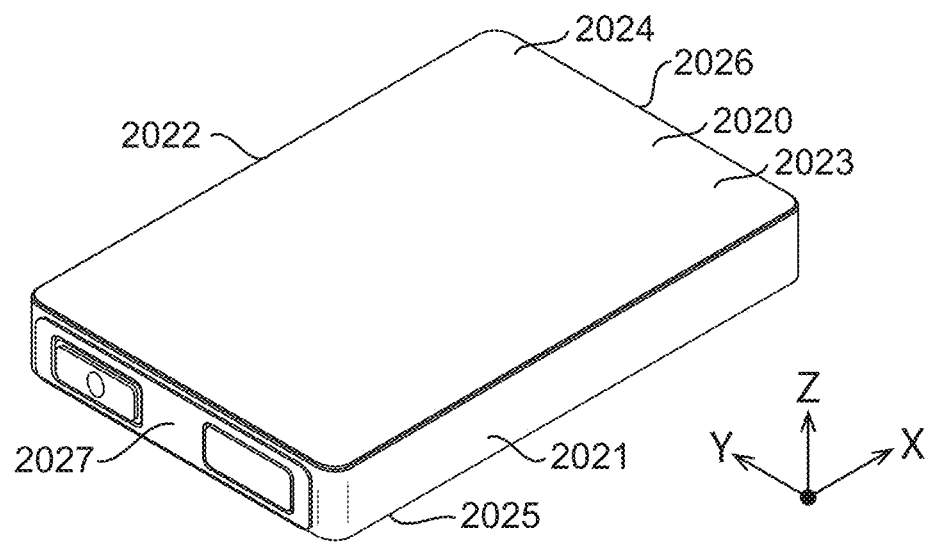
FIG. 18 is a perspective view of an embodiment of a hermetically sealed case.
Figure 19:
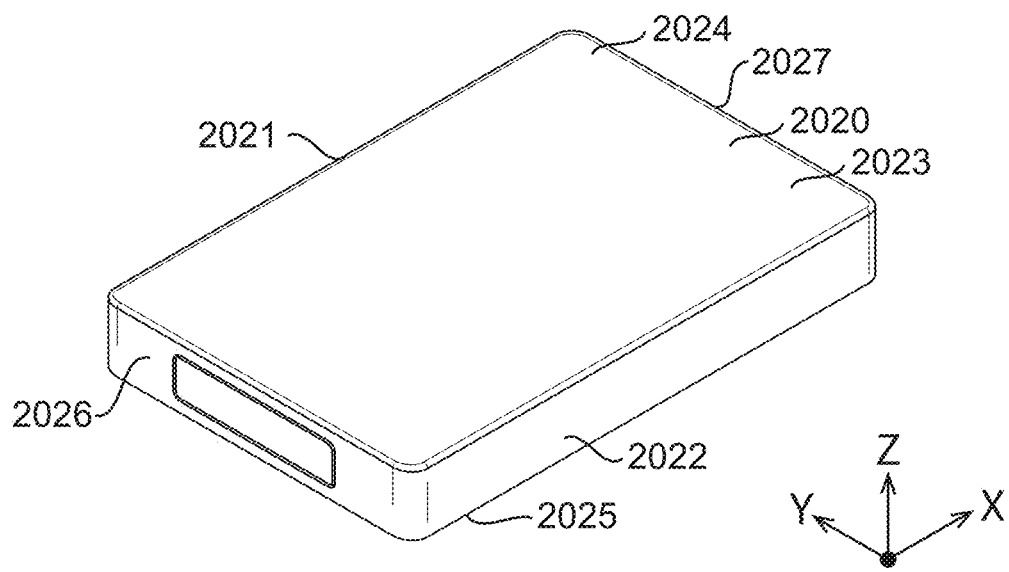
FIG. 19 is a perspective view of an embodiment of the hermetically sealed case of FIG. 18 from the opposite side.
Figure 20:
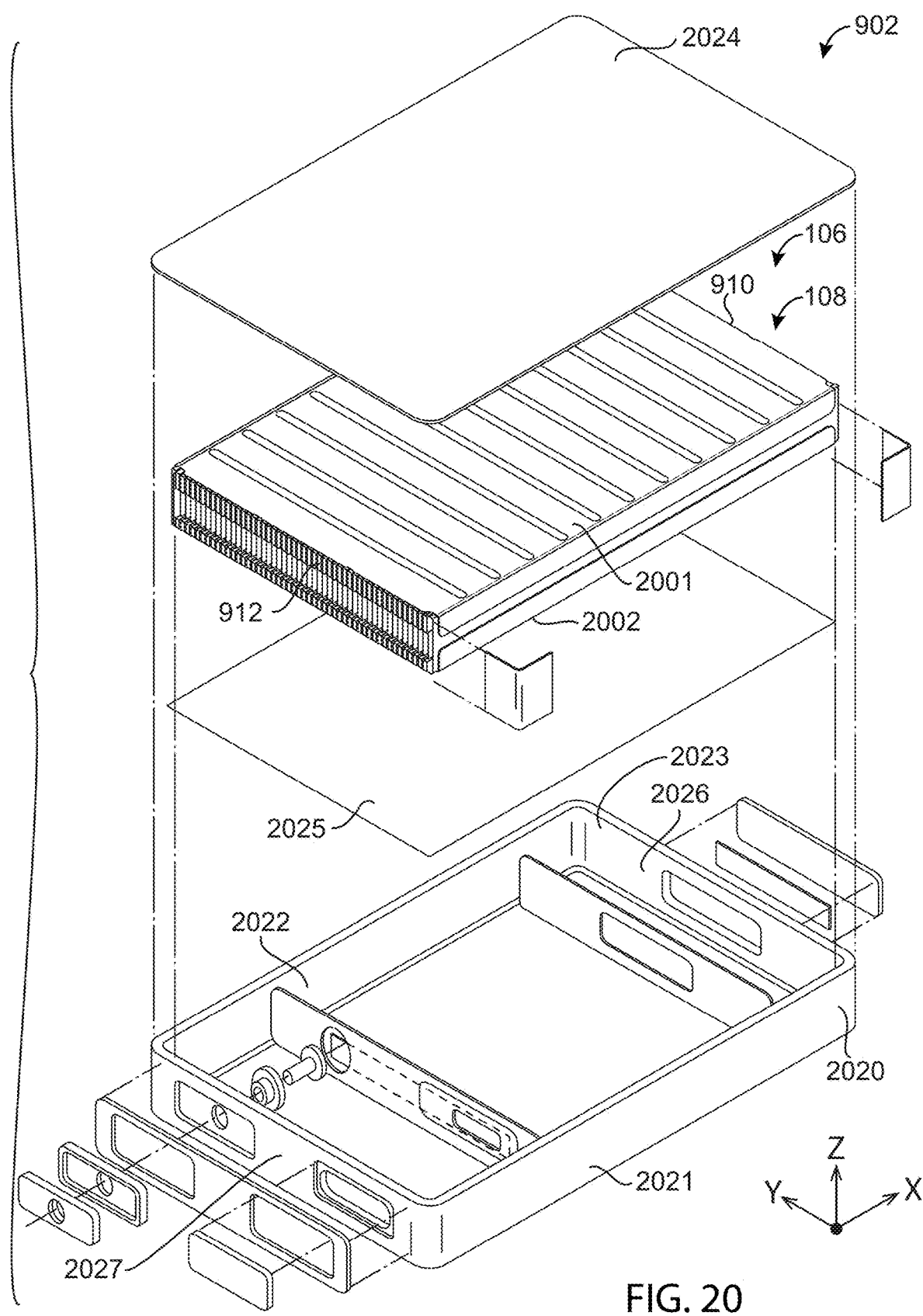
FIG. 20 illustrates an exploded view of an embodiment of a secondary battery cell in the hermetically sealed case of FIGS. 18-19.
Figure 21:
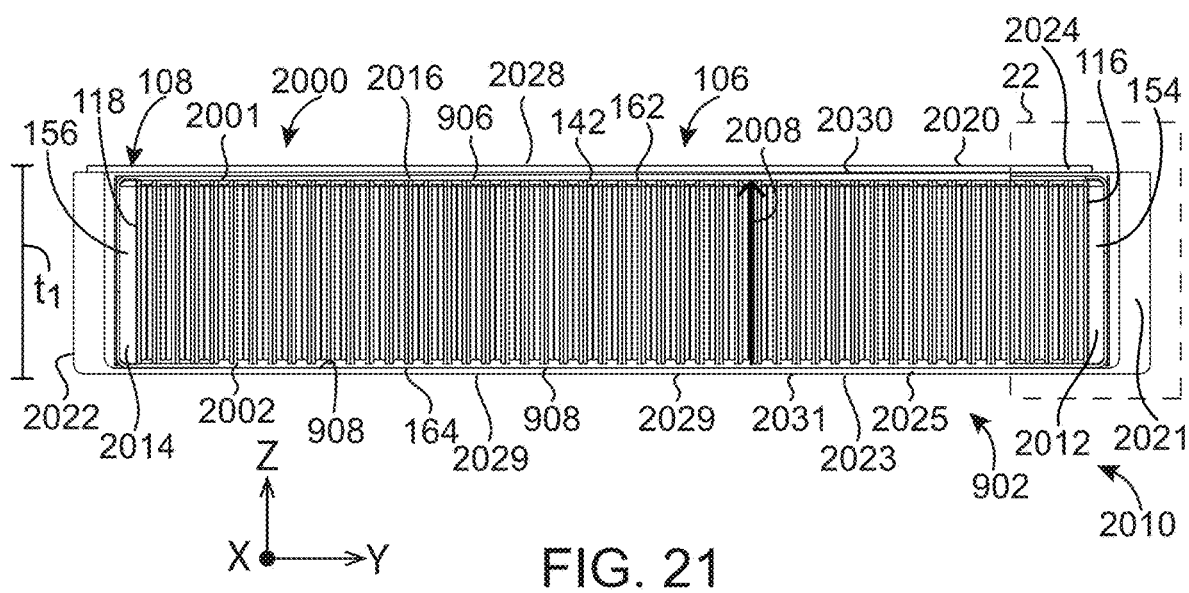
FIG. 21 illustrates a cross-section in a Z-Y plane, of embodiments of a secondary battery cell in a hermetically sealed case.
Figure 22:
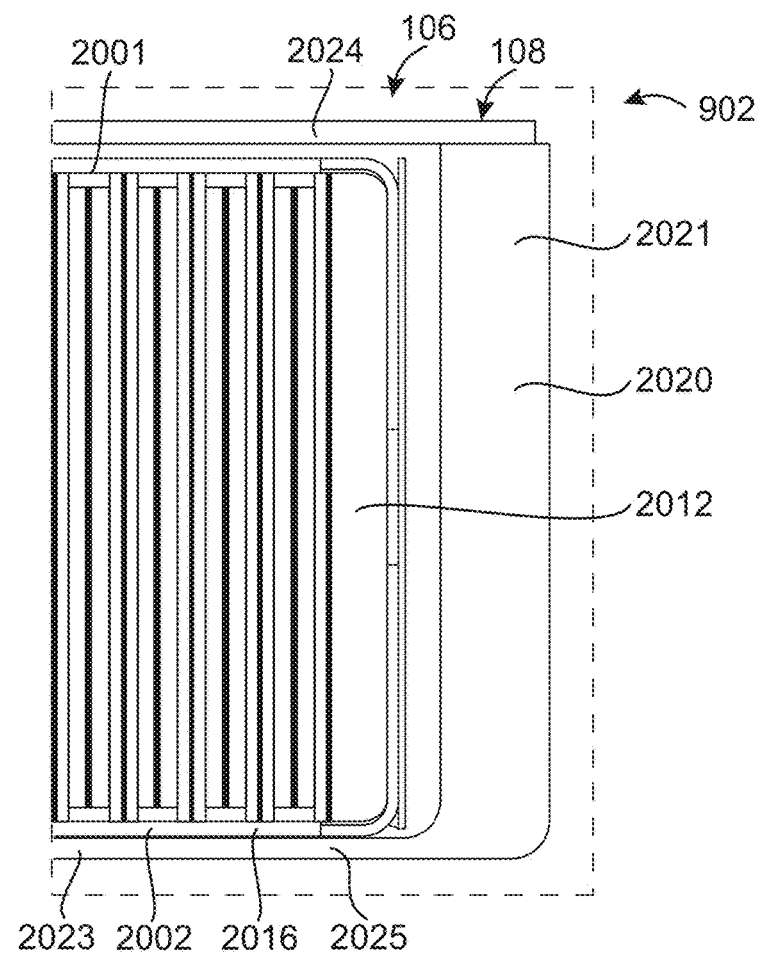
FIG. 22 is the enlarged view of one end of the cross-section of FIG. 21.

According to one embodiment, as shown in FIGS. 14-15 the hermetically sealed enclosure 610 comprises opposing first and second vertical sides 612a, 612b separated from each other in the vertical direction, each of the first and second vertical sides 612a, 612b comprising interior vertical surfaces 613a, 613b facing the electrode assembly 106 and respectively affixed to first and second vertical growth constraints 2001, 2002. In one embodiment, the interior vertical surfaces 613a, 613b of the first and second vertical sides 612a, 612b of the hermetically sealed enclosure 610 are affixed to the first and second vertical growth constraints 2001, 2002 by any of adhering, brazing, gluing, welding, bonding, joining, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Figure 7B:
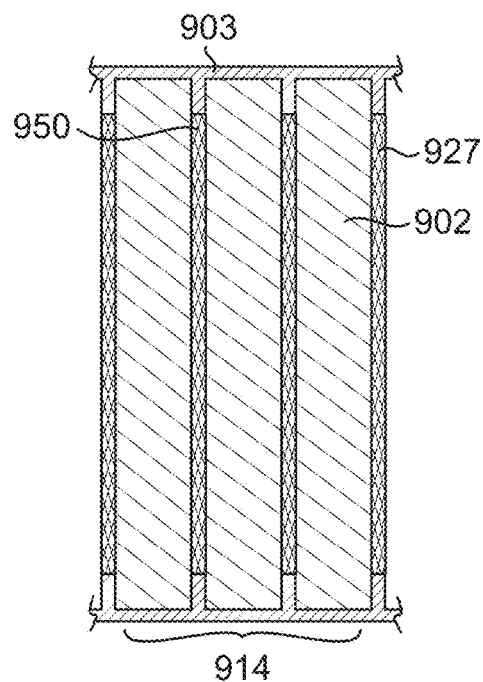
FIG. 7B illustrates a cross section of an embodiment of a battery pack having sealed secondary battery cells and pressure applying structures.
Figure 8A:
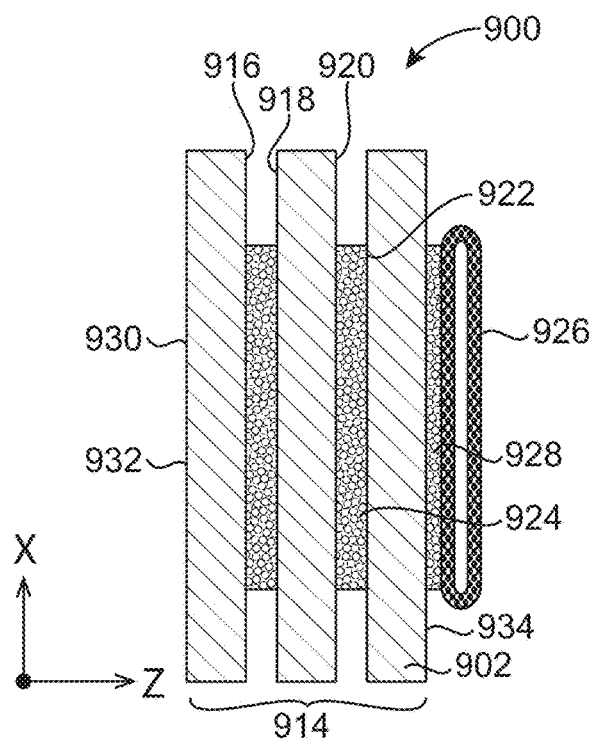
FIGS. 8A and 8B illustrates cross sections of further embodiments of battery packs having cell arrays with different numbers of sealed secondary battery cells.
Figure 8B:
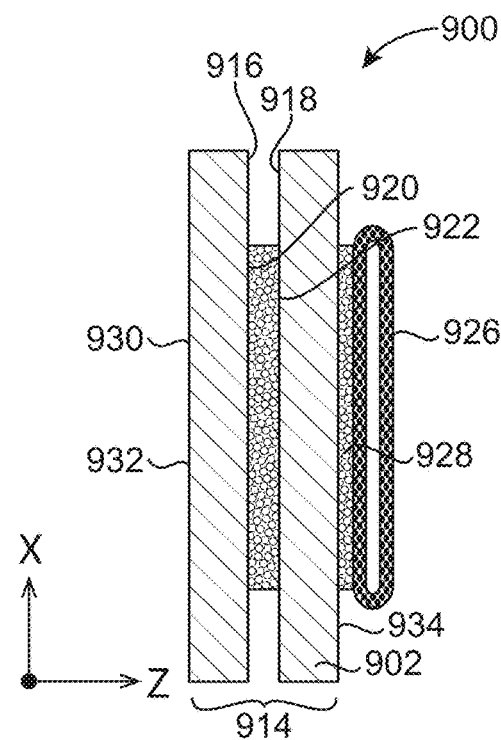
Figure 9:
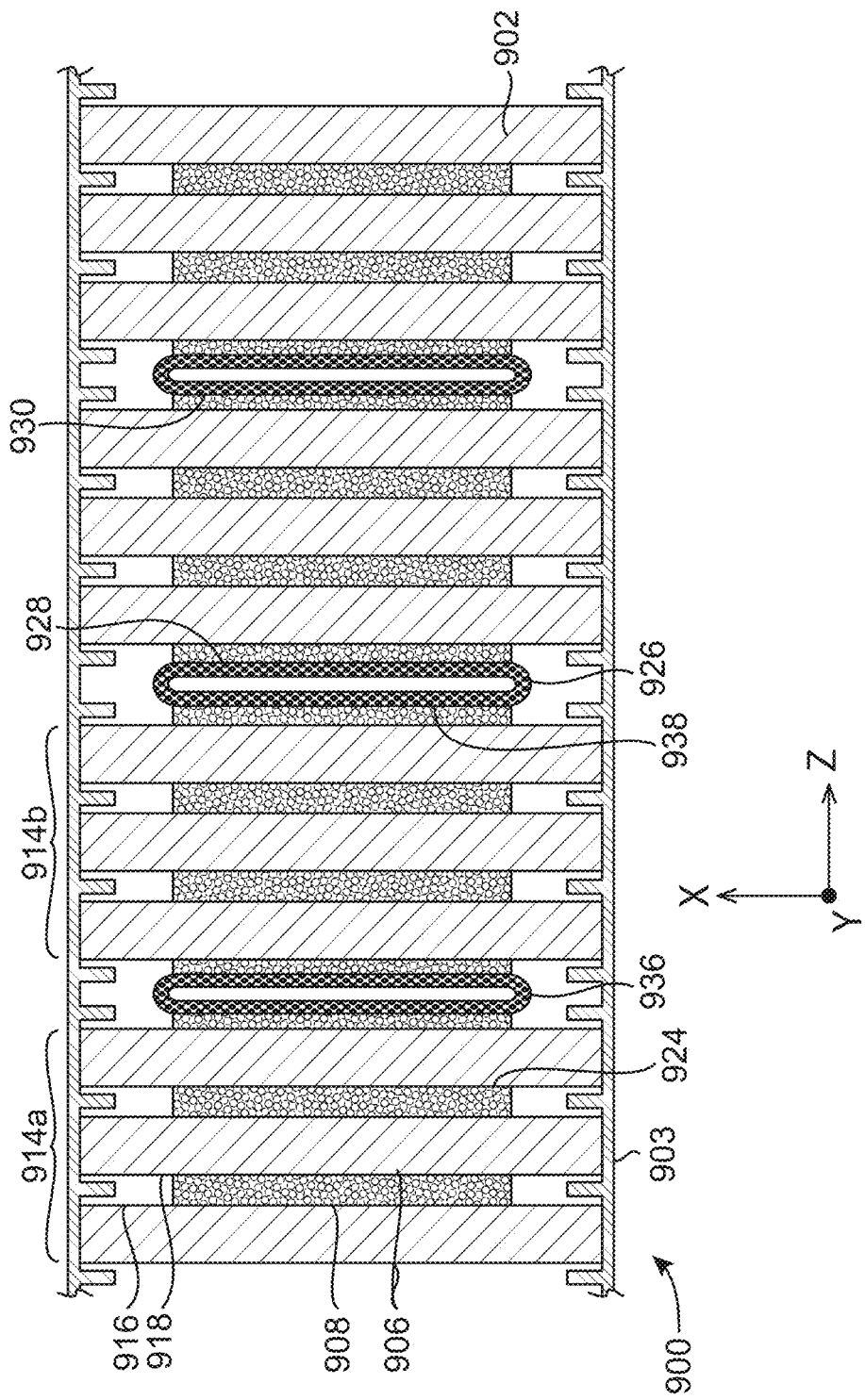
FIG. 9 illustrates a cross section of another embodiment of a battery pack having sealed secondary battery cells and a cross-flow cooling tube.

The present disclosure also provides a battery pack comprising a population of sealed secondary battery cell disclosed herein. Referring to FIGS. 7-9, in one embodiment, the battery pack 900 comprises a frame 903 to hold the secondary battery cells 902, and a population of pressure-applying structures 950 (see FIG. 7B) configured to apply a pressure to the hermetically sealed enclosure 104 of members of the population of sealed secondary battery cells 902, wherein the hermetically sealed enclosure 104 comprises first and second vertical sides 942, 944 separated from each other in the vertical direction, and the frame 903 is configured to hold a cell array 914 comprising a subset of the population secondary battery cells 902, and a population of pressure-applying structures 950, wherein members of the cell array 914 are held by the frame 903 in relation to members of the population of pressure-applying structures 950 such that members of the population of pressure-applying structures maintain a pressure against the first or second vertical sides 942, 944 of the hermetically sealed enclosure 104 during cycling of the members of the subset of the secondary battery cell population 902, such that the interior surfaces of the first and second vertical sides 942, 944 of the hermetically sealed enclosure 104 are maintained in direct contact with the first and second vertical growth constraints 2001, 2002. For example, in one embodiment, the pressure applying structures 950 apply a total pressure, in combination with ambient pressure (e.g. 1 atm), of at least 1.01 atm, to the first or second vertical sides of the hermetically sealed enclosure. In another embodiment, the pressure applying structures apply a total pressure, in combination with ambient pressure (e.g. 1 atm), in a range of 1.01 atm to 11 atm, to the first or second vertical sides of the hermetically sealed enclosure. In another embodiment, the pressure applying structures apply a total pressure, in combination with ambient pressure (e.g. 1 atm), in a range of 1.1 atm to 2 atm, to the first or second vertical sides of the hermetically sealed enclosure. In another embodiment, the pressure applying structures 950 apply the pressure to both the first and second vertical sides of the hermetically sealed enclosure.

According to one embodiment, members of the population of pressure-applying structures 950 comprise any of (i) a cooling tube 926, (ii) a layer of heat-exchange material 927, (iii) a portion of the frame, and (iv) a member of the population of sealed secondary battery cells. For example, the frame itself may be configured to exert a pressure against the vertical surfaces, or a separate structure can be provided, such as a cooling tube or heat-exchange material that removed heat from the secondary battery cell while also being positioned to exert a pressure against the vertical sides. For example, the cooling tubes or other structures may be positioned and supported within the frame such that they exert a pressure on the vertical sides. In another embodiment, adjacent sealed secondary batteries may exert pressure on each other, such as by being positioned and supported within the frame such that they exert a pressure on one another's vertical sides. In one embodiment, the cell array 914 comprises a plurality of the sealed secondary battery cells 902 arranged adjacent to one another with vertical sides of the sealed secondary battery cells facing one another, and wherein members of the population of pressure-applying structures 950 apply pressure at first and second vertical end sides 928, 930 located at opposing vertical ends of the cell array 914, and wherein members of the cell array that are internal to the cell array vertical ends have a pressure applied on vertical surfaces thereof by vertically adjacent secondary battery cells in the cell array. In another embodiment, a pressure applied by members of the population of pressure-applying structures 950 to the first or second vertical sides 942, 944 of members of the sealed secondary battery population 902 is greater than a pressure applied to transverse or horizontal sides of members of the sealed secondary battery population.

Another embodiment of the present disclosure is a method of charging a sealed secondary battery cell. This method comprises charging at a rate of at least 1 C, at least 2C, at least 3C, at least 4C, at least 6C, at least 10C, at least 12C, at least 15C, at least 18C, at least 20C, and/or at least 30C, until the sealed secondary battery reaches at predetermined capacity. In one embodiment, the method comprises charging at the charging rate until the secondary battery reaches at least 80%, at least 85%, at least 90%, at least 95%, and/or at least 99% of its rated capacity. In some embodiments, the sealed secondary battery is charged at the charging rate, and discharged, at least 200 times, (at least 300, at least 400, at least 500, at least 600, at least 800, and/or at least 1000 times. In some other embodiments, the sealed secondary battery comprises any of the electrode assemblies disclosed herein, any of the sealed secondary battery disclosed herein, or is a part of the cell array in any of the battery pack disclosed herein, or any combination thereof.

According to one embodiment, the sealed secondary battery cell disclosed herein has a rated capacity of at least 500 mAmp·hr, at least 1 Amp·hr, at least 5 Amp·hr, at least 10 Amp·hr, at least 15 Amp·hr, at least 20 Amp·hr, at least 25 Amp·hr, at least 30 Amp·hr, at least 35 Amp·hr and/or at least 50 Amp·hr.

According to another embodiment, the electrode assembly 106 disclosed herein has a substantially polyhedral shape, with opposing longitudinal end surfaces 116, 118 that are substantially flat, opposing vertical surfaces 148, 150 that are substantially flat, and opposing transverse surfaces 144, 146 that are substantially flat. In some embodiments, for the electrode assembly disclosed herein, the ratio of $V_{SA}$ to each of $L_{SA}$ and $T_{SA}$ is at least 5:1.

According to one embodiment, for the sealed secondary battery cell 902, battery pack 900, or method disclosed herein, the hermetically sealed enclosure comprises a polymer enclosure material. In another embodiment, the hermetically sealed enclosure 104 comprises a hermetically sealed case 2020.

According to some embodiments, the frame 903 disclosed herein holds the cell array 914 comprising the subset of the population of secondary battery cells 902 that are arranged adjacent to one another, with the members being arranged in the cell array 914 such that opposing vertical surfaces of adjacent members in the cell array face each other to form an adjacent facing pair of vertical surfaces, each adjacent facing pair of vertical surfaces in the cell array comprising adjacent facing regions thereof.

In one embodiment, the sealed secondary battery disclosed herein comprises a core energy density of at least at least 700 Whr/liter, at least 800 Whr/liter, at least 900 Whr/liter, at least 1000 Whr/liter, at least 1100 Whr/liter, or at least 1200 Whr/liter, wherein the core energy density is defined as the rated capacity of the sealed secondary battery divided by the combined weight of the electrode structures, counter-electrode structures, separators, and any electrolyte that makes up the electrode assembly of the sealed secondary battery. The combined weight does not include the weight of the set of constraints, pack, enclosure, or pouch, etc.

In an electrode assembly disclosed herein, members of the electrode structure population comprise layers of electrode active material, and wherein the layers of electrode active material comprise a thickness in the longitudinal direction in a range of from 15 microns to 75 microns, 20 microns to 60 microns, or 30 microns to 50 microns, such as about 45 microns. In another embodiment, members of the electrode structure population comprise layers of electrode active material, and wherein the layers of electrode active material comprise a porosity in a range of from 10-40%, 12-30%, or 18-20%.

According to certain aspects, the porosity referred to herein can be measured by any suitable technique known to those of ordinary skill in the art. For example, according to one embodiment, the porosity can be determined by a mercury porosimetry technique, which is a technique that characterizes the porosity of a material by applying varying levels of pressure to a sample of the material immersed in mercury. The pressure required to intrude mercury into the pores of the sample is inversely proportional to the size of the pores. A mercury porosimetry technique is described in the National Institute of Standards and Technology (NIST) Practice Guide for Porosity and Specific Surface Area Measurements for Solid Materials, by Peter Klobes, Klaus Meyer and Ronald Munro, dated September 2006, which is hereby incorporated by reference herein in its entirety. In other embodiments, the porosity can be determined by calculating the porosity using the volume of electrode active material layer being used, as well as the weight of the electrode active material used in the electrode active material layer and its density, with the porosity being the difference between the total volume of the electrode active material layer and the volume occupied by electrode active material (the weight of the electrode active material divided by its density), as a percentage of the total volume of the electrode active material layer, as would be understood by those of ordinary skill in the art.

According to one embodiment, as shown in FIGS. 2 and 7-9, the sealed secondary battery as disclosed herein comprises an electrode busbar 191 that electrically connects to electrode current collectors 136 to pool current from members of the electrode structure population 110, and comprises a counter-electrode busbar 193 that electrically connects to counter-electrode current collectors 140 to pool current from members of the counter-electrode structure population 112, and wherein the sealed secondary battery further comprises: an electrode busbar tab 190 that electrically connects the electrode busbar 191 to electrical structures exterior to the sealed secondary battery, and a counter-electrode busbar tab 192 that electrically connects the counter-electrode busbar 193 to electrical structures exterior to the sealed secondary battery, and a cooling system 926 configured to cool the electrode or counter-electrode busbar tab, via one or more of convective or conductive cooling. In another embodiment, the cooling is by cooling tubes 926a, 926b provided adjacent the tabs, or by a heat sink that is thermally connected to the tabs.

Battery Pack

Referring to FIGS. 7-9, according to embodiments of the disclosure, a battery pack 900 for a population of secondary battery cells 902 that are chargeable between a charged state and a discharged state is provided, the battery pack 900 including a frame 903 to hold secondary battery cells in the battery pack 900. According to certain embodiments, the members of the secondary battery cell population 902 have a rated capacity, and comprise an enclosure 104 that is hermetically sealed, and an electrode assembly 106 within the hermetically sealed enclosure.

According to certain embodiments, the electrode assembly has substantially polyhedral shape with mutually perpendicular transverse, longitudinal and vertical axes corresponding to the x, y and z axes, respectively, of an imaginary three-dimensional Cartesian coordinate system. For example, in certain embodiments the electrode assembly can substantially comprise 6 substantially flat and/or entirely flat surfaces, and/or can comprise further flat surfaces, such as 8 or more flat surfaces. The electrode assembly can also, in certain embodiments, comprise curved portions, such as for example at the corners and/or vertices between otherwise flat surfaces.

According to certain embodiments, and referring again to FIGS. 6A-6B, the electrode assembly 106 comprises opposing longitudinal surfaces 116, 118 (i.e. first and second longitudinal end surfaces) that are substantially flat and are separated from each other in the longitudinal direction, and a lateral surface 142 surrounding an electrode assembly longitudinal axis $A_{EA}$ and connecting the opposing longitudinal end surfaces. The lateral surface 142 comprises opposing vertical surfaces 906, 908 that are substantially flat and are separated from each other in the vertical direction on opposing vertical sides of the longitudinal axis, and comprises opposing transverse surfaces 910, 912 that are substantially flat and are separated from each other in the transverse direction on opposing transverse sides of the longitudinal axis. According to one embodiment, the opposing longitudinal surfaces 116, 118 have a combined surface area, $L_{SA}$, the opposing transverse surfaces 910, 912 have a combined surface area, $T_{SA}$, and the opposing vertical surfaces 906, 908 have a combined surface area, $V_{SA}$, where the ratio of $V_{SA}$ to each of $L_{SA}$ and $T_{SA}$ is at least 5:1, The combined surface area is the surface area of each surface added to its opposing surface (e.g. the combined surface area of the opposing longitudinal surfaces 116, 118 is the surface area of the longitudinal surface 116 added to the surface area of the longitudinal surface 118).

Furthermore, according to certain embodiments, and as similarly described with respect to energy storage devices and/or secondary batteries 102 above, the electrode assembly 106 of the secondary battery cell 902 comprises an electrode structure population 110, an electrically insulating separator population 130, and a counter-electrode structure population 112, wherein members of the electrode structure, electrically insulating separator and counter-electrode structure populations are arranged in an alternating sequence in the longitudinal direction within the electrode assembly.

Referring to FIG. 7, according to certain embodiments, the battery pack frame 903 holds a cell array 914 comprising a subset of the population of secondary battery cells 902 that are arranged adjacent to one another, with the members being arranged in the cell array such that opposing vertical surfaces 906, 908 of adjacent members in the cell array face each other to form an adjacent facing pair 916, 918 of vertical surfaces. As shown for example in FIG. 7, the members are arranged adjacent to each other in the vertical direction to provide adjacent facing pairs of vertical surfaces for those secondary battery cells that are adjacent to one another in the vertical direction. According to one embodiment, the adjacent facing pairs 916, 918 of vertical surfaces may be entirely aligned with one another in the longitudinal and transverse direction, and/or the adjacent facing pairs may be partly offset from one another in one or more of the longitudinal and transverse directions.

According to certain embodiments, each adjacent facing pair 916, 918 of vertical surfaces in the cell array comprising adjacent facing regions 920, 922 thereof that are separated by less than 1 mm from each other. In one embodiment, the facing pair 916, 918 are entirely aligned with each other in the longitudinal and transverse directions, and the facing regions that are separated by less than 1 mm from each other may extend across the entire surfaces of the facing pairs 916. In another embodiment, the facing pair 916, 918 are at least partly offset from one another in one or more of the longitudinal and transverse directions, and the facing regions that are separated by less than 1 mm from each other extend across those portions of the surfaces of the facing pairs 916 that overlap with one another in the transverse and/or longitudinal directions. In one embodiment, the facing regions 920, 922 are in thermal contact with one another via a thermally conductive pathway having thermally conductive material 924 that has a thermal conductivity of at least 1 W/mK.

According to one embodiment, the opposing longitudinal, vertical, and transverse surfaces make up a combined surface area of greater than 66%. According to another embodiment, the opposing longitudinal, vertical, and transverse surfaces make up a combined surface area of greater than 75%. According to another embodiment the opposing longitudinal, vertical, and transverse surfaces make up a combined surface area of greater than 80%. According to another embodiment, the opposing longitudinal, vertical, and transverse surfaces make up a combined surface area of greater than 95%. According to another embodiment, the opposing longitudinal, vertical, and transverse surfaces make up a combined surface area of greater than 99%. According to another embodiment the opposing longitudinal, vertical, and transverse surfaces make up a combined surface area corresponding to substantially the entire surface area of the electrode assembly.

According to one embodiment, the number of secondary battery cells 902 in the cell array 914 is 2. According to another embodiment, the number of secondary battery cells in the cell array is 3 (e.g. as shown in FIGS. 7 and 8A-8B). According to another embodiment, the number of secondary battery cells in the cell array is greater than 3. The secondary battery cells 902 in the cell array 914 are in thermal contact with each other via thermally conductive pathways between the secondary battery cells 902 in the cell array 914, such as via thermally conductive material disposed in between adjacent secondary battery cells 902. According to one embodiment, the battery pack 900 comprises a plurality of cell arrays 914, such as a plurality of cell arrays 914 arranged in the vertical direction with respect to one another, and/or arranged in one or more of the transverse or longitudinal directions with respect to one another.

According to one embodiment, the battery pack 900 comprises at least one cooling tube 926 to cool the cell array 914. According to one embodiment, the cell array comprises opposing cell array end surfaces 928, 930, separated from each other in the vertical direction, and wherein the cooling tube 926 extends in direction orthogonal to the vertical direction (e.g. in the longitudinal direction as shown in FIG. 7) and along at least one of the opposing cell array end surfaces 928, 930 of the cell array to cool the at least one opposing cell array end surface. According to certain embodiments, the thermally conductive pathway between cells in the array provides that cooling of one cell array end surface by the cooling tube draws heat from other cells in the array, to provide a cooling effect to the overall array.

According to one embodiment, the cell array comprises two secondary battery cells 902 arranged adjacent to one another (see FIG. 8B), such that the opposing vertical surfaces 906, 908 of the two secondary battery cells comprise a pair of external surfaces 932, 934 separated from each other in the vertical direction and located towards the opposing cell array end surfaces 928, 930. According to certain aspects, the cooling tube 926 extends in the orthogonal direction along at least one vertical cell array end surface 928, 930 that is adjacent to one of the pair of external surfaces 932, 934 to cool the external surface, According to another embodiment, the cell array comprises three secondary battery cells 902 arranged adjacent to one another (see FIG. 8B), such that the opposing vertical surfaces 906, 908 of the three secondary battery cells comprise a pair of external surfaces 932, 934 separated from each other in the vertical direction and located towards the opposing cell array end surfaces 928, 930. According to certain aspects, the cooling tube 926 extends in the orthogonal direction along at least one vertical cell array end surface 928, 930 that is adjacent to one of the pair of external surfaces 932, 934 to cool the external surface. According to another embodiment, the cell array comprises more than three secondary battery cells 902 arranged adjacent to one another, such that the opposing vertical surfaces 906, 908 of the more than three secondary battery cells 902 in the cell array comprise a pair of external surfaces 932, 934 separated from each other in the vertical direction and located towards the opposing cell array end surfaces 928, 930. According to certain aspects, the cooling tube 926 extends in the orthogonal direction along at least one vertical cell array end surface 928, 930 that is adjacent to one of the pair of external surfaces 932, 934 to cool the external surface, Cooling of the external surface of the secondary battery cell 902 adjacent the cooling tube 926 can further cool the other secondary battery cells in the array, including secondary battery cells that are more remote from the cooling tube 926, by transfer of heat between secondary battery cells in the cell array via the thermally conductive pathways therebetween.

According to one embodiment, the thermally conductive material 924 is provided between the cooling tube 926 and the external surface 932, 934 of the secondary battery cell adjacent to the cooling tube. For example, referring to FIG. 7, the thermally conductive material 924 can be provided both between adjacent secondary battery cells 902 in the cell array 914, as well as between a secondary battery cell at the end of the array and adjacent the cooling tube, to provide a thermally conductive pathway between cells in the array as well as between the array and the cooling tube. In one embodiment, the thermally conductive material comprises a thermally conductive adhesive. In another embodiment, the thermally conductive material comprises a compressible thermal interface material. In another embodiment, the thermally conductive material comprises a combination of compressible thermal interface material and thermally conductive adhesive, such as a layer of compressible thermal interface material with thermally conductive adhesive on either side to adhere to adjacent secondary battery cells and/or cooling tube. In another embodiment, the thermally conductive material can substantially entirely comprise a thermally conductive adhesive material. In one embodiment, the thermally conductive material comprises a thermally conductive adhesive that adheres adjacent facing regions 920, 922 of adjacent facing pairs 916, 918 of opposing vertical surfaces in the cell array to one another. In another embodiment, the thermally conductive material comprises a compressible thermal interface material disposed between the adjacent facing regions 920, 922 of adjacent facing pairs 916, 918 of opposing vertical surfaces in the cell array. In another embodiment, the thermally conductive material is disposed between an external surface of the cell array and a surface of an adjacent cooling tube, and comprises any selected from the group of a thermally conductive adhesive and a compressible thermal interface material.

In one embodiment, the compressible thermal interface material can be provided (alone or in addition to thermally conductive adhesive) in a case where the secondary battery cells undergo an expansion and/or contraction in the vertical direction with charging and/or discharging of the cells, to at least partly accommodate the expansion and/or contraction of the cells. In another embodiment where the secondary battery cells have little or no expansion and/or contraction, a thermally conductive adhesive may be sufficient to provide the thermally conductive pathway between the adjacent cells and/or cooling tube. In one embodiment, a first thermally conductive material 924a is provided between the first cell array end surface 930 and a surface 940 of the cooling tube, and a second thermally conductive material 924b is provided between adjacent facing regions 920, 922 of each adjacent facing pair of opposing vertical surfaces in the cell array, and wherein the first thermally conductive material 924a has a higher thermal conductivity than the second thermally conductive material 924b. According to another embodiment, thermally conductive material comprising a first compressible thermal interface material is provided between the first cell array end surface 930 and a surface 940 of the cooling tube 926, and thermally conductive material comprising a second compressible thermal interface material is provided between adjacent facing regions 920, 922 of each adjacent facing pair of opposing vertical surfaces in the cell array, and wherein the first compressible thermal interface material is thinner than the second compressible thermal interface material.

In one embodiment, at least one of the cell array end surfaces 928, 930 comprises the surface of the thermally conductive material that is disposed on one of the external surfaces 932, 934 of the cell array. For example, as shown in FIGS. 8A and 8B, a first external surface 932 at a first end of the cell array may be the same as the first cell array end surface 930 (i.e. no thermally conductive material present at the external surface 932), and a second external surface 934 at a second end of the cell array on the opposing side of the cell array may comprise thermally conductive material thereon, the surface of which forms the second cell array end surface 928 at the opposing side of the cell array. In one embodiment, the thermally conductive material comprises a compressible thermal interface material comprising any selected from the group consisting of any of a compressible foam and elastomeric material, such as for example any selected from the group consisting of silicone pad (e.g. a silicone pad), natural rubber, or other elastomeric materials (e.g. SIL PAD®, and which may contain electrically insulating ceramic particles to increase thermal conductivity. In another embodiment, the thermally conductive material comprises a thermally conductive adhesive comprising any selected from the group consisting of an epoxy adhesive, a thermoplastic adhesive, silicone adhesive, or polyurethane adhesive (e.g. LOCTITE® Bergquist®), and which may contain electrically insulating ceramic particles to increase thermal conductivity. According to yet another embodiment, the thermally conductive material can comprise a grease material loaded with electrically insulating ceramic particles to increase thermal conductivity.

According to one embodiment, the battery pack comprises a plurality of cell arrays 914, with a first cell array 914a arranged on a first vertical side of the cooling tube 926, and a second cell array 914b arranged on a second vertical side of the cooling tube 926, wherein the cooling tube cools the external surfaces 932, 934 of the first and second cell arrays that are adjacent to the cooling tube on each of the first and second vertical sides, as shown for example in FIG.

7. According to certain aspects, the same cooling tube 926 can be used to transfer heat from, and cool, both cell arrays arranged on either vertical side of the cooling tube, with the cell arrays being in contact with the cooling tube via the thermally conducting material between the secondary battery cell at the end of each array and the cooling tube. According to another embodiment, the battery pack 900 comprises first and second cooling tubes 926*a*, 926*b* (see FIG. 7), where the second cooling tube can extend along a cell array end surface in the same or different direction than the first cooling tube (that is orthogonal to the vertical direction). According to one embodiment, the first cooling tube extends along a first cell array end surface 928 that is adjacent to a first of the pair of external surfaces 932, 934 of the cell array, and the second cooling tube extends along a second cell array end surface 928 that is adjacent to a second of the pair of external surfaces 932, 934 of the cell array, such that both of the pair of external surfaces 932, 934 of the cell array can be cooled by the first and second cooling tubes. According to yet another embodiment, the battery pack 900 comprises a plurality of cell arrays and a plurality of cooling tubes, with the cell arrays alternating with the cooling tubes in the vertical direction.

Referring to FIG. 9, in one embodiment, the battery pack 900 comprises a cooling tube 926 that has a cooling fluid inlet side 936 into which cooling fluid is introduced, and a cooling fluid outlet side 938 that is downstream of the cooling fluid inlet side, with cooling fluid flowing from the cooling fluid inlet side to the cooling fluid outlet side. The cooling tube 926 is arranged such that the cooling fluid inlet side 936 of the cooling tube passes along a first cell array end surface 928 in a direction orthogonal to the vertical direction, and the cooling fluid outlet side 938 of the cooling tube 926 passes by an opposing second cell array end surface 930 in a direction orthogonal to the vertical direction. According to aspects, the same cooling tube can be used to cool both opposing cell array end surfaces 928, 930. In one embodiment, a first thermally conductive material 924*a* is provided between the first cell array end surface 930 and a surface of the cooling tube on the fluid inlet side 936, and between the second cell array end surface 928 of the cell array and a surface 940 of the cooling tube on the fluid outlet side 938, and a second thermally conductive material 924*b* is provided between adjacent facing regions 920, 922 of each adjacent facing pair of opposing vertical surfaces in the cell array, and wherein the first thermally conductive material has a higher thermal conductivity than the second thermally conductive material.

According to further embodiments, the battery pack 900 can further comprise, in addition to one or more cell arrays arranged in the vertical direction, but also a plurality of cell arrays arranged in a direction orthogonal to the vertical direction, and one or more cooling tubes can further extend along the plurality of cell arrays in the orthogonal direction to cool the plurality of cell arrays. According to certain embodiments, the same cooling tube can be used to cool both opposing cell array end surfaces 928, 930 in the plurality of cell arrays arrange in the orthogonal direction, and/or a plurality of cooling tubes can be used. According to certain embodiments, the one or more cooling tubes are configured to carry a liquid or gas coolant.

According to one embodiment, the battery pack 900 comprises a cell array 914 wherein adjacent facing regions 920, 922 of each adjacent facing pair 916, 918 of vertical surfaces in the cell array 914 are separated by less than 0.8 mm from each other. According to another embodiment, the battery pack 900 comprises a cell array 914 wherein adjacent facing regions of each adjacent facing pair of vertical surfaces in the cell array are separated by less than 0.75 mm from each other. According to another embodiment, the battery pack 900 comprises a cell array 914 wherein adjacent facing regions of each adjacent facing pair of vertical surfaces in the cell array are separated by less than 0.5 mm from each other. According to another embodiment, the battery pack 900 comprises a cell array 914 wherein the adjacent facing regions of each adjacent facing pair of vertical surfaces in the cell array are separated by less than 0.25 mm from each other. According to another embodiment, the battery pack 900 comprises a cell array 914 wherein the adjacent facing regions of each adjacent facing pair of vertical surfaces in the cell array are separated by less than 0.1 mm from each other. According to another embodiment, the battery pack 900 comprises a cell array 914 wherein the adjacent facing regions of each adjacent facing pair of vertical surfaces in the cell array are separated by less than 0.05 mm from each other. According to another embodiment the battery pack 900 comprises a cell array 914 wherein the adjacent facing regions of each adjacent facing pair of vertical surfaces in the cell array are separated by less than 0.01 mm from each other. According to another embodiment the battery pack 900 comprises a cell array 914 wherein the adjacent facing regions of each adjacent facing pair of vertical surfaces in the cell array are separated by less than 0.005 mm from each other. According to another embodiment the battery pack 900 comprises a cell array 914 wherein the adjacent facing regions of each adjacent facing pair of vertical surfaces in the cell array are separated by less than 0.001 mm from each other.

According to one embodiment, the thermally conductive pathway extends across at least 20% of the surface areas of the respective adjacent vertical surfaces of the cell array. According to another embodiment, the thermally conductive pathway extends across at least 30% of the surface areas of the respective adjacent vertical surfaces of the cell array. According to another embodiment, the thermally conductive pathway extends across at least 50%, of the surface areas of the respective adjacent vertical surfaces of the cell array. According to another embodiment, the thermally conductive pathway extends across at least 75% of the surface areas of the respective adjacent vertical surfaces of the cell array. According to another embodiment, the thermally conductive pathway extends across at least 80% of the surface areas of the respective adjacent vertical surfaces of the cell array. According to another embodiment, the thermally conductive pathway extends across at least 90% of the surface areas of the respective adjacent vertical surfaces of the cell array. According to another embodiment, the thermally conductive pathway extends across at least 95% of the surface areas of the respective adjacent vertical surfaces of the cell array. According to another embodiment, the thermally conductive pathway extends across substantially the entirety of the surface areas of the respective adjacent vertical surfaces of the cell array.

According to one embodiment, the thermally conductive material between each adjacent facing pair of vertical surface forms a contact patch between the adjacent facing pair that extends across at least 20% of the surface areas of the respective adjacent vertical surfaces of the cell array. According to another embodiment, the thermally conductive material between each adjacent facing pair of vertical surface forms a contact patch between the adjacent facing pair that extends across least 30% of the surface areas of the respective adjacent vertical surfaces of the cell array. According to another embodiment, the thermally conductive material between each adjacent facing pair of vertical surface forms a contact patch between the adjacent facing pair that extends across at least 50% of the surface areas of the respective adjacent vertical surfaces of the cell array. According to another embodiment, the thermally conductive material between each adjacent facing pair of vertical surface forms a contact patch between the adjacent facing pair that extends across at least 75% of the surface areas of the respective adjacent vertical surfaces of the cell array. According to another embodiment, the thermally conductive material between each adjacent facing pair of vertical surface forms a contact patch between the adjacent facing pair that extends across at least 80% of the surface areas of the respective adjacent vertical surfaces of the cell array. According to another embodiment, the thermally conductive material between each adjacent facing pair of vertical surface forms a contact patch between the adjacent facing pair that extends across at least 90% of the surface areas of the respective adjacent vertical surfaces of the cell array. According to another embodiment, the thermally conductive material between each adjacent facing pair of vertical surface forms a contact patch between the adjacent facing pair that extends across least 95% of the surface areas of the respective adjacent vertical surfaces of the cell array. According to another embodiment, the thermally conductive material between each adjacent facing pair of vertical surface forms a contact patch between the adjacent facing pair that extends across substantially the entirety of the surface areas of the respective adjacent vertical surfaces of the cell array.

According to one embodiment, the thermally conductive pathway between each adjacent facing pair 916, 918 of vertical surfaces in the cell array 914 comprises a thermally conductive material with a thermal conductivity of at least 2 W/mK. According to another embodiment, the thermally conductive pathway between each adjacent facing pair of vertical surfaces in the cell array comprises a thermally conductive material with a thermal conductivity of at least 3 W/mK. According to another embodiment, the thermally conductive pathway between each adjacent facing pair of vertical surfaces in the cell array comprises a thermally conductive material with a thermal conductivity of at least 5 W/mK. According to another embodiment, the thermally conductive pathway between each adjacent facing pair of vertical surfaces in the cell array comprises a thermally conductive material with a thermal conductivity of at least 10 W/m K.

According to one embodiment, the hermetically sealed enclosure 104 comprises upper and lower outer surfaces 942, 944 (see FIG. 7) separated from each other in the vertical direction, and wherein a vertical thickness of the secondary battery cell 902 as measured between the upper and lower outer surfaces 942, 944 is no more than 50 mm. According to another embodiment, the hermetically sealed enclosure 104 comprises upper and lower outer surfaces 942, 944 separated from each other in the vertical direction, and wherein a vertical thickness of the secondary battery cell 902 as measured between the upper and lower outer surfaces 942, 944 is no more than 20 mm, According to another embodiment, the hermetically sealed enclosure 104 comprises upper and lower outer surfaces 942, 944 separated from each other in the vertical direction, and wherein a vertical thickness of the secondary battery cell 902 as measured between the upper and lower outer surfaces 942, 944 is no more than 15 mm. According to another embodiment, the hermetically sealed enclosure 104 comprises upper and lower outer surfaces 942, 944 separated from each other in the vertical direction, and wherein a vertical thickness of the secondary battery cell 902 as measured between the upper and lower outer surfaces 942, 944 is no more than 10 mm. According to another embodiment, the hermetically sealed enclosure 104 comprises upper and lower outer surfaces 942, 944 separated from each other in the vertical direction, and wherein a vertical thickness of the secondary battery cell 902 as measured between the upper and lower outer surfaces 942, 944 is no more than 8 mm. According to another embodiment, the hermetically sealed enclosure 104 comprises upper and lower outer surfaces 942, 944 separated from each other in the vertical direction, and wherein a vertical thickness of the secondary battery cell 902 as measured between the upper and lower outer surfaces 942, 944 is at least 0.5 mm. According to another embodiment, the hermetically sealed enclosure 104 comprises upper and lower outer surfaces 942, 944 separated from each other in the vertical direction, and wherein a vertical thickness of the secondary battery cell 902 as measured between the upper and lower outer surfaces 942, 944 is at least 1 mm. According to another embodiment, the hermetically sealed enclosure 104 comprises upper and lower outer surfaces 942, 944 separated from each other in the vertical direction, and wherein a vertical thickness of the secondary battery cell 902 as measured between the upper and lower outer surfaces 942, 944 is at least 2 mm. According to another embodiment, the hermetically sealed enclosure 104 comprises upper and lower outer surfaces 942, 944 separated from each other in the vertical direction, and wherein a vertical thickness of the secondary battery cell 902 as measured between the upper and lower outer surfaces 942, 944 is at least 3 mm. According to another embodiment, the hermetically sealed enclosure 104 comprises upper and lower outer surfaces 942, 944 separated from each other in the vertical direction, and wherein a vertical thickness of the secondary battery cell 902 as measured between the upper and lower outer surfaces 942, 944 is at least 5 mm.

According to one embodiment, the frame 903 holds a cell array comprising two secondary battery cells 902 (see FIG. 8A). According to another embodiment, the frame 903 holds a cell array comprising three secondary battery cells 902 (see FIG. 8B). According to another embodiment, the frame 903 holds a cell array comprising more than three secondary battery cells 902. According to another embodiment, the frame 903 holds a cooling array comprising at least one cell array and at least one cooling tube. According to another embodiment, the frame 903 holds a cooling array comprising a plurality of cell arrays and cooling tubes.

Sealed Secondary Battery Cell Having Hermetically Sealed Enclosure

Referring to FIGS. 13-16, according to embodiments of the disclosure, a sealed secondary battery cell 902 is provided that is chargeable between the charged state and the discharged state. The sealed secondary battery cell 902 comprises an enclosure 104 that is a hermetically sealed enclosure comprising a polymer enclosure material, an electrode assembly 106 being enclosed by the hermetically sealed enclosure 104, a set of electrode constraints 108. According to certain embodiments, a rated capacity of the sealed secondary battery cell is at least 100 mAmp·hr. According to certain embodiments, the charged state is at least 75% of the rated capacity of the secondary battery cell, and the discharged state is less than 25% of the rated capacity of the secondary battery cell.

According to certain embodiments, the electrode assembly 106 has a substantially polyhedral shape with mutually perpendicular transverse, longitudinal and vertical axes corresponding to the x, y and z axes, respectively, of an imaginary three-dimensional Cartesian coordinate system. For example, in certain embodiments the electrode assembly 106 can substantially comprise six substantially flat and/or entirely flat surfaces, and/or can comprise further flat surfaces, such as eight or more flat surfaces. The electrode assembly can also, in certain embodiments, comprise curved portions, such as for example at the corners and/or vertices between otherwise flat surfaces.

According to certain embodiments, and referring again to FIGS. 13-16, the electrode assembly 106 comprises opposing longitudinal surfaces 116, 118 (i.e. first and second longitudinal end surfaces) that are substantially flat and are separated from each other in the longitudinal direction, and a lateral surface 142 surrounding an electrode assembly longitudinal axis $A_{EA}$ and connecting the opposing longitudinal end surfaces. The lateral surface 142 comprises opposing vertical surfaces 906, 908 that are substantially flat and are separated from each other in the vertical direction on opposing vertical sides of the longitudinal axis, and comprises opposing transverse surfaces 910, 912 that are substantially flat and are separated from each other in the transverse direction on opposing transverse sides of the longitudinal axis. According to one embodiment, the opposing longitudinal surfaces 116, 118 have a combined surface area, $L_{SA}$, the opposing transverse surfaces 910, 912 have a combined surface area, $T_{SA}$, and the opposing vertical surfaces 906, 908 have a combined surface area, $V_{SA}$, where the ratio of $V_{SA}$ to each of $L_{SA}$ and $T_{SA}$ is at least 5:1, The combined surface area is the surface area of each surface added to its opposing surface (e.g. the combined surface area of the opposing longitudinal surfaces 116, 118 is the surface area of the longitudinal surface 116 added to the surface area of the longitudinal surface 118).

According to one embodiment, the opposing longitudinal, vertical, and transverse surfaces (which are substantially flat) make up a combined surface area of greater than 66%. According to one embodiment, the opposing longitudinal, vertical, and transverse surfaces (which are substantially flat) make up a combined surface area of greater than 75%. According to one embodiment, the opposing longitudinal, vertical, and transverse surfaces (which are substantially flat) make up a combined surface area of greater than 80%. According to one embodiment, the opposing longitudinal, vertical, and transverse surfaces (which are substantially flat) make up a combined surface area of greater than 95%. According to one embodiment, the opposing longitudinal, vertical, and transverse surfaces (which are substantially flat) make up a combined surface area of greater than 99%. According to one embodiment, the opposing longitudinal, vertical, and transverse surfaces (which are substantially flat) make up substantially the entire combined surface area of the electrode assembly.

Furthermore, according to certain embodiments, and as similarly described with respect to energy storage devices and/or secondary batteries 102 above, the electrode assembly 106 of the secondary battery cell 902 comprises an electrode structure population 110, an electrically insulating separator population 130, and a counter-electrode structure population 112, wherein members of the electrode structure, electrically insulating separator and counter-electrode structure populations are arranged in an alternating sequence within the electrode assembly. In one embodiment, the members of the electrode structure, electrically insulating separator and counter-electrode structure populations are arranged in an alternating sequence in the longitudinal direction. According to one embodiment, members of the electrode structure population 110 comprise electrode active material layers 132 and electrode current collectors 136, and members of the counter-electrode structure population 112 comprise counter-electrode active material layers 138 and counter-electrode current collectors 140.

Referring to FIG. 14, according to certain embodiments, the set of electrode constraints 108 comprises a vertical constraint system 2000 comprising first and second vertical growth constraints 2001, 2002 that are separated from each other in the vertical direction, the first and second vertical growth constraints 2001, 2002 being connected to members of the population of electrode structures 110 and/or members of the population of counter-electrode structures 112. According to certain embodiments, the vertical constraint system 2000 corresponds to the secondary growth constraint system 152 described herein, and accordingly the description of the secondary growth constraint system 152 can be considered as also applying to the vertical constraint system 2000. For example, the first and second vertical growth constraints 2001, 2002 can correspond to the first and second secondary growth constraints 158, 160, described herein, and the members of the population of electrode structures 110 and/or members of the population of counter-electrode structures 112 can correspond to the at least one connecting member 166. As with the secondary growth constraint system described above, the vertical constraint system 2000 is capable of restraining growth of the electrode assembly in the vertical direction. Members of the population of electrode structures and/or members of the population of counter-electrode structures that are connected to the first and second vertical growth constraints 2001, 2002 have a thickness as measured in the longitudinal direction that is in a range of between 5 and 50 μm, and a yield strength of greater than 100 MPa, to provide the restraint of growth in the vertical direction with the vertical growth constraints 2001, 2002.

Furthermore, according to certain embodiments, the set of electrode constraints 108 further comprises a longitudinal growth constraint system 2010 comprising first and second longitudinal constraints 2012, 2014, separated from each other in the longitudinal direction, and connected by a connecting member 2016 to restrain growth of the electrode assembly in the longitudinal direction. According to certain embodiments, the longitudinal constraint system 2010 corresponds to the primary growth constraint system 151 described elsewhere herein, and accordingly the description of the primary growth constraint system 151 can be considered as also applying to the longitudinal constraint system 2010. For example, the first and second longitudinal growth constraints 2012, 2014 can correspond to the first and second primary growth constraints 154, 156, described herein, and they can be connected by primary connecting member 162, 164 corresponding to the first and second vertical growth constraints 2001, 2002.

According to certain embodiments, the hermetically sealed enclosure 104 comprises opposing external vertical surfaces 2004, 2005 separated from each other in the vertical direction, and a thickness ti of the sealed secondary battery cell 902 as measured in the vertical direction between vertically opposing regions 2006, 2007 of the external vertical surfaces 2004, 2005 of the hermetically sealed enclosure 104, is at least 1 mm. According to further embodiments, a thermal conductivity of the secondary battery cell 902 along a thermally conductive path 2008 between the vertically opposing regions 2006, 2007 of the external vertical surfaces 2004, 2005 of the hermetically sealed enclosure 104 in the vertical direction is at least 2 W/m·K.

According to certain embodiments, the sealed secondary battery cell 902 has a rated capacity of at least 150 mAmp·hr. According to another embodiment, the sealed secondary battery cell 902 has a rated capacity of at least 200 mAmp·hr. According to another embodiment, the sealed secondary battery cell 902 has a rated capacity of at least 400 mAmp·hr. According to another embodiment, the sealed secondary battery cell 902 has a rated capacity of at least 0.1 Amp·hr. According to another embodiment, the sealed secondary battery cell 902 has a rated capacity of at least 0.5 Amp·hr. According to another embodiment, the sealed secondary battery cell 902 has a rated capacity of at least 1 Amp·hr. According to another embodiment, the sealed secondary battery cell 902 has a rated capacity of at least 3 Amp·hr. According to another embodiment, the sealed secondary battery cell 902 has a rated capacity of at least 5 Amp·hr.

According to certain embodiments, the thickness of the secondary battery cell 902 as measured between opposing regions 2006, 2007 of the opposing surfaces 2004, 2005 of the hermetically sealed enclosure 104, in the vertical direction, is at least 2 mm. According to another embodiment, the thickness of the secondary battery cell 902 as measured between opposing regions 2006, 2007 of the opposing surfaces 2004, 2005 of the hermetically sealed enclosure 104, in the vertical direction, is at least 3 mm. According to another embodiment, the thickness of the secondary battery cell 902 as measured between opposing regions 2006, 2007 of the opposing surfaces 2004, 2005 of the hermetically sealed enclosure 104, in the vertical direction, is at least 5 mm. According to another embodiment, the thickness of the secondary battery cell 902 as measured between opposing regions 2006, 2007 of the opposing surfaces 2004, 2005 of the hermetically sealed enclosure 104, in the vertical direction, is at least 8 mm. According to another embodiment, the thickness of the secondary battery cell 902 as measured between opposing regions 2006, 2007 of the opposing surfaces 2004, 2005 of the hermetically sealed enclosure 104, in the vertical direction, is at least 10 mm.

According to certain embodiments, the thermal conductivity of the secondary battery cell 902 along the thermally conductive path 2008 between opposing regions 2006, 2007 of the opposing surfaces 2004, 2005 of the hermetically sealed enclosure 104 in the vertical direction is at least 3 W/m·K. According to another embodiment, the thermal conductivity of the secondary battery cell 902 along the thermally conductive path 2008 between opposing regions 2006, 2007 of the opposing surfaces 2004, 2005 of the hermetically sealed enclosure 104 in the vertical direction, is at least 4 W/m·K. According to another embodiment, the thermal conductivity of the secondary battery cell 902 along the thermally conductive path 2008 between opposing regions 2006, 2007 of the opposing surfaces 2004, 2005 of the hermetically sealed enclosure 104 in the vertical direction, is at least 5 W/m·K. According to certain embodiments, the thermally conductive path 2008 is along the vertical direction of members of the population of electrode structures 110 and/or members of the population of counter-electrode structures 112 that are connected to the first and second vertical growth constraints 2001, 2002.

According to one embodiment, the hermetically sealed enclosure 104 comprises polymeric materials that are suitable to contain the electrode assembly, and/or electrolyte, within the enclosure. According to certain embodiments, the hermetically sealed enclosure 104 can further comprise a laminate structure of polymeric materials with other materials, such as flexible sheets of metal materials. In certain embodiments, the polymeric and/or other materials used for the enclosure can be resistant to erosion by any electrolyte used in the secondary battery cell, and can serve to contain such electrolyte within the cell. In one embodiment, the hermetically sealed enclosure 104 comprises a laminate structure made of sheets of polymeric materials with a flexible sheet of metal material disposed in between. In one embodiment, the hermetically sealed enclosure 104 comprises a laminate structure made of sheets of polypropylene, aluminum, and nylon, with the aluminum sheet being between the polypropylene and nylon polymeric sheets. The hermetically sealed enclosure 104 can be in the form of a hermetically sealed pouch having the polymeric materials, such as a hermetically sealed pouch made of flexible pouch materials. According to certain embodiments, the first and second vertical growth constraints 2001, 2002 can comprise any of the materials specified for either of the primary and secondary growth constraint systems 151, 152 herein, such as for example any of metals, alloys, ceramics, glass, plastics, or a combination thereof. In one embodiment, the first and second vertical growth constraints comprise any one or more of stainless steel and aluminum.

According to one embodiment, the first and second vertical growth constraints, have a yield strength of at least 70 MPa. According to one embodiment, the first and second vertical growth constraints, have a yield strength of at least 100 MPa. According to another embodiment, the first and second vertical growth constraints, have a yield strength of at least 150 MPa. According to another embodiment, the first and second vertical growth constraints, have a yield strength of at least 200 MPa. According to another embodiment, the first and second vertical growth constraints, have a yield strength of at least 300 MPa. According to another embodiment, the first and second vertical growth constraints, have a yield strength of at least 500 MPa.

According to one embodiment, the first and second vertical growth constraints, have a tensile strength of at least 70 MPa. According to one embodiment, the first and second vertical growth constraints, have a tensile strength of at least 100 MPa. According to another embodiment, the first and second vertical growth constraints, have a tensile strength of at least 150 MPa. According to another embodiment, the first and second vertical growth constraints, have a tensile strength of at least 200 MPa. According to another embodiment, first and second vertical growth constraints, have a tensile strength of at least 300 MPa. According to another embodiment, the first and second vertical growth constraints, have a tensile strength of at least 500 MPa.

According to one embodiment, the first and second longitudinal growth constraints, have a yield strength of at least 70 MPa. According to one embodiment, the first and second longitudinal growth constraints, have a yield strength of at least 100 MPa. In another embodiment, the first and second longitudinal growth constraints, have a yield strength of at least 150 MPa. In another embodiment, the first and second longitudinal growth constraints, have a yield strength of at least 200 MPa. In another embodiment, the first and second longitudinal growth constraints, have a yield strength of at least 300 MPa. In another embodiment, the first and second longitudinal growth constraints, have a yield strength of at least 500 MPa.

According to one embodiment, the first and second longitudinal growth constraints, have a tensile strength of at least 70 MPa. According to one embodiment, the first and second longitudinal growth constraints, have a tensile strength of at least 100 MPa. In another embodiment, the first and second longitudinal growth constraints, have a tensile strength of at least 150 MPa. In another embodiment, the first and second longitudinal growth constraints, have a tensile strength of at least 200 MPa. In another embodiment, the first and second longitudinal growth constraints, have a tensile strength of at least 300 MPa. In another embodiment, the first and second longitudinal growth constraints, have a tensile strength of at least 500 MPa.

According to one embodiment, the members of the population of electrode structures and/or members of the population of counter-electrode structures that are connected to the first and second vertical growth constraints have a yield strength of greater than 70 MPa. In another embodiment, the members of the population of electrode structures and/or members of the population of counter-electrode structures that are connected to the first and second vertical growth constraints have a yield strength of greater than 100 MPa. In another embodiment, the members of the population of electrode structures and/or members of the population of counter-electrode structures that are connected to the first and second vertical growth constraints have a yield strength of greater than 150 MPa. In another embodiment, the members of the population of electrode structures and/or members of the population of counter-electrode structures that are connected to the first and second vertical growth constraints have a yield strength of greater than 200 MPa. In another embodiment, the members of the population of electrode structures and/or members of the population of counter-electrode structures that are connected to the first and second vertical growth constraints have a yield strength of greater than 300 MPa. In another embodiment, the members of the population of electrode structures and/or members of the population of counter-electrode structures that are connected to the first and second vertical growth constraints have a yield strength of greater than 500 MPa.

According to one embodiment, the members of the population of electrode structures and/or members of the population of counter-electrode structures that are connected to the first and second vertical growth constraints have a tensile strength of greater than 70 MPa. In another embodiment, the members of the population of electrode structures and/or members of the population of counter-electrode structures that are connected to the first and second vertical growth constraints have a tensile strength of greater than 100 MPa. In another embodiment, the members of the population of electrode structures and/or members of the population of counter-electrode structures that are connected to the first and second vertical growth constraints have a tensile strength of greater than 150 MPa. In another embodiment, the members of the population of electrode structures and/or members of the population of counter-electrode structures that are connected to the first and second vertical growth constraints have a tensile strength of greater than 200 MPa. In another embodiment, the members of the population of electrode structures and/or members of the population of counter-electrode structures that are connected to the first and second vertical growth constraints have a tensile strength of greater than 300 MPa. In another embodiment, the members of the population of electrode structures and/or members of the population of counter-electrode structures that are connected to the first and second vertical growth constraints have a tensile strength of greater than 500 MPa.

According to one embodiment, the first and second vertical growth constraints 2001, 2002 are connected to upper and lower surfaces of members of the electrode structure population and/or counter-electrode structure population. For example, the first and second vertical growth constraints 2001, 2002 can be connected to upper and lower end surfaces 500a, 500b separated in the vertical direction of members of the electrode structure population, and/or upper and lower end surfaces 501a, 501b of counter-electrode structures separated in the vertical direction. According to another embodiment, the first and second vertical growth constraints 2001, 2002 can be connected to upper and lower end surfaces 502a, 502b separated in the vertical direction of the separator 130. In one embodiment, the first and second vertical growth constraints are connected to upper and lower surfaces of electrode current collectors of members of the electrode structure population, and/or upper and lower surfaces of counter-electrode current collectors of members of the counter-electrode population. For example, in one embodiment, the electrode and/or counter-electrode current collectors are connected to the first and second vertical growth constraints 2001, 2002, and comprise a thickness as measured in the longitudinal direction that is in a range of between 5 and 50 µm, and a yield strength of greater than 100 MPa, to provide restraint of growth in the vertical direction. In one embodiment, the electrode current collectors are connected to the first and second vertical growth constraints 2001, 2002, and comprise a thickness as measured in the longitudinal direction that is in a range of between 5 and 50 µm, and a yield strength of greater than 100 MPa, The electrode and/or counter-electrode current collectors may also have any of the yield strengths and/or tensile strengths otherwise described herein as suitable for members of the electrode and/or counter-electrode structure population that are connected to the upper and lower sidewalls.

According to one embodiment, the vertical constraint system 2000 comprising the first and second vertical growth constraints 2001, 2002 constrain growth in the vertical direction such that any increase in the Feret diameter of the electrode assembly over 20 consecutive cycles is less than 2%. In another embodiment the vertical constraint system 2000 comprising the first and second vertical growth constraints 2001, 2002 constrain growth in the vertical direction such that any increase in the Feret diameter of the electrode assembly over 30 consecutive cycles is less than 2%. In another embodiment, the vertical constraint system 2000 comprising the first and second vertical growth constraints 2001, 2002 constrain growth in the vertical direction such that any increase in the Feret diameter of the electrode assembly over 50 consecutive cycles is less than 2%. In another embodiment, the vertical constraint system 2000 comprising the first and second vertical growth constraints 2001, 2002 constrain growth in the vertical direction such that any increase in the Feret diameter of the electrode assembly over 80 consecutive cycles is less than 2%. In another embodiment, the vertical constraint system 2000 comprising the first and second vertical growth constraints 2001, 2002 constrain growth in the vertical direction such that any increase in the Feret diameter of the electrode assembly over 100 consecutive cycles is less than 2%.

According to certain embodiments, the first and second vertical growth constraints 2001, 2002 comprise a tensile strength of at least 10000 psi (greater than 70 Mpa). According to another embodiment, the first and second longitudinal constraints 2012, 2014 comprise a tensile strength of at least 10000 psi (greater than 70 Mpa). In one embodiment, the thickness of the first and second longitudinal constraints as measured in the longitudinal direction is at least 150 um. In another embodiment, the thickness of the first and second longitudinal constraints 2012, 2014 as measured in the longitudinal direction is at least 250 um. In another embodiment, the thickness of the first and second longitudinal constraints 2012, 2014 as measured in the longitudinal direction is at least 400 um.

According to one embodiment, the members of the population of electrode structures and/or members of the population of counter-electrode structures are connected to the first and second vertical growth constraints 2001, 2002 by any one or more of one or more of adhering, gluing, welding, bonding, joining, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying. In one embodiment, opposing vertical surfaces of the members of the electrode structures and/or members of the population of counter-electrode structures are connected to the first and second vertical growth constraints 200, 2001 by an adhesive.

Figure 10:
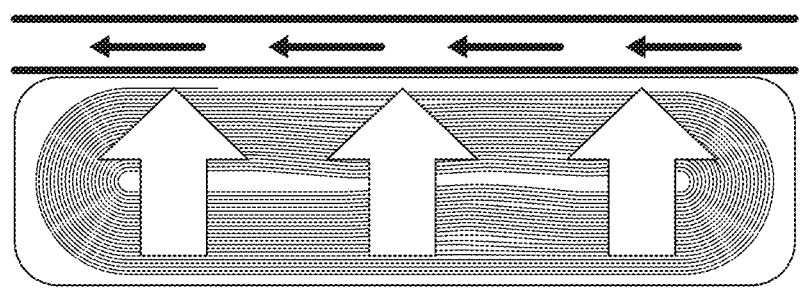
FIG. 10 illustrates a schematic of an exemplary thermally conductive path in a jelly roll secondary battery cell.
Figure 11:
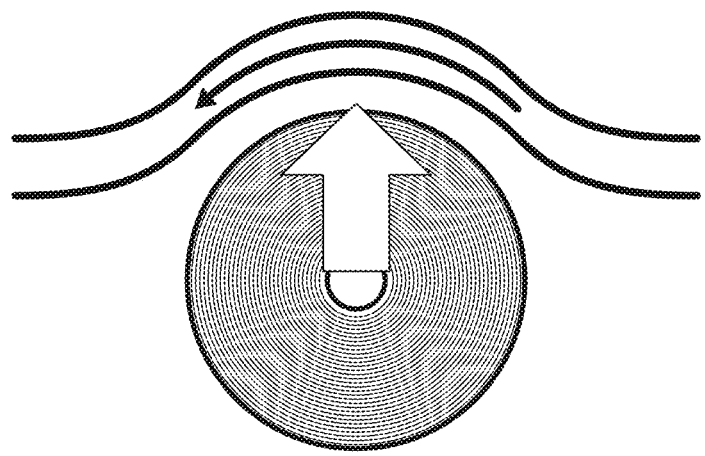
FIG. 11 illustrates a schematic of an exemplary thermally conductive path in a cylindrical secondary battery cell.
Figure 12:
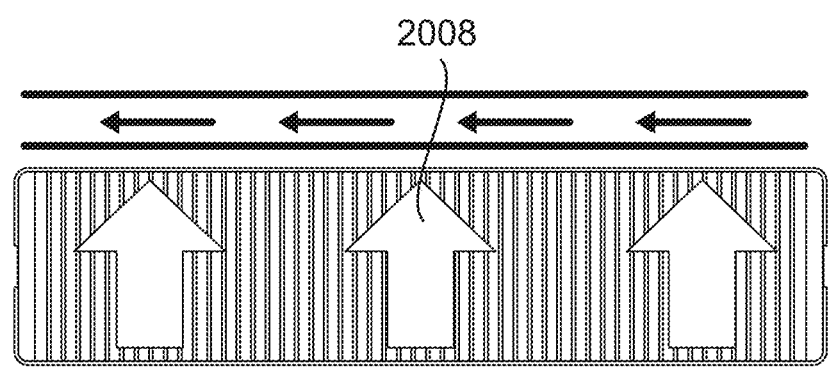
FIG. 12 illustrates a schematic of an exemplary thermally conductive path in an embodiment of a secondary battery cell having a substantially polyhedral shape according to aspects of the disclosure.
Figure 13:
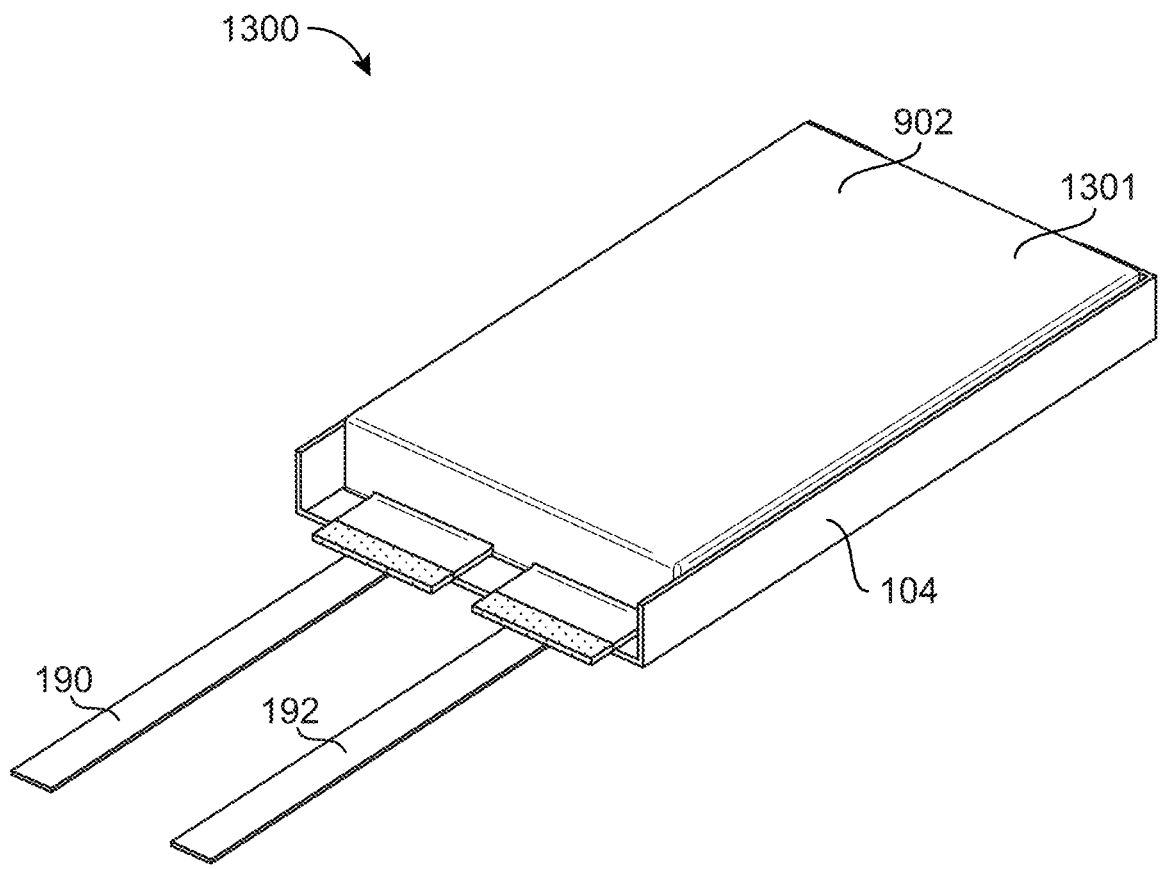
FIG. 13 is a perspective view of one embodiment of a hermetically sealed secondary battery cell.

Referring to FIG. 12, comparing to other secondary battery cell (FIGS. 10 and 11), aspects of the present disclosure provide an efficient thermally conductive path for heat dissipation during battery cycling (hollow arrows indicate the heat path inside a secondary battery cell, and solid lines indicate the cooling paths used to cool the outside of the secondary battery cell). As can be seen in FIG. 12, according to aspects herein, a direct thermally conductive pathway is provided along the electrode and/or counter-electrode structures to the greatest surface area surfaces (i.e. vertical surfaces) of the secondary battery, such that cooling of these surfaces removes a significant amount of heat. In contrast, in FIGS. 10-11, the heat exit path crosses numerous different layers of the electrode assemblies, such that heat is not efficiently conveyed to the surface of the secondary battery cell. In the embodiment shown in FIG. 14, an exemplary enclosure 104 may comprise two parts: a top cover 1302 and a bottom holder 1303. These two parts may overlap in the vertical direction (FIGS. 14 and 15) and be sealed to one another, with the seal being folded up and against the side of the sealed secondary battery cell.

Sealed Secondary Battery Cell Having Hermetically Sealed Case

Referring to FIGS. 17-22, according to embodiments of the disclosure, a sealed secondary battery cell 902 that is chargeable between the charged state and the discharged state is provided. The sealed secondary battery cell 902 comprises an enclosure 104 that is a hermetically sealed case 2020 comprising a polymer enclosure material, and an electrode assembly 106 enclosed by the hermetically sealed case 2020. According to certain embodiments, a rated capacity of the sealed secondary battery cell is at least 100 mAmp·hr. According to certain embodiments, the charged state is at least 75% of the rated capacity of the secondary battery cell, and the discharged state is less than 25% of the rated capacity of the secondary battery cell.

According to certain embodiments, the electrode assembly 106 has a substantially polyhedral shape with mutually perpendicular transverse, longitudinal and vertical axes corresponding to the x, y and z axes, respectively, of an imaginary three-dimensional Cartesian coordinate system. For example, in certain embodiments the electrode assembly 106 can substantially comprise six substantially flat and/or entirely flat surfaces, and/or can comprise further flat surfaces, such as eight or more flat surfaces. The electrode assembly can also, in certain embodiments, comprise curved portions, such as for example at the corners and/or vertices between otherwise flat surfaces.

According to certain embodiments, and referring again to FIGS. 17-22, the electrode assembly 106 comprises opposing longitudinal surfaces 116, 118 (i.e. first and second longitudinal end surfaces) that are substantially flat and are separated from each other in the longitudinal direction, and a lateral surface 142 surrounding an electrode assembly longitudinal axis $A_{EA}$ and connecting the opposing longitudinal end surfaces.

The lateral surface 142 comprises opposing vertical surfaces 906, 908 that are substantially flat and are separated from each other in the vertical direction on opposing vertical sides of the longitudinal axis, and comprises opposing transverse surfaces 910, 912 that are substantially flat and are separated from each other in the transverse direction on opposing transverse sides of the longitudinal axis. According to one embodiment, the opposing longitudinal surfaces 116, 118 have a combined surface area, $L_{SA}$, the opposing transverse surfaces 910, 912 have a combined surface area, $T_{SA}$, and the opposing vertical surfaces 906, 908 have a combined surface area, $V_{SA}$, where the ratio of $V_{SA}$ to each of $L_{SA}$ and $T_{SA}$ is at least 5:1, The combined surface area is the surface area of each surface added to its opposing surface (e.g. the combined surface area of the opposing longitudinal surfaces 116, 118 is the surface area of the longitudinal surface 116 added to the surface area of the longitudinal surface 118).

According to one embodiment, the opposing longitudinal, vertical, and transverse surfaces (which are substantially flat) make up a combined surface area of greater than 66%. According to one embodiment, the opposing longitudinal, vertical, and transverse surfaces (which are substantially flat) make up a combined surface area of greater than 75%. According to one embodiment, the opposing longitudinal, vertical, and transverse surfaces (which are substantially flat) make up a combined surface area of greater than 80%. According to one embodiment, the opposing longitudinal, vertical, and transverse surfaces (which are substantially flat) make up a combined surface area of greater than 95%. According to one embodiment, the opposing longitudinal, vertical, and transverse surfaces (which are substantially flat) make up a combined surface area of greater than 99%. According to one embodiment, the opposing longitudinal, vertical, and transverse surfaces (which are substantially flat) make up substantially the entire combined surface area of the electrode assembly.

Furthermore, according to certain embodiments, and as similarly described with respect to energy storage devices and/or secondary batteries 102 above, the electrode assembly 106 of the secondary battery cell 902 comprises an electrode structure population 110, an electrically insulating separator population 130, and a counter-electrode structure population 112, wherein members of the electrode structure, electrically insulating separator and counter-electrode structure populations are arranged in an alternating sequence within the electrode assembly. In one embodiment, the members of the electrode structure, electrically insulating separator and counter-electrode structure populations are arranged in an alternating sequence in the longitudinal direction. According to one embodiment, members of the electrode structure population 110 comprise electrode active material layers 132 and electrode current collectors 136, and members of the counter-electrode structure population 112 comprise counter-electrode active material layers 138 and counter-electrode current collectors 140.

According to one embodiment, the hermetically sealed case 2020 has opposing first and second case ends 2021, 2022 separated in the longitudinal direction, and a case sidewall 2023 that connects the first and second case ends 2021, 2022, the opposing first and second case ends 2021, 2022 and case sidewall 2023 forming a hermetic seal about the electrode assembly 106, wherein the case sidewall 2023 comprises upper and lower sidewalls 2024, 2025 separated from each other in the vertical direction, and first and second transverse sidewalls 2026, 2027 that are separated from each other in the transverse direction. In the embodiment as shown in FIGS. 17-22, the first and second case ends 2021, 2022, the first and second transverse sidewalls 2026, 2027 and lower sidewall 2025 form a lower enclosure portion of the case 2020, with the upper sidewall 2024 being in the form of a lid that is sealable to the lower enclosure portion to form the hermetically sealed case 2020.

According to one embodiment, a thickness ti of the secondary battery cell 902 as measured in the vertical direction between vertically opposing regions 2028, 2028 of external vertical surfaces 2030, 2031 of the upper and lower sidewalls 2024, 2025 of the hermetically sealed case 2020, is at least 1 mm. According to certain embodiments, the thickness of the secondary battery cell 902 as measured in the vertical direction between vertically opposing regions 2028, 2028 of external vertical surfaces 2030, 2031 of the upper and lower sidewalls 2024, 2025 of the hermetically sealed case 2020, is at least 2 mm. According to another embodiment, the thickness of the secondary battery cell 902 as measured in the vertical direction between vertically opposing regions 2028, 2028 of external vertical surfaces 2030, 2031 of the upper and lower sidewalls 2024, 2025 of the hermetically sealed case 2020, is at least 3 mm. According to another embodiment, the thickness of the secondary battery cell 902 as measured in the vertical direction between vertically opposing regions 2028, 2028 of external vertical surfaces 2030, 2031 of the upper and lower sidewalls 2024, 2025 of the hermetically sealed case 2020, is at least 5 mm. According to another embodiment, the thickness of the secondary battery cell 902 as measured in the vertical direction between vertically opposing regions 2028, 2028 of external vertical surfaces 2030, 2031 of the upper and lower sidewalls 2024, 2025 of the hermetically sealed case 2020, is at least 8 mm. According to another embodiment, the thickness of the secondary battery cell 902 as measured in the vertical direction between vertically opposing regions 2028, 2028 of external vertical surfaces 2030, 2031 of the upper and lower sidewalls 2024, 2025 of the hermetically sealed case 2020, is at least 10 mm.

According to one embodiment, members of the electrode structure population 110 and/or counter-electrode structure population 112 are connected to the upper and lower sidewalls 2024, 2025 of the hermetically sealed case 2020 to restrain growth of the electrode assembly in the vertical direction during cycling of the secondary battery between the charged and discharged states. According to certain embodiments, the upper and lower sidewalls 2024, 2025 (in combination with the electrode and/or counter-electrode structures to which they are connected) corresponds to the secondary growth constraint system 152 described herein, and accordingly the description of the secondary growth constraint system 152 can be considered as also applying to the upper and lower sidewalls 2024, 2025 connected to the electrode and/or counter-electrode structures. For example, the upper and lower sidewalls 2024, 2025 can correspond to the first and second secondary growth constraints 158, 160, described herein, and the members of the population of electrode structures 110 and/or members of the population of counter-electrode structures 112 can correspond to the at least one connecting member 166. As with the secondary growth constraint system described above, the upper and lower sidewalls 2024, 2025 connected to the electrode and/or counter-electrode structures are capable of restraining growth of the electrode assembly in the vertical direction. Members of the population of electrode structures and/or members of the population of counter-electrode structures that are connected to the upper and lower sidewalls 2024, 2025 have a thickness as measured in the longitudinal direction that is in a range of between 5 and 50 μm, and a yield strength of greater than 100 MPa, to provide the restraint of growth in the vertical direction.

Furthermore, according to certain embodiments, the first and second case ends 2021, 2022 that are separated from each other in the longitudinal direction can act to restrain growth in the longitudinal direction. For example, the opposing first and second case ends 2021, 2022 can be connected together by one or more of the upper and lower sidewalls of the case 2024, 2025, and restrain growth of the electrode assembly in the longitudinal direction. In one embodiment, the first and second case ends 2021, 2022 (in combination with one or more of the upper and lower sidewalls 2024, 2025) can correspond to the primary growth constraint system 151 described elsewhere herein, and accordingly the description of the primary growth constraint system 151 can be considered as also applying to the first and second case ends 2021, 2022 as connected by one or more of the upper and lower sidewalls 2024, 2025). For example, the opposing first and second case ends 2021, 2022 can correspond to the first and second primary growth constraints 154, 156, described herein, and they can be connected by primary connecting members 162, 164 corresponding to the upper and lower sidewalls 2024, 2025 of the case.

In one embodiment, the sealed secondary battery cell 902 further comprises a set of electrode constraints 108 internal to the hermetically sealed case 2020, the set of electrode constraints comprising an internal vertical constraint system 2020 comprising first and second vertical growth constraints 2001, 2002 that are separated from each other in the vertical direction, the first and second vertical growth constraints 2001, 2002 being connected to members of the population of electrode structures and/or members of the population of counter-electrode structures. The vertical constraint system 2000 is capable of restraining growth of the electrode assembly in the vertical direction and the first and second vertical growth constraints 2001, 2002 are connected to the respective upper and lower sidewalls 2024, 2025, to indirectly connect the members of the population of electrode structures and/or members of the population of counter-electrode structures to the upper and lower sidewalls. For example, the first and second vertical growth constraints 2001, 2002 can be adhered to the upper and lower sidewalls 2024, 2025 with an adhesive, to complete a connection of the members of the electrode and/or counter-electrode population to the upper and lower sidewalls 2024, 2025 of the hermetically sealed case 2020. According to certain embodiments, the vertical constraint system 2000, either alone or in combination with the upper and lower sidewalls 2024, 2025 of the case, can correspond to the primary growth constraint system 151 described elsewhere herein, and accordingly the description of the primary growth constraint system 151 can be considered as also applying to the vertical constraints system 2000. For example, the first and second vertical growth constraints 2001, 2002, either alone or in combination with the upper and lower sidewalls 2024, 2025, can correspond to the first and second secondary growth constraints 158, 160, described herein, and they can be connected by secondary connecting members 166 corresponding to members of the electrode and/or counter-electrode structure population. In embodiments where an internal set of electrode constraints 108 are provided, members of the population of electrode structures and/or members of the population of counter-electrode structures that are connected to the upper and lower sidewalls have a thickness as measured in the longitudinal direction that is in a range of between 5 and 50 μm, and a yield strength of greater than 100 MPa, to restrain growth in the vertical direction.

According to yet another embodiment, the set of electrode constraints 108 that are internal to the hermetically sealed case 2020 further comprise a longitudinal constraint system 2010 comprising first and second longitudinal growth constraints 2012, 2014 separated from each other in the longitudinal direction, and connected by a connecting member 2016 to restrain growth of the electrode assembly in the longitudinal direction. According to certain embodiments, the longitudinal constraint system 2010, either alone or in combination with the first and second case ends 2021, 2022, can correspond to the primary growth constraint system 151 described elsewhere herein, and accordingly the description of the primary growth constraint system 151 can be considered as also applying to the longitudinal constraint system 2010. For example, the first and second longitudinal growth constraints 2012, 2014, either alone or in combination with the first and second case ends 2021, 2022, can correspond to the first and second primary growth constraints 154, 156, described herein, and they can be connected by primary connecting members 162, 164 corresponding to first and second vertical growth constraints 2002, 2002, either alone or in combination with the upper and lower sidewalls 2024, 2025.

According to one embodiment, a thermal conductivity of the secondary battery cell 902 along a thermally conductive path 2008 between the vertically opposing regions 2028, 2029 of the external vertical surfaces 2030, 2031 of the upper and lower sidewalls 2024, 2025 of the hermetically sealed case 2020 in the vertical direction is at least 7.5 W/m·K. According to another embodiment, the thermal conductivity of the secondary battery cell 902 along the thermally conductive path 2008 between the vertically opposing regions 2028, 2029 of the external vertical surfaces 2030, 2031 of the upper and lower sidewalls 2024, 2025 of the hermetically sealed case 2020 in the vertical direction is at least 8 W/m·K. According to another embodiment, the thermal conductivity of the secondary battery cell 902 along the thermally conductive path 2008 between the vertically opposing regions 2028, 2029 of the external vertical surfaces 2030, 2031 of the upper and lower sidewalls 2024, 2025 of the hermetically sealed case 2020 in the vertical direction is at least 10 W/m·K. According to another embodiment, the thermal conductivity of the secondary battery cell 902 along the thermally conductive path 2008 between the vertically opposing regions 2028, 2029 of the external vertical surfaces 2030, 2031 of the upper and lower sidewalls 2024, 2025 of the hermetically sealed case 2020 in the vertical direction is at least 15 W/m·K. According to certain embodiments, the thermally conductive path 2008 is along the vertical direction of members of the population of electrode structures 110 and/or members of the population of counter-electrode structures 112 that are connected to the first and second vertical growth constraints 2001, 2002.

According to certain embodiments, the sealed secondary battery cell 902 has a rated capacity of at least 150 mAmp·hr. According to another embodiment, the sealed secondary battery cell 902 has a rated capacity of at least 200 mAmp·hr. According to another embodiment, the sealed secondary battery cell 902 has a rated capacity of at least 400 mAmp·hr. According to another embodiment, the sealed secondary battery cell 902 has a rated capacity of at least 0.1 Amp·hr. According to another embodiment, the sealed secondary battery cell 902 has a rated capacity of at least 0.5 Amp·hr. According to another embodiment, the sealed secondary battery cell 902 has a rated capacity of at least 1 Amp·hr. According to another embodiment, the sealed secondary battery cell 902 has a rated capacity of at least 3 Amp·hr. According to another embodiment, the sealed secondary battery cell 902 has a rated capacity of at least 5 Amp·hr.

According to one embodiment, the hermetically sealed case 2020 comprises a metal material comprising any selected from the group consisting of stainless steel, aluminum, titanium, beryllium, beryllium, copper, nickel, and alloys thereof. For example, the metal material in certain embodiments is any of the metal materials disclosed as suitable for the primary growth constraint system 151 and/or secondary growth constraint system 152 herein. In one embodiment, the metal material used for the case, such as the upper and lower sidewalls, comprises any of stainless steel and aluminum. In certain embodiments, the metal materials used for the case can be resistant to erosion by any electrolyte used in the secondary battery cell, and can serve to contain such electrolyte within the cell. According to certain embodiments where an internal set of electrode constraints 108 is provided within the hermetically sealed case 2020, the first and second vertical growth constraints, and/or first and second longitudinal constraints, can comprise any of the materials specified for either of the primary and secondary growth constraint systems 151, 152 herein, such as for example any of metals, alloys, ceramics, glass, plastics, or a combination thereof. In one embodiment, the first and second vertical growth constraints 2001, 2002 comprise any one or more of stainless steel and aluminum.

According to one embodiment, the upper and lower sidewalls 2024, 2025, either alone or in combination with the first and second vertical growth constraints 2001, 2002, have a yield strength of at least 70 MPa. According to one embodiment, the upper and lower sidewalls 2024, 2025, either alone or in combination with the first and second vertical growth constraints 2001, 2002, have a yield strength of at least 100 MPa.

According to another embodiment, the upper and lower sidewalls 2024, 2025, either alone or in combination with the first and second vertical growth constraints 2001, 2002, have a yield strength of at least 150 MPa. According to another embodiment, the upper and lower sidewalls 2024, 2025, either alone or in combination with the first and second vertical growth constraints 2001, 2002, have a yield strength of at least 200 MPa. According to another embodiment, the upper and lower sidewalls 2024, 2025, either alone or in combination with the first and second vertical growth constraints 2001, 2002, have a yield strength of at least 300 MPa. According to another embodiment, the upper and lower sidewalls 2024, 2025, either alone or in combination with the first and second vertical growth constraints 2001, 2002, have a yield strength of at least 500 MPa.

According to one embodiment, the upper and lower sidewalls 2024, 2025 either alone or in combination with the first and second vertical growth constraints 2001, 2002 have a tensile strength of at least 70 MPa. According to one embodiment, the upper and lower sidewalls, either alone or in combination with the first and second vertical growth constraints, have a tensile strength of at least 100 MPa. According to another embodiment, the upper and lower sidewalls 2024, 2025, either alone or in combination with the first and second vertical growth constraints 2001, 2002, have a tensile strength of at least 150 MPa. According to another embodiment, the upper and lower sidewalls 2024, 2025, either alone or in combination with the first and second vertical growth constraints 2001, 2002, have a tensile strength of at least 200 MPa.

According to another embodiment, the upper and lower sidewalls 2024, 2025, either alone or in combination with the first and second vertical growth constraints 2001, 2002, have a tensile strength of at least 300 MPa. According to another embodiment, the upper and lower sidewalls 2024, 2025, either alone or in combination with the first and second vertical growth constraints 2001, 2002, have a tensile strength of at least 500 MPa.

According to one embodiment, the first and second case ends 2021, 2022, either alone or in combination with first and second longitudinal growth constraints 2012, 2014, have a yield strength of at least 70 MPa. According to one embodiment, the first and second case ends 2021, 2022, either alone or in combination with first and second longitudinal growth constraints 2012, 2014, have a yield strength of at least 100 MPa. In another embodiment, the first and second case ends 2021, 2022, either alone or in combination with first and second longitudinal growth constraints 2012, 2014, have a yield strength of at least 150 MPa. In another embodiment, the first and second case ends 2021, 2022, either alone or in combination with first and second longitudinal growth constraints 2012, 2014, have a yield strength of at least 200 MPa. In another embodiment, the first and second case ends 2021, 2022, either alone or in combination with first and second longitudinal growth constraints 2012, 2014, have a yield strength of at least 300 MPa. In another embodiment, the first and second case ends 2021, 2022, either alone or in combination with first and second longitudinal growth constraints 2012, 2014, have a yield strength of at least 500 MPa.

According to one embodiment, the first and second case ends 2021, 2022, either alone or in combination with first and second longitudinal growth constraints 2012, 2014, have a tensile strength of at least 70 MPa. According to one embodiment, the first and second case ends 2021, 2022, either alone or in combination with first and second longitudinal growth constraints 2012, 2014, have a tensile strength of at least 100 MPa. In another embodiment, the first and second case ends 2021, 2022, either alone or in combination with first and second longitudinal growth constraints 2012, 2014, have a tensile strength of at least 150 MPa. In another embodiment, the first and second case ends 2021, 2022, either alone or in combination with first and second longitudinal growth constraints 2012, 2014, have a tensile strength of at least 200 MPa. In another embodiment, the first and second case ends 2021, 2022, either alone or in combination with first and second longitudinal growth constraints 2012, 2014, have a tensile strength of at least 300 MPa. In another embodiment, the first and second case ends 2021, 2022, either alone or in combination with first and second longitudinal growth constraints 2012, 2014 have a tensile strength of at least 500 MPa.

According to one embodiment, the members of the population of electrode structures and/or members of the population of counter-electrode structures that are connected to the upper and lower sidewalls 2024, 2025 have a yield strength of greater than 70 MPa. In another embodiment, the members of the population of electrode structures and/or members of the population of counter-electrode structures that are connected to the upper and lower sidewalls 2024, 2025 have a yield strength of greater than 100 MPa. In another embodiment, the members of the population of electrode structures and/or members of the population of counter-electrode structures that are connected to the upper and lower sidewalls 2024, 2025 have a yield strength of greater than 150 MPa. In another embodiment, the members of the population of electrode structures and/or members of the population of counter-electrode structures that are connected to the upper and lower sidewalls 2024, 2025 have a yield strength of greater than 200 MPa. In another embodiment, the members of the population of electrode structures and/or members of the population of counter-electrode structures that are connected to the upper and lower sidewalls 2024, 2025 have a yield strength of greater than 300 MPa. In another embodiment, the members of the population of electrode structures and/or members of the population of counter-electrode structures that are connected to the upper and lower sidewalls 2024, 2025 have a yield strength of greater than 500 MPa.

According to one embodiment, the members of the population of electrode structures and/or members of the population of counter-electrode structures that are connected to the upper and lower sidewalls 2024, 2025 have a tensile strength of greater than 70 MPa. In another embodiment, the members of the population of electrode structures and/or members of the population of counter-electrode structures that are connected to the upper and lower sidewalls 2024, 2025 have a tensile strength of greater than 100 MPa. In another embodiment, the members of the population of electrode structures and/or members of the population of counter-electrode structures that are connected to the upper and lower sidewalls 2024, 2025 have a tensile strength of greater than 150 MPa. In another embodiment, the members of the population of electrode structures and/or members of the population of counter-electrode structures that are connected to the upper and lower sidewalls 2024, 2025 have a tensile strength of greater than 200 MPa. In another embodiment, the members of the population of electrode structures and/or members of the population of counter-electrode structures that are connected to the upper and lower sidewalls 2024, 2025 have a tensile strength of greater than 300 MPa. In another embodiment, the members of the population of electrode structures and/or members of the population of counter-electrode structures that are connected to the upper and lower sidewalls 2024, 2025 have a tensile strength of greater than 500 MPa.

According to one embodiment, the first and second longitudinal growth constraints comprise a thickness in the longitudinal direction of at least 150 um. In another embodiment, the first and second longitudinal growth constraints comprise a thickness in the longitudinal direction of at least 250 um. In another embodiment, the first and second longitudinal growth constraints comprise a thickness in the longitudinal direction of at least 400 um.

According to one embodiment, the upper and lower sidewalls 2024, 2025 are connected to upper and lower surfaces of members of the electrode structure population and/or counter-electrode structure population. For example, the upper and lower sidewalls 2024, 2025 can be connected to upper and lower end surfaces 500a, 500b separated in the vertical direction of members of the electrode structure population, and/or upper and lower end surfaces 501a, 501b of counter-electrode structures separated in the vertical direction. According to another embodiment, the upper and lower sidewalls 2024, 2025 can be connected to upper and lower end surfaces 502*a*, 502*b* separated in the vertical direction of the separator 130. In one embodiment, the upper and lower sidewalls 2024, 2025 are connected to upper and lower surfaces of electrode current collectors of members of the electrode structure population, and/or upper and lower surfaces of counter-electrode current collectors of members of the counter-electrode population. In one embodiment, the first and second vertical growth constraints 2001, 2002 are connected to upper and lower surfaces of members of the electrode structure population and/or counter-electrode structure population, which first and second vertical growth constraints 2001, 2002 are in turn connected to the upper and lower sidewalls 2024, 2025. In another embodiment, the first and second vertical growth constraints 2001, 2002 are connected to upper and lower surfaces of electrode current collectors of members of the electrode structure population, and/or upper and lower surfaces of counter-electrode current collectors of members of the counter-electrode population, which first and second vertical growth constraints 2001, 2002 are in turn directly connected to the upper and lower sidewalls 2024, 2025. For example, in one embodiment, the electrode and/or counter-electrode current collectors are connected to the upper and lower sidewalls 2024, 2025 (e.g. either directly or via the first and second vertical growth constraints), and comprise a thickness as measured in the longitudinal direction that is in a range of between 5 and 50 µm, and a yield strength of greater than 100 MPa, to provide restraint of growth in the vertical direction. In one embodiment, the electrode current collectors are connected to the upper and lower sidewalls 2024, 2025 (e.g. either directly or via the first and second vertical growth constraints), and comprise a thickness as measured in the longitudinal direction that is in a range of between 5 and 50 µm, and a yield strength of greater than 100 MPa. The electrode and/or counter-electrode current collectors may also have any of the yield strengths and/or tensile strengths otherwise described herein as suitable for members of the electrode and/or counter-electrode structure population that are connected to the upper and lower sidewalls 2024, 2025.

According to one embodiment, the upper and lower sidewalls 2024, 2025 connected to the members of the electrode structure population or counter-electrode structure population, alone or together with the internal vertical constraint system, constrain growth in the vertical direction such that any increase in the Feret diameter of the electrode assembly over 20 consecutive cycles is less than 2%. In another embodiment the upper and lower sidewalls 2024, 2025 connected to the members of the electrode structure population or counter-electrode structure population, alone or together with the internal vertical constraint system, constrain growth in the vertical direction such that any increase in the Feret diameter of the electrode assembly over 30 consecutive cycles is less than 2%. In another embodiment, the upper and lower sidewalls 2024, 2025 connected to the members of the electrode structure population or counter-electrode structure population, alone or together with the internal vertical constraint system, constrain growth in the vertical direction such that any increase in the Feret diameter of the electrode assembly over 50 consecutive cycles is less than 2%. In another embodiment, the upper and lower sidewalls 2024, 2025 connected to the members of the electrode structure population or counter-electrode structure population, alone or together with the internal vertical constraint system, constrain growth in the vertical direction such that any increase in the Feret diameter of the electrode assembly over 80 consecutive cycles is less than 2%. In another embodiment, the upper and lower sidewalls 2024, 2025 connected to the members of the electrode structure population or counter-electrode structure population, alone or together with the internal vertical constraint system, constrain growth in the vertical direction such that any increase in the Feret diameter of the electrode assembly over 100 consecutive cycles is less than 2%.

In one embodiment, members of the population of electrode structures 110 and/or members of the population of counter-electrode structures 112 are connected directly to the upper and lower sidewalls 2024, 2025 of the case. According to another embodiment, the members of the population of electrode structures 110 and/or members of the population of counter-electrode structures 112 are connected indirectly to the upper and lower sidewalls 2024, 2025 of the case, such as via the first and second vertical growth constraints. For example, the members of the population of electrode structures and/or members of the population of counter-electrode structures can be directly connected to first and second vertical growth constraints, which in turn are connected to the upper and lower sidewalls 2024, 2025. According to certain embodiments, members of the population of electrode structures and/or members of the population of counter-electrode structures are connected directly to the upper and lower sidewalls by any one or more of one or more of adhering, gluing, welding, bonding, joining, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying. According to certain embodiments, members of the population of electrode structures and/or members of the population of counter-electrode structures are connected directly to the first and second vertical growth constraints by any one or more of one or more of adhering, gluing, welding, bonding, joining, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying. According to certain embodiments, the first and second vertical growth constraints are connected directly to respective upper and lower sidewalls by any one or more of one or more of adhering, gluing, welding, bonding, joining, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying. In one embodiment, opposing vertical surfaces of the members of the electrode structures and/or members of the population of counter-electrode structures are connected to any of the first and second vertical growth constraints, and/or upper and lower sidewalls, and/or the first and second vertical growth constraints are connected to the upper and lower sidewalls, by an adhesive.

Figure 25:
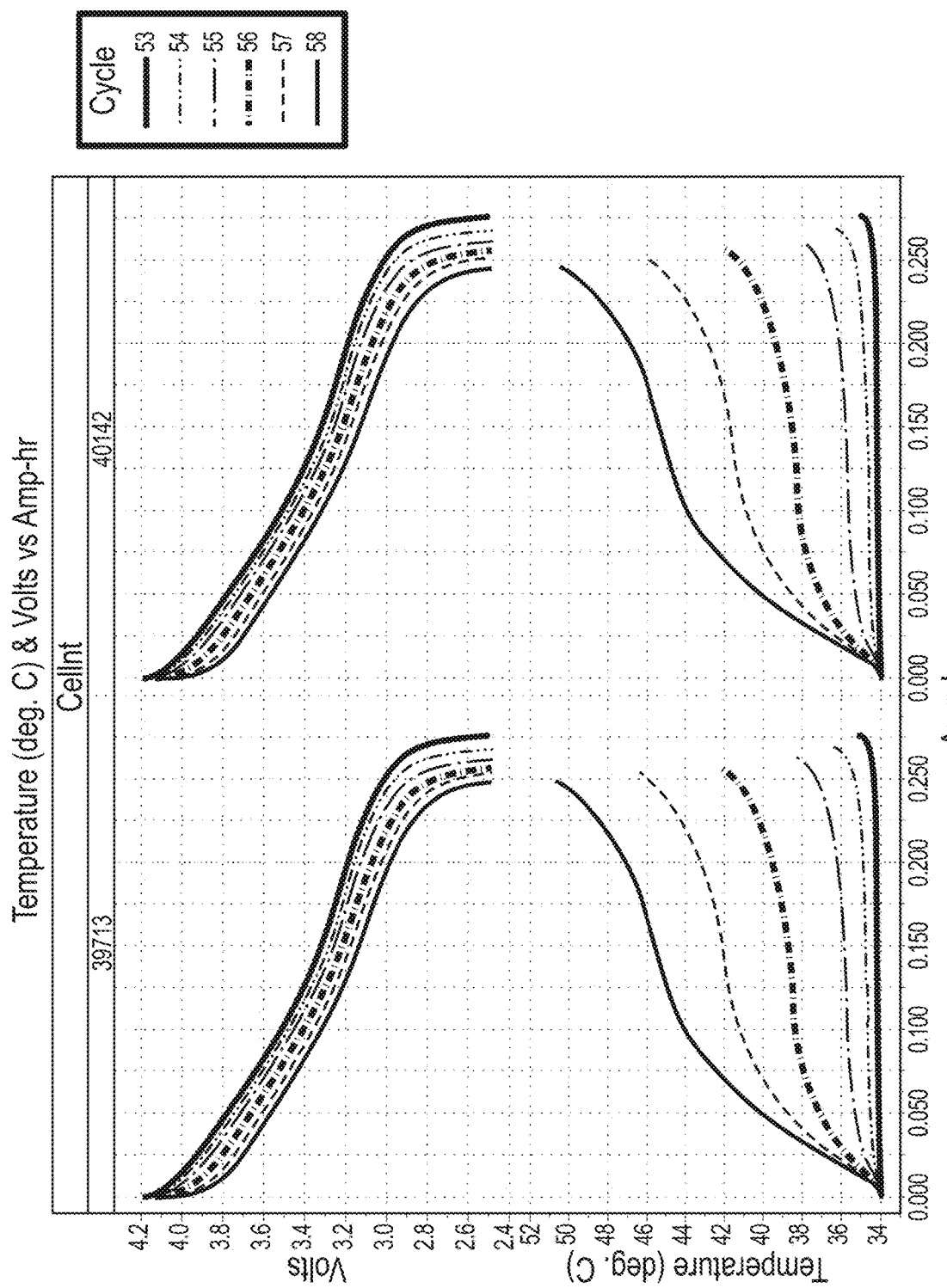
FIG. 25 shows cell voltage (V) and cell temperature (° C.) vs. capacity (Ah) for cells TM39713 (left) and TM40142 (right) for indicated cycles using rates tested from C/5 to 4 C discharge rates with standard C/3 charge rate on all cycles with C/25 CV step, as described in Tables 3 and 4.

Referring to FIG. 25, comparing to other secondary battery cells (FIGS. 23 and 24), aspects of the present disclosure provide an efficient thermally conductive path for heat dissipation during battery cycling (hollow arrows indicate the heat path inside a secondary battery cell, and solid lines indicate the cooling paths used to cool the outside of the secondary battery cell). As can be seen in FIG. 25, according to aspects herein, a direct thermally conductive pathway is provided along the electrode and/or counter electrode structures to the greatest surface area surfaces (i.e. vertical surfaces) of the secondary battery cell, such that cooling of these surfaces removes a significant amount of heat. In contrast, in FIGS. 23-24, the heat exit path crosses numerous different layers of the electrode assemblies, such that heat not efficiently conveyed to the surface of the secondary battery cell.

Members of the electrode 110 and counter-electrode 112 populations include an electroactive material capable of absorbing and releasing a carrier ion such as lithium, sodium, potassium, calcium, magnesium or aluminum ions. In some embodiments, members of the electrode structure 110 population include an anodically active electroactive material (sometimes referred to as a negative electrode) and members of the counter-electrode structure 112 population include a cathodically active electroactive material (sometimes referred to as a positive electrode). In other embodiments, members of the electrode structure 110 population include a cathodically active electroactive material and members of the counter-electrode structure 112 population comprise an anodically active electroactive material. In each of the embodiments and examples recited in this paragraph, negative electrode active material may be, for example, a particulate agglomerate electrode, an electrode active material formed from a particulate material, such as by forming a slurry of the particulate material and casting into a layer shape, or a monolithic electrode.

According to one embodiment, an electrode active material used in an electrode structure 110 corresponding to an anode of the electrode assembly 106 comprises a material that expands upon insertion of carrier ions into the electrode active material during charge of the secondary battery 102 and/or electrode assembly 106. For example, the electrode active materials may comprise anodically active materials that accept carrier ions during charging of the secondary battery, such as by intercalating with or alloying with the carrier ions, in an amount that is sufficient to generate an increase in the volume of the electrode active material. For example, in one embodiment the electrode active material may comprise a material that has the capacity to accept more than one mole of carrier ion per mole of electrode active material, when the secondary battery 102 is charged from a discharged to a charged state. By way of further example, the electrode active material may comprise a material that has the capacity to accept 1.5 or more moles of carrier ion per mole of electrode active material, such as 2.0 or more moles of carrier ion per mole of electrode active material, and even 2.5 or more moles of carrier ion per mole of electrode active material, such as 3.5 moles or more of carrier ion per mole of electrode active material. The carrier ion accepted by the electrode active material may be at least one of lithium, potassium, sodium, calcium, and magnesium. Examples of electrode active materials that expand to provide such a volume change include one or more of silicon (e.g., SiO), aluminum, tin, zinc, silver, antimony, bismuth, gold, platinum, germanium, palladium, and alloys and compounds thereof. For example, in one embodiment, the electrode active material can comprise a silicon-containing material in particulate form, such as one or more of particulate silicon, particulate silicon oxide, and mixtures thereof. In yet another embodiment, the electrode active material can comprise a material that exhibits a smaller or even negligible volume change. For example, in one embodiment the electrode active material can comprise a carbon-containing material, such as graphite. In yet another embodiment, the electrode structure comprises a layer of lithium metal, which can serve as an electrode current collector, and on which electrode active material deposits via transfer of carrier ions to the lithium metal layer during a charging process.

Exemplary anodically active electroactive materials include carbon materials such as graphite and soft or hard carbons, or any of a range of metals, semi-metals, alloys, oxides and compounds capable of forming an alloy with lithium. Specific examples of the metals or semi-metals capable of constituting the anode material include graphite, tin, lead, magnesium, aluminum, boron, gallium, silicon, Si/C composites, Si/graphite blends, SiOx, porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon, silicon oxide, or an alloy thereof.

In yet further embodiment, the anodically active material can comprise lithium metals, lithium alloys, carbon, petroleum cokes, activated carbon, graphite, silicon compounds, tin compounds, and alloys thereof. In one embodiment, the anodically active material comprises carbon such as non-graphitizable carbon, graphite-based carbon, etc.; a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0 < x \leq 1$; $1 \leq y \leq 3$; $1 \leq z \leq 8$), etc.; a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene, etc.; Li—Co—Ni-based material, etc. In one embodiment, the anodically active material can comprise carbon-based active material include crystalline graphite such as natural graphite, synthetic graphite and the like, and amorphous carbon such as soft carbon, hard carbon and the like. Other examples of carbon material suitable for anodically active material can comprise graphite, Kish graphite, pyrolytic carbon, mesophase pitch-based carbon fibers, meso-carbon microbeads, mesophase pitches, graphitized carbon fiber, and high-temperature sintered carbon such as petroleum or coal tar pitch derived cokes. In one embodiment, the negative electrode active material may comprise tin oxide, titanium nitrate and silicon. In another embodiment, the negative electrode can comprise lithium metal, such as a lithium metal film, or lithium alloy, such as an alloy of lithium and one or more types of metals selected from the group consisting of Na, K, Rb, Cs, Fr, Be, Mg, Ca, Sr, Ba, Ra, Al and Sn. In yet another embodiment, the anodically active material can comprise a metal compound capable of alloying and/or intercalating with lithium, such as Si, Al, C, Pt, Sn, Pb, Ir, Ni, Cu, Ti, Na, K, Rb, Cs, Fr, Be, Ca, Sr, Sb, Ba, Ra, Ge, Zn, Bi, In, Mg, Ga, Cd, a Si alloy, a Sn alloy, an Al alloy or the like; a metal oxide capable of doping and dedoping lithium ions such as $SiO_v$ ($0 < v < 2$), $SnO_2$, vanadium oxide or lithium vanadium oxide; and a composite including the metal compound and the carbon material such as a Si—C composite or a Sn—C composite. For example, in one embodiment, the material capable of alloying/intercalating with lithium may be a metal, such as lithium, indium, tin, aluminum, or silicon, or an alloy thereof; a transition metal oxide, such as $Li_4/3Ti_5/3O_4$ or SnO; and a carbonaceous material, such as artificial graphite, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite. In yet another embodiment, the negative electrode active material can comprise a composition suitable for a carrier ion such as sodium or magnesium. For example, in one embodiment, the negative electrode active material can comprise a layered carbonaceous material; and a composition of the formula $Na_xSn_{y-z}M_z$ disposed between layers of the layered carbonaceous material, wherein M is Ti, K, Ge, P, or a combination thereof, and $0<x\le15$, $1\le y\le5$, and $0\le z\le1$.

In one embodiment, the negative electrode active material may further comprise a conductive material and/or conductive aid, such as carbon-based materials, carbon black, graphite, graphene, active carbon, carbon fiber, carbon black such as acetylene black, Ketjen black, channel black, furnace black, lamp black, thermal black or the like; a conductive fiber such as carbon fiber, metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like. In addition, metallic fibers such as metal mesh; metallic powders such as copper, silver, nickel and aluminum; or organic conductive materials such as polyphenylene derivatives may also be used. In yet another embodiment, a binder may be provided, such as for example one or more of polyethylene, polyethylene oxide, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoro ethylene copolymer, an ethylene-acrylic acid copolymer and the like may be used either alone or as a mixture.

Exemplary cathodically active materials include any of a wide range of cathode active materials. For example, for a lithium-ion battery, the cathodically active material may comprise a cathode material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_y Co_z)O_2$, and combinations thereof. Furthermore, compounds for the cathodically active material layers can comprise lithium-containing compounds further comprising metal oxides or metal phosphates such as compounds comprising lithium, cobalt and oxygen (e.g., $LiCoO_2$), compounds comprising lithium, manganese and oxygen (e.g., $LiMn_2O_4$) and compound comprising lithium iron and phosphate (e.g., LiFePO). In one embodiment, the cathodically active material comprises at least one of lithium manganese oxide, lithium cobalt oxide, lithium nickel oxide, lithium iron phosphate, or a complex oxide formed from a combination of aforesaid oxides. In another embodiment, the cathodically active material can comprise one or more of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (where, x is 0 to 0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$ etc.; Ni site-type lithium nickel oxide represented by the chemical formula of $LiNi_{1-x}M_xO_2$ (where, M=Co, Mn, Al, Cu, Fe, Mg, B or Ga, and x=0.01 to 0.3); lithium manganese complex oxide represented by the chemical formula of $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ in which a portion of Li is substituted with alkaline earth metal ions; a disulfide compound; $Fe_2(MoO_4)_3$, and the like. In one embodiment, the cathodically active material can comprise a lithium metal phosphate having an olivine crystal structure of Formula $Li_{1+a}Fe_{1-x}M'_x(PO_{4-b})X_b$ wherein M' is at least one selected from Al, Mg, Ni, Co, Mn, Ti, Ga, Cu, V, Nb, Zr, Ce, In, Zn, and Y, X is at least one selected from F, S, and N, $-0.5 \le a \le 0.5$, $0 \le x \le 0.5$, and $0 = b \le 0.1$, such at least one of $LiFePO_4$, $Li(Fe, Mn)PO_4$, $Li(Fe, Co)PO_4$, $Li(Fe, Ni)PO_4$, or the like. In one embodiment, the cathodically active material comprises at least one of $LiCoO_2$, $LiNiO_2$, $LiMnO_2$, $LiMn_2O_4$, $LiNi_{1-y}Co_yO_2$, $LiCo_{1-y}Mn_yO_2$, $LiNi_{1-y}Mn_yO_2$ ($0 \le y \le 1$), $Li(Ni_aCo_bMn_c)O_4$ ($0<a<2$, $0<b<2$, $0<c<2$, and $a+b+c=2$), $LiMn_{2-z}Ni_zO_4$, $LiMn_{2-z}Co_zO_4$ ($0<z<2$), $LiCoPO_4$ and $LiFePO_4$, or a mixture of two or more thereof.

In yet another embodiment, a cathodically active material can comprise elemental sulfur (S8), sulfur series compounds or mixtures thereof. The sulfur series compound may specifically be $Li_2Sn$ ($n \ge 1$), an organosulfur compound, a carbon-sulfur polymer ($(C_2S_x)_n$: x=2.5 to 50, $n \ge 2$) or the like. In yet another embodiment, the cathodically active material can comprise an oxide of lithium and zirconium.

In yet another embodiment, the cathodically active material can comprise at least one composite oxide of lithium and metal, such as cobalt, manganese, nickel, or a combination thereof, may be used, and examples thereof are $Li_aA_{1-b}M_bD_2$ (wherein, $0.90 \le a \le 1$, and $0 \le b \le 0.5$); $Li_aE_{1-b}M_bO_{2-c}D_c$ (wherein, $0.90 \le a \le 1$, $0 \le b \le 0.5$, and $0 \le c \le 0.05$); $LiE_{2-b}M_bO_{4-c}D_c$ (wherein, $0 \le b \le 0.5$, and $0 \le b \le 0.5$); $Li_aNi_{1-b-c}Co_bM_cD_\alpha$ (wherein, $0.90 \le a \le 1$, $0 \le b \le 0.5$, $0 \le c \le 0.05$, and $0<\alpha \le 2$); $Li_aNi_{1-b-c}Co_bM_cO_{2-\alpha}X_\alpha$ (wherein, $0.90 \le a \le 1$, $0 \le b \le 0.5$, $0 \le c \le 0.05$, and $0<\alpha<2$); $Li_aNi_{1-b-c}Co_bM_cO_{2-\alpha}X_2$ (wherein, $0.90 \le a \le 1$, $0 \le b \le 0.5$, $0 \le c \le 0.05$, and $0<\alpha<2$); $Li_aNi_{1-b-c}Mn_bM_cD_\alpha$ (wherein, $0.90 \le a \le 1$, $0 \le b \le 0.05$, $0 \le c \le 0.05$, and $0<\alpha \le 2$); $Li_aNi_{1-b-c}Mn_bM_cO_{2-\alpha}X_\alpha$ (wherein, $0.90 \le a \le 1$, $0 \le b \le 0.05$, $0 \le c \le 0.05$, and $0<\alpha<2$); $Li_aNi_{1-b-c}Mn_bM_cO_{2-\alpha}X_2$ (wherein, $0.90 \le a \le 1$, $0 \le b \le 0.5$, $0 \le c \le 0.05$, and $0<\alpha<2$); $Li_aNi_bE_cG_dO_2$ (wherein, $0.90 \le a \le 1$, $0 \le b \le 0.9$, $0 \le c \le 0.5$, and $0.001 \le d \le 0.1$); $Li_aNi_bCo_cMn_dGeO_2$ (wherein, $0.90 \le a \le 1$, $0 \le b \le 0.9$, $0 \le c \le 0.5$, $0 \le d \le 0.5$, and $0.001 \le e \le 0.1$); $Li_aNiG_bO_2$ (wherein, $0.90 \le a \le 1$ and $0.001 \le b \le 0.1$); $Li_aCoG_bO_2$ (wherein, $0.90 \le a \le 1$ and $0.001 \le b \le 0.1$); $Li_aMnG_bO_2$ (wherein, $0.90 \le a \le 1$ and $0.001 \le b \le 0.1$); $Li_aMn_2G_bO_4$ (wherein, $0.90 \le a \le 1$ and $0.001 \le b \le 0.1$); $QO_2$; $QS_2$; $LiQS_2$; $V_2O_5$; $LiV_2O_5$; $LiX'O_2$; $LiNiVO_4$; $Li_{(3-F)}J_2(PO_4)_3$ ($0 \le f \le 2$); $Li_{(3-f)}Fe_2(PO_4)_3$ ($0 \le f \le 2$); and $LiFePO_4$. In the formulas above, A is Ni, Co, Mn, or a combination thereof; M is Al, Ni, Co, Mn, Cr, Fe, Mg, Sr, V, a rare-earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof; and J is V, Cr, Mn, Co, Ni, Cu, or a combination thereof. For example, $LiCoO_2$, $LiMn_xO_{2x}$ (x=1 or 2), $LiNi_{1-x}Mn_xO_{2x}(0<x<1)$, $LiNi_{1-x-y}Co_xMn_yO_2$ ($0 \leq x \leq 0.5$, $0 \leq y \leq 0.5$), or $FePO_4$ may be used. In one embodiment, the cathodically active material comprises at least one of a lithium compound such as lithium cobalt oxide, lithium nickel oxide, lithium nickel cobalt oxide, lithium nickel cobalt aluminum oxide, lithium nickel cobalt manganese oxide, lithium manganese oxide, or lithium iron phosphate; nickel sulfide; copper sulfide; sulfur; iron oxide; or vanadium oxide.

In one embodiment, the cathodically active material can comprise a sodium containing material, such as at least one of an oxide of the formula $NaM^1{}_aO_2$ such as $NaFeO_2$, $NaMnO_2$, $NaNiO_2$, or $NaCoO_2$; or an oxide represented by the formula $NaMn_{1-a}M^1{}_aO_2$, wherein $M^1$ is at least one transition metal element, and $0 \leq a < 1$. Representative positive active materials include $Na[Ni_{1/2}Mn_{1/2}]O_2$, $Na_{2/3}$ $[Fe_{1/2}Mn_{1/2}]O_2$, and the like; an oxide represented by $Na_{0.44}Mn_{1-a}M^1{}_aO_2$, an oxide represented by $Na_{0.7}Mn_{1-a}M^1{}_aO_{2.05}$ an (wherein $M^1$ is at least one transition metal element, and $0 \leq a < 1$); an oxide represented by $Na_bM^2{}_cSi_{12}O_{30}$ as $Na_6Fe_2Si_{12}O_{30}$ or $Na_2Fe_5Si_{12}O$ (wherein $M^2$ is at least one transition metal element, $2 \leq b \leq 6$, and $2 \leq c \leq 5$); an oxide represented by $Na_dM^3{}_eSi_6O_{18}$ such as $Na_2Fe_2Si_6O_{18}$ or $Na_2MnFeSi_6O_{18}$ (wherein $M^3$ is at least one transition metal element, $3 \leq d \leq 6$, and $1 \leq e \leq 2$); an oxide represented by $Na_fM^4{}_gSi_2O_6$ such as $Na_2FeSiO_6$ (wherein $M^4$ is at least one element selected from transition metal elements, magnesium (Mg) and aluminum (Al), $1 \leq f \leq 2$ and $1 \leq g \leq 2$); a phosphate such as $NaFePO_4$, $Na_3Fe_2(PO_4)_3$, $Na_3V_2(PO_4)_3$, $Na_4Co_3(PO_4)_2P_2O_7$ and the like; a borate such as $NaFeBO_4$ or $Na_3Fe_2(BO_4)_3$; a fluoride represented by $Na_hM^5F_6$ such as $Na_3FeF_6$ or $Na_2MnF_6$ (wherein $M^5$ is at least one transition metal element, and $2 \leq h \leq 3$, a fluorophosphate such as $Na_3V_2(PO_4)_2F_3$, $Na_3V_2(PO_4)_2FO_2$ and the like. The positive active material is not limited to the foregoing and any suitable positive active material that is used in the art can be used. In an embodiment, the positive active material preferably comprises a layered-type oxide cathode material such as $NaMnO_2$, $Na[Ni_{1/2}Mn_{1/2}]O_2$ and $Na_{2/3}[Fe_{1/2}Mns_{1/2}]O_2$, a phosphate cathode such as $Na_3V_2(PO_4)_3$ and $Na_4Co_3(PO_4)_2P_2O_7$, or a fluorophosphate cathode such as $Na_3V_2(PO_4)_2F_3$ and $Na_3V_2(PO_4)_2F_{02}$.

In one embodiment, the electrode current collector can comprise a negative electrode current collector, and can comprise a suitable conductive material, such as a metal material. For example, in one embodiment, the negative electrode current collector can comprise at least one of copper, nickel, aluminum, stainless steel, titanium, palladium, baked carbon, calcined carbon, indium, iron, magnesium, cobalt, germanium, lithium a surface treated material of copper or stainless steel with carbon, nickel, titanium, silver, an aluminum-cadmium alloy, and/or other alloys thereof. As another example, in one embodiment, the negative electrode current collector comprises at least one of copper, stainless steel, aluminum, nickel, titanium, baked carbon, a surface treated material of copper or stainless steel with carbon, nickel, titanium, silver, an aluminum-cadmium alloy, and/or other alloys thereof. In one embodiment, the negative electrode current collector comprises at least one of copper and stainless steel.

In one embodiment, the counter-electrode current collector can comprise a positive electrode current collector, and can comprise a suitable conductive material, such as a metal material. In one embodiment, the positive electrode current collector comprises at least one of stainless steel, aluminum, nickel, titanium, baked carbon, sintered carbon, a surface treated material of aluminum or stainless steel with carbon, nickel, titanium, silver, and/or an alloy thereof. In one embodiment, the positive electrode current collector comprises aluminum.

In yet another embodiment, the cathodically active material can further comprise one or more of a conductive aid and/or binder, which for example may be any of the conductive aids and/or binders described for the anodically active material herein.

According to certain embodiments, electrically insulating separator layers 130 may electrically isolate each member of the electrode structure 110 population from each member of the counter-electrode structure 112 population. The electrically insulating separator layers are designed to prevent electrical short circuits while also allowing the transport of ionic charge carriers that are needed to close the circuit during the passage of current in an electrochemical cell. In one embodiment, the electrically insulating separator layers are microporous and permeated with an electrolyte, e.g., a non-aqueous liquid or gel electrolyte. Alternatively, the electrically insulating separator layer may comprise a solid electrolyte, i.e., a solid ion conductor, which can serve as both a separator and the electrolyte in a battery.

In certain embodiments, electrically insulating separator layers 130 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%. Additionally, the microporous separator material may be permeated with a non-aqueous electrolyte to permit conduction of carrier ions between adjacent members of the electrode and counter-electrode populations. In certain embodiments, for example, and ignoring the porosity of the microporous separator material, at least 70 vol % of electrically insulating separator material between a member of the electrode structure 110 population and the nearest member(s) of the counter-electrode structure 112 population (i.e., an "adjacent pair") for ion exchange during a charging or discharging cycle is a microporous separator material; stated differently, microporous separator material constitutes at least 70 vol % of the electrically insulating material between a member of the electrode structure 110 population and the nearest member of the counter-electrode 112 structure population.

In one embodiment, the microporous separator material comprises a particulate material and a binder, and has a porosity (void fraction) of at least about 20 vol. % The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder can be an organic polymeric material such as a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile and polyethylene oxide. In another embodiment, the binder is selected from the group consisting of acrylates, styrenes, epoxies, and silicones. Other suitable binders may be selected from polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymethyl cellulose, acrylonitrile-styrene-butadiene copolymer, polyimide or mixtures thereof. In yet another embodiment, the binder may be selected from any of polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, and/or combinations thereof. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1 \times 10^{-4}$ S/cm. By way of further example, in one embodiment, the particulate material has a conductivity for carrier ions of less than $1 \times 10^{-5}$ S/cm. By way of further example, in one embodiment, the particulate material has a conductivity for carrier ions of less than $1 \times 10^{-6}$ S/cm. For example, in one embodiment, the particulate material is an inorganic material selected from the group consisting of silicates, phosphates, aluminates, aluminosilicates, and hydroxides such as magnesium hydroxide, calcium hydroxide, etc. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, $BaO$, $ZnO$, $ZrO_2$, BN, $Si_3N_4$, $Ge_3N_4$. See, for example, P. Arora and J. Zhang, "Battery Separators" Chemical Reviews 2004, 104, 4419-4462). Other suitable particles can comprise $BaTiO_3$, $Pb(Zr,Ti)O_3$ (PZT), $Pb_{1-x}La_xZr_{1-y}Ti_yO_3$ (PLZT), $PB(Mg_{2/3})O_3$—$PbTiO_3$ (PMN—PT), hafnia ($HfO_2$), $SrTiO_3$, $SnO_2$, CeO2, MgO, NiO, CaO, ZnO, $ZrO_2$, $Y_2O_3$, $Al_2O_3$, $TiO_2$, SiC or mixtures thereof. In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In yet another embodiment, the electrically insulating separator 130 comprises a solid electrolyte, for example as in a solid state battery. Generally speaking, the solid electrolyte can facilitate transport of carrier ions, without requiring addition of a liquid or gel electrolyte. According to certain embodiments, in a case where a solid electrolyte is provided, the solid electrolyte may itself be capable of providing insulation between the electrodes and allowing for passage of carrier ions therethrough, and may not require addition of a liquid electrolyte permeating the structure.

In one embodiment, the secondary battery 102 can comprise electrolyte that may be any of an organic liquid electrolyte, an inorganic liquid electrolyte, an aqueous electrolyte, a non-aqueous electrolyte, a solid polymer electrolyte, a solid ceramic electrolyte, a solid glass electrolyte, a garnet electrolyte, a gel polymer electrolyte, an inorganic solid electrolyte, a molten-type inorganic electrolyte or the like. Other arrangements and/or configurations of electrically insulating separator 130, with or without liquid electrolyte, may also be provided. In one embodiment, the solid electrolyte can comprise a ceramic or glass material that is capable of providing electrical insulation while also conducting carrier ions therethrough. Examples of ion conducting material can include garnet materials, a sulfide glass, a lithium ion conducting glass ceramic, or a phosphate ceramic material. In one embodiment, a solid polymer electrolyte can comprise any of a polymer formed of polyethylene oxide (PEO)-based, polyvinyl acetate (PVA)-based, polyethyleneimine (PEI)-based, polyvinylidene fluoride (PVDF)-based, polyacrylonitrile (PAN)-based, LiPON (lithium phosphorus oxynitride), and polymethyl methacrylate (PMMA)-based polymers or copolymers thereof. In another embodiment, a sulfide-based solid electrolyte may be provided, such as a sulfide-based solid electrolyte comprising at least one of lithium and/or phosphorous, such as at least one of $Li_2S$ and $P_2S_5$, and/or other sulfides such as $SiS_2$, $GeS_2$, $Li_3PS_4$, $Li_4P_2S_7$, $Li_4SiS_4$, $Li_2S$—$P_2S_5$, and $50Li_4SiO_450Li_3BO_3$, and/or $B_2S_3$. Yet other embodiments of solid electrolyte can include nitrides, halides and sulfates of lithium (Li) such as $Li_3N$, Lil, $Li_5NI_2$, $Li_3N$-Lil-LiOH, $LiSiO_4$, $LiSiO_4$-Lil-LiOH, $Li_2SiS_3$, $Li_4SiO_4$, $Li_4SiO_4$-Lil-LiOH, and $Li_3PO_4$—$Li_2S$—$SiS_2$, $Li_2S$—$P_2S_5$, $Li_2S$—$P_2S_5$-$L_4SiO_4$, $Li_2S$—$Ga_2S_3$—$GeS_2$, $Li_2S$—$Sb_2S_3$—$GeS_2$, $Li_{3.25}$—$Ge_{0.25}$—$P_{0.75}S_4$, $(La,Li)TiO_3$ (LLTO), $Li_6La_2CaTa_2O_{12}$, $Li_6La_2ANb2O_{12}$(A=Ca, Sr), $Li_2Nd_3TeSbO_{12}$, $Li_3BO_{2.5}N_{0.5}$, $Li_9SiAlO_8$, $Li_{1-x}Al_xGe_{2-x}(PO_4)_3$ (LAGP), $Li_{1-x}Al_xTi_{2-x}(PO_4)_3$(LATP), $Li_{1+x}Ti_{2-x}Al_xSi_y(PO_4)_{3-y}$, $LiAl_xZr_{2-x}(PO_4)_3$, $LiTi_xZr_{2-x}(PO_4)_3$, Yet other embodiments of solid electrolyte can include garnet materials, such as for example described in U.S. Pat. No. 10,361,455, which is hereby incorporated herein in its entirety. In one embodiment, the garnet solid electrolyte is a nesosilicate having the general formula $X_3Y_2(SiO_4)_3$, where X may be a divalent cation such as Ca, Mg, Fe or Mn, or Y may be a trivalent cation such as Al, Fe, or Cr.

According to one embodiment of an assembled energy storage device, the electrically insulating separator comprises a microporous separator material that is permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, LiCl, and LiBr; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. As yet another example, the electrolyte can comprise sodium ions dissolved therein, such as for example any one or more of $NaClO_4$, $NaPF_6$, $NaBF_4$, $NaCF_3SO_3$, $NaN(CF_3SO_2)_2$, $NaN(C_2F_5SO_2)_2$, $NaC(CF_3SO_2)_3$ Salts of magnesium and/or potassium can similarly be provided. For example magnesium salts such as magnesium chloride ($MgCl_2$), magnesium bromide $MgBr_2$), or magnesium iodide ($MgI_2$) may be provided, and/or as well as a magnesium salt that may be at least one selected from the group consisting of magnesium perchlorate ($Mg(ClO_4)_2$), magnesium nitrate ($Mg(NO_3)_2$), magnesium sulfate ($MgSO_4$), magnesium tetrafluoroborate ($Mg(BF_4)_2$), magnesium tetraphenylborate ($Mg(B(C_6H_5)_4)_2$, magnesium hexafluorophosphate ($Mg(PF_6)_2$), magnesium hexafluoroarsenate ($Mg(AsF_6)_2$), magnesium perfluoroalkylsulfonate (($Mg(R_{f1}SO_3)_2$), in which RH is a perfluoroalkyl group), magnesium perfluoroalkylsulfonylimide ($Mg((R_{f2}SO_2)_2N)_2$, in which $R_{f2}$ is a perfluoroalkyl group), and magnesium hexaalkyl disilazide (($Mg(HRDS)_2$), in which R is an alkyl group).

Exemplary organic solvents to dissolve the lithium salt include cyclic esters, chain esters, cyclic ethers, and chain ethers. Specific examples of the cyclic esters include propylene carbonate, ethylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxyethane, diethyl ether, ethylene glycol dialkyl ethers, diethylene glycol dialkyl ethers, triethylene glycol dialkyl ethers, and tetraethylene glycol dialkyl ethers.

According to certain embodiments, the battery pack 900 can comprise sealed secondary battery cells 902 corresponding to any of those described herein.

Aspects of the disclosure can provide numerous advantages. For example, the structures and architectures for the battery packs and sealed secondary battery cells described herein can provide an increase in 26% energy density as compared to conventional battery packs. As an example, the battery pack with sealed secondary battery cells can provide 971 Wh/L, versus 676 Wh/L for a battery pack with conventional cylindrical cells. As an example, the battery pack with sealed secondary battery cells can provide 4.7 times faster cooling of the secondary battery cells.

EXAMPLES

The following non-limiting examples are provided to further illustrate aspects of the present invention, with reference to FIGS. 23A-35. It should be appreciated by those of skill in the art that the techniques disclosed in the examples that follow represent approaches the inventors have found function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Charge Acceptance and Discharge Rate Capability Test Protocols

C-rate of the cell was determined using the cycle 1 capacity measured at 0.1 C. The protocol used for charge acceptance tests was as follows: after using a standard 0.33 C cycling protocol for 25 cycles, the specified charge C-rate was input for a given cycle. For charge acceptance tests, every second cycle used the standard 0.33 C constant current charge with a constant voltage step at top of charge voltage of 4.2 V, using a current cutoff of 0.04 C, followed by a 5 minute rest at top of charge, followed by 0.33 C constant current discharge with 2.5 V voltage cutoff, followed by a 5 minute rest at bottom of charge. Each alternating cycle then used charge rates which include: 1C, 2C, 3C, 4C, 5C, 6C, 7C, 8C, 9C, or 10C, with otherwise the same protocol; i.e. a constant current charge at the specified C-rate, followed by a constant voltage hold at the top of charge 4.2 V, with current cutoff of 0.04 C, followed by a 5 minute rest at top of charge, followed by 0.33 C constant current discharge with 2.5 V voltage cutoff. For discharge rate tests, the same cells were then used to discharge the cell using the standard protocol described above, except the 0.33 C constant current discharge was replaced with the specified rate, i.e. up to 4 C discharge. Consecutive cycles were used to ramp current and include: 0.2 C, 0.5 C, 1 C, 2 C, 3 C, 4 C discharge rates. The following examples provided batteries repurposed from EXP 4049 (~530 Wh/L) for charge and discharge rate capability tests and high rate cycle tests. These cells use 3.6 mAh/cm² NMC622 electrode with 96.4% by weight active material, 3.2 g/cc density and a POR-type $SiO_x$ anode balanced with 80% buffer and target 26% anode formed porosity after formation using 2.5-4.2 V cell cutoff voltages.

Example 1—Charge Rate Capability

Table 1 and Table 2 show the charge rate, discharge rate, the constant current charge step (CC) capacity in units of amp hours, the constant voltage charge step (CV) capacity at cell top of charge, and the first recorded time with >80% of the charge capacity. Good reproducibility was demonstrated with two cells (TM40142 as shown in Table 1 and TM39713 as shown in Table 2) and the maximum tested rate of 10 C (2.53 amps) approached 5.2 minutes to 80% SOC.

TABLE 1

Summary of charge rate capability for EXP4049-type cell TM40142.
TM40142 charge rate capability

| cycle | charge rate | discharge rate | CC capacity (Ah) | CV capacity (Ah) | time to >80% SOC (mins) |
|---|---|---|---|---|---|
| 31 | C/3 | C/3 | 0.2583 | 0.0101 | 154.6 |
| 32 | 1 C | C/3 | 0.2496 | 0.0194 | 51.1 |
| 34 | 2 C | C/3 | 0.2406 | 0.0285 | 25.6 |
| 36 | 3 C | C/3 | 0.2343 | 0.0351 | 17.0 |
| 38 | 4 C | C/3 | 0.2275 | 0.0421 | 12.9 |
| 40 | 5 C | C/3 | 0.2234 | 0.0470 | 10.3 |
| 42 | 6 C | C/3 | 0.2186 | 0.0527 | 8.60 |
| 44 | 7 C | C/3 | 0.2143 | 0.0569 | 7.37 |
| 46 | 8 C | C/3 | 0.2095 | 0.0622 | 6.46 |
| 48 | 9 C | C/3 | 0.2035 | 0.0686 | 5.77 |
| 50 | 10 C | C/3 | 0.1977 | 0.0748 | 5.23 |

TABLE 2 summary of charge rate capability for EXP4049-type cell TM39713.
TM39713 charge rate capability

| cycle | charge rate | discharge rate | CC capacity (Ah) | CV capacity (Ah) | time to >80% SOC (mins) |
|---|---|---|---|---|---|
| 31 | C/3 | C/3 | 0.2596 | 0.0100 | 155.4 |
| 32 | 1 C | C/3 | 0.2513 | 0.0188 | 51.2 |
| 34 | 2 C | C/3 | 0.2425 | 0.0281 | 25.7 |
| 36 | 3 C | C/3 | 0.2363 | 0.0346 | 17.2 |
| 38 | 4 C | C/3 | 0.2303 | 0.0407 | 12.9 |
| 40 | 5 C | C/3 | 0.2257 | 0.0454 | 10.3 |
| 42 | 6 C | C/3 | 0.2207 | 0.0505 | 8.60 |
| 44 | 7 C | C/3 | 0.2168 | 0.0543 | 7.38 |
| 46 | 8 C | C/3 | 0.2105 | 0.0611 | 6.45 |
| 48 | 9 C | C/3 | 0.2065 | 0.0653 | 5.75 |
| 50 | 10 C | C/3 | 0.2009 | 0.0712 | 5.20 |

Figure 23A:
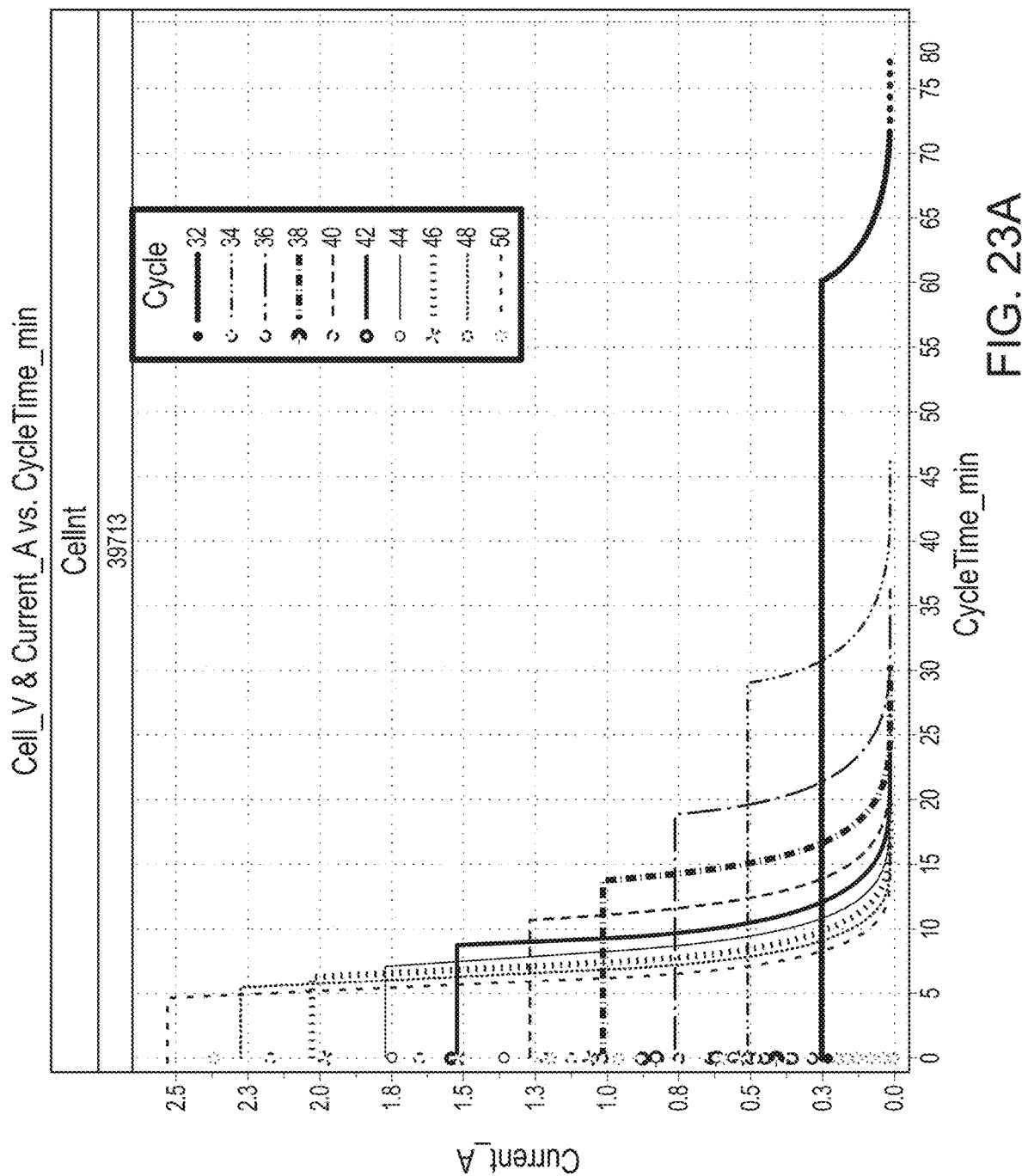
FIGS. 23A-23D show the current (A) and voltage (V) versus time (in minutes) for two different cells (TM39713 and TM40142) for indicated cycles using rates tested from 1 C up to 10 C charge rate with C/25 CV cutoff as described in Tables 1 and 2.
Figure 23B:
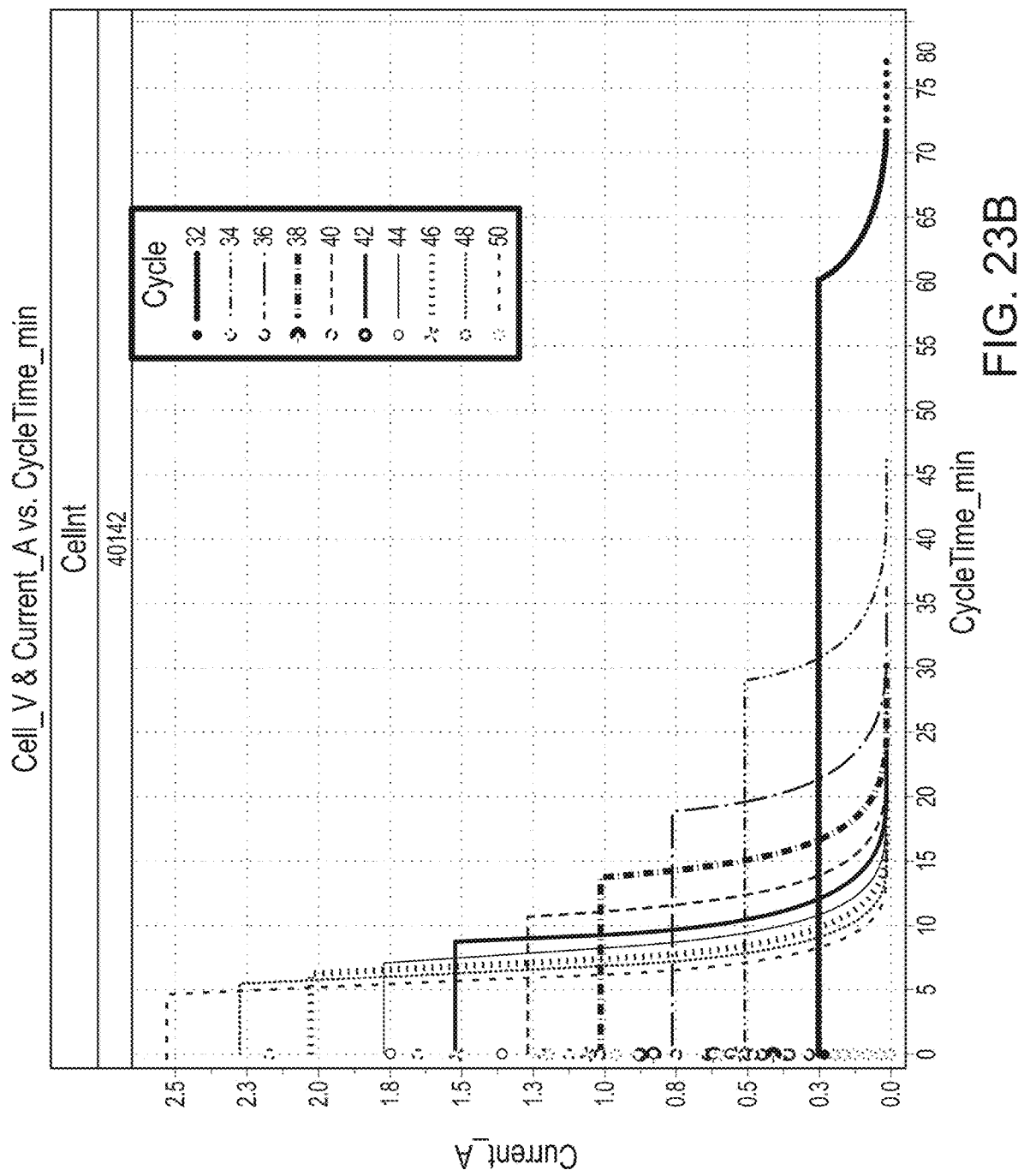
Figure 23C:
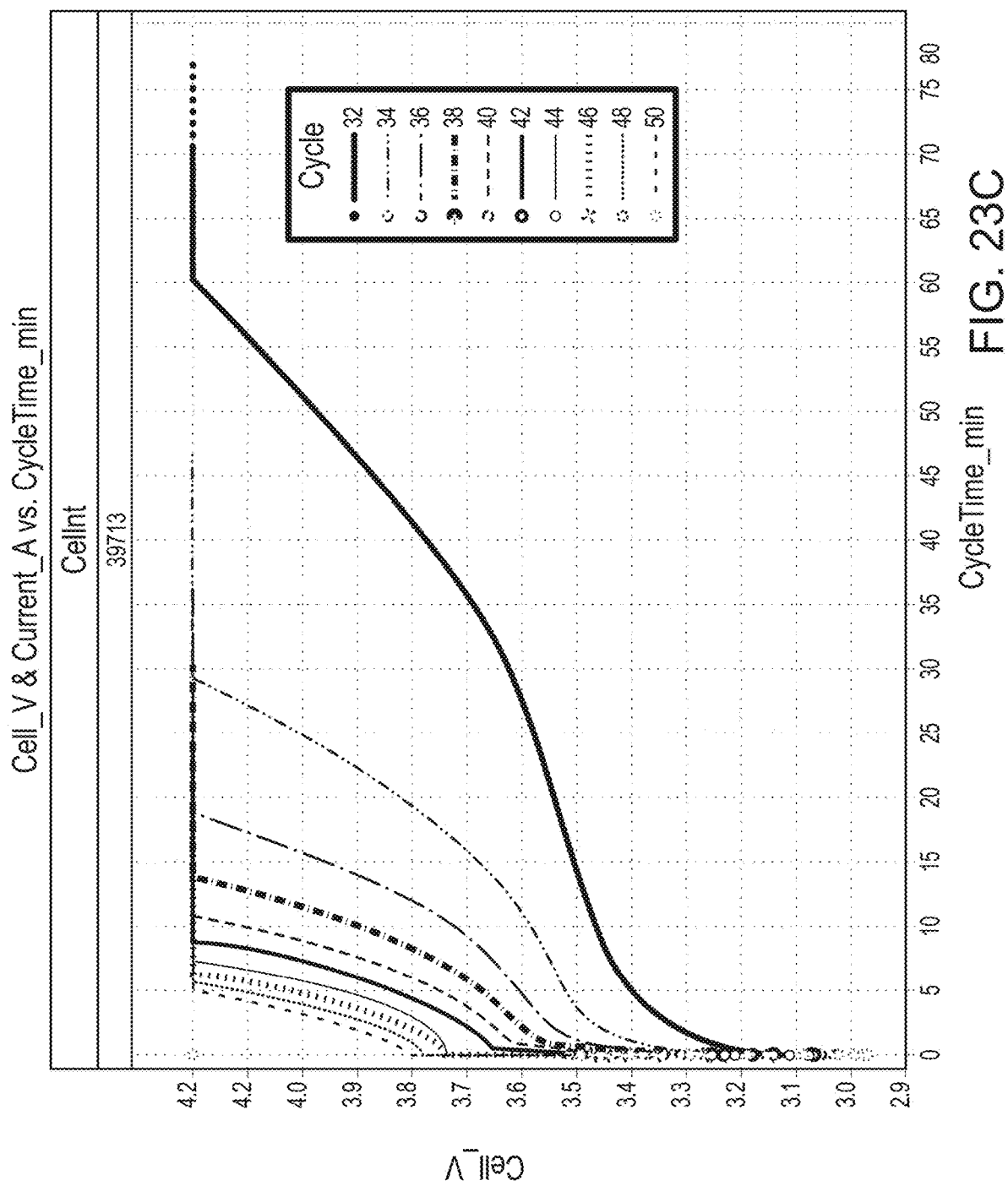
Figure 23D:
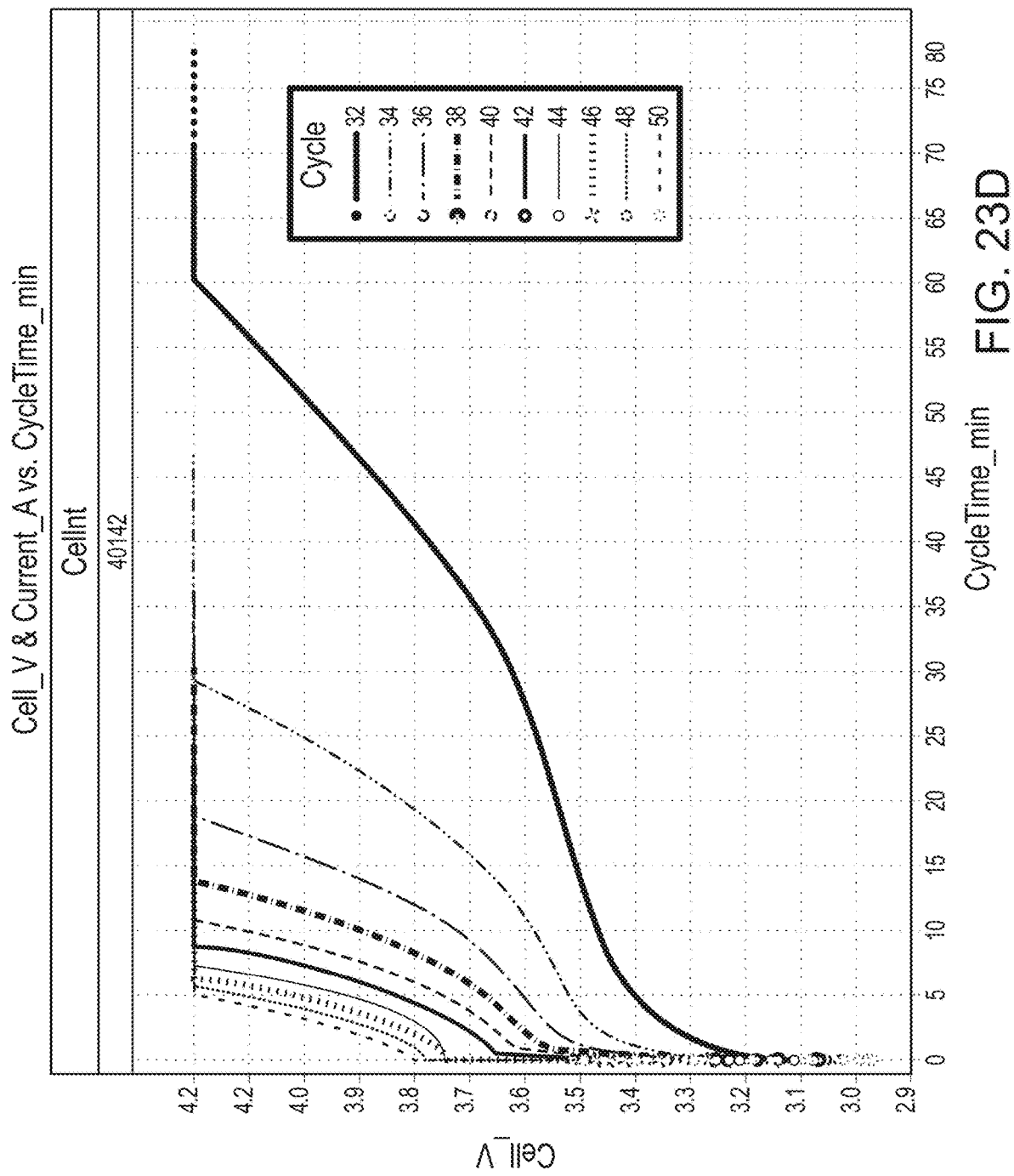
Figure 24A:
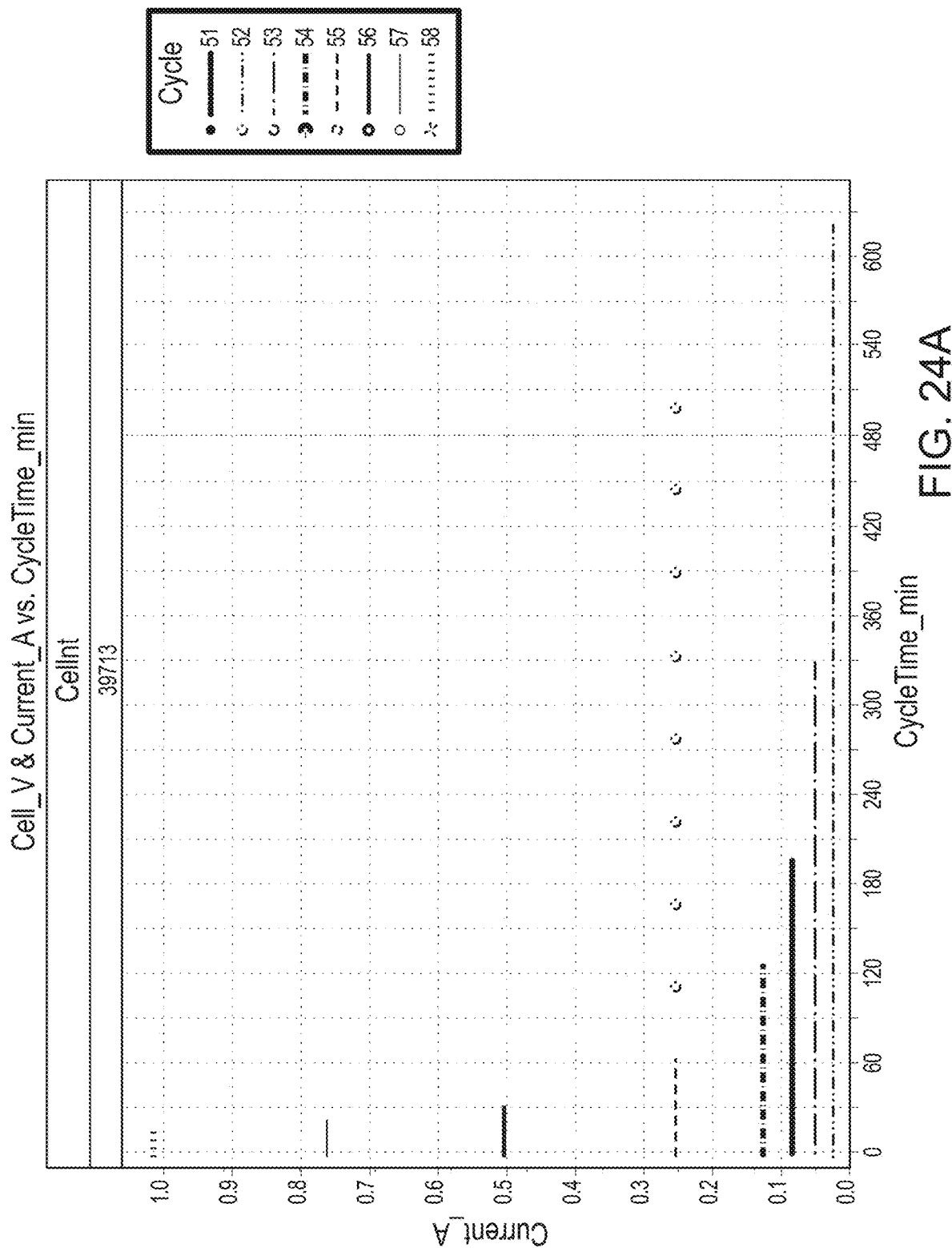
FIGS. 24A-24D show current (A) and cell voltage (V) vs. time (minutes) for two different cells (TM39713 and TM40142) for indicated cycles using rates tested from C/10 to 4 C discharge rates with standard C/3 charge rate on all cycles with C/25 CV step, as described in Tables 3 and 4. The C/10 reference cycle 52 has 1 C discharge pulses and 0.75 C charge pulses every 10% SOC according to standard test protocols defined by the US Department of Energy.
Figure 24B:
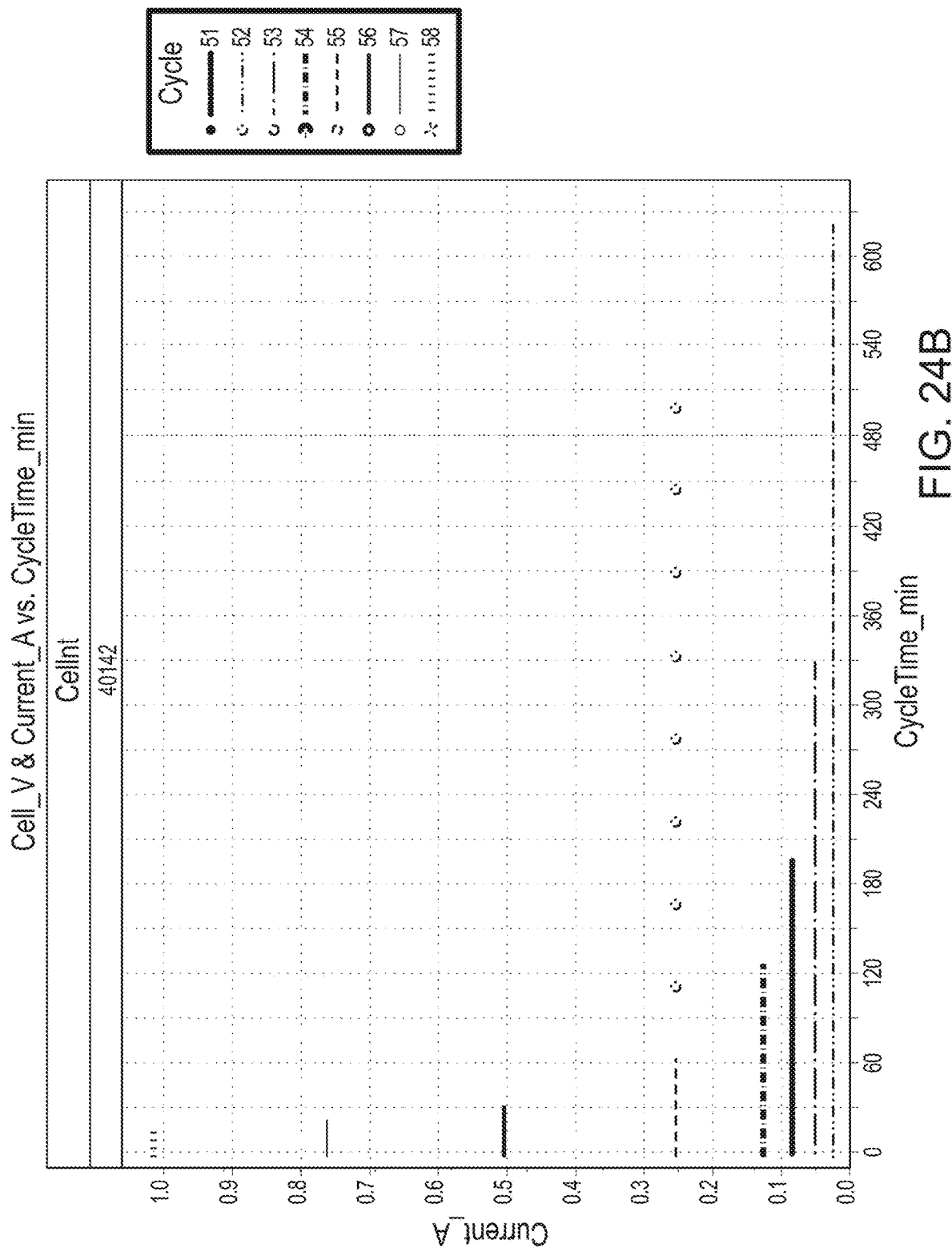
Figure 24C:
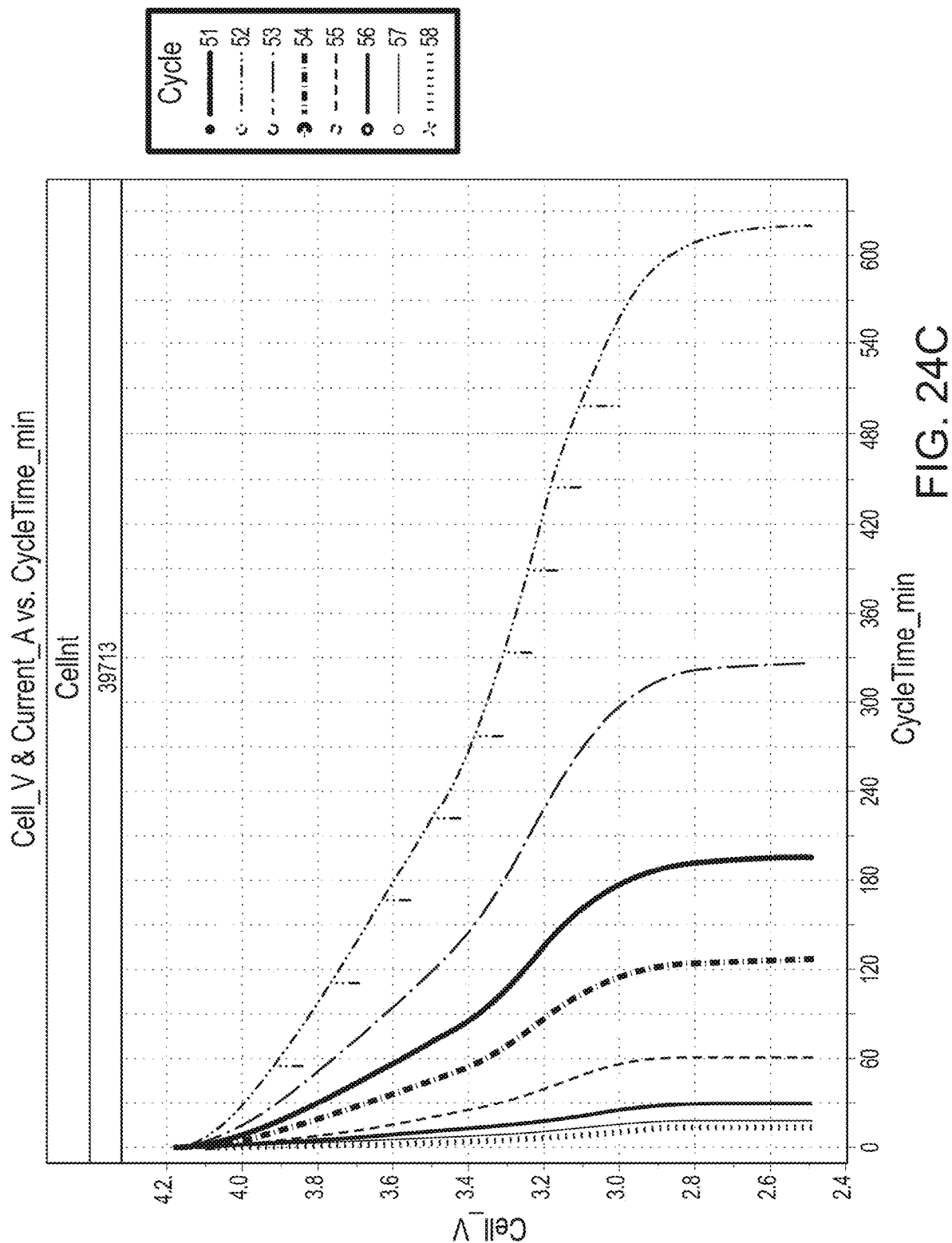
Figure 24D:
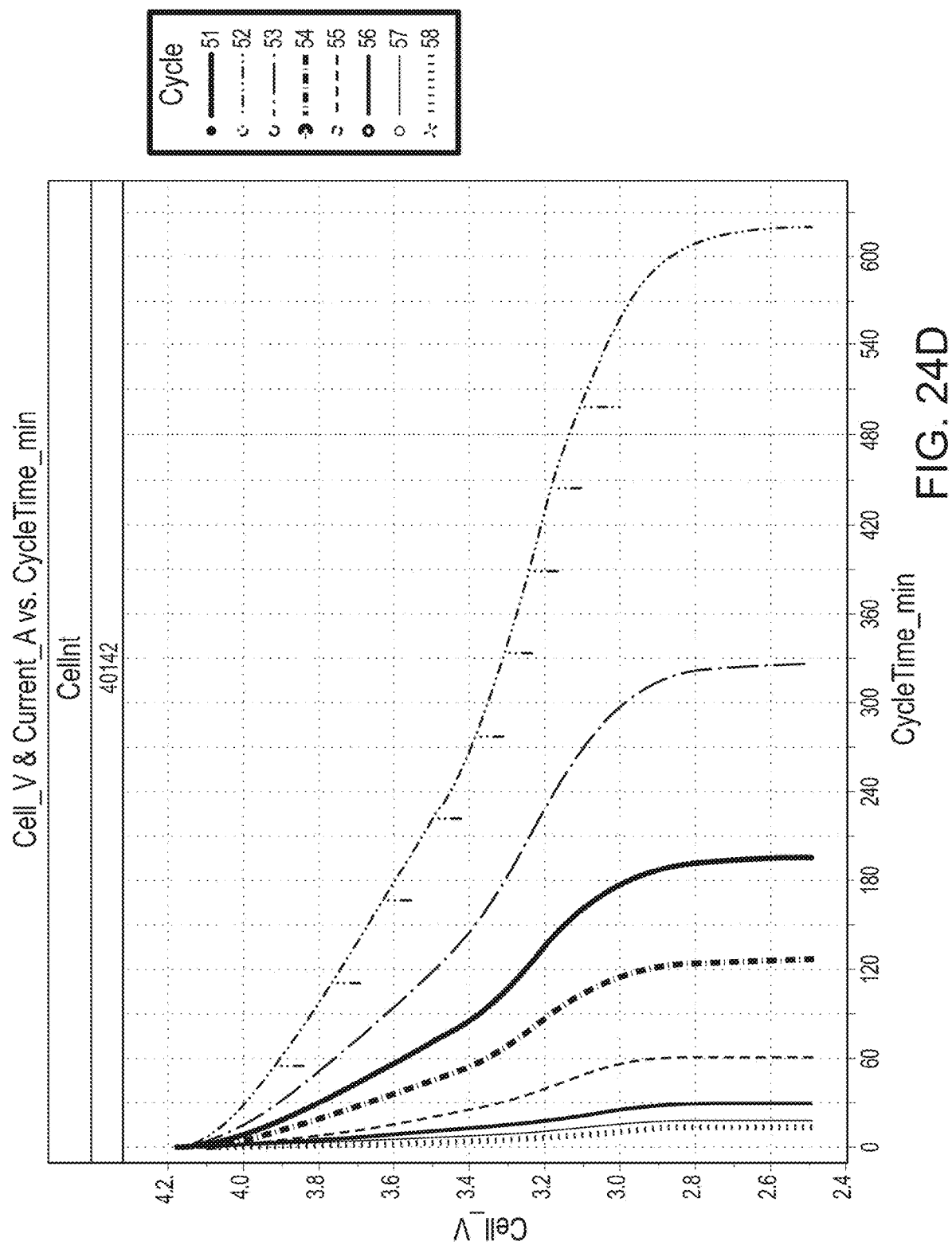
Figure 28:
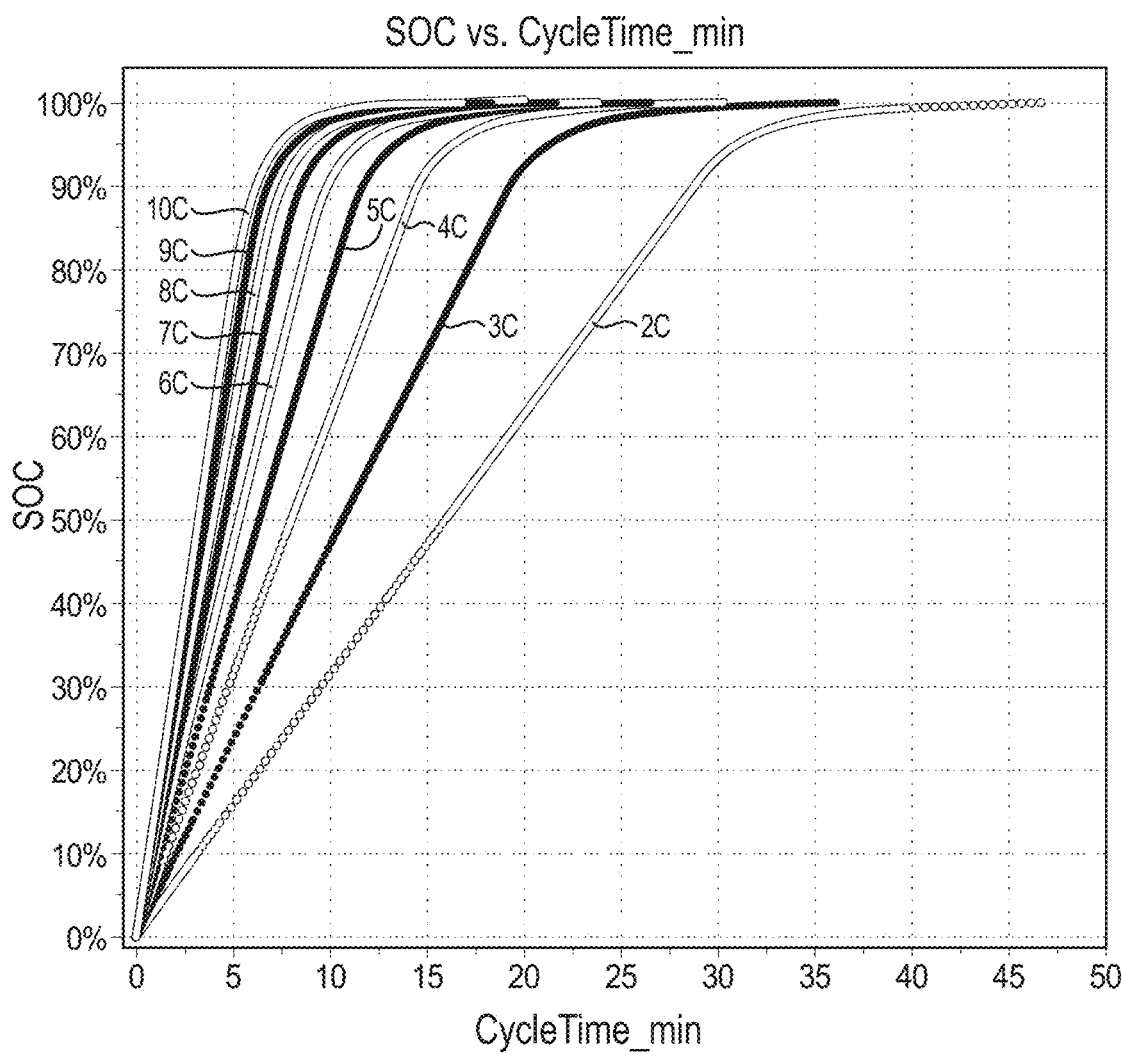
FIG. 28 shows state of charge versus cycle time and charge times at various C-rates.
Figure 35:
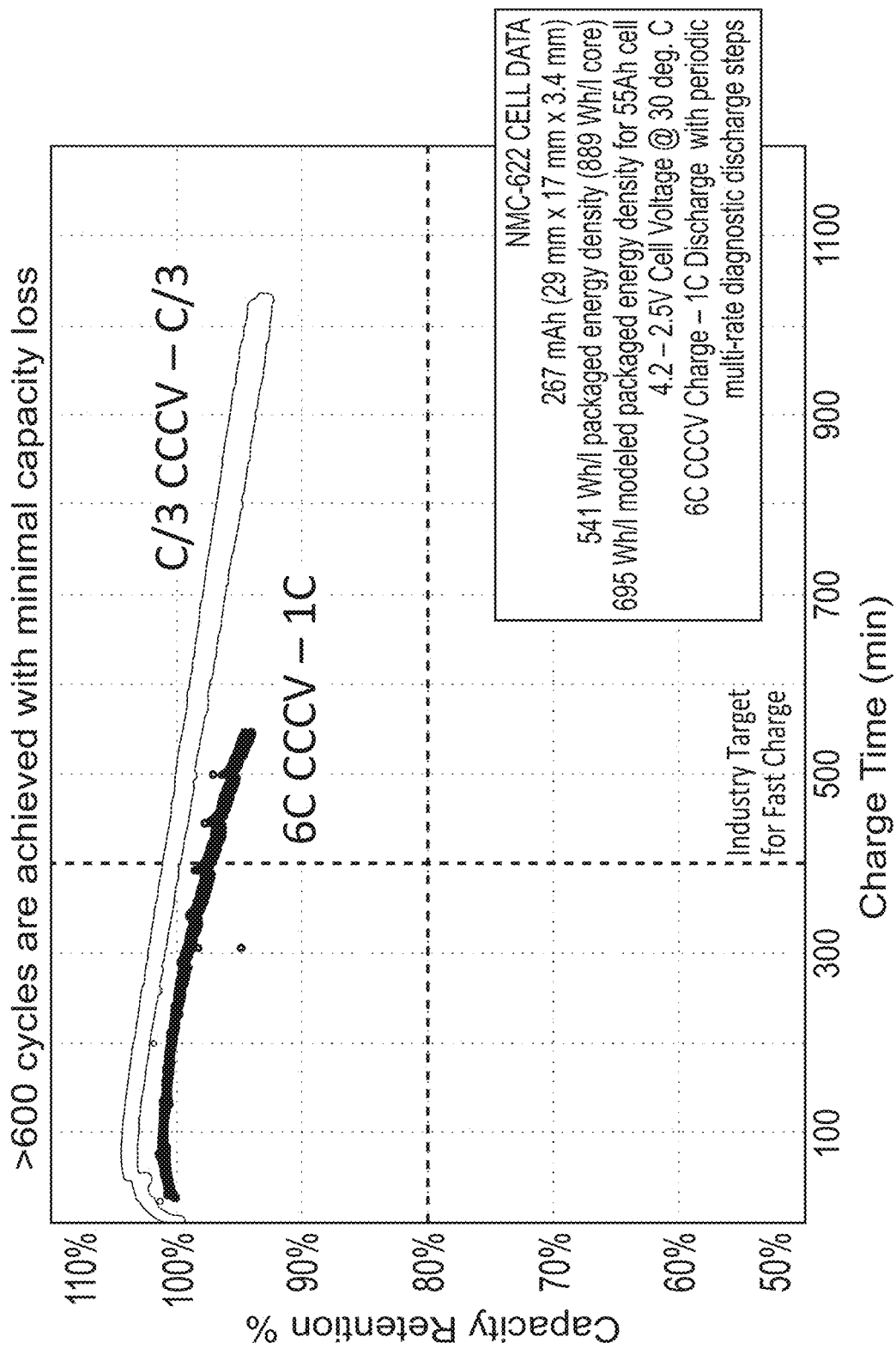
FIG. 35 shows the % capacity retention versus cycle number for 6C CCCV-1 C and C/3 CCCV-C/3.

In supporting Tables 1 and 2, the current (A) and voltage (V) vs. time (minutes) plots for TM39713 and TM40142 were further shown in FIGS. 23A-23C. These plots show the relative CC and CV step times for charge rates 1 C to 10 C as well as currents used for the CC and CV steps. FIG. 28 shows plots of SOC vs. cycle time and charge times at various C-rates using a NMC-622 cell, and FIG. 29 summarizes results. Furthermore, as shown in FIG. 35, at charge rate of 6 C, over 600 cycles were achieved with minimal capacity loss (~5%).

Example 2—Discharge Rate Capability

Table 3 and Table 4 show the discharge rate normalized to the 0.1 C reference cycle 52 and 0.2 C reference cycle 53 for comparison (*Cycle 52 included 1 C discharge pulses and 0.75 C charge pulses every 10% SOC according to a DOE standard reference protocol). Also shown are the charge rates, the discharge rates (with a C/25 CV step) and the discharge capacity in units of amp-hours. The maximum tested 4C discharge rate was found to be approximately 88% when normalized to the C/10 capacity.

TABLE 3

Summary of discharge rate capability for EXP4049-type cell TM40142.
TM40142 discharge rate capability

| cycle | charge rate | discharge rate | discharge capacity (Ah) | discharge C-rate/0.2 C | discharge C-rate/0.1 C |
|---|---|---|---|---|---|
| 51 | C/3 | C/3 | 0.2722 | 98.52% | 96.76% |
| 52 | C/3 | C/10* | 0.2814 | 101.83% | 100.00% |
| 53 | C/3 | C/5 | 0.2763 | 100.00% | 98.21% |
| 54 | C/3 | C/2 | 0.2683 | 97.10% | 95.36% |
| 55 | C/3 | 1 C | 0.2614 | 94.60% | 92.90% |
| 56 | C/3 | 2 C | 0.2558 | 92.59% | 90.93% |
| 57 | C/3 | 3 C | 0.2520 | 91.21% | 89.58% |
| 58 | C/3 | 4 C | 0.2455 | 88.84% | 87.25% |

TABLE 4

Summary of discharge rate capability for EXP4049-type cell TM39713.
TM39713 discharge rate capability

| cycle | charge rate | discharge rate | discharge capacity (Ah) | discharge C-rate/0.2 C | discharge C-rate/0.1 C |
|---|---|---|---|---|---|
| 51 | C/3 | C/3 | 0.2721 | 98.57% | 96.83% |
| 52 | C/3 | C/10* | 0.2810 | 101.80% | 100.00% |
| 53 | C/3 | C/5 | 0.2760 | 100.00% | 98.23% |
| 54 | C/3 | C/2 | 0.2682 | 97.16% | 95.44% |
| 55 | C/3 | 1 C | 0.2618 | 94.84% | 93.17% |
| 56 | C/3 | 2 C | 0.2567 | 92.98% | 91.34% |
| 57 | C/3 | 3 C | 0.2536 | 91.85% | 90.23% |
| 58 | C/3 | 4 C | 0.2487 | 90.09% | 88.50% |

FIGS. 24A-24D provide supporting data for Tables 3 and 4 with the current (A) and voltage (V) vs. time (minutes) plots for TM39713 and TM40142 for the indicated cycles. FIG. 25 shows the discharge voltage curves from cycle 53-58 for the same two cells with discharge rates ranging from C/5 to 4 C along with a temperature profile as a function of capacity. Discharge rate capability observed in these cells exceeded that expected by the fundamental rate capability of the NMC 622 material procured from BASF. Thermocouples placed directly on the surface of the cell were used to monitor the surface temperature as a function of SOC and indicate the surface exceeds 50° C. at 4 C rate near bottom of charge. The elevated cell temperature in comparison to the test chamber set point of 30° C. was likely responsible for the rate capability increase at rates above 1 C and higher, expected to be ~90% at 1 C at room temperature from the manufacturer spec sheet.

FIG. 25 shows the cell voltage (V) and cell temperature (° C.) vs. capacity (Ah) for cells TM39713 (left) and TM40142 (right) for indicated cycles using rates tested from C/5 to 4 C discharge rates with standard C/3 charge rate on all cycles with C/25 CV step, as described in Tables 3 and 4.

The discharge capacity and average discharge voltage were compared in Table 5 and showed similar values for all three cells (TM39713, TM40142 and the reference cell TM36721), suggesting that TM39713 and TM40142 were not damaged after charge acceptance tests up to 10 C during cycles indicated in Table 1.

TABLE 5

Comparison of C/3 cycles in TM39713 and TM40142 to a C/3 reference cell TM36721.

| Cycle | Rate | | Capacity (Ah) | | | Discharge voltage (V) | | |
|---|---|---|---|---|---|---|---|---|
| | Charge | Discharge | Reference | TM39713 | TM40142 | Reference | TM39713 | TM40142 |
| 33 | C/3 | C/3 | 0.2698 | 0.2701 | 0.2683 | 3.4019 | 3.4095 | 3.4081 |
| 35 | C/3 | C/3 | 0.2699 | 0.2703 | 0.2685 | 3.4011 | 3.4089 | 3.4077 |
| 37 | C/3 | C/3 | 0.2701 | 0.2705 | 0.2689 | 3.4009 | 3.4084 | 3.4067 |
| 39 | C/3 | C/3 | 0.2702 | 0.2707 | 0.2694 | 3.4004 | 3.4080 | 3.4054 |
| 41 | C/3 | C/3 | 0.2702 | 0.2708 | 0.2708 | 3.4002 | 3.4074 | 3.4051 |
| 43 | C/3 | C/3 | 0.2703 | 0.2710 | 0.2711 | 3.3998 | 3.4069 | 3.4052 |
| 45 | C/3 | C/3 | 0.2704 | 0.2713 | 0.2714 | 3.3995 | 3.4066 | 3.4054 |
| 47 | C/3 | C/3 | 0.2705 | 0.2716 | 0.2716 | 3.3992 | 3.4057 | 3.4049 |
| 49 | C/3 | C/3 | 0.2705 | 0.2718 | 0.2719 | 3.3990 | 3.4048 | 3.4038 |
| 51 | C/3 | C/3 | 0.2710 | 0.2721 | 0.2722 | 3.3987 | 3.4039 | 3.4022 |

Example 3—High Rate Cycle Life Stability

Figure 26:
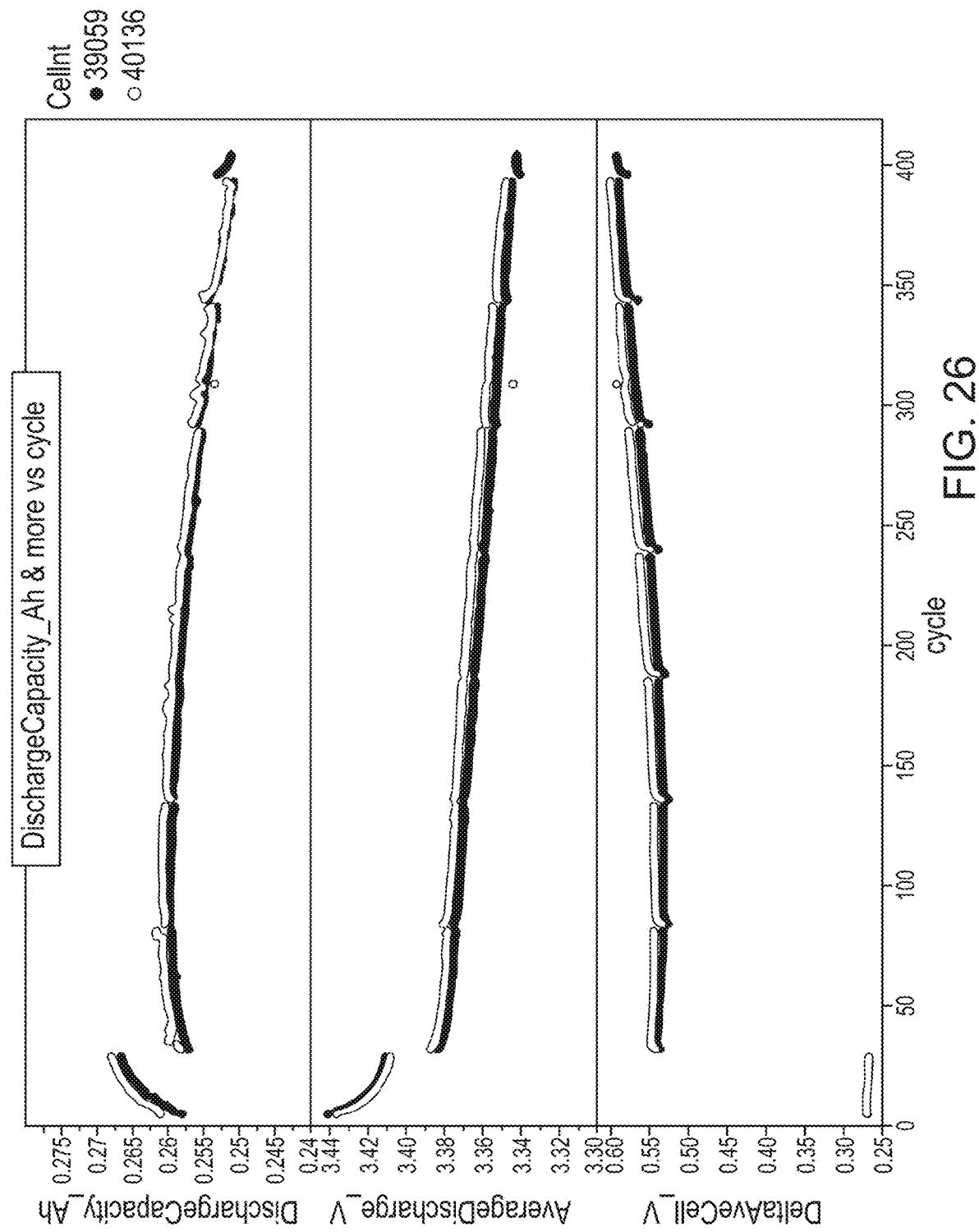
FIG. 26 shows cell discharge capacity (Ah), average discharge voltage (V), and DeltaAveCell_V (V) vs. cycle number for TM39059 and TM40136 using 6C charge and 1 C discharge for cycles 32 and above, with multi-rate US Department of Energy defined diagnostic cycles every 50th cycle.

FIG. 26 shows cell capacity (Ah), average discharge voltage (V), and the difference between the average charge and discharge voltage DeltaAveCell_V (V) vs. cycle number for EXP4049-type cells TM39059 and TM40136. For cycles 5-29, C/3 charge and discharge rates were used with the C/25 CV step at top of charge. For cycles 32 and higher, a 6C charge step (with C/25 CV step) and 1 C discharge step were used for every cycle, except at 50 cycle intervals where a standard C/3 reference cycle was used, along with the standard US Department of Energy defined test protocol with current pulse routines described above.

Figure 30:
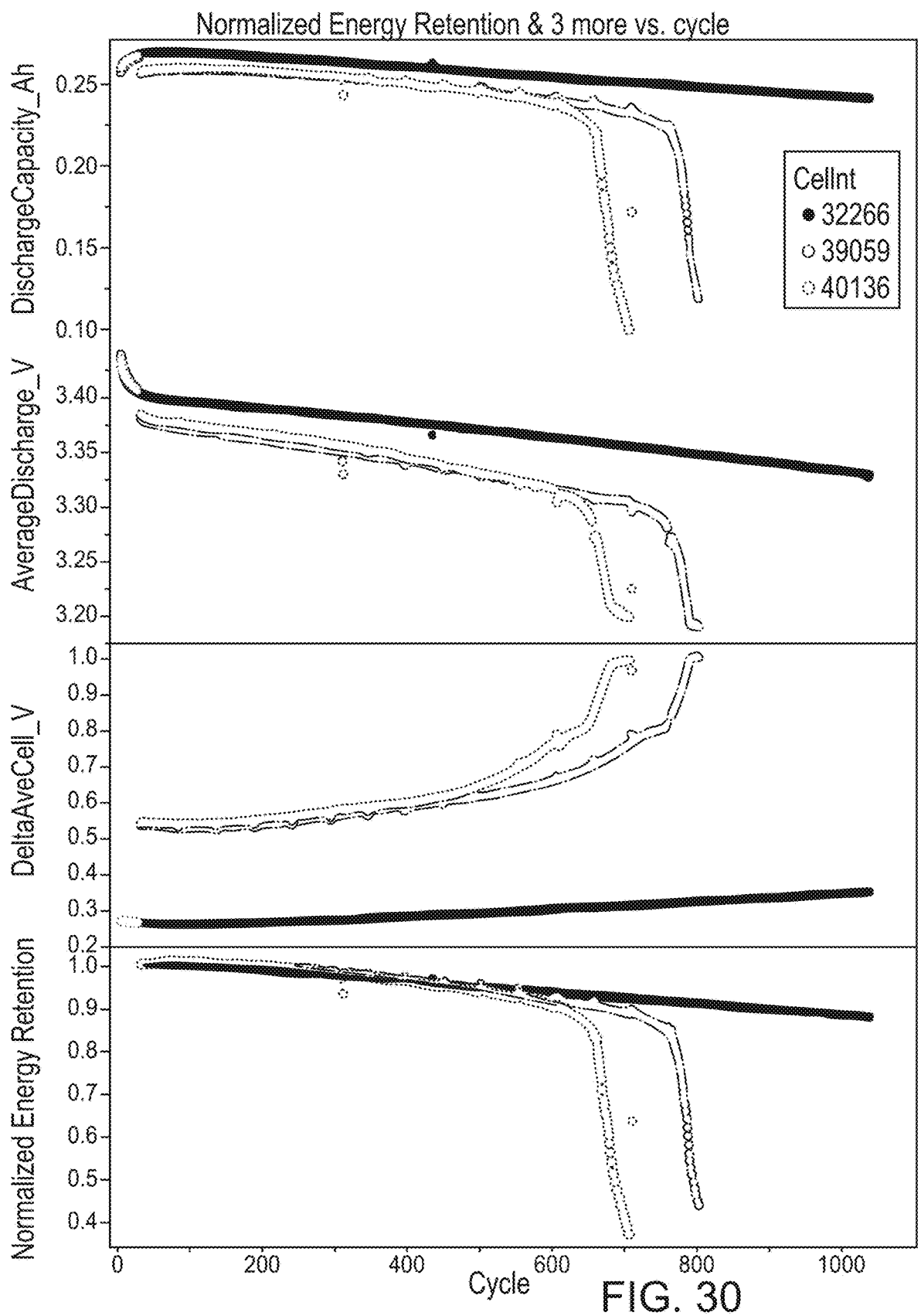
FIG. 30 shows cells cycled using 0.33 C/0.33 C charge/discharge rate with C/25 CV step (CellInt=32266) compared to cells cycled with 6 C/1 C charge/discharge rate with C/25 CV step (CellInt=39059 and CellInt=40136) including discharge capacity, average discharge voltage, the difference between average charge and discharge voltage DeltaAveCell_V, and normalized capacity retention (using cycle 32 as reference) plotted vs. cycle number. Every 50th cycle has a DOE defined diagnostic cycle using C/10 discharge with 1 C discharge pulses and 0.75 C charge pulses, and a standard 0.33 C/0.33 C diagnostic cycle (not shown).
Figure 31:
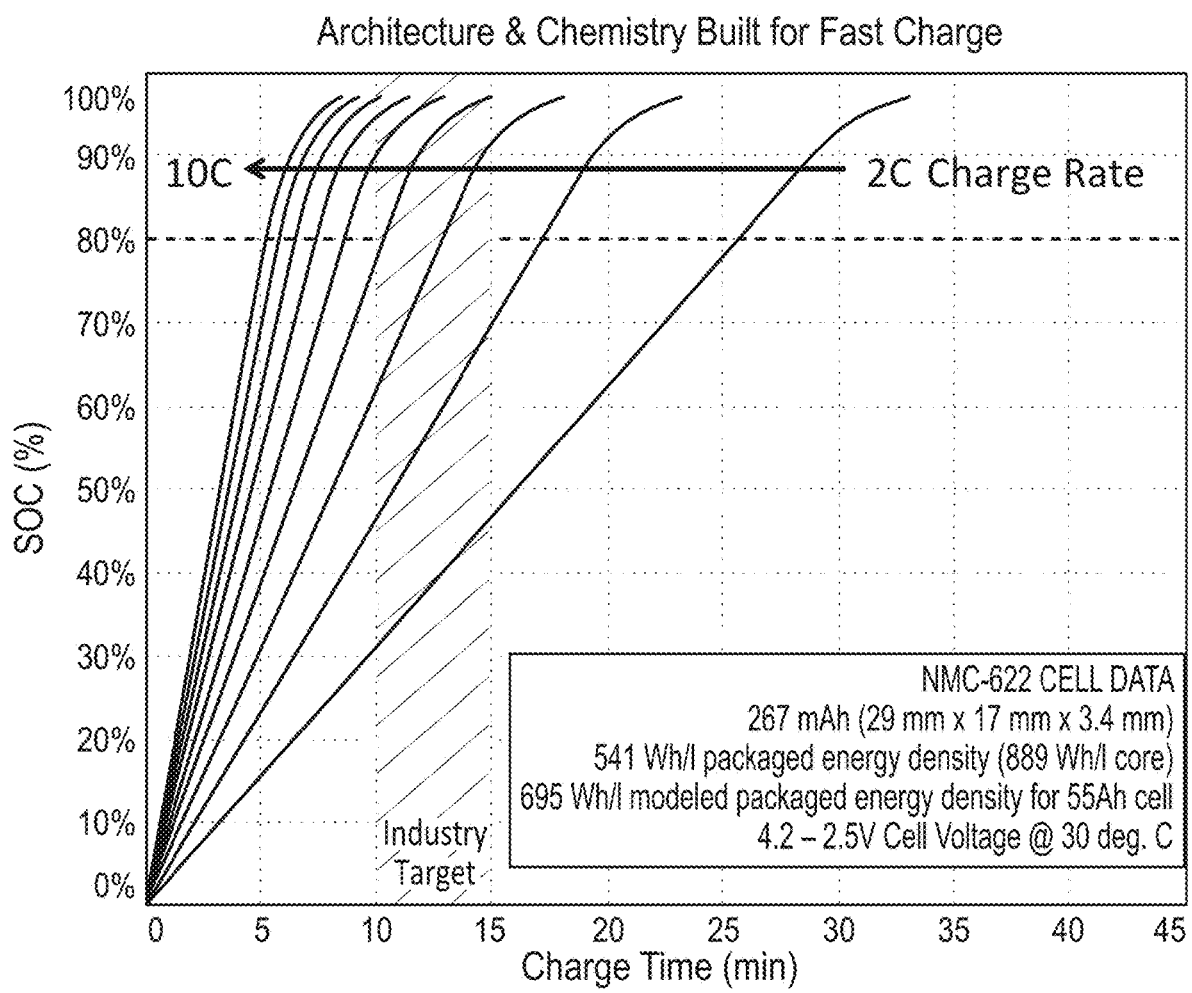
FIGS. 31-32 show state of charge versus time for various charging rates.
Figures 32, 33:
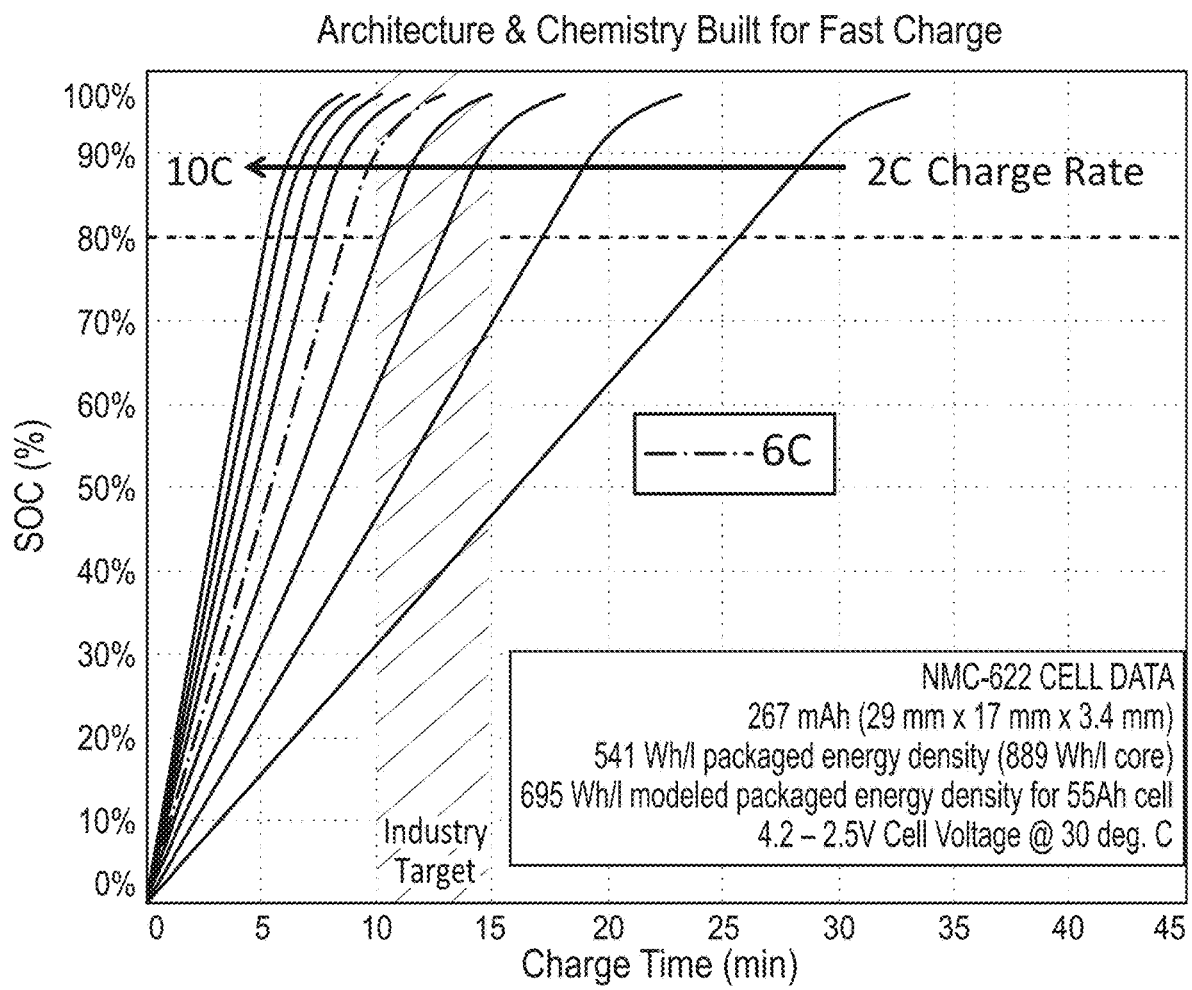
FIG. 33 is a chart showing charge rate and minutes to state of charge.
Figure 34:
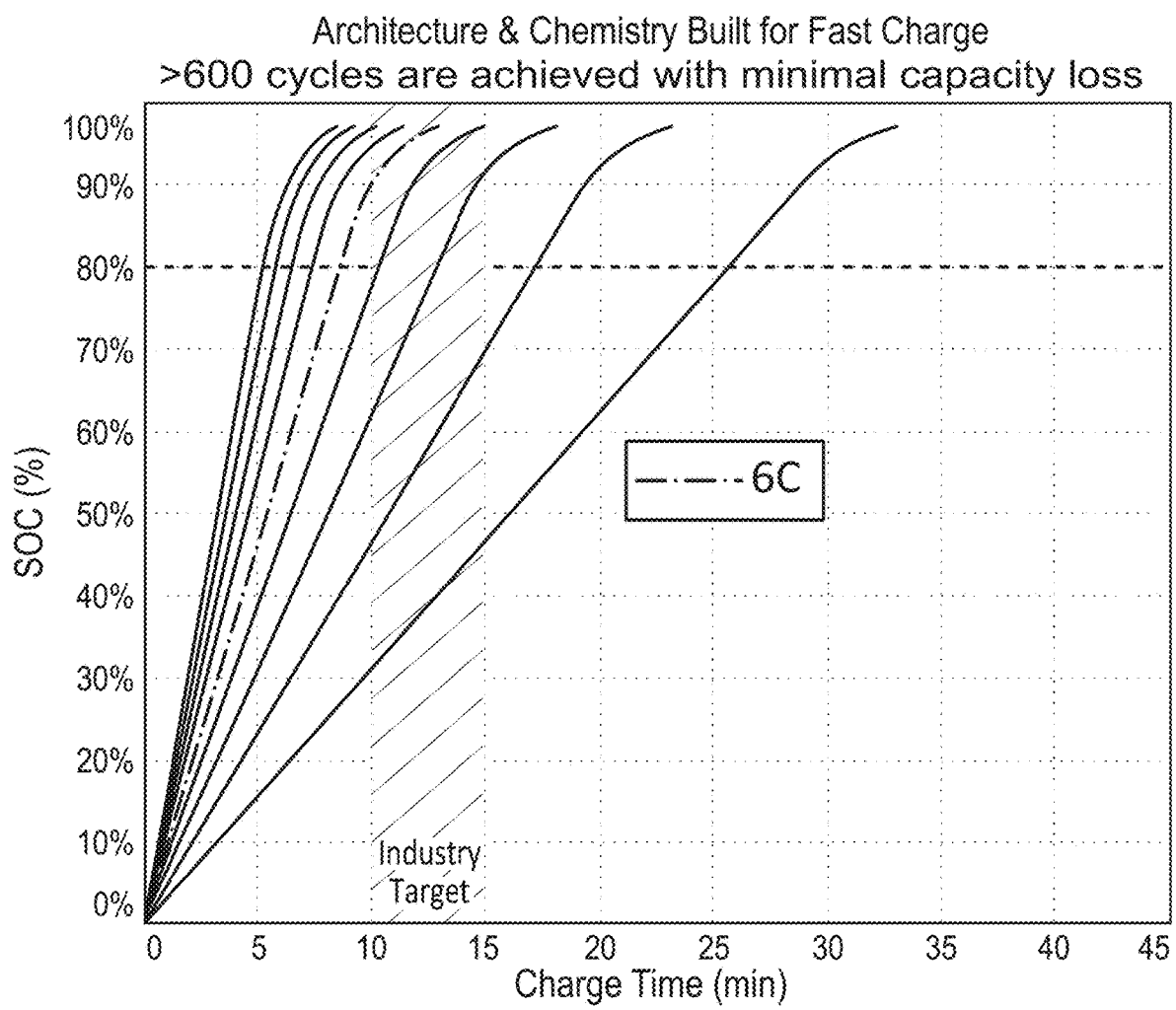
FIG. 34 shows state of charge versus time for various charging rates, with an industry target rate.

FIG. 30 shows the cell cycled using 0.33 C/0.33 C charge/discharge rate with C/25 CV step (CellInt=32266) compared to cells cycled with 6C/1 C charge/discharge rate with C/25 CV step (CellInt=39059 and CellInt=40136) including discharge capacity, average discharge voltage, the difference between average charge and discharge voltage DeltaAveCell_V, and normalized capacity retention (using cycle 32 as reference) plotted vs. cycle number. Every 50th cycle had a DOE defined diagnostic cycle using C/10 discharge with 1 C discharge pulses and 0.75 C charge pulses, and a standard 0.33 C/0.33 C diagnostic cycle (not shown).

Figure 27A:
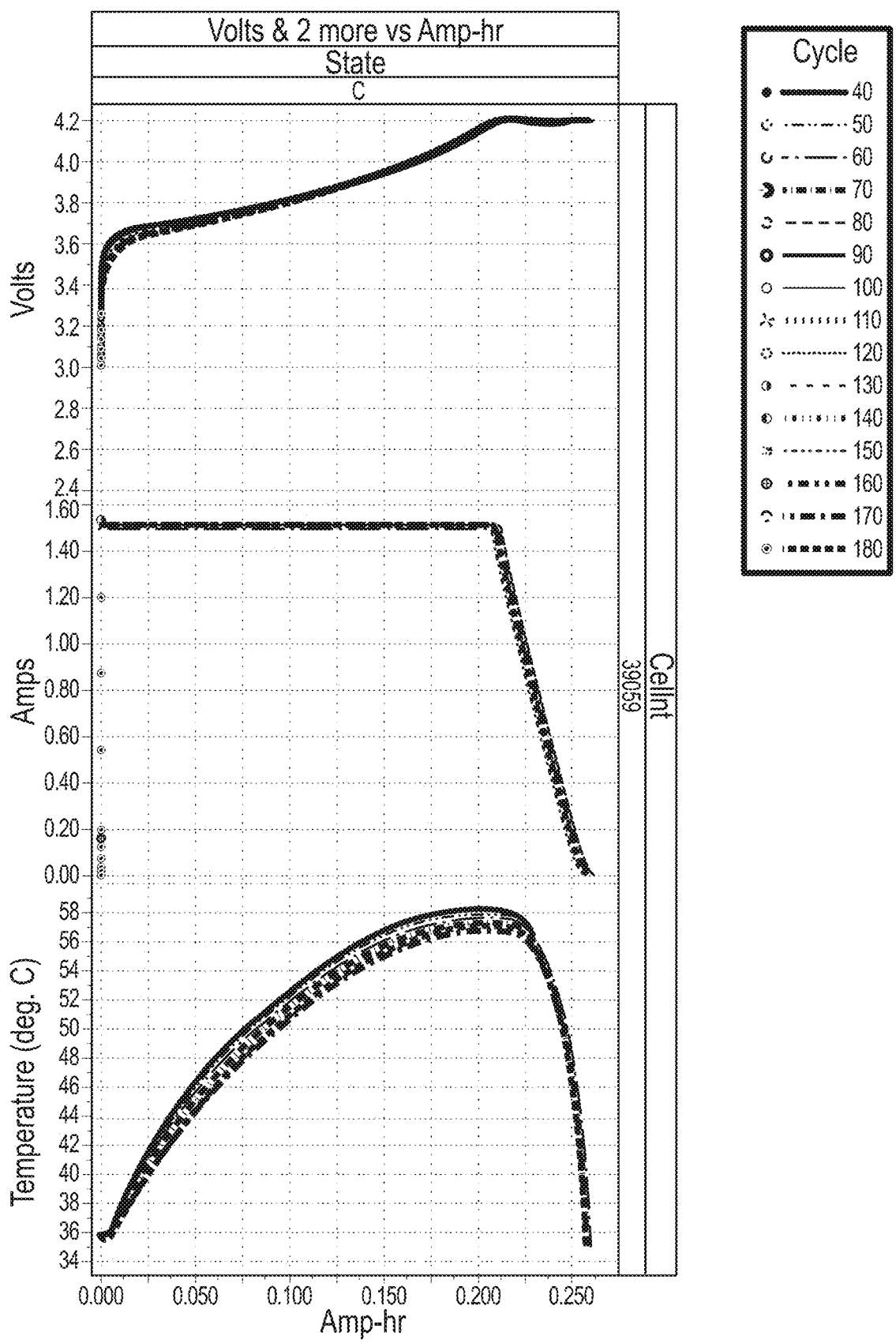
FIGS. 27A-27B show Cell voltage (V), current (amps), and temperature (° C.) vs. capacity (Ah) for charge (27A) and discharge (27B) for indicated cycles 40-180 for EXP4049-type cell TM39059.
Figure 27B:
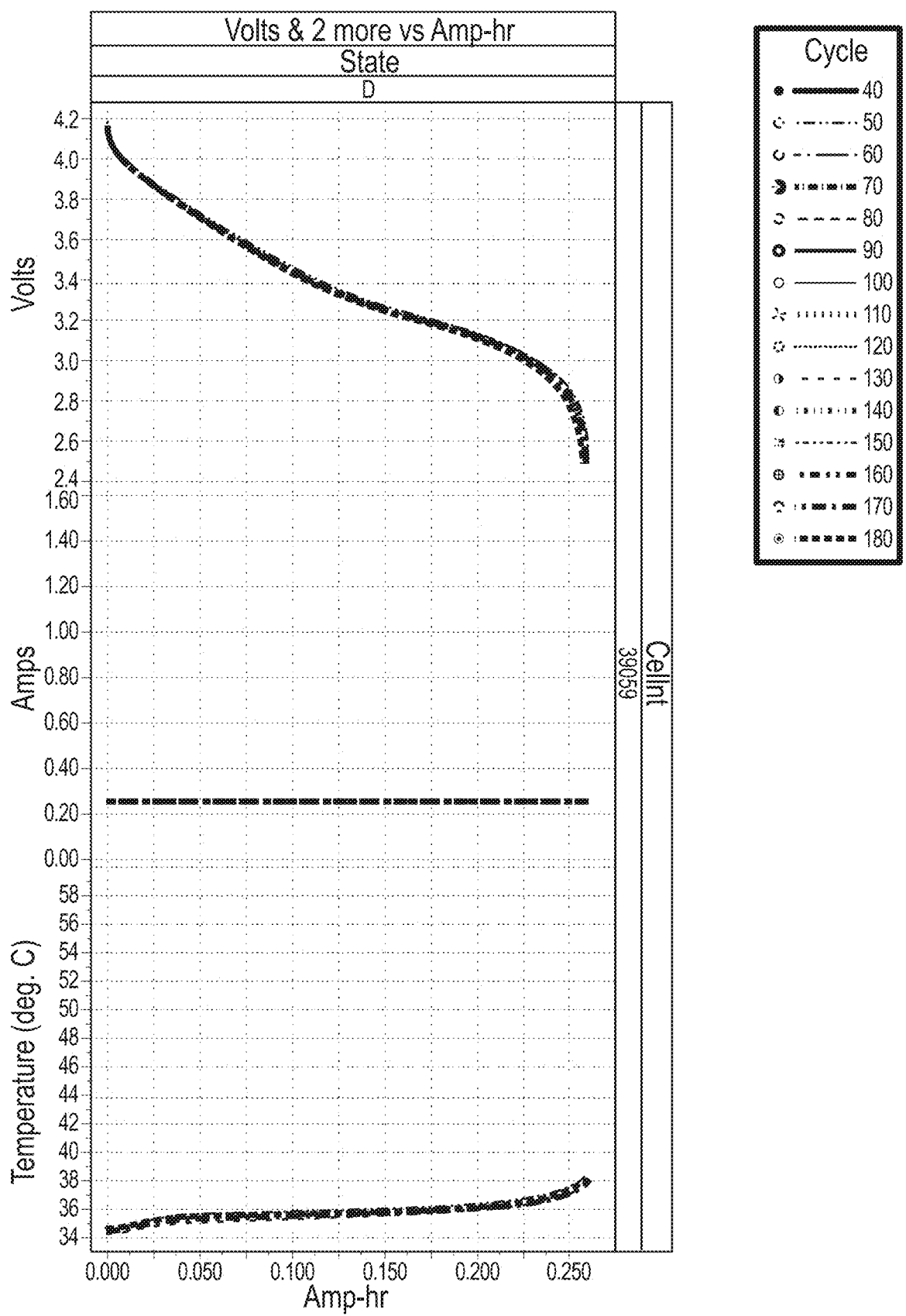

Cells TM39059 and TM40136 both showed stable and reproducible performance with >350 cycles using the 6 C charge and 1 C discharge test protocol. FIGS. 27A-27B shows the charge and discharge voltage profiles for the same cells along with the current in amps and the temperature vs. capacity for every 10th cycle between cycle 40 and cycle 180. Both cells showed significantly elevated temperature during the charge profile, with temperature exceeding 58° C. near top of charge on cycle 40. This maximum temperature decreased to near 57° C. near top of charge on cycle 180. High temperature resulting from stressful test conditions in the 30° C. test chamber negatively affected cycle life and stability compared to standard C/3 cycling tests.

FIGS. 31-35 provide further examples of charging rates achievable with structures according to embodiments of the present disclosure.

The following Enumerated Embodiments are provided to illustrate aspects of the disclosure, although the embodiments are not intended to be limiting and other aspects and/or embodiments may also be provided.

Embodiment 1. An electrode assembly for a secondary battery, wherein the electrode assembly has mutually perpendicular transverse, longitudinal and vertical axes corresponding to the x, y and z axes, respectively, of an imaginary three-dimensional Cartesian coordinate system, opposing longitudinal end surfaces that are separated from each other in the longitudinal direction, and a lateral surface surrounding an electrode assembly longitudinal axis $A_{EA}$ and connecting the first and second longitudinal end surfaces, the lateral surface having opposing vertical surfaces that are separated from each other in the vertical direction on opposing vertical sides of the longitudinal axis, opposing transverse surfaces that are separated from each other in the transverse direction on opposing transverse sides of the longitudinal axis, wherein the opposing longitudinal surfaces have a combined surface area, $L_{SA}$, the opposing transverse surfaces have a combined surface area, $T_{SA}$, the opposing vertical surfaces have a combined surface area, $V_{SA}$, the electrode assembly further comprises an electrode structure population, an electrically insulating separator population, and a counter-electrode structure population, wherein members of the electrode structure, electrically insulating separator and counter-electrode structure populations are arranged in an alternating sequence along the longitudinal direction.

Embodiment 2. The electrode assembly according to Embodiment 1, wherein members of the electrode structure population comprise an electrode current collector adjacent an electrode active material layer, the electrode active material layer comprising opposing transverse ends, and wherein members of the counter-electrode structure population comprise a counter-electrode current collector adjacent a counter-electrode active material layer, the counter-electrode active material layer comprising opposing transverse ends.

Embodiment 3. The electrode assembly of any preceding Embodiment wherein the electrode assembly comprises a population of unit cells, each member of the unit cell population comprises, in a stacked series in the longitudinal direction, a unit cell portion of an electrode current collector, an electrode active material layer, an electrically insulating separator, a counter-electrode active material layer, and a unit cell portion of a counter-electrode current collector.

Embodiment 4. The electrode assembly of any preceding Embodiment wherein the electrode current collectors have opposing electrode current collector surfaces separated from each other in the longitudinal direction and the counter-electrode current collectors have opposing counter-electrode current collector surfaces separated from each other in the longitudinal direction, and one of the opposing electrode current collector surfaces comprises a coated region that is covered with the electrode active material layer and an uncoated region that lacks the electrode active material layer, the uncoated region being proximate one of the transverse ends of the electrode current collector.

Embodiment 5. The electrode assembly of any preceding Embodiment wherein the electrode current collectors have opposing electrode current collector surfaces separated from each other in the longitudinal direction and the counter-electrode current collectors have opposing counter-electrode current collector surfaces separated from each other in the longitudinal direction, and one of the opposing counter-electrode current collector surfaces comprises a coated region that is covered with the counter-electrode active material layer and an uncoated region that lacks the counter-electrode active material layer, the uncoated region being proximate one of the transverse ends of the counter-electrode current collector.

Embodiment 6. The electrode assembly of any preceding Embodiment wherein the electrode current collectors have opposing electrode current collector surfaces separated from each other in the longitudinal direction and the counter-electrode current collectors have opposing counter-electrode current collector surfaces separated from each other in the longitudinal direction, and each of the opposing electrode current collector surfaces comprises a coated region that is covered with the electrode active material layer and an uncoated region that lacks the electrode active material layer, the uncoated region being proximate one of the transverse ends of the electrode current collector.

Embodiment 7. The electrode assembly of any preceding Embodiment wherein the electrode current collectors have opposing electrode current collector surfaces separated from each other in the longitudinal direction and the counter-electrode current collectors have opposing counter-electrode current collector surfaces separated from each other in the longitudinal direction, and each of the opposing counter-electrode current collector surfaces comprises a coated region that is covered with the counter-electrode active material layer and an uncoated region that lacks the counter-electrode active material layer, the uncoated region being proximate one of the transverse ends of the counter-electrode current collector.

Embodiment 8. The electrode assembly of any preceding Embodiment, wherein
members of the electrode structure population comprise an electrode current collector adjacent an electrode active material layer, the electrode active material layer comprising opposing transverse ends, and wherein members of the counter-electrode structure population comprise a counter-electrode current collector adjacent a counter-electrode active material layer, the counter-electrode active material layer comprising opposing transverse ends,
each member of the electrode structure population comprises an electrode current collector that is partially coated by the adjacent electrode active material layer, the electrode current collector having (i) an electrode current collector body region coated by the adjacent electrode active material layer and extending between the opposing first and second transverse ends of the adjacent electrode active material layer, and (ii) an electrode current collector end region on a first or second transverse end of the electrode current collector, the electrode current collector end region being bounded by and extending past the first or second transverse end of the adjacent electrode active material layer that is on a same transverse side as the electrode current collector end region.

Embodiment 9. The electrode assembly of any preceding Embodiment, wherein
members of the electrode structure population comprise an electrode current collector adjacent an electrode active material layer, the electrode active material layer comprising opposing transverse ends, and wherein members of the counter-electrode structure population comprise a counter-electrode current collector adjacent a counter-electrode active material layer, the counter-electrode active material layer comprising opposing transverse ends,
each member of the counter-electrode structure population comprises a counter-electrode current collector that is partially coated by the adjacent counter-electrode active material layer, the counter-electrode current collector having (i) a counter-electrode current collector body region coated by the adjacent counter-electrode active material layer and extending between the opposing first and second transverse ends of the adjacent counter-electrode active material layer, and (ii) a counter-electrode current collector end region on a first or second transverse end of the counter-electrode current collector, the counter-electrode current collector end region being bounded by and extending past the first or second transverse end of the adjacent counter-electrode active material layer that is on a same transverse side as the counter-electrode current collector end region.

Embodiment 10. The electrode assembly of any preceding Embodiment, wherein
the electrode assembly further comprises an electrode busbar connected to the electrode current collector end regions of the electrode current collectors to electrically pool current from members of the electrode structure population.

Embodiment 11. The electrode assembly of any preceding Embodiment, wherein
the electrode assembly further comprises a counter-electrode busbar connected to the counter-electrode current collector end regions of the counter-electrode current collectors to electrically pool current from members of the counter-electrode structure population.

Embodiment 12. The electrode assembly of any preceding Embodiment, wherein a length of the electrode current collector end region in the transverse direction ($L_{ER}$) is as measured from the first or second transverse end of the adjacent electrode active material layer that is on a same transverse side as the electrode current collector end region, to a region where the electrode current collector end region connects with the electrode busbar.

Embodiment 13. The electrode assembly of any preceding Embodiment, wherein a length of the counter-electrode current collector end region in the transverse direction ($L_{CER}$) is as measured from the first or second transverse end of the adjacent counter-electrode active material layer that is on a same transverse side as the counter-electrode current collector end region, to a region where the counter-electrode current collector end region connects with the counter-electrode busbar.

Embodiment 14. The electrode assembly of any preceding Embodiment, wherein a height of the electrode current collector body region in the vertical direction ($H_{BR}$) is as measured between opposing vertical surfaces of the electrode current collector body region.

Embodiment 15. The electrode assembly of any preceding Embodiment, wherein a height of the counter-electrode current collector body region in the vertical direction ($H_{CBR}$) is as measured between opposing vertical surfaces of the counter-electrode current collector body region.

Embodiment 16. The electrode assembly of any preceding Embodiment, wherein a height of the electrode current collector end region in the vertical direction ($H_{ER}$) is as measured between opposing vertical surfaces of the electrode current collector end region.

Embodiment 17. The electrode assembly of any preceding Embodiment, wherein a height of the counter-electrode current collector end region in the vertical direction ($H_{CER}$) is as measured between opposing vertical surfaces of the counter-electrode current collector end region.

Embodiment 18. The electrode assembly of any preceding Embodiment, wherein the length of the electrode current collector end region in the transverse direction ($L_{ER}$) and the height of the electrode current collector body region in the vertical direction ($H_{BR}$) satisfy the following relationship:

$$L_{ER} < 0.5 \times H_{BR}.$$

Embodiment 19. The electrode assembly of any preceding Embodiment, wherein the length of the electrode current collector end region in the transverse direction ($L_{ER}$) and the height of the electrode current collector body region in the vertical direction ($H_{BR}$) satisfy the following relationship:

$$L_{ER} < 0.4 \times H_{BR}.$$

Embodiment 20. The electrode assembly of any preceding Embodiment, wherein the length of the electrode current collector end region in the transverse direction ($L_{ER}$) and the height of the electrode current collector body region in the vertical direction ($H_{BR}$) satisfy the following relationship:

$$L_{ER} < 0.3 \times H_{BR}.$$

Embodiment 21. The electrode assembly of any preceding Embodiment, wherein the length of the counter-electrode current collector end region in the transverse direction ($L_{CER}$) and the height of the counter-electrode current collector body region in the vertical direction ($H_{CBR}$) satisfy the following relationship:

$$L_{CER} < 0.5 \times H_{CBR}.$$

Embodiment 22. The electrode assembly of any preceding Embodiment, wherein the length of the counter-electrode current collector end region in the transverse direction ($L_{CER}$) and the height of the counter-electrode current collector body region in the vertical direction ($H_{BR}$) satisfy the following relationship:

$$L_{CER} < 0.4 \times H_{CBR}.$$

Embodiment 23. The electrode assembly of any preceding Embodiment, wherein the length of the counter-electrode current collector end region in the transverse direction ($L_{CER}$) and the height of the counter-electrode current collector body region in the vertical direction ($H_{BR}$) satisfy the following relationship:

$$L_{CER} < 0.3 \times H_{CBR}.$$

Embodiment 24. The electrode assembly of any preceding Embodiment, wherein the height of the electrode current collector end region in the vertical direction ($H_{ER}$) and the height of the electrode current collector body region in the vertical direction ($H_{BR}$) satisfy the following relationship:

$$H_{ER} > 0.5 \times H_{BR}.$$

Embodiment 25. The electrode assembly of any preceding Embodiment, wherein the height of the electrode current collector end region in the vertical direction ($H_{ER}$) and the height of the electrode current collector body region in the vertical direction ($H_{BR}$) satisfy the following relationship:

$$H_{ER} > 0.7 \times H_{BR}.$$

Embodiment 26. The electrode assembly of any preceding Embodiment, wherein the height of the electrode current collector end region in the vertical direction ($H_{ER}$) and the height of the electrode current collector body region in the vertical direction ($H_{BR}$) satisfy the following relationship:

$$H_{ER} > 0.9 \times H_{BR}.$$

Embodiment 27. The electrode assembly of any preceding Embodiment, wherein the height of the counter-electrode current collector end region in the vertical direction ($H_{CER}$) and the height of the counter-electrode current collector body region in the vertical direction ($H_{CBR}$) satisfy the following relationship:

$$H_{CER} > 0.5 \times H_{CBR}.$$

Embodiment 28. The electrode assembly of any preceding Embodiment, wherein the height of the counter-electrode current collector end region in the vertical direction ($H_{CER}$) and the height of the counter-electrode current collector body region in the vertical direction ($H_{CBR}$) satisfy the following relationship:

$$H_{CER} > 0.7 \times H_{CBR}.$$

Embodiment 29. The electrode assembly of any preceding Embodiment, wherein the height of the counter-electrode current collector end region in the vertical direction ($H_{CER}$) and the height of the counter-electrode current collector body region in the vertical direction ($H_{CBR}$) satisfy the following relationship:

$$H_{CER} > 0.9 \times H_{CBR}.$$

Embodiment 30. The electrode assembly of any preceding Embodiment, wherein the length of the electrode current collector end region in the transverse direction ($L_{ER}$) and the height of the electrode current collector end region in the vertical direction ($H_{ER}$) satisfy the following relationship:

$$L_{ER}/H_{ER} < 1.$$

Embodiment 31. The electrode assembly of any preceding Embodiment, wherein the length of the counter-electrode current collector end region in the transverse direction ($L_{CER}$) and the height of the counter-electrode current collector end region in the vertical direction ($H_{CER}$) satisfy the following relationship:

$$L_{CER}/H_{CER} < 1.$$

Embodiment 32. The electrode assembly of any preceding Embodiment, wherein members of the electrode structure population comprise electrode current collector end regions having opposing surfaces separated from each other in the longitudinal direction, and wherein at least one of the opposing surfaces of electrode current collector end regions comprise a layer of thermally conductive material disposed thereon.

Embodiment 33. The electrode assembly of Embodiment 32, wherein electrode current collector end regions electrically connect to the electrode busbar via at least one of the opposing surfaces, and wherein the layer of thermally conductive material is disposed on the other of the opposing surfaces.

Embodiment 34. The electrode assembly of any preceding Embodiment, wherein members of the counter-electrode structure population comprise counter-electrode current collector end regions having opposing surfaces separated from each other in the longitudinal direction, and wherein at least one of the opposing surfaces of counter-electrode current collector end regions comprise a layer of thermally conductive material disposed thereon.

Embodiment 35. The electrode assembly of Embodiment 34, wherein counter-electrode current collector end regions electrically connect to the counter-electrode busbar via at least one of the opposing surfaces, and wherein the layer of thermally conductive material is disposed on the other of the opposing surfaces.

Embodiment 36. The electrode assembly of any of Embodiments 32-35, wherein the thermally conductive material comprises a thermally conductive ceramic material.

Embodiment 37. The electrode assembly of any preceding Embodiment, wherein the length $L_{ER}$ of the electrode current collector end region is from (i) the first or second transverse end of the adjacent electrode active material layer that is on a same transverse side as the electrode current collector end region, to (ii) a region of electrical connection of the electrode current collector end region with the electrode busbar.

Embodiment 38. The electrode assembly of any preceding Embodiment, wherein the length $L_{CER}$ of the counter-electrode current collector end region is from (i) the first or second transverse end of the adjacent counter-electrode active material layer that is on a same transverse side as the counter-electrode current collector end region, to (ii) a region of electrical connection of the counter-electrode current collector end region with the counter-electrode busbar.

Embodiment 39. A sealed secondary battery cell comprising the electrode assembly according to any of Embodiments 1-38, wherein the sealed secondary battery is chargeable between a charged and discharged state, the sealed secondary battery comprising a hermetically sealed enclosure.

Embodiment 40. The sealed secondary battery cell according to Embodiment 39, wherein the secondary battery cell comprises one or more gas containment compartments located externally to the electrode assembly and within the hermetically sealed enclosure, to contain a gas evolved during charging or discharging of the secondary battery cell, the one or more gas containment compartments comprising any one or more of (i) a transverse containment compartment located external to the transverse end surfaces of the electrode assembly in the transverse direction to contain the gas between the hermetically sealed enclosure and the electrode assembly on a transverse side of the electrode assembly, and (ii) a longitudinal containment compartment located external to the longitudinal end surfaces of the electrode assembly in the longitudinal direction to contain the gas between the hermetically sealed enclosure and the electrode assembly on a longitudinal side of the electrode assembly.

Embodiment 41. The sealed secondary battery cell according to Embodiment 40, wherein one or more of the transverse and longitudinal containment compartments are configured to contain a volume of gas $V_{X,Y}$ evolved from the electrode assembly during charging or discharging of the secondary battery cell.

Embodiment 42. The sealed secondary battery cell according to any of Embodiments 40-41, wherein one or more of the transverse and longitudinal containment compartments are configured to contain a volume of gas $V_{X,Y}$ evolved from the electrode assembly during charging or discharging of the secondary battery cell that is greater than any volume $V_Z$ of gas evolved from the electrode assembly during charging or discharging of the secondary battery cell that is contained in between the hermetically sealed enclosure and the electrode assembly on any of the vertical sides of the electrode assembly.

Embodiment 43. The sealed secondary battery cell according to any of Embodiments 39-42, wherein one or more of the transverse and longitudinal containment compartments have a greater volume, either alone or in combination with one another, than any space between the hermetically sealed enclosure and electrode assembly on either vertical side of the electrode assembly.

Embodiment 44. The sealed secondary battery cell according to any of Embodiments 39-43, wherein the volume of gas Vxy contained in one or more of the transverse and longitudinal containment compartments is at least 1.5 times, at least 2 times, at least 3 times, at least 5 times, and/or at least 10 times a volume of gas Vz contained on any of the vertical sides of the electrode assembly.

Embodiment 45. The sealed secondary battery cell according to any of Embodiments 39-44, wherein substantially no volume of gas VZ is contained on any vertical side of the electrode assembly.

Embodiment 46. The sealed secondary battery cell according to any of Embodiments 39-45, wherein one or more of the transverse and longitudinal containment compartments is configured to contain a volume of gas Vxy that is at least 4% of the volume of the sealed secondary cell.

Embodiment 47. The sealed secondary battery cell according to any of Embodiments 39-46, wherein one or more of the transverse and longitudinal containment compartments is configured to contain a volume of gas Vxy that is at least 5% of the volume of the sealed secondary cell.

Embodiment 48. The sealed secondary battery cell according to any of Embodiments 39-47, wherein the hermetically sealed enclosure comprises a flexible polymer enclosure material, and wherein the one or more transverse and longitudinal containment compartments are formed by expansion of the hermetically sealed enclosure in at least one of the transverse and longitudinal directions upon charging or discharging of the sealed secondary battery cell.

Embodiment 49. The sealed secondary battery cell according to any of Embodiments 39-48, wherein the hermetically sealed enclosure comprises a hermetically sealed case, and wherein the one or more transverse and longitudinal containment compartments are formed in a space between walls of the hermetically case and the electrode assembly on one or more transverse and longitudinal sides of the electrode assembly.

Embodiment 50. The sealed secondary battery cell according to any of Embodiments 39-49, wherein the sealed secondary battery cell comprises a set of electrode constraints, and wherein the set of electrode constraints comprises a vertical constraint system comprising first and second vertical growth constraints that are separated from each other in the vertical direction, the first and second vertical growth constraints being connected to members of the population of electrode structures and/or members of the population of counter-electrode structures, and the vertical constraint system being capable of restraining growth of the electrode assembly in the vertical direction.

Embodiment 51. The sealed secondary battery cell according to any of Embodiments 39-50, wherein the hermetically sealed enclosure comprises opposing first and second vertical sides separated from each other in the vertical direction, each of the first and second vertical sides comprising interior vertical surfaces facing the electrode assembly and respectively affixed to first and second vertical growth constraints.

Embodiment 52. The sealed secondary battery cell according to Embodiment 51, wherein the interior vertical surfaces of the first and second vertical sides of the hermetically sealed enclosure are affixed to the first and second vertical growth constraints by any of adhering, brazing, gluing, welding, bonding, joining, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Embodiment 53. A battery pack comprising a population of sealed secondary battery cells according to any of Embodiments 39-52.

Embodiment 54. A battery pack comprising a population of sealed secondary battery cell according to any of Embodiments 39-52, wherein the battery pack comprises a frame to hold the secondary battery cells, and a population of pressure-applying structures configured to apply a pressure to the hermetically sealed enclosure of members of the population of sealed secondary battery cells, wherein the hermetically sealed enclosure comprises first and second vertical sides separated from each other in the vertical direction, and the frame is configured to hold a cell array comprising a subset of the population secondary battery cells, and a population of pressure-applying structures, wherein members of the cell array are held by the frame in relation to members of the population of pressure-applying structures such that members of the population of pressure-applying structures maintain a pressure against the first or second vertical sides of the hermetically sealed enclosure during cycling of the members of the subset of the secondary battery cell population, such that the interior surfaces of the first and second vertical sides of the hermetically sealed enclosure are maintained in direct contact with the first and second vertical growth constraints.

Embodiment 55. The battery pack according to Embodiment 54, wherein the pressure applying structures apply a total pressure, in combination with ambient pressure, of at least 1.01 atm, to the first or second vertical sides of the hermetically sealed enclosure.

Embodiment 56. The battery pack according to any of Embodiments 54-55, wherein the pressure applying structures apply a total pressure, in combination with ambient pressure, in a range of 1.01 atm to 11 atm, to the first or second vertical sides of the hermetically sealed enclosure.

Embodiment 57. The battery pack according to any of Embodiments 54-56, wherein the pressure applying structures apply a total pressure, in combination with ambient pressure, in a range of 1.1 atm to 2 atm, to the first or second vertical sides of the hermetically sealed enclosure.

Embodiment 58. The battery pack according to any of Embodiments 54-57, wherein the pressure applying structures apply the pressure to both the first and second vertical sides of the hermetically sealed enclosure.

Embodiment 59. The battery pack according to any of Embodiments 54-58, wherein members of the population of pressure-applying structures comprises any of (i) a cooling tube, (ii) a layer of heat-exchange material, (iii) a portion of the frame, and (iv) a member of the population of sealed secondary battery cells.

Embodiment 60. The battery pack according to any of Embodiments 54-59, wherein the cell array comprises a plurality of the sealed secondary battery cells arranged adjacent to one another with vertical sides of the sealed secondary battery cells facing one another, and wherein members of the population of pressure applying structures apply pressure at first and second vertical end sides located at opposing vertical ends of the cell array, and wherein members of the cell array that are internal to the cell array vertical ends have a pressure applied on vertical surfaces thereof by vertically adjacent secondary battery cells in the cell array.

Embodiment 61. The battery pack according to any of Embodiments 54-60, wherein a pressure applied by members of the population of pressure-applying structures to the first or second vertical sides of members of the sealed secondary battery cell population is greater than a pressure applied to transverse or horizontal sides of members of the sealed secondary battery cell population.

Embodiment 62. A method of charging a sealed secondary battery cell, comprising charging at a rate of at least 1 C.

Embodiment 63. The method of Embodiment 62, comprising charging at a rate of at least 2C.

Embodiment 64. The method of Embodiment 62, comprising charging at a rate of at least 3C.

Embodiment 65. The method of Embodiment 62, comprising charging at a rate of at least 4C.

Embodiment 66. The method of Embodiment 62, comprising charging at a rate of at least 6C.

Embodiment 67. The method of Embodiment 62, comprising charging at a rate of at least 10C.

Embodiment 68. The method of Embodiment 62, comprising charging at a rate of at least 12C.

Embodiment 69. The method of Embodiment 62, comprising charging at a rate of at least 15C.

Embodiment 70. The method of Embodiment 62, comprising charging at a rate of at least 18C.

Embodiment 71. The method of Embodiment 62, comprising charging at a rate of at least 20C.

Embodiment 72. The method of Embodiment 62, comprising charging at a rate of at least 30C.

Embodiment 73. The method according to any of Embodiments 62-72, comprising charging at the rate until the sealed secondary battery cell reaches at least 80% of its rated capacity.

Embodiment 74. The method according to Embodiment 73, comprising charging at the rate until the sealed secondary battery cell reaches at least 85% of its rated capacity.

Embodiment 75. The method according to Embodiment 73, comprising charging at the rate until the sealed secondary battery cell reaches at least 90% of its rated capacity.

Embodiment 76. The method according to Embodiment 73, comprising charging at the rate until the sealed secondary battery cell reaches at least 95% of its rated capacity.

Embodiment 77. The method according to Embodiment 73, comprising charging at the rate until the sealed secondary battery cell reaches at least 99% of its rated capacity.

Embodiment 78. The method according to any of Embodiments 62-77, wherein the sealed secondary battery cell is charged at the charging rate, and discharged, at least 200 times.

Embodiment 79. The method according to Embodiment 78, wherein the sealed secondary battery cell is charged at the charging rate, and discharged, at least 300 times.

Embodiment 80. The method according to Embodiment 78, wherein the sealed secondary battery cell is charged at the charging rate, and discharged, at least 400 times.

Embodiment 81. The method according to Embodiment 78, wherein the sealed secondary battery cell is charged at the charging rate, and discharged, at least 500 times.

Embodiment 82. The method according to Embodiment 78, wherein the sealed secondary battery cell is charged at the charging rate, and discharged, at least 600 times.

Embodiment 83. The method according to Embodiment 78, wherein the sealed secondary battery cell is charged at the charging rate, and discharged, at least 800 times.

Embodiment 84. The method according to Embodiment 78, wherein the sealed secondary battery cell is charged at the charging rate, and discharged, at least 1000 times.

Embodiment 85. The method according to any of Embodiments 62-84, wherein the sealed secondary battery cell comprises any of the electrode assemblies according to Embodiments 1-38, any of the sealed secondary battery cell of Embodiments 39-52, or is a part of the cell array in any of the battery pack in Embodiments 53-61, or any combination thereof.

Embodiment 86. The sealed secondary battery cell of any of Embodiments 39-52, battery pack of any of Embodiments 53-61, or method of any of Embodiments 62-85, wherein the sealed secondary battery cell has a rated capacity of at least 500 mAmp·hr.

Embodiment 87. The sealed secondary battery cell, battery pack, or method of Embodiment 86, wherein the sealed secondary battery cell has a rated capacity of at least 1 Amp·hr.

Embodiment 88. The sealed secondary battery cell, battery pack, or method of Embodiment 86, wherein the sealed secondary battery cell has a rated capacity of at least 5 Amp·hr.

Embodiment 89. The sealed secondary battery cell, battery pack, or method of Embodiment 86, wherein the sealed secondary battery cell has a rated capacity of at least 10 Amp·hr.

Embodiment 90. The sealed secondary battery cell, battery pack, or method of Embodiment 86, wherein the sealed secondary battery cell has a rated capacity of at least 15 Amp·hr.

Embodiment 91. The sealed secondary battery cell, battery pack, or method of Embodiment 86, wherein the sealed secondary battery cell has a rated capacity of at least 20 Amp·hr.

Embodiment 92. The sealed secondary battery cell, battery pack, or method of Embodiment 86, wherein the sealed secondary battery cell has a rated capacity of at least 25 Amp·hr.

Embodiment 93. The sealed secondary battery cell, battery pack, or method of Embodiment 86, wherein the sealed secondary battery cell has a rated capacity of at least 30 Amp·hr.

Embodiment 94. The sealed secondary battery cell, battery pack, or method of Embodiment 86, wherein the sealed secondary battery cell has a rated capacity of at least 35 Amp·hr.

Embodiment 95. The sealed secondary battery cell, battery pack, or method of Embodiment 86, wherein the sealed secondary battery cell has a rated capacity of at least 50 Amp·hr.

Embodiment 96. The electrode assembly, sealed secondary battery cell, battery pack or method of any preceding Embodiment, wherein the electrode assembly has a substantially polyhedral shape, with opposing longitudinal end surfaces that are substantially flat, opposing vertical surfaces that are substantially flat, and opposing transverse surfaces that are substantially flat.

Embodiment 97. The electrode assembly, sealed secondary battery cell, battery pack or method of any preceding Embodiment, wherein the ratio of $V_{SA}$ to each of $L_{SA}$ and $T_{SA}$ is at least 5:1.

Embodiment 98. The sealed secondary battery cell of any of Embodiments 39-52 and 86-97, battery pack of any of Embodiments 53-61 and 86-97, or method of any of Embodiments 62-97, wherein the hermetically sealed enclosure comprises a polymer enclosure material.

Embodiment 99. The sealed secondary battery cell of any of Embodiments 39-52 and 86-98, battery pack of any of Embodiments 53-61 and 86-98, or method of any of Embodiments 62-98, wherein the hermetically sealed enclosure comprises a hermetically sealed case.

Embodiment 100. The battery pack of any of Embodiments 53-61 and 86-99, or method of any of Embodiments 62-99, wherein the frame holds the cell array comprising the subset of the population of secondary battery cells that are arranged adjacent to one another, with the members being arranged in the cell array such that opposing vertical surfaces of adjacent members in the cell array face each other to form an adjacent facing pair of vertical surfaces, each adjacent facing pair of vertical surfaces in the cell array comprising adjacent facing regions thereof.

Embodiment 101. The sealed secondary battery cell, battery pack, or method of any preceding Embodiment, wherein the sealed secondary battery cell comprises a core energy density of at least 700 Whr/liter, wherein the core energy density is defined as the rated capacity of the sealed secondary battery cell divided by the combined weight of the electrode structures, counter-electrode structures, separators, and any electrolyte that makes up the electrode assembly of the sealed secondary battery cell.

Embodiment 102. The sealed secondary battery cell, battery pack, or method of any preceding Embodiment, wherein the sealed secondary battery cell comprises a core energy density of at least 800 Whr/liter, wherein the core energy density is defined as the rated capacity of the sealed secondary battery cell divided by the combined weight of the electrode structures, counter-electrode structures, separators, and any electrolyte that makes up the electrode assembly of the sealed secondary battery cell.

Embodiment 103. The sealed secondary battery cell, battery pack, or method of any preceding Embodiment, wherein the sealed secondary battery cell comprises a core energy density of at least 900 Whr/liter, wherein the core energy density is defined as the rated capacity of the sealed secondary battery cell divided by the combined weight of the electrode structures, counter-electrode structures, separators, and any electrolyte that makes up the electrode assembly of the sealed secondary battery cell.

Embodiment 104. The sealed secondary battery cell, battery pack, or method of any preceding Embodiment, wherein the sealed secondary battery cell comprises a core energy density of at least 1000 Whr/liter, wherein the core energy density is defined as the rated capacity of the sealed secondary battery cell divided by the combined weight of the electrode structures, counter-electrode structures, separators, and any electrolyte that makes up the electrode assembly of the sealed secondary battery cell.

Embodiment 105. The sealed secondary battery cell, battery pack, or method of any preceding Embodiment, wherein the sealed secondary battery cell comprises a core energy density of at least 1100 Whr/liter, wherein the core energy density is defined as the rated capacity of the sealed secondary battery cell divided by the combined weight of the electrode structures, counter-electrode structures, separators, and any electrolyte that makes up the electrode assembly of the sealed secondary battery cell.

Embodiment 106. The sealed secondary battery cell, battery pack, or method of any preceding Embodiment, wherein the sealed secondary battery cell comprises a core energy density of at least 1200 Whr/liter, wherein the core energy density is defined as the rated capacity of the sealed secondary battery cell divided by the combined weight of the electrode structures, counter-electrode structures, separators, and any electrolyte that makes up the electrode assembly of the sealed secondary battery cell.

Embodiment 107. The electrode assembly, sealed secondary battery cell, battery pack, or method of any preceding Embodiment, wherein members of the electrode structure population comprise layers of electrode active material, and wherein the layers of electrode active material comprise a thickness in the longitudinal direction in a range of from 15 microns to 75 microns.

Embodiment 108. The electrode assembly, sealed secondary battery cell, battery pack, or method of any preceding Embodiment, wherein members of the electrode structure population comprise layers of electrode active material, and wherein the layers of electrode active material comprise a thickness in the longitudinal direction in a range of from 20 microns to 60 microns.

Embodiment 109. The electrode assembly, sealed secondary battery cell, battery pack, or method of any preceding Embodiment, wherein members of the electrode structure population comprise layers of electrode active material, and wherein the layers of electrode active material comprise a thickness in the longitudinal direction in a range of from 30 microns to 50 microns.

Embodiment 110. The electrode assembly, sealed secondary battery cell, battery pack, or method of any preceding Embodiment, wherein members of the electrode structure population comprise layers of electrode active material, and wherein the layers of electrode active material comprise a thickness in the longitudinal direction of about 45 microns.

Embodiment 111. The electrode assembly, sealed secondary battery cell, battery pack, or method of any preceding Embodiment, wherein members of the electrode structure population comprise layers of electrode active material, and wherein the layers of electrode active material comprise a porosity in a range of from 10-40%.

Embodiment 112. The electrode assembly, sealed secondary battery cell, battery pack, or method of any preceding Embodiment, wherein members of the electrode structure population comprise layers of electrode active material, and wherein the layers of electrode active material comprise a porosity in a range of from 12-30%.

Embodiment 113. The electrode assembly, sealed secondary battery cell, battery pack, or method of any preceding Embodiment, wherein members of the electrode structure population comprise layers of electrode active material, and wherein the layers of electrode active material comprise a porosity in a range of from 18-20%.

Embodiment 114. The sealed secondary battery cell, battery pack, or method of any preceding Embodiment, wherein the sealed secondary battery cell comprises an electrode busbar that electrically connects to electrode current collectors to pool current from members of the electrode structure population, and comprises a counter-electrode busbar that electrically connects to counter-electrode current collectors to pool current from members of the counter-electrode structure population, and wherein the sealed secondary battery cell further comprises:

an electrode busbar tab that electrically connects the electrode busbar to electrical structures exterior to the sealed secondary battery cell, and a counter-electrode busbar tab that electrically connects the counter-electrode busbar to electrical structures exterior to the sealed secondary battery cell, and a cooling system configured to cool the electrode or counter-electrode busbar tab, via one or more of convective or conductive cooling.

Embodiment 115. The sealed secondary battery cell, battery pack, or method of Embodiment 114, wherein the cooling is by cooling tubes provided adjacent the tabs, or by a heat sink that is thermally connected to the tabs.

Embodiment 116: A battery pack comprising a population of secondary battery cells chargeable between a charged state and a discharged state, and a frame to hold secondary battery cells in the battery pack, wherein (a) members of the secondary battery cell population have a rated capacity and comprise a hermetically sealed enclosure and an electrode assembly within the hermetically sealed enclosure, (b) the electrode assembly has substantially polyhedral shape mutually perpendicular transverse, longitudinal and vertical axes corresponding to the x, y and z axes, respectively, of an imaginary three-dimensional Cartesian coordinate system, (c) the electrode assembly comprises opposing longitudinal surfaces that are substantially flat and are separated from each other in the longitudinal direction, and a lateral surface surrounding an electrode assembly longitudinal axis $A_{EA}$ and connecting the opposing longitudinal end surfaces, the lateral surface having opposing vertical surfaces that are substantially flat and are separated from each other in the vertical direction on opposing vertical sides of the longitudinal axis, and opposing transverse surfaces that are substantially flat and are separated from each other in the transverse direction on opposing transverse sides of the longitudinal axis, wherein the opposing longitudinal surfaces have a combined surface area, $L_{SA}$, the opposing transverse surfaces have a combined surface area, $T_{SA}$, the opposing vertical surfaces have a combined surface area, $V_{SA}$, and the ratio of $V_{SA}$ to each of $L_{SA}$ and $T_{SA}$ is at least 5:1, (d) the electrode assembly further comprises an electrode structure population, an electrically insulating separator population, and a counter-electrode structure population, wherein members of the electrode structure, electrically insulating separator and counter-electrode structure populations are arranged in an alternating sequence in the longitudinal direction within the electrode assembly, and (e) wherein the frame holds a cell array comprising a subset of the population of secondary battery cells that are arranged adjacent to one another, with the members being arranged in the cell array such that opposing vertical surfaces of adjacent members in the cell array face each other to form an adjacent facing pair of vertical surfaces, each adjacent facing pair of vertical surfaces in the cell array comprising adjacent facing regions thereof.

Embodiment 117: The electrode assembly, sealed secondary battery cell, battery pack, or method according to any preceding Embodiment, wherein adjacent facing regions of each adjacent facing pair of vertical surfaces in the cell array are (separated by less than 1 mm from each other in the vertical direction, Embodiment 118: The electrode assembly, sealed secondary battery cell, battery pack, or method according to any preceding Embodiment, wherein adjacent facing regions of each adjacent facing pair of vertical surfaces in the cell array are in thermal contact with one another via a thermally conductive pathway having thermally conductive material that has a thermal conductivity of at least 1 W/mK.

Embodiment 119: The electrode assembly, sealed secondary battery cell, battery pack, or method according to any preceding Embodiment, wherein the substantially flat opposing longitudinal, vertical, and transverse surfaces make up a combined surface area of greater than 66% of the electrode assembly.

Embodiment 120: The electrode assembly, sealed secondary battery cell, battery pack, or method according to any preceding Embodiment, wherein the substantially flat opposing longitudinal, vertical, and transverse surfaces make up a combined surface area of greater than 75% of the electrode assembly.

Embodiment 121: The electrode assembly, sealed secondary battery cell, battery pack, or method according to any preceding Embodiment, wherein the substantially flat opposing longitudinal, vertical, and transverse surfaces make up a combined surface area of greater than 80% of the electrode assembly.

Embodiment 122: The electrode assembly, sealed secondary battery cell, battery pack, or method according to any preceding Embodiment, wherein the substantially flat opposing longitudinal, vertical, and transverse surfaces make up a combined surface area of greater than 95% of the electrode assembly.

Embodiment 123: The electrode assembly, sealed secondary battery cell, battery pack, or method according to any preceding Embodiment, wherein the substantially flat opposing longitudinal, vertical, and transverse surfaces make up a combined surface area of greater than 99% of the electrode assembly.

Embodiment 124: The electrode assembly, sealed secondary battery cell, battery pack, or method according to any preceding Embodiment, wherein the substantially flat opposing longitudinal, vertical, and transverse surfaces make up a combined surface area corresponding to substantially the entire surface area of the electrode assembly.

Embodiment 125: The electrode assembly, sealed secondary battery cell, battery pack, or method according to any preceding Embodiment, wherein the battery pack comprises a cell array with a number of secondary battery cells in the cell array that is 2.

Embodiment 126: The electrode assembly, sealed secondary battery cell, battery pack, or method according to any preceding Embodiment, the battery pack comprises a cell array with a number of secondary battery cells in the cell array that is 3.

Embodiment 127: The electrode assembly, sealed secondary battery cell, battery pack, or method according to any preceding Embodiment, wherein the battery pack comprises a cell array with a number of secondary battery cells in the cell array that is greater than 3.

Embodiment 128: The electrode assembly, sealed secondary battery cell, battery pack, or method according to any preceding Embodiment, wherein subset of secondary battery cells in the cell array are in thermal contact with each other.

Embodiment 129: The electrode assembly, sealed secondary battery cell, battery pack, or method according to any preceding Embodiment, wherein the battery pack comprises a plurality of cell arrays.

Embodiment 130: The electrode assembly, sealed secondary battery cell, battery pack, or method according to any preceding Embodiment, further comprising a cooling tube to cool the cell array.

Embodiment 131: The electrode assembly, sealed secondary battery cell, battery pack, or method according to any preceding Embodiment, wherein the cell array comprises opposing cell array end surfaces separated from each other in the vertical direction, and wherein the cooling tube extends in direction orthogonal to the vertical direction and along at least one of the opposing cell array end surfaces of the cell array to cool the at least one opposing cell array end surface.

Embodiment 132: The electrode assembly, sealed secondary battery cell, battery pack, or method according to any preceding Embodiment, wherein the cell array comprises two secondary battery cells arranged adjacent to one another, such that the opposing vertical surfaces of the two secondary battery cells comprise a pair of external surfaces separated from each other in the vertical direction and located towards the opposing cell array end surfaces, and wherein the cooling tube extends in the orthogonal direction along at least one vertical cell array end surface that is adjacent to one of the pair of external surfaces to cool the external surface of the two adjacent secondary battery cells.

Embodiment 133: The electrode assembly, sealed secondary battery cell, battery pack, or method according to any preceding Embodiment, wherein the cell array comprises three secondary battery cells arranged adjacent to one another, such that the opposing vertical surfaces of the three secondary battery cells comprise a pair of external surfaces separated in the vertical direction located towards the opposing cell array end surfaces, and wherein the cooling tube extends in the orthogonal direction along at least one cell array end surface that is adjacent to one of the pair of external surfaces to cool the external surface of the three adjacent secondary battery cells.

Embodiment 134: The electrode assembly, sealed secondary battery cell, battery pack, or method according to any preceding Embodiment, wherein the cell array comprises more than three secondary battery cells arranged adjacent to one another, such that the opposing vertical surfaces of the more than three secondary battery cells comprise a pair of external surfaces located towards the opposing cell array end surfaces, and wherein the cooling tube extends in the orthogonal direction along at least one cell array end surface that is adjacent to one of the pair of external surfaces to cool the external surface of the more than three adjacent secondary battery cells.

Embodiment 135: The electrode assembly, sealed secondary battery cell, battery pack, or method according to any preceding Embodiment, comprising thermally conductive material between the cooling tube and the external surface of the secondary battery cell adjacent to the cooling tube.

Embodiment 136: The electrode assembly, sealed secondary battery cell, battery pack, or method according to any preceding Embodiment, wherein the thermally conductive material comprises a thermally conductive adhesive.

Embodiment 137: The electrode assembly, sealed secondary battery cell, battery pack, or method according to any preceding Embodiment, wherein the thermally conductive material comprises a compressible thermal interface material.

Embodiment 138: The electrode assembly, sealed secondary battery cell, battery pack, or method according to any preceding Embodiment, comprising a first cell array arranged on a first vertical side of the cooling tube, and a second cell array arranged on a second vertical side of the cooling tube, wherein the cooling tube cools the external surfaces of the first and second cell arrays that are adjacent to the cooling tube on each of the first and second vertical sides.

Embodiment 139: The electrode assembly, sealed secondary battery cell, battery pack, or method according to any preceding Embodiment, wherein the cooling tube comprises a first cooling tube, and wherein battery pack further comprises a second cooling tube extending in the same or different direction than the first cooling tube, that is orthogonal to the vertical direction, along the other of the cell array end surfaces that is adjacent to the other of the pair of external surfaces, such that both of the pair of external surfaces of the cell array are cooled.

Embodiment 140: The electrode assembly, sealed secondary battery cell, battery pack, or method according to any preceding Embodiment, wherein the battery pack comprises a plurality of cell arrays alternating with cooling tubes in the vertical direction.

Embodiment 141: The electrode assembly, sealed secondary battery cell, battery pack, or method according to any preceding Embodiment, wherein the battery pack comprises a cooling tube that has a cooling fluid inlet side into which cooling fluid is introduced, and a cooling fluid outlet side that is downstream of the cooling fluid inlet side, wherein the cooling tube is arranged such that the cooling fluid inlet side of the cooling tube passes along a first cell array end surface in a direction orthogonal to the vertical direction, and the cooling fluid outlet side of the cooling tube passes by an opposing second cell array end surface in a direction orthogonal to the vertical direction.

Embodiment 142: The electrode assembly, sealed secondary battery cell, battery pack, or method according to any preceding Embodiment, wherein the battery pack comprises a plurality of cell arrays arranged in a direction orthogonal to the vertical direction, and wherein the cooling tube extends in the orthogonal direction along the plurality of cell arrays to cool the plurality of cell arrays.

Embodiment 143: The electrode assembly, sealed secondary battery cell, battery pack, or method according to any preceding Embodiment, wherein the cooling tube(s) are configured to carry a liquid or gas coolant.

Embodiment 144: The electrode assembly, sealed secondary battery cell, battery pack, or method according to any preceding Embodiment, wherein the battery pack comprises thermally conductive material that comprises a thermally conductive adhesive that adheres adjacent facing regions of adjacent facing pairs of opposing vertical surfaces in the cell array to one another.

Embodiment 145: The electrode assembly, sealed secondary battery cell, battery pack, or method according to any preceding Embodiment, wherein the battery pack comprises thermally conductive material that comprises a compressible thermal interface material disposed between the adjacent facing regions of adjacent facing pairs of opposing vertical surfaces in the cell array.

Embodiment 146: The electrode assembly, sealed secondary battery cell, battery pack, or method according to any of preceding Embodiment, wherein the battery pack comprises thermally conductive material that is disposed between an external surface of the cell array and a surface of an adjacent cooling tube, and comprises any selected from the group of a thermally conductive adhesive and a compressible thermal interface material.

Embodiment 147: The electrode assembly, sealed secondary battery cell, battery pack, or method according to any preceding Embodiment, wherein a first thermally conductive material is provided between the first cell array end surface and a surface of the cooling tube, and a second thermally conductive material is provided between adjacent facing regions of each adjacent facing pair of opposing vertical surfaces in the cell array, and wherein the first thermally conductive material has a higher conductivity than the second thermally conductive material.

Embodiment 148: The electrode assembly, sealed secondary battery cell, battery pack, or method according to any preceding Embodiment, wherein the battery pack comprises cooling tube having a fluid inlet side and a fluid outlet side, and a first thermally conductive material is provided between the first cell array end surface and a surface of the cooling tube on the fluid inlet side, and between the second cell array end surface of the cell array and a surface of the cooling tube on the fluid outlet side, and a second thermally conductive material is provided between adjacent facing regions of each adjacent facing pair of opposing vertical surfaces in the cell array, and wherein the first thermally conductive material has a higher thermal conductivity than the second thermally conductive material.

Embodiment 149: The electrode assembly, sealed secondary battery cell, battery pack, or method according to any preceding Embodiment, wherein a first compressible thermal interface material is provided between the first cell array end surface and a surface of the cooling tube, and a second compressible thermal interface material is provided between adjacent facing regions of each adjacent facing pair of opposing vertical surfaces in the cell array, and wherein the first compressible thermal interface material is thinner than the second compressible thermal interface material.

Embodiment 150: The electrode assembly, sealed secondary battery cell, battery pack, or method according to any preceding Embodiment, wherein the adjacent facing regions of each adjacent facing pair of vertical surfaces in the cell array are separated by less than 0.8 mm from each other.

Embodiment 151: The electrode assembly, sealed secondary battery cell, battery pack, or method according to any preceding Embodiment, wherein the adjacent facing regions of each adjacent facing pair of vertical surfaces in the cell array are separated by less than 0.75 mm from each other.

Embodiment 152: The electrode assembly, sealed secondary battery cell, battery pack, or method according to any preceding Embodiment, wherein the adjacent facing regions of each adjacent facing pair of vertical surfaces in the cell array are separated by less than 0.5 mm from each other.

Embodiment 153: The electrode assembly, sealed secondary battery cell, battery pack, or method according to any preceding Embodiment, wherein the adjacent facing regions of each adjacent facing pair of vertical surfaces in the cell array are separated by less than 0.25 mm from each other.

Embodiment 154: The electrode assembly, sealed secondary battery cell, battery pack, or method according to any preceding Embodiment, wherein the adjacent facing regions of each adjacent facing pair of vertical surfaces in the cell array are separated by less than 0.1 mm from each other.

Embodiment 155: The electrode assembly, sealed secondary battery cell, battery pack, or method according to any preceding Embodiment, wherein the adjacent facing regions of each adjacent facing pair of vertical surfaces in the cell array are separated by less than 0.05 mm from each other.

Embodiment 156: The electrode assembly, sealed secondary battery cell, battery pack, or method according to any preceding Embodiment, wherein the adjacent facing regions of each adjacent facing pair of vertical surfaces in the cell array are separated by less than 0.01 mm from each other.

Embodiment 157: The electrode assembly, sealed secondary battery cell, battery pack, or method according to any preceding Embodiment, wherein the adjacent facing regions of each adjacent facing pair of vertical surfaces in the cell array are separated by less than 0.005 mm from each other.

Embodiment 158: The electrode assembly, sealed secondary battery cell, battery pack, or method according to any preceding Embodiment, wherein the adjacent facing regions of each adjacent facing pair of vertical surfaces in the cell array are separated by less than 0.001 mm from each other.

Embodiment 159: The electrode assembly, sealed secondary battery cell, battery pack, or method according to any preceding Embodiment, wherein thermally conductive pathway extends across at least 20% of the surface areas of the respective adjacent vertical surfaces of the cell array.

Embodiment 160: The electrode assembly, sealed secondary battery cell, battery pack, or method according to any preceding Embodiment, wherein thermally conductive pathway extends across at least 30% of the surface areas of the respective adjacent vertical surfaces of the cell array.

Embodiment 161: The electrode assembly, sealed secondary battery cell, battery pack, or method according to any preceding Embodiment, wherein thermally conductive pathway extends across at least 50%, of the surface areas of the respective adjacent vertical surfaces of the cell array.

Embodiment 162: The electrode assembly, sealed secondary battery cell, battery pack, or method according to any preceding Embodiment, wherein thermally conductive pathway extends across at least 75% of the surface areas of the respective adjacent vertical surfaces of the cell array.

Embodiment 163: The electrode assembly, sealed secondary battery cell, battery pack, or method according to any preceding Embodiment, wherein thermally conductive pathway extends across at least 80% of the surface areas of the respective adjacent vertical surfaces of the cell array.

Embodiment 164: The electrode assembly, sealed secondary battery cell, battery pack, or method according to any preceding Embodiment, wherein thermally conductive pathway extends across at least 90% of the surface areas of the respective adjacent vertical surfaces of the cell array.

Embodiment 165: The electrode assembly, sealed secondary battery cell, battery pack, or method according to any preceding embodiment, wherein thermally conductive pathway extends across at least 95% of the surface areas of the respective adjacent vertical surfaces of the cell array.

Embodiment 166: The electrode assembly, sealed secondary battery cell, battery pack, or method according to any preceding Embodiment, wherein thermally conductive pathway extends across substantially the entirety of the surface areas of the respective adjacent vertical surfaces of the cell array.

Embodiment 167: The electrode assembly, sealed secondary battery cell, battery pack, or method according to any preceding Embodiment, wherein the thermally conductive material between each adjacent facing pair of vertical surface forms a contact patch between the adjacent facing pair that extends across at least 20% of the surface areas of the respective adjacent vertical surfaces of the cell array.

Embodiment 168: The electrode assembly, sealed secondary battery cell, battery pack, or method according to any preceding Embodiment, wherein the thermally conductive material between each adjacent facing pair of vertical surface forms a contact patch between the adjacent facing pair that extends across least 30% of the surface areas of the respective adjacent vertical surfaces of the cell array.

Embodiment 169: The electrode assembly, sealed secondary battery cell, battery pack, or method according to any preceding Embodiment, wherein the thermally conductive material between each adjacent facing pair of vertical surface forms a contact patch between the adjacent facing pair that extends across at least 50% of the surface areas of the respective adjacent vertical surfaces of the cell array.

Embodiment 170: The electrode assembly, sealed secondary battery cell, battery pack, or method according to any preceding Embodiment, wherein the thermally conductive material between each adjacent facing pair of vertical surface forms a contact patch between the adjacent facing pair that extends across at least 75% of the surface areas of the respective adjacent vertical surfaces of the cell array.

Embodiment 171: The electrode assembly, sealed secondary battery cell, battery pack, or method according to any preceding Embodiment, wherein the thermally conductive material between each adjacent facing pair of vertical surface forms a contact patch between the adjacent facing pair that extends across at least 80% of the surface areas of the respective adjacent vertical surfaces of the cell array.

Embodiment 172: The electrode assembly, sealed secondary battery cell, battery pack, or method according to any preceding Embodiment, wherein the thermally conductive material between each adjacent facing pair of vertical surface forms a contact patch between the adjacent facing pair that extends across at least 90% of the surface areas of the respective adjacent vertical surfaces of the cell array.

Embodiment 173: The electrode assembly, sealed secondary battery cell, battery pack, or method according to any preceding Embodiment, wherein the thermally conductive material between each adjacent facing pair of vertical surface forms a contact patch between the adjacent facing pair that extends across at least 95% of the surface areas of the respective adjacent vertical surfaces of the cell array.

Embodiment 174: The electrode assembly, sealed secondary battery cell, battery pack, or method according to any preceding Embodiment, wherein the thermally conductive material between each adjacent facing pair of vertical surface forms a contact patch between the adjacent facing pair that extends across substantially the entirety of the surface areas of the respective adjacent vertical surfaces of the cell array.

Embodiment 175: The electrode assembly, sealed secondary battery cell, battery pack, or method according to any preceding Embodiment, wherein the thermally conductive pathway between each adjacent facing pair of vertical surfaces in the cell array comprises a thermally conductive material with a thermal conductivity of at least 2 W/m K.

Embodiment 176: The electrode assembly, sealed secondary battery cell, battery pack, or method according to any preceding embodiment, wherein the thermally conductive pathway between each adjacent facing pair of vertical surfaces in the cell array comprises a thermally conductive material with a thermal conductivity of at least 3 W/m K.

Embodiment 177: The electrode assembly, sealed secondary battery cell, battery pack, or method according to any preceding Embodiment, wherein the thermally conductive pathway between each adjacent facing pair of vertical surfaces in the cell array comprises a thermally conductive material with a thermal conductivity of at least 5 W/m K.

Embodiment 178: The electrode assembly, sealed secondary battery cell, battery pack, or method according to any preceding Embodiment, wherein the thermally conductive pathway between each adjacent facing pair of vertical surfaces in the cell array comprises a thermally conductive material with a thermal conductivity of at least 10 W/mK.

Embodiment 179: The electrode assembly, sealed secondary battery cell, battery pack, or method according to any preceding Embodiment, wherein the hermetically sealed enclosure comprises upper and lower outer surfaces separated from each other in the vertical direction, and wherein a vertical thickness as measured between the upper and lower outer surfaces is no more than 50 mm.

Embodiment 180: The electrode assembly, sealed secondary battery cell, battery pack, or method according to any preceding Embodiment, wherein the hermetically sealed enclosure comprises upper and lower outer surfaces separated from each other in the vertical direction, and wherein a vertical thickness as measured between the upper and lower outer surfaces is no more than 20 mm.

Embodiment 181: The electrode assembly, sealed secondary battery cell, battery pack, or method according to any preceding Embodiment, wherein the hermetically sealed enclosure comprises upper and lower outer surfaces separated from each other in the vertical direction, and wherein a vertical thickness as measured between the upper and lower outer surfaces is no more than 15 mm.

Embodiment 182: The electrode assembly, sealed secondary battery cell, battery pack, or method according to any preceding Embodiment, wherein the hermetically sealed enclosure comprises upper and lower outer surfaces separated from each other in the vertical direction, and wherein a vertical thickness as measured between the upper and lower outer surfaces is no more than 10 mm.

Embodiment 183: The electrode assembly, sealed secondary battery cell, battery pack, or method according to any preceding Embodiment, wherein the hermetically sealed enclosure comprises upper and lower outer surfaces separated from each other in the vertical direction, and wherein a vertical thickness as measured between the upper and lower outer surfaces is no more than 8 mm.

Embodiment 184: The electrode assembly, sealed secondary battery cell, battery pack, or method according to any preceding Embodiment, wherein the hermetically sealed enclosure comprises upper and lower outer surfaces separated from each other in the vertical direction, and wherein a vertical thickness as measured between the upper and lower outer surfaces is at least 0.5 mm.

Embodiment 185: The electrode assembly, sealed secondary battery cell, battery pack, or method according to any preceding Embodiment, wherein the hermetically sealed enclosure comprises upper and lower outer surfaces separated from each other in the vertical direction, and wherein a vertical thickness as measured between the upper and lower outer surfaces is at least 1 mm.

Embodiment 186: The electrode assembly, sealed secondary battery cell, battery pack, or method according to any preceding Embodiment, wherein the hermetically sealed enclosure comprises upper and lower outer surfaces separated from each other in the vertical direction, and wherein a vertical thickness as measured between the upper and lower outer surfaces is at least 2 mm.

Embodiment 187: The electrode assembly, sealed secondary battery cell, battery pack, or method according to any preceding Embodiment, wherein the hermetically sealed enclosure comprises upper and lower outer surfaces separated from each other in the vertical direction, and wherein a vertical thickness as measured between the upper and lower outer surfaces is at least 3 mm.

Embodiment 188: The electrode assembly, sealed secondary battery cell, battery pack, or method according to any preceding Embodiment, wherein the hermetically sealed enclosure comprises upper and lower outer surfaces separated from each other in the vertical direction, and wherein a vertical thickness as measured between the upper and lower outer surfaces is at least 5 mm.

Embodiment 189: The electrode assembly, sealed secondary battery cell, battery pack, or method according to any preceding Embodiment, wherein the frame holds a cell array comprising two secondary battery cells.

Embodiment 190: The electrode assembly, sealed secondary battery cell, battery pack, or method according to any preceding Embodiment, wherein the frame holds a cell array comprising three secondary battery cells.

Embodiment 191: The electrode assembly, sealed secondary battery cell, battery pack, or method according to any preceding Embodiment, wherein the frame holds a cell array comprising more than three secondary battery cells.

Embodiment 192: The electrode assembly, sealed secondary battery cell, battery pack, or method according to any preceding Embodiment, wherein the frame holds a cooling array comprising at least one cell array and at least one cooling tube.

Embodiment 193: The electrode assembly, sealed secondary battery cell, battery pack, or method according to any preceding Embodiment, wherein the frame holds a cooling array comprising a plurality of cell arrays and cooling tubes.

Embodiment 194: The electrode assembly, sealed secondary battery cell, battery pack, or method according to any preceding Embodiment, wherein the thermally conductive material comprises a compressible thermal interface material comprising any selected from the group consisting of a compressible foam and an elastomeric material.

Embodiment 195: The electrode assembly, sealed secondary battery cell, battery pack, or method according to any preceding Embodiment, wherein the thermally conductive material comprises a compressible thermal interface material comprising any selected from the group consisting of silicone, natural rubber, and synthetic elastomeric material.

Embodiment 196: The electrode assembly, sealed secondary battery cell, battery pack, or method according to any preceding Embodiment, wherein the thermally conductive material comprises a thermally conductive adhesive comprising any selected from the group consisting of an epoxy adhesive, a thermoplastic adhesive, silicone adhesive, and polyurethane adhesive.

Embodiment 197: The electrode assembly, sealed secondary battery thermally conductive material contains electrically insulating ceramic particles to increase thermal conductivity.

Embodiment 198: The electrode assembly, sealed secondary battery cell, battery pack, or method according to any preceding Embodiment, wherein members of the population of sealed secondary battery cells comprise a sealed secondary battery cell that is chargeable between a charged state and a discharged state, the sealed secondary battery cell comprising a hermetically sealed enclosure comprising a polymer enclosure material, an electrode assembly enclosed by the hermetically sealed enclosure, a set of electrode constraints, and a rated capacity of at least 100 mAmp·hr, wherein the electrode assembly has a substantially polyhedral shape with mutually perpendicular transverse, longitudinal and vertical axes corresponding to the x, y and z axes, respectively, of an imaginary three-dimensional Cartesian coordinate system, opposing longitudinal end surfaces that are substantially flat and separated from each other in the longitudinal direction, and a lateral surface surrounding an electrode assembly longitudinal axis $A_{EA}$ and connecting the first and second longitudinal end surfaces, the lateral surface having opposing vertical surfaces that are substantially flat and are separated from each other in the vertical direction on opposing vertical sides of the longitudinal axis, opposing transverse surfaces that are substantially flat and are separated from each other in the transverse direction on opposing transverse sides of the longitudinal axis, wherein the opposing longitudinal surfaces have a combined surface area, $L_{SA}$, the opposing transverse surfaces have a combined surface area, $T_{SA}$, the opposing vertical surfaces have a combined surface area, $V_{SA}$, and the ratio of $V_{SA}$ to each of $L_{SA}$ and $T_{SA}$ is at least 5:1, the electrode assembly further comprises an electrode structure population, an electrically insulating separator population, and a counter-electrode structure population, wherein members of the electrode structure, electrically insulating separator and counter-electrode structure populations are arranged in an alternating sequence, the set of electrode constraints comprises a vertical constraint system comprising first and second vertical growth constraints that are separated from each other in the vertical direction, the first and second vertical growth constraints being connected to members of the population of electrode structures and/or members of the population of counter-electrode structures, and the vertical constraint system being capable of restraining growth of the electrode assembly in the vertical direction, the charged state is at least 75% of a rated capacity of the secondary battery, and the discharged state is less than 25% of a rated capacity of the secondary battery, and the hermetically sealed enclosure comprises opposing external vertical surfaces separated from each other in the vertical direction.

Embodiment 199: The electrode assembly, sealed secondary battery cell, battery pack, or method according to any preceding Embodiment, wherein members of the population of electrode structures and/or members of the population of counter-electrode structures that are connected to the first and second vertical growth constraints have a thickness as measured in the longitudinal direction that is in a range of between 5 and 50 µm.

Embodiment 200: The electrode assembly, sealed secondary battery cell, battery pack, or method according to any preceding Embodiment, wherein members of the population of electrode structures and/or members of the population of counter-electrode structures that are connected to the first and second vertical growth constraints have a yield strength of greater than 70 MPa.

Embodiment 201: The electrode assembly, sealed secondary battery cell, battery pack, or method according to any preceding Embodiment, wherein members of the population of electrode structures and/or members of the population of counter-electrode structures that are connected to the first and second vertical growth constraints have a yield strength of greater than 100 MPa.

Embodiment 202: The electrode assembly, sealed secondary battery cell, battery pack, or method according to any preceding Embodiment, wherein a thickness of the sealed secondary battery cell as measured in the vertical direction between vertically opposing regions of the external vertical surfaces of the hermetically sealed enclosure, is at least 1 mm.

Embodiment 203: The electrode assembly, sealed secondary battery cell, battery pack, or method according to any preceding Embodiment, wherein a thermal conductivity of the secondary battery along a thermally conductive path between the vertically opposing regions of the external vertical surfaces of hermetically sealed enclosure in the vertical direction is at least 2 W/m·K.

Embodiment 204: The electrode assembly, sealed secondary battery cell, battery pack, or method according to any preceding Embodiment, wherein the opposing longitudinal, vertical, and transverse surfaces make up a combined surface area of greater than 66% of the electrode assembly.

Embodiment 205: The electrode assembly, sealed secondary battery cell, battery pack, or method according to any preceding Embodiment, wherein the opposing longitudinal, vertical, and transverse surfaces make up a combined surface area of greater than 75% of the electrode assembly.

Embodiment 206: The electrode assembly, sealed secondary battery cell, battery pack, or method according to any preceding Embodiment, wherein the opposing longitudinal, vertical, and transverse surfaces make up a combined surface area of greater than 80% of the electrode assembly.

Embodiment 207: The electrode assembly, sealed secondary battery cell, battery pack, or method according to any preceding Embodiment, wherein the opposing longitudinal, vertical, and transverse surfaces make up a combined surface area of greater than 95% of the electrode assembly.

Embodiment 208: The electrode assembly, sealed secondary battery cell, battery pack, or method according to any preceding Embodiment, wherein the opposing longitudinal, vertical, and transverse surfaces make up a combined surface area of greater than 99% of the electrode assembly.

Embodiment 209: The electrode assembly, sealed secondary battery cell, battery pack, or method according to any preceding Embodiment, wherein the opposing longitudinal, vertical, and transverse surfaces make up a combined surface area corresponding to substantially the entire surface area of the electrode assembly.

Embodiment 210: The electrode assembly, sealed secondary battery cell, battery pack, or method according to any preceding Embodiment, wherein the set of electrode constraints further comprises first and second longitudinal constraints separated from each other in the longitudinal direction, and connected by a connecting member to restrain growth of the electrode assembly in the longitudinal direction.

Embodiment 211: The electrode assembly, sealed secondary battery cell, battery pack, or method according to any preceding Embodiment, wherein the sealed secondary battery cell has a rated capacity of at least 150 mAmp·hr.

Embodiment 212: The electrode assembly, sealed secondary battery cell, battery pack, or method according to any preceding Embodiment, wherein the sealed secondary battery cell has a rated capacity of at least 200 mAmp·hr.

Embodiment 213: The electrode assembly, sealed secondary battery cell, battery pack, or method according to any preceding Embodiment, wherein the sealed secondary battery cell has a rated capacity of at least 400 mAmp·hr.

Embodiment 214: The electrode assembly, sealed secondary battery cell, battery pack, or method according to any preceding Embodiment, wherein the sealed secondary battery cell has a rated capacity of at least 0.1 Amp·hr.

Embodiment 215: The electrode assembly, sealed secondary battery cell, battery pack, or method according to any preceding Embodiment, wherein the sealed secondary battery cell has a rated capacity of at least 0.5 Amp·hr.

Embodiment 216: The electrode assembly, sealed secondary battery cell, battery pack, or method according to any preceding Embodiment, wherein the sealed secondary battery cell has a rated capacity of at least 1 Amp·hr.

Embodiment 217: The electrode assembly, sealed secondary battery cell, battery pack, or method according to any preceding Embodiment, wherein the sealed secondary battery cell has a rated capacity of at least 3 Amp·hr.

Embodiment 218: The electrode assembly, sealed secondary battery cell, battery pack, or method according to any preceding Embodiment, wherein the sealed secondary battery cell has a rated capacity of at least 5 Amp·hr.

Embodiment 219: The electrode assembly, sealed secondary battery cell, battery pack, or method according to any preceding Embodiment, wherein the thickness of the secondary battery cell as measured between opposing regions of the opposing surfaces of the hermetically sealed enclosure in the vertical direction, is at least 2 mm.

Embodiment 220: The electrode assembly, sealed secondary battery cell, battery pack, or method according to any preceding Embodiment, wherein the thickness of the secondary battery cell as measured between opposing regions of the opposing surfaces of the hermetically sealed enclosure in the vertical direction, is at least 3 mm.

Embodiment 221: The electrode assembly, sealed secondary battery cell, battery pack, or method according to any preceding Embodiment, wherein the thickness of the secondary battery cell as measured between opposing regions of the opposing surfaces of the hermetically sealed enclosure in the vertical direction, is at least 5 mm.

Embodiment 222: The electrode assembly, sealed secondary battery cell, battery pack, or method according to any preceding Embodiment, wherein the thickness of the secondary battery cell as measured between opposing regions of the opposing surfaces of the hermetically sealed enclosure in the vertical direction, is at least 8 mm.

Embodiment 223: The electrode assembly, sealed secondary battery cell, battery pack, or method according to any preceding Embodiment 7, wherein the thickness of the secondary battery cell as measured between opposing regions of the opposing surfaces of the hermetically sealed enclosure in the vertical direction, is at least 10 mm.

Embodiment 224: The electrode assembly, sealed secondary battery cell, battery pack, or method according to any preceding Embodiment, wherein the thermal conductivity of the secondary battery along the thermally conductive path between opposing regions of the opposing surfaces of the hermetically sealed enclosure in the vertical direction is at least 3 W/m·K.

Embodiment 225: The electrode assembly, sealed secondary battery cell, battery pack, or method according to any preceding Embodiment, wherein the thermal conductivity of the secondary battery along the thermally conductive path between opposing regions of the opposing surfaces of the hermetically sealed enclosure in the vertical direction is at least 4 W/m·K.

Embodiment 226: The electrode assembly, sealed secondary battery cell, battery pack, or method according to any preceding Embodiment, wherein the thermal conductivity of the secondary battery along the thermally conductive path between opposing regions of the opposing surfaces of the hermetically sealed enclosure in the vertical direction is at least 5 W/m·K.

Embodiment 227: The electrode assembly, sealed secondary battery cell, battery pack, or method according to any preceding Embodiment, wherein the thermally conductive path is along the vertical direction of members of the population of electrode structures and/or members of the population of counter-electrode structures that are connected to the first and second vertical growth constraints.

Embodiment 228: The electrode assembly, sealed secondary battery cell, battery pack, or method according to any preceding Embodiment, wherein the hermetically sealed enclosure comprises a laminate structure made of sheets of polymeric materials with a flexible sheet of metal material disposed in between.

Embodiment 229: The electrode assembly, sealed secondary battery cell, battery pack, or method according to any preceding Embodiment, wherein the hermetically sealed enclosure comprises a laminate structure made of sheets of polypropylene, aluminum, and nylon, with the aluminum sheet being between the polypropylene and nylon polymeric sheets.

Embodiment 230: The electrode assembly, sealed secondary battery cell, battery pack, or method according to any preceding Embodiment, wherein the first and second vertical growth constraints and/or first and second longitudinal constraints comprise any of metals, alloys, ceramics, glass, plastics, or a combination thereof.

Embodiment 231: The electrode assembly, sealed secondary battery cell, battery pack, or method according to any preceding Embodiment, wherein the first and second vertical growth constraints and/or first and second longitudinal constraints comprise any of stainless steel and aluminum.

Embodiment 232: The electrode assembly, sealed secondary battery cell, battery pack, or method according to any preceding Embodiment, wherein first and second vertical growth constraints have a yield strength of at least 70 MPa.

Embodiment 233: The electrode assembly, sealed secondary battery cell, battery pack, or method according to any preceding Embodiment, wherein first and second vertical growth constraints have a yield strength of at least 100 MPa.

Embodiment 234: The electrode assembly, sealed secondary battery cell, battery pack, or method according to any preceding Embodiment, wherein first and second vertical growth constraints have a yield strength of at least 150 MPa.

Embodiment 235: The electrode assembly, sealed secondary battery cell, battery pack, or method according to any preceding Embodiment, wherein first and second vertical growth constraints have a yield strength of at least 200 MPa.

Embodiment 236: The electrode assembly, sealed secondary battery cell, battery pack, or method according to any preceding Embodiment, wherein first and second vertical growth constraints have a yield strength of at least 300 MPa.

Embodiment 237: The electrode assembly, sealed secondary battery cell, battery pack, or method according to any preceding Embodiment, wherein first and second vertical growth constraints have a yield strength of at least 500 MPa.

Embodiment 238: The electrode assembly, sealed secondary battery cell, battery pack, or method according to any preceding Embodiment, wherein first and second vertical growth constraints have a tensile strength of at least 70 MPa.

Embodiment 239: The electrode assembly, sealed secondary battery cell, battery pack, or method according to any preceding Embodiment, wherein first and second vertical growth constraints have a tensile strength of at least 100 MPa.

Embodiment 240: The electrode assembly, sealed secondary battery, battery pack, or method according to any preceding Embodiment, wherein first and second vertical growth constraints have a tensile strength of at least 150 MPa.

Embodiment 241: The electrode assembly, sealed secondary battery cell, battery pack, or method according to any preceding Embodiment, wherein first and second vertical growth constraints have a tensile strength of at least 200 MPa.

Embodiment 242: The electrode assembly, sealed secondary battery cell, battery pack, or method according to any preceding Embodiment, wherein first and second vertical growth constraints have a tensile strength of at least 300 MPa.

Embodiment 243: The electrode assembly, sealed secondary battery cell, battery pack, or method according to any preceding Embodiment, wherein first and second vertical growth constraints, have a tensile strength of at least 500 MPa.

Embodiment 244: The electrode assembly, sealed secondary battery cell, battery pack, or method according to any preceding Embodiment, wherein first and second longitudinal growth constraints have a yield strength of at least 70 MPa.

Embodiment 245: The electrode assembly, sealed secondary battery cell, battery pack, or method according to any preceding Embodiment, wherein first and second longitudinal growth constraints have a yield strength of at least 100 MPa.

Embodiment 246: The electrode assembly, sealed secondary battery cell, battery pack, or method according to any preceding Embodiment, wherein first and second longitudinal growth constraints, have a yield strength of at least 150 MPa.

Embodiment 247: The electrode assembly, sealed secondary battery cell, battery pack, or method according to any preceding Embodiment, wherein first and second longitudinal growth constraints, have a yield strength of at least 200 MPa.

Embodiment 248: The electrode assembly, sealed secondary battery cell, battery pack, or method according to any preceding Embodiment, wherein first and second longitudinal growth constraints, have a yield strength of at least 300 MPa.

Embodiment 249: The electrode assembly, sealed secondary battery cell, battery pack, or method according to any preceding Embodiment, wherein first and second longitudinal growth constraints, have a yield strength of at least 500 MPa.

Embodiment 250: The electrode assembly, sealed secondary battery cell, battery pack, or method according to any preceding Embodiment, wherein first and second longitudinal growth constraints have a tensile strength of at least 70 MPa.

Embodiment 251: The electrode assembly, sealed secondary battery cell, battery pack, or method according to any preceding Embodiment, wherein first and second longitudinal growth constraints, have a tensile strength of at least 100 MPa.

Embodiment 252: The electrode assembly, sealed secondary battery cell, battery pack, or method according to any preceding Embodiment, wherein first and second longitudinal growth constraints, have a tensile strength of at least 150 MPa.

Embodiment 253: The electrode assembly, sealed secondary battery cell, battery pack, or method according to any preceding Embodiment, wherein first and second longitudinal growth constraints have a tensile strength of at least 200 MPa.

Embodiment 254: The electrode assembly, sealed secondary battery cell, battery pack, or method according to any preceding Embodiment, wherein first and second longitudinal growth constraints have a tensile strength of at least 300 MPa.

Embodiment 255: The electrode assembly, sealed secondary battery cell, battery pack, or method according to any preceding Embodiment, wherein first and second longitudinal growth constraints have a tensile strength of at least 500 MPa.

Embodiment 256: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 150 MPa.

Embodiment 257: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 200 MPa.

Embodiment 258: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 300 MPa.

Embodiment 259: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 500 MPa.

Embodiment 260: The electrode assembly, sealed secondary battery cell, battery pack, or method according to any preceding Embodiment, wherein members of the population of electrode structures and/or members of the population of counter-electrode structures that are connected to the upper and lower sidewalls have a tensile strength of greater than 100 MPa.

Embodiment 261: The electrode assembly, sealed secondary battery cell, battery pack, or method according to any preceding Embodiment, wherein members of the population of electrode structures and/or members of the population of counter-electrode structures that are connected to the upper and lower sidewalls have a tensile strength of greater than 150 MPa.

Embodiment 262: The electrode assembly, sealed secondary battery cell, battery pack, or method according to any preceding Embodiment, wherein members of the population of electrode structures and/or members of the population of counter-electrode structures that are connected to the upper and lower sidewalls have a tensile strength of greater than 200 MPa.

Embodiment 263: The electrode assembly, sealed secondary battery cell, battery pack, or method according to any preceding Embodiment, wherein members of the population of electrode structures and/or members of the population of counter-electrode structures that are connected to the upper and lower sidewalls have a tensile strength of greater than 300 MPa.

Embodiment 264: The electrode assembly, sealed secondary battery cell, battery pack, or method according to any preceding Embodiment, wherein members of the population of electrode structures and/or members of the population of counter-electrode structures that are connected to the upper and lower sidewalls have a tensile strength of greater than 500 MPa.

Embodiment 265: The electrode assembly, sealed secondary battery cell, battery pack, or method according to any preceding Embodiment, wherein the members of the electrode structure and/or counter electrode structure population that are connected to first and second vertical growth constraints have a yield strength of at least 70 MPa.

Embodiment 266: The electrode assembly, sealed secondary battery cell, battery pack, or method according to any preceding Embodiment, wherein the members of the electrode structure and/or counter electrode structure population that are connected to first and second vertical growth constraints have a yield strength of at least 100 MPa.

Embodiment 267: The electrode assembly, sealed secondary battery cell, battery pack, or method according to any preceding Embodiment, wherein the members of the electrode structure and/or counter electrode structure population that are connected to the first and second vertical growth constraints have a yield strength of at least 150 MPa.

Embodiment 268: The electrode assembly, sealed secondary battery cell, battery pack, or method according to any preceding Embodiment, wherein the members of the electrode structure and/or counter electrode structure population that are connected to the first and second vertical growth constraints have a yield strength of at least 200 MPa.

Embodiment 269: The electrode assembly, sealed secondary battery cell, battery pack, or method according to any preceding Embodiment, wherein the members of the electrode structure and/or counter electrode structure population that are connected to the first and second vertical growth constraints have a yield strength of at least 300 MPa.

Embodiment 270: The electrode assembly, sealed secondary battery cell, battery pack, or method according to any preceding Embodiment, wherein the members of the electrode structure and/or counter electrode structure population that are connected to the first and second vertical growth constraints have a yield strength of at least 500 MPa.

Embodiment 271: The electrode assembly, sealed secondary battery cell, battery pack, or method according to any preceding Embodiment, wherein the members of the electrode structure, electrically insulating separator and counter-electrode structure populations are arranged in an alternating sequence in the longitudinal direction.

Embodiment 272: The electrode assembly, sealed secondary battery cell, battery pack, or method according to any preceding Embodiment, wherein the members of the electrode structure population comprise electrode active material layers and electrode current collectors, and members of the counter-electrode structure population comprise counter-electrode active material layers and counter-electrode current collectors.

Embodiment 273: The electrode assembly, sealed secondary battery cell, battery pack, or method according to any preceding Embodiment, and wherein the first and second vertical growth constraints are connected to upper and lower surfaces of members of the electrode structure population and/or counter-electrode structure population.

Embodiment 274: The electrode assembly, sealed secondary battery cell, battery pack, or method according to any preceding Embodiment, and wherein the first and second vertical growth constraints are connected to upper and lower surfaces of electrode current collector layers of members of the electrode structure population, and/or upper and lower surfaces of counter-electrode current collectors of members of the counter-electrode population.

Embodiment 275: The electrode assembly, sealed secondary battery cell, battery pack, or method according to any preceding Embodiment, wherein the electrode current collectors and/or counter-electrode current collectors that are connected to the first and second vertical growth constraints comprise a thickness as measured in the longitudinal direction that is in a range of between 5 and 50 µm.

Embodiment 276: The electrode assembly, sealed secondary battery cell, battery pack, or method according to any preceding Embodiment, wherein the electrode current collectors and/or counter-electrode current collectors that are connected to the first and second vertical growth constraints comprise a yield strength of greater than 100 MPa.

Embodiment 277: The electrode assembly, sealed secondary battery cell, battery pack, or method according to any preceding Embodiment, wherein the first and second vertical growth constraints constrain growth in the vertical direction such that any increase in the Feret diameter of the electrode assembly over 20 consecutive cycles is less than 2%.

Embodiment 278: The electrode assembly, sealed secondary battery cell, battery pack, or method according to any preceding Embodiment, wherein the first and second vertical growth constraints constrain growth in the vertical direction such that any increase in the Feret diameter of the electrode assembly over 30 consecutive cycles is less than 2%.

Embodiment 279: The electrode assembly, sealed secondary battery cell, battery pack, or method according to any preceding Embodiment, wherein the first and second vertical growth constraints constrain growth in the vertical direction such that any increase in the Feret diameter of the electrode assembly over 50 consecutive cycles is less than 2%.

Embodiment 280: The electrode assembly, sealed secondary battery cell, battery pack, or method according to any preceding Embodiment, wherein the first and second vertical growth constraints constrain growth in the vertical direction such that any increase in the Feret diameter of the electrode assembly over 80 consecutive cycles is less than 2%.

Embodiment 281: The electrode assembly, sealed secondary battery cell, battery pack, or method according to any preceding Embodiment, wherein the first and second vertical growth constraints constrain growth in the vertical direction such that any increase in the Feret diameter of the electrode assembly over 100 consecutive cycles is less than 2%.

Embodiment 282: The electrode assembly, sealed secondary battery cell, battery pack, or method according to any preceding Embodiment, wherein the first and second longitudinal growth constraints comprise a thickness in the longitudinal direction of at least 150 um.

Embodiment 283: The electrode assembly, sealed secondary battery cell, battery pack, or method according to any preceding Embodiment, wherein the first and second longitudinal growth constraints comprise a thickness in the longitudinal direction of at least 250 um.

Embodiment 284: The electrode assembly, sealed secondary battery cell, battery pack, or method according to any preceding Embodiment, wherein the first and second longitudinal growth constraints comprise a thickness in the longitudinal direction of at least 400 um.

Embodiment 285: The electrode assembly, sealed secondary battery cell, battery pack, or method according to any preceding Embodiment, wherein members of the population of electrode structures and/or members of the population of counter-electrode structures are connected to the first and second vertical growth constraints by any one or more of one or more of adhering, gluing, welding, joining, bonding, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Embodiment 286: The electrode assembly, sealed secondary battery cell, battery pack, or method according to any preceding Embodiment, wherein members of the population of sealed secondary battery cells comprise a sealed secondary battery cell chargeable between a charged state and a discharged state, the sealed secondary battery cell comprising a hermetically sealed case, an electrode assembly enclosed by the hermetically sealed case, and a rated capacity of at least 100 mAmp·hr, wherein, the electrode assembly has a substantially polyhedral shape with mutually perpendicular transverse, longitudinal and vertical axes corresponding to the x, y and z axes, respectively, of an imaginary three-dimensional Cartesian coordinate system, opposing longitudinal end surfaces that are substantially flat and separated from each other in the longitudinal direction, and a lateral surface surrounding an electrode assembly longitudinal axis $A_{EA}$ and connecting the first and second longitudinal end surfaces, the lateral surface having opposing vertical surfaces that are substantially flat and separated from each other in the vertical direction on opposing vertical sides of the longitudinal axis, and opposing transverse surfaces that are substantially flat and separated from each other in the transverse direction on opposing transverse sides of the longitudinal axis, wherein the opposing longitudinal surfaces have a combined surface area, $L_{SA}$, the opposing transverse surfaces have a combined surface area, $T_{SA}$, the opposing vertical surfaces have a combined surface area, $V_{SA}$, and the ratio of $V_{SA}$ to each of $L_{SA}$ and $T_{SA}$ is at least 5:1, the electrode assembly further comprises an electrode structure population, an electrically insulating separator population, and a counter-electrode structure population, wherein members of the electrode structure, electrically insulating separator and counter-electrode structure populations are arranged in an alternating sequence, the hermetically sealed case has opposing first and second case ends separated in the longitudinal direction, and a case sidewall that connects the first and second case ends, the opposing first and second case ends and case sidewall forming a hermetic seal about the electrode assembly, wherein the case sidewall comprises upper and lower sidewalls separated from each other in the vertical direction, and first and second transverse sidewalls that are separated from each other in the transverse direction, wherein members of the electrode structure population and/or counter-electrode structure are connected to the upper and lower sidewalls of the hermetically sealed case to restrain growth of the electrode assembly in the vertical direction during cycling of the secondary battery between the charged and discharged states, and the charged state is at least 75% of a rated capacity of the secondary battery, and the discharged state is less than 25% of a rated capacity of the secondary battery.

Embodiment 287: The electrode assembly, sealed secondary battery cell, battery pack, or method according to any preceding Embodiment, wherein members of the population of electrode structures and/or members of the population of counter-electrode structures that are connected to the upper and lower sidewalls have a thickness as measured in the longitudinal direction that is in a range of between 5 and 50 μm.

Embodiment 288: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 70 MPa.

Embodiment 289: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 100 MPa.

Embodiment 290: The electrode assembly, sealed secondary battery cell, battery pack, or method according to any preceding Embodiment, wherein a thickness of the secondary battery as measured in the vertical direction between vertically opposing regions of external vertical surfaces of the upper and lower sidewalls of the hermetically sealed case, is at least 1 mm.

Embodiment 291: The electrode assembly, sealed secondary battery cell, battery pack, or method according to any preceding Embodiment, wherein a thermal conductivity of the secondary battery along a thermally conductive path between the vertically opposing regions of the external vertical surfaces of the upper and lower sidewalls of the hermetically sealed case in the vertical direction is at least 7.5 W/m·K.

Embodiment 292: The electrode assembly, sealed secondary battery cell, battery pack, or method according to any preceding Embodiment, wherein the opposing longitudinal, vertical, and transverse surfaces make up a combined surface area of greater than 66% of the electrode assembly.

Embodiment 293: The electrode assembly, sealed secondary battery cell, battery pack, or method according to any preceding Embodiment, wherein the opposing longitudinal, vertical, and transverse surfaces make up a combined surface area of greater than 75% of the electrode assembly.

Embodiment 294: The electrode assembly, sealed secondary battery cell, battery pack, or method according to any preceding Embodiment, wherein the opposing longitudinal, vertical, and transverse surfaces make up a combined surface area of greater than 80% of the electrode assembly.

Embodiment 295: The electrode assembly, sealed secondary battery opposing longitudinal, vertical, and transverse surfaces make up a combined surface area of greater than 95% of the electrode assembly.

Embodiment 296: The electrode assembly, sealed secondary battery cell, battery pack, or method according to any preceding Embodiment, wherein the opposing longitudinal, vertical, and transverse surfaces make up a combined surface area of greater than 99% of the electrode assembly.

Embodiment 297: The electrode assembly, sealed secondary battery cell, battery pack, or method according to any preceding Embodiment, wherein the opposing longitudinal, vertical, and transverse surfaces make up a combined surface area corresponding to substantially the entire surface area of the electrode assembly.

Embodiment 298: The electrode assembly, sealed secondary battery cell, battery pack, or method according to any preceding Embodiment, wherein the opposing first and second case ends are connected together by one or more of the upper and lower sidewalls of the case, and restrain growth of the electrode assembly in the longitudinal direction.

Embodiment 299: The electrode assembly, sealed secondary battery cell, battery pack, or method according to any preceding Embodiment, wherein the sealed secondary battery further comprises a set of electrode constraints internal to the hermetically sealed case, the set of electrode constraints comprising a vertical constraint system comprising first and second vertical growth constraints that are separated from each other in the vertical direction, the first and second vertical growth constraints being connected to members of the population of electrode structures and/or members of the population of counter-electrode structures, and the vertical constraint system being capable of restraining growth of the electrode assembly in the vertical direction, and wherein the first and second vertical growth constraints are connected to the respective upper and lower sidewalls, to indirectly connect the members of the population of electrode structures and/or members of the population of counter-electrode structures to the upper and lower sidewalls.

Embodiment 300: The electrode assembly, sealed secondary battery cell, battery pack, or method according to any preceding Embodiment, wherein the set of electrode constraints that are internal to the hermetically sealed case further comprise a longitudinal constraint system comprising first and second longitudinal constraints separated from each other in the longitudinal direction, and connected by a connecting member to restrain growth of the electrode assembly in the longitudinal direction.

Embodiment 301: The electrode assembly, sealed secondary battery cell, battery pack, or method according to any preceding Embodiment, wherein the sealed secondary battery has a rated capacity of at least 150 mAmp·hr.

Embodiment 302: The electrode assembly, sealed secondary battery cell, battery pack, or method according to any preceding Embodiment, wherein the sealed secondary battery has a rated capacity of at least 200 mAmp·hr.

Embodiment 303: The electrode assembly, sealed secondary battery cell, battery pack, or method according to any preceding Embodiment 7, wherein the sealed secondary battery has a rated capacity of at least 400 mAmp·hr.

Embodiment 304: The electrode assembly, sealed secondary battery cell, battery pack, or method according to any preceding Embodiment 8, wherein the sealed secondary battery has a rated capacity of at least 0.1 Amp·hr.

Embodiment 305: The electrode assembly, sealed secondary battery cell, battery pack, or method according to any preceding Embodiment, wherein the sealed secondary battery has a rated capacity of at least 0.5 Amp·hr.

Embodiment 306: The electrode assembly, sealed secondary battery cell, battery pack, or method according to any preceding Embodiment, wherein the sealed secondary battery has a rated capacity of at least 1 Amp·hr.

Embodiment 307: The electrode assembly, sealed secondary battery cell, battery pack, or method according to any preceding Embodiment, wherein the sealed secondary battery has a rated capacity of at least 3 Amp·hr.

Embodiment 308: The electrode assembly, sealed secondary battery cell, battery pack, or method according to any preceding Embodiment, wherein the sealed secondary battery has a rated capacity of at least 5 Amp·hr.

Embodiment 309: The electrode assembly, sealed secondary battery cell, battery pack, or method according to any preceding Embodiment, wherein between vertically opposing regions of external vertical surfaces of the upper and lower sidewalls of the hermetically sealed case, is at least 2 mm.

Embodiment 310: The electrode assembly, sealed secondary battery cell, battery pack, or method according to any preceding Embodiment, wherein between vertically opposing regions of external vertical surfaces of the upper and lower sidewalls of the hermetically sealed case, is at least 3 mm.

Embodiment 311: The electrode assembly, sealed secondary battery cell, battery pack, or method according to any preceding Embodiment, wherein between vertically opposing regions of external vertical surfaces of the upper and lower sidewalls of the hermetically sealed case, is at least 5 mm.

Embodiment 312: The electrode assembly, sealed secondary battery cell, battery pack, or method according to any preceding Embodiment, wherein between vertically opposing regions of external vertical surfaces of the upper and lower sidewalls of the hermetically sealed case, is at least 8 mm.

Embodiment 313: The electrode assembly, sealed secondary battery cell, battery pack, or method according to any preceding Embodiment, wherein between vertically opposing regions of external vertical surfaces of the upper and lower sidewalls of the hermetically sealed case, is at least 10 mm.

Embodiment 314: The electrode assembly, sealed secondary battery cell, battery pack, or method according to any preceding Embodiment, wherein the thermal conductivity of the secondary battery along the thermally conductive path between vertically opposing regions of external vertical surfaces of the upper and lower sidewalls of the hermetically sealed case in the vertical direction is at least 8 W/m·K.

Embodiment 315: The electrode assembly, sealed secondary battery cell, battery pack, or method according to any preceding Embodiment, wherein the thermal conductivity of the secondary battery along the thermally conductive path between vertically opposing regions of external vertical surfaces of the upper and lower sidewalls of the hermetically sealed case in the vertical direction is at least 10 W/m·K.

Embodiment 316: The electrode assembly, sealed secondary battery cell, battery pack, or method according to any preceding Embodiment, wherein the thermal conductivity of the secondary battery along the thermally conductive path between vertically opposing regions of external vertical surfaces of the upper and lower sidewalls of the hermetically sealed case in the vertical direction is at least 15 W/m·K.

Embodiment 317: The electrode assembly, sealed secondary battery cell, battery pack, or method according to any preceding Embodiment, wherein the thermally conductive path is along the vertical direction of members of the population of electrode structures and/or members of the population of counter-electrode structures that are connected to the upper and lower sidewalls.

Embodiment 318: The electrode assembly, sealed secondary battery cell, battery pack, or method according to any preceding Embodiment, wherein the hermetically sealed case comprises a metal material comprising any selected from the group consisting of stainless steel, aluminum, titanium, beryllium, beryllium, copper, nickel, and alloys thereof.

Embodiment 319: The electrode assembly, sealed secondary battery cell, battery pack, or method according to any preceding Embodiment, wherein the upper and lower sidewalls comprise any of stainless steel and aluminum.

Embodiment 320: The electrode assembly, sealed secondary battery cell, battery pack, or method according to any preceding Embodiment, wherein the first and second vertical growth constraints and/or first and second longitudinal constraints comprise any of metals, alloys, ceramics, glass, plastics, or a combination thereof.

Embodiment 321: The electrode assembly, sealed secondary battery cell, battery pack, or method according to any preceding Embodiment, wherein the first and second vertical growth constraints and/or first and second longitudinal constraints comprise any of stainless steel and aluminum.

Embodiment 322: The electrode assembly, sealed secondary battery cell, battery pack, or method according to any preceding Embodiment, wherein upper and lower sidewalls, either alone or in combination with first and second vertical growth constraints, have a yield strength of at least 70 MPa.

Embodiment 323: The electrode assembly, sealed secondary battery cell, battery pack, or method according to any preceding Embodiment, wherein upper and lower sidewalls, either alone or in combination with first and second vertical growth constraints, have a yield strength of at least 100 MPa.

Embodiment 324: The electrode assembly, sealed secondary battery cell, battery pack, or method according to any preceding Embodiment, wherein upper and lower sidewalls, either alone or in combination with first and second vertical growth constraints, have a yield strength of at least 150 MPa.

Embodiment 325: The electrode assembly, sealed secondary battery cell, battery pack, or method according to any preceding Embodiment, wherein upper and lower sidewalls, either alone or in combination with first and second vertical growth constraints, have a yield strength of at least 200 MPa.

Embodiment 326: The electrode assembly, sealed secondary battery cell, battery pack, or method according to any preceding Embodiment, wherein upper and lower sidewalls, either alone or in combination with first and second vertical growth constraints, have a yield strength of at least 300 MPa.

Embodiment 327: The electrode assembly, sealed secondary battery cell, battery pack, or method according to any preceding Embodiment, wherein upper and lower sidewalls, either alone or in combination with first and second vertical growth constraints, have a yield strength of at least 500 MPa.

Embodiment 328: The electrode assembly, sealed secondary battery cell, battery pack, or method according to any preceding Embodiment, wherein upper and lower sidewalls, either alone or in combination with first and second vertical growth constraints, have a tensile strength of at least 70 MPa.

Embodiment 329: The electrode assembly, sealed secondary battery cell, battery pack, or method according to any preceding Embodiment, wherein upper and lower sidewalls, either alone or in combination with first and second vertical growth constraints, have a tensile strength of at least 100 MPa.

Embodiment 330: The electrode assembly, sealed secondary battery cell, battery pack, or method according to any preceding Embodiment, wherein upper and lower sidewalls, either alone or in combination with first and second vertical growth constraints, have a tensile strength of at least 150 MPa.

Embodiment 331: The electrode assembly, sealed secondary battery cell, battery pack, or method according to any preceding Embodiment, wherein upper and lower sidewalls, either alone or in combination with first and second vertical growth constraints, have a tensile strength of at least 200 MPa.

Embodiment 332: The electrode assembly, sealed secondary battery cell, battery pack, or method according to any preceding Embodiment, wherein upper and lower sidewalls, either alone or in combination with first and second vertical growth constraints, have a tensile strength of at least 300 MPa.

Embodiment 333: The electrode assembly, sealed secondary battery cell, battery pack, or method according to any preceding Embodiment, wherein upper and lower sidewalls, either alone or in combination with first and second vertical growth constraints, have a tensile strength of at least 500 MPa.

Embodiment 334: The electrode assembly, sealed secondary battery cell, battery pack, or method according to any preceding Embodiment, wherein the first and second case ends, either alone or in combination with first and second longitudinal growth constraints, have a yield strength of at least 70 MPa.

Embodiment 335: The electrode assembly, sealed secondary battery cell, battery pack, or method according to any preceding Embodiment, wherein the first and second case ends, either alone or in combination with first and second longitudinal growth constraints, have a yield strength of at least 100 MPa.

Embodiment 336: The electrode assembly, sealed secondary battery cell, battery pack, or method according to any preceding Embodiment, wherein the first and second case ends, either alone or in combination with first and second longitudinal growth constraints, have a yield strength of at least 150 MPa.

Embodiment 337: The electrode assembly, sealed secondary battery cell, battery pack, or method according to any preceding Embodiment, wherein the first and second case ends, either alone or in combination with first and second longitudinal growth constraints, have a yield strength of at least 200 MPa.

Embodiment 338: The electrode assembly, sealed secondary battery cell, battery pack, or method according to any preceding Embodiment, wherein the first and second case ends, either alone or in combination with first and second longitudinal growth constraints, have a yield strength of at least 300 MPa.

Embodiment 339: The electrode assembly, sealed secondary battery cell, battery pack, or method according to any preceding Embodiment, wherein the first and second case ends, either alone or in combination with first and second longitudinal growth constraints, have a yield strength of at least 500 MPa.

Embodiment 340: The electrode assembly, sealed secondary battery cell, battery pack, or method according to any preceding Embodiment, wherein the first and second case ends, either alone or in combination with first and second longitudinal growth constraints, have a tensile strength of at least 70 MPa.

Embodiment 341: The electrode assembly, sealed secondary battery cell, battery pack, or method according to any preceding Embodiment, wherein the first and second case ends, either alone or in combination with first and second longitudinal growth constraints, have a tensile strength of at least 100 MPa.

Embodiment 342: The electrode assembly, sealed secondary battery cell, battery pack, or method according to any preceding Embodiment, wherein the first and second case ends, either alone or in combination with first and second longitudinal growth constraints, have a tensile strength of at least 150 MPa.

Embodiment 343: The electrode assembly, sealed secondary battery cell, battery pack, or method according to any preceding Embodiment, wherein the first and second case ends, either alone or in combination with first and second longitudinal growth constraints, have a tensile strength of at least 200 MPa.

Embodiment 344: The electrode assembly, sealed secondary battery cell, battery pack, or method according to any preceding Embodiment, wherein the first and second case ends, either alone or in combination with first and second longitudinal growth constraints, have a tensile strength of at least 300 MPa.

Embodiment 345: The electrode assembly, sealed secondary battery cell, battery pack, or method according to any preceding Embodiment, wherein the first and second case ends, either alone or in combination with first and second longitudinal growth constraints, have a tensile strength of at least 500 MPa.

Embodiment 346: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 70 MPa.

Embodiment 347: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 150 MPa.

Embodiment 348: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 200 MPa.

Embodiment 349: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 300 MPa.

Embodiment 350: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 500 MPa.

Embodiment 351: The electrode assembly, sealed secondary battery cell, battery pack, or method according to any preceding Embodiment, wherein members of the population of electrode structures and/or members of the population of counter-electrode structures that are connected to the upper and lower sidewalls have a tensile strength of greater than 70 MPa.

Embodiment 352: The electrode assembly, sealed secondary battery cell, battery pack, or method according to any preceding Embodiment, wherein members of the population of electrode structures and/or members of the population of counter-electrode structures that are connected to the upper and lower sidewalls have a tensile strength of greater than 100 MPa.

Embodiment 353: The electrode assembly, sealed secondary battery cell, battery pack, or method according to any preceding Embodiment, wherein members of the population of electrode structures and/or members of the population of counter-electrode structures that are connected to the upper and lower sidewalls have a tensile strength of greater than 150 MPa.

Embodiment 354: The electrode assembly, sealed secondary battery cell, battery pack, or method according to any preceding Embodiment, wherein members of the population of electrode structures and/or members of the population of counter-electrode structures that are connected to the upper and lower sidewalls have a tensile strength of greater than 200 MPa.

Embodiment 355: The electrode assembly, sealed secondary battery cell, battery pack, or method according to any preceding Embodiment, wherein members of the population of electrode structures and/or members of the population of counter-electrode structures that are connected to the upper and lower sidewalls have a tensile strength of greater than 300 MPa.

Embodiment 356: The electrode assembly, sealed secondary battery cell, battery pack, or method according to any preceding Embodiment, wherein members of the population of electrode structures and/or members of the population of counter-electrode structures that are connected to the upper and lower sidewalls have a tensile strength of greater than 500 MPa.

Embodiment 357: The electrode assembly, sealed secondary battery cell, battery pack, or method according to any preceding Embodiment, wherein the members of the electrode structure, electrically insulating separator and counter-electrode structure populations are arranged in an alternating sequence in the longitudinal direction.

Embodiment 358: The electrode assembly, sealed secondary battery cell, battery pack, or method according to any preceding Embodiment, wherein the members of the electrode structure population comprise electrode active material layers and electrode current collector layers, and members of the counter-electrode structure population comprise counter-electrode active material layers and counter-electrode current collector layers.

Embodiment 359: The electrode assembly, sealed secondary battery cell, battery pack, or method according to any preceding Embodiment, wherein the upper and lower sidewalls are connected to upper and lower surfaces of members of the electrode structure population and/or counter-electrode structure population.

Embodiment 360: The electrode assembly, sealed secondary battery cell, battery pack, or method according to any preceding Embodiment, wherein the upper and lower sidewalls are connected to upper and lower surfaces of electrode current collectors of members of the electrode structure population, and/or upper and lower surfaces of counter-electrode current collectors of members of the counter-electrode population.

Embodiment 361: The electrode assembly, sealed secondary battery cell, battery pack, or method according to any preceding Embodiment, wherein the first and second vertical growth constraints are connected to upper and lower surfaces of members of the electrode structure population and/or counter-electrode structure population.

Embodiment 362: The electrode assembly, sealed secondary battery cell, battery pack, or method according to any preceding Embodiment, wherein first and second vertical growth constraints are connected to upper and lower surfaces of electrode current collectors of members of the electrode structure population, and/or upper and lower surfaces of counter-electrode current collectors of members of the counter-electrode population.

Embodiment 363: The electrode assembly, sealed secondary battery cell, battery pack, or method according to any preceding Embodiment, wherein the electrode and/or counter-electrode current collectors that are connected to the upper and lower sidewalls comprise a thickness as measured in the longitudinal direction that is in a range of between 5 and 50 μm.

Embodiment 364: The electrode assembly, sealed secondary battery cell, battery pack, or method according to any preceding Embodiment, wherein the electrode and/or counter-electrode current collectors that are connected to the upper and lower sidewalls comprise a yield strength of greater than 100 MPa.

Embodiment 365: The electrode assembly, sealed secondary battery cell, battery pack, or method according to any preceding Embodiment, wherein the upper and lower sidewalls connected to the members of the electrode structure population or counter-electrode structure population, alone or together with the internal vertical constraint system constrain growth in the vertical direction such that any increase in the Feret diameter of the electrode assembly over 20 consecutive cycles is less than 2%.

Embodiment 366: The electrode assembly, sealed secondary battery cell, battery pack, or method according to any preceding Embodiment, wherein the upper and lower sidewalls connected to the members of the electrode structure population or counter-electrode structure population, alone or together with the internal vertical constraint system constrain growth in the vertical direction such that any increase in the Feret diameter of the electrode assembly over 30 consecutive cycles is less than 2%.

Embodiment 367: The electrode assembly, sealed secondary battery cell, battery pack, or method according to any preceding Embodiment, wherein the upper and lower sidewalls connected to the members of the electrode structure population or counter-electrode structure population, alone or together with the internal vertical constraint system constrain growth in the vertical direction such that any increase in the Feret diameter of the electrode assembly over 50 consecutive cycles is less than 2%.

Embodiment 368: The electrode assembly, sealed secondary battery cell, battery pack, or method according to any preceding Embodiment, wherein the upper and lower sidewalls connected to the members of the electrode structure population or counter-electrode structure population, alone or together with the internal vertical constraint system constrain growth in the vertical direction such that any increase in the Feret diameter of the electrode assembly over 80 consecutive cycles is less than 2%.

Embodiment 369: The electrode assembly, sealed secondary battery cell, battery pack, or method according to any preceding Embodiment, wherein the upper and lower sidewalls connected to the members of the electrode structure population or counter-electrode structure population, alone or together with the internal vertical constraint system constrain growth in the vertical direction such that any increase in the Feret diameter of the electrode assembly over 100 consecutive cycles is less than 2%.

Embodiment 370: The electrode assembly, sealed secondary battery cell, battery pack, or method according to any preceding Embodiment, wherein the first and second longitudinal growth constraints comprise a thickness in the longitudinal direction of at least 150 um.

Embodiment 371: The electrode assembly, sealed secondary battery cell, battery pack, or method according to any preceding Embodiment, wherein the first and second longitudinal growth constraints comprise a thickness in the longitudinal direction of at least 250 um.

Embodiment 372: The electrode assembly, sealed secondary battery cell, battery pack, or method according to any preceding Embodiment, wherein the first and second longitudinal growth constraints comprise a thickness in the longitudinal direction of at least 400 um.

Embodiment 373: The electrode assembly, sealed secondary battery cell, battery pack, or method according to any preceding Embodiment, wherein members of the population of electrode structures and/or members of the population of counter-electrode structures are connected directly to the upper and lower sidewalls.

Embodiment 374: The electrode assembly, sealed secondary battery cell, battery pack, or method according to any preceding Embodiment, wherein members of the population of electrode structures and/or members of the population of counter-electrode structures are connected directly to the upper and lower sidewalls by any one or more of one or more of adhering, gluing, welding, bonding, joining, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Embodiment 375: The electrode assembly, sealed secondary battery cell, battery pack, or method according to any preceding Embodiment, wherein the members of the population of electrode structures and/or members of the population of counter-electrode structures are connected indirectly to the upper and lower sidewalls.

Embodiment 376: The electrode assembly, sealed secondary battery cell, battery pack, or method according to any preceding Embodiment, wherein members of the population of electrode structures and/or members of the population of counter-electrode structures are connected via first and second vertical growth constraints to the upper and lower sidewalls.

Embodiment 377: The electrode assembly, sealed secondary battery cell, battery pack, or method according to any preceding Embodiment, wherein the members of the population of electrode structures and/or members of the population of counter-electrode structures are connected directly to first and second vertical growth constraints by any one or more of one or more of adhering, gluing, welding, bonding, joining, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Embodiment 378: The electrode assembly, sealed secondary battery cell, battery pack, or method according to any preceding Embodiment, wherein the first and second vertical growth constraints are connected to the respective upper and lower sidewalls by any one or more of adhering, gluing, welding, bonding, soldering, sintering, joining, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Embodiment 379: The electrode assembly, sealed secondary battery cell, battery pack, or method according to any preceding Embodiment, wherein the members of the population of electrode structures comprise electrode current collectors having opposing upper and lower end surfaces in the vertical direction, and members of the population of counter-electrode structures comprise counter-electrode current collectors having opposing upper and lower end surfaces in the vertical direction, and wherein the upper and lower sidewalls and/or first and second vertical growth constraints are connected to vertical end surfaces of the electrode or counter-electrode current collectors of the subset of members of the electrode or counter-electrode population.

Embodiment 380. The electrode assembly, sealed secondary battery cell, battery pack, or method of any preceding Embodiment, wherein the first and second vertical growth constraints comprise apertures through the vertical thicknesses thereof.

Embodiment 381. The electrode assembly, sealed secondary battery cell, battery pack, or method of any preceding Embodiment, where the surface area of the opposing longitudinal end surfaces is less than 33% of the surface area of the electrode assembly.

Embodiment 382. The electrode assembly, sealed secondary battery cell, battery pack, or method of any preceding Embodiment, wherein for members of the secondary battery cell population, a length $L_E$ of each member of the electrode structure population and a length $L_{CE}$ of each member of the counter-electrode structure population are measured in the transverse direction of their central longitudinal axis $A_E$ and $A_{CE}$, a width $W_E$ of each member of the electrode structure population and a width $W_{CE}$ of each member of the counter-electrode structure population are measured in the longitudinal direction, and a height $H_E$ of each member the electrode structure population and a height $H_{CE}$ of each member of the counter-electrode structure population is measured in the vertical direction that is perpendicular to the central longitudinal axis $A_E$ or $A_{CE}$ of each such member and to the longitudinal direction, the ratio of $L_E$ to each of $W_E$ and $H_E$ of each member of the electrode structure population being at least 5:1, respectively, the ratio of $H_E$ to $W_E$ for each member of the electrode structure population being between 0.4:1 and 1000:1, and the ratio of $L_{CE}$ to each of $W_{CE}$ and $H_{CE}$ of each member of the counter-electrode structure population being at least 5:1, respectively, the ratio of $H_{CE}$ to $W_{CE}$ for each member of the counter-electrode structure population being between 0.4:1 and 1000:1.

Embodiment 383. The electrode assembly, sealed secondary battery cell, battery pack, or method of any preceding Embodiment, wherein for members of the population of secondary battery cells, the electrode assembly has a maximum width $W_{EA}$, measured in the longitudinal direction, a maximum length $L_{EA}$ bounded by the lateral surface and measured in the transverse direction, and a maximum height $H_{EA}$, bounded by the lateral surface and measured in the vertical direction, and the ratio of each of $L_{EA}$, and $W_{EA}$, to $H_{EA}$, is at least 2:1.

Embodiment 384. The electrode assembly, sealed secondary battery cell, battery pack, or method of any preceding Embodiment, wherein a projection of members of the electrode structure population and the counter electrode structure populations onto the first longitudinal surface circumscribes a first projected area and a projection of the members of the electrode structure population and the counter electrode structure population onto the second longitudinal surface circumscribes a second projected area, and wherein the first and second longitudinal growth constraints comprises first and second compression members that overlie the first and second projected areas.

Embodiment 385. The electrode assembly, sealed secondary battery, battery pack, or method of any preceding Embodiment, wherein the opposing first and second ends of the hermetically sealed case, or the first and second longitudinal growth constraints, either alone or in combination with one another maintain a pressure on the electrode assembly in the longitudinal direction that exceeds the pressure maintained on the electrode assembly in the each of the two directions that are mutually perpendicular and perpendicular to the longitudinal direction.

Embodiment 386. The electrode assembly, sealed secondary battery cell, battery pack, or method of any preceding Embodiment, wherein the opposing first and second ends of the hermetically sealed case, or the first and second longitudinal growth constraints, either alone or in combination with one another maintain a pressure on the electrode assembly in the longitudinal direction that exceeds the pressure maintained on the electrode assembly in the each of the two directions that are mutually perpendicular and perpendicular to the longitudinal direction by a factor of at least 3.

Embodiment 387. The electrode assembly, sealed secondary battery cell, battery pack, or method of any preceding Embodiment, wherein opposing first and second ends of the hermetically sealed case, or the first and second longitudinal growth constraints, either alone or in combination with one another maintain a pressure on the electrode assembly in the longitudinal direction that exceeds the pressure maintained on the electrode assembly in the each of the two directions that are mutually perpendicular and perpendicular to the longitudinal direction by a factor of at least 4.

Embodiment 388. The electrode assembly, sealed secondary battery cell, battery pack, or method of any preceding Embodiment, wherein the opposing first and second ends of the hermetically sealed case, or the first and second longitudinal growth constraints, either alone or in combination with one another maintain a pressure on the electrode assembly in the longitudinal direction that exceeds the pressure maintained on the electrode assembly in the each of the two directions that are mutually perpendicular and perpendicular to the longitudinal direction by a factor of at least 5.

Embodiment 389. The electrode assembly, sealed secondary battery cell, battery pack, or method of any preceding Embodiment, wherein the opposing first and second ends of the hermetically sealed case, or the first and second longitudinal growth constraints, either alone or in combination with one another, restrain growth of the electrode assembly in the longitudinal direction such that any increase in the Feret diameter of the electrode assembly in the longitudinal direction over 20 consecutive cycles is less than 20%.

Embodiment 390. The electrode assembly, sealed secondary battery cell, battery pack, or method of any preceding Embodiment, wherein the opposing first and second ends of the hermetically sealed case, or the first and second longitudinal growth constraints, either alone or in combination with one another, restrain growth of the electrode assembly in the longitudinal direction such that any increase in the Feret diameter of the electrode assembly in the longitudinal direction over 10 consecutive cycles is less than 10%

Embodiment 391. The electrode assembly, sealed secondary battery cell, battery pack, or method of any preceding Embodiment, wherein the opposing first and second ends of the hermetically sealed case, or the first and second longitudinal growth constraints, either alone or in combination with one another, restrain growth of the electrode assembly in the longitudinal direction such that any increase in the Feret diameter of the electrode assembly in the longitudinal direction over 5 consecutive cycles is less than 10%.

Embodiment 392. The electrode assembly, sealed secondary battery cell, battery pack, or method of any preceding Embodiment, wherein the opposing first and second ends of the hermetically sealed case, or the first and second longitudinal growth constraints, either alone or in combination with one another restrain growth of the electrode assembly in the longitudinal direction such that any increase in the Feret diameter of the electrode assembly in the longitudinal direction is less than 1% per cycle.

Embodiment 393. The electrode assembly, sealed secondary battery cell, battery pack, or method of any preceding Embodiment, wherein the upper and lower sidewalls of the hermetically sealed case, or the first and second vertical growth constraints, either alone or in combination with one another, restrain growth of the electrode assembly in the vertical direction, such that any increase in the Feret diameter of the electrode assembly in the vertical direction over 20 consecutive cycles is less than 20%

Embodiment 394. The electrode assembly, sealed secondary battery cell, battery pack, or method of any preceding Embodiment, wherein the upper and lower sidewalls of the hermetically sealed case, or the first and second vertical growth constraints, either alone or in combination with one another, restrain growth of the electrode assembly in the vertical direction, such that any increase in the Feret diameter of the electrode assembly in the vertical direction over 10 consecutive cycles is less than 10%

Embodiment 395. The electrode assembly, sealed secondary battery cell, battery pack, or method of any preceding Embodiment, wherein the upper and lower sidewalls of the hermetically sealed case, or the first and second vertical growth constraints, either alone or in combination with one another, restrain growth of the electrode assembly in the vertical direction, such that any increase in the Feret diameter of the electrode assembly in the vertical direction over 5 consecutive cycles is less than 10%.

Embodiment 396. The electrode assembly, sealed secondary battery cell, battery pack, or method of any preceding Embodiment, wherein the upper and lower sidewalls of the hermetically sealed case, or the first and second vertical growth constraints, either alone or in combination with one another, restrain growth of the electrode assembly in the vertical direction, such that any increase in the Feret diameter of the electrode assembly in the vertical direction is less than 1% per cycle.

Embodiment 397. The electrode assembly, sealed secondary battery cell, battery pack, or method of any preceding Embodiment, wherein (i) members of the population of electrode structures are anode structures and members of the population of counter-electrode structures are cathode structures, or (ii) members of the population of electrode structures are cathode structures and members of the population of electrode structures are anode structures.

Embodiment 398. The electrode assembly, sealed secondary battery cell, battery pack, or method of any preceding Embodiment, wherein members of the population of electrode structures are anode structures comprising anodically active material layers, and members of the population of counter-electrode structures are cathode structures comprising cathodically active material layers.

Embodiment 399. The electrode assembly, sealed secondary battery cell, battery pack, or method of any preceding Embodiment, wherein carrier ions are contained within the hermetically sealed battery enclosure.

Embodiment 400. The electrode assembly, sealed secondary battery cell, battery pack, or method of any preceding Embodiment, wherein members of the population of electrode structures comprises anode active material comprising any one of more of carbon materials, graphite, soft or hard carbons, metals, semi-metals, alloys, oxides, compounds capable of forming an alloy with lithium, tin, lead, magnesium, aluminum, boron, gallium, silicon, Si/C composites, Si/graphite blends, $SiO_x$, porous Si, intermetallic Si alloys, indium, zirconium, germanium, bismuth, cadmium, antimony, silver, zinc, arsenic, hafnium, yttrium, lithium, sodium, lithium titanate, palladium, lithium metals, carbon, petroleum cokes, activated carbon, graphite, silicon compounds, silicon alloys, tin compounds, non-graphitizable carbon, graphite-based carbon, $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0 < x \leq 1$; $1 \leq y \leq 3$; $1 \leq z \leq 8$), a lithium alloy, a silicon-based alloy, a tin-based alloy; a metal oxide, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, a conductive polymer, polyacetylene, Li—Co—Ni-based material, crystalline graphite, natural graphite, synthetic graphite, amorphous carbon, Kish graphite, pyrolytic carbon, mesophase pitch-based carbon fibers, meso-carbon microbeads, mesophase pitches, graphitized carbon fiber, high-temperature sintered carbon, petroleum, coal tar pitch derived cokes, tin oxide, titanium nitrate, lithium metal film, an alloy of lithium and one or more types of metals selected from the group consisting of Na, K, Rb, Cs, Fr, Be, Mg, Ca, Sr, Ba, Ra, Al and Sn, a metal compound capable of alloying and/or intercalating with lithium selected from any of Si, Al, C, Pt, Sn, Pb, Ir, Ni, Cu, Ti, Na, K, Rb, Cs, Fr, Be, Ca, Sr, Sb, Ba, Ra, Ge, Zn, Bi, In, Mg, Ga, Cd, a Sn alloy, an Al alloy, a metal oxide capable of doping and dedoping lithium ions, $SiO_v$ ($0 < v < 2$), $SnO_2$, vanadium oxide, lithium vanadium oxide, a composite including a metal compound and carbon material, a Si—C composite, a Sn—C composite, a transition metal oxide, $Li_4/3Ti_5/3O_4$, SnO, a carbonaceous material, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite, and a composition of the formula $Na_xSn_{y-z}M_z$ disposed between layers of the layered carbonaceous material, wherein M is Ti, K, Ge, P, or a combination thereof, and $0 < x \leq 15$, $1 \leq z \leq 5$, and $0 \leq z \leq 1$, as well as oxides, alloys, nitrides, fluorides of any of the foregoing, and any combination of any of the foregoing.

Embodiment 401. The electrode assembly, sealed secondary battery cell, battery pack, or method of any preceding Embodiment, wherein the anode active material comprises at least one of lithium metal, a lithium metal alloy, silicon, silicon alloy, silicon oxide, tin, tin alloy, tin oxide, and a carbon-containing material.

Embodiment 402. The electrode assembly, sealed secondary battery cell, battery pack, or method of any preceding Embodiment, wherein the anode active material comprises at least one of silicon and silicon oxide.

Embodiment 403. The electrode assembly, sealed secondary battery cell, battery pack, or method of any preceding Embodiment, wherein the anode active material comprises at least one of lithium and lithium metal alloy.

Embodiment 404. The electrode assembly, sealed secondary battery cell, battery pack, or method of any preceding Embodiment, wherein the anode active material comprises a carbon-containing material.

Embodiment 405. The electrode assembly, sealed secondary battery cell, battery pack, or method of any preceding Embodiment, wherein members of the population of electrically insulating separators comprise microporous separator material permeated with non-aqueous liquid electrolyte.

Embodiment 406. The electrode assembly, sealed secondary battery cell, battery pack, or method of any preceding Embodiment, wherein members of the population of electrically insulating separators comprise solid electrolyte.

Embodiment 407. The electrode assembly, sealed secondary battery cell, battery pack, or method of any preceding Embodiment, wherein members of the population of electrically insulating separators comprise a ceramic material, glass, or garnet material.

Embodiment 408. The electrode assembly, sealed secondary battery cell, battery pack, or method of any preceding Embodiment, the electrode assembly comprising an electrolyte selected from the group consisting of non-aqueous liquid electrolytes, gel electrolytes, solid electrolytes and combinations thereof.

Embodiment 409. The electrode assembly, sealed secondary battery cell, battery pack, or method of any preceding Embodiment, wherein the electrode assembly comprises a liquid electrolyte.

Embodiment 410. The electrode assembly, sealed secondary battery cell, battery pack, or method of any preceding Embodiment, wherein the electrode assembly comprises an aqueous liquid electrolyte.

Embodiment 411. The electrode assembly, sealed secondary battery cell, battery pack, or method of any preceding Embodiment, wherein the electrode assembly comprises a non-aqueous liquid electrolyte.

Embodiment 412. The electrode assembly, sealed secondary battery cell, battery pack, or method of any preceding Embodiment, wherein the electrode assembly comprises a gel electrolyte.

Embodiment 413. The electrode assembly, sealed secondary battery cell, battery pack, or method of any preceding Embodiment, wherein the electrically insulating separator comprises a solid electrolyte.

Embodiment 414. The electrode assembly, sealed secondary battery cell, battery pack, or method of any preceding Embodiment, wherein the electrically insulating separator comprises a solid polymer electrolyte.

Embodiment 415. The electrode assembly, sealed secondary battery cell, battery pack, or method of any preceding Embodiment, wherein the electrically insulating separator comprises a solid inorganic electrolyte.

Embodiment 416. The electrode assembly, sealed secondary battery cell, battery pack, or method of any preceding Embodiment, wherein the electrically insulating separator comprises a solid organic electrolyte.

Embodiment 417. The electrode assembly, sealed secondary battery cell, battery pack, or method of any preceding Embodiment, wherein the electrically insulating separator comprises a ceramic electrolyte.

Embodiment 418. The electrode assembly, sealed secondary battery cell, battery pack, or method of any preceding Embodiment, wherein the electrically insulating separator comprises an inorganic electrolyte.

Embodiment 419. The electrode assembly, sealed secondary battery cell, battery pack, or method of any preceding Embodiment, wherein the electrically insulating separator comprises a ceramic.

Embodiment 420. The electrode assembly, sealed secondary battery cell, battery pack, or method of any preceding embodiment wherein the electrically insulating separator comprises a garnet material.

Embodiment 421. The electrode assembly, sealed secondary battery cell, battery pack, or method of any preceding Embodiment, comprising an electrolyte selected from the group consisting of aqueous electrolytes, a non-aqueous liquid electrolyte, a solid polymer electrolyte, a solid ceramic electrolyte, a solid glass electrolyte, a solid garnet electrolyte, a gel polymer electrolyte, an inorganic solid electrolyte, and a molten-type inorganic electrolyte.

Embodiment 422. The electrode assembly, sealed secondary battery cell, battery pack, or method of any preceding Embodiment, wherein members of the population of counter-electrode structures comprise a cathodically active material comprising at least one of transition metal oxides, transition metal sulfides, transition metal nitrides, lithium-transition metal oxides, lithium-transition metal sulfides, lithium-transition metal nitrides, including transition metal oxides, transition metal sulfides, and transition metal nitrides having metal elements having a d-shell or f-shell, and/or where the metal element is any selected from Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au, $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, lithium-containing compounds comprising metal oxides or metal phosphates, compounds comprising lithium, cobalt and oxygen (e.g., $LiCoO_2$), compounds comprising lithium, manganese and oxygen (e.g., $LiMn_2O_4$) compounds comprising lithium iron and phosphate (e.g., LiFePO), lithium manganese oxide, lithium cobalt oxide, lithium nickel oxide, lithium iron phosphate, lithium cobalt oxide ($LiCoO_2$), lithium nickel oxide ($LiNiO_2$), a substituted compound with one or more transition metals, lithium manganese oxide, $Li_{1+x}Mn_{2-x}O_4$(where, x is 0 to 0.33), $LiMnO_3$, $LiMn_2O_3$, $LiMnO_2$, lithium copper oxide ($Li_2CuO_2$), vanadium oxide, $LiV_3O_8$, $LiFe_3O_4$, $V_2O_5$, $Cu_2V_2O_7$, Ni site-type lithium nickel oxide represented by the chemical formula of $LiNi_{1-x}M_xO_2$ (where, M═Co, Mn, Al, Cu, Fe, Mg, B or Ga, and x=0.01 to 0.3), lithium manganese complex oxide represented by the chemical formula of $LiMn_{2-x}M_xO_2$ (where, M═Co, Ni, Fe, Cr, Zn or Ta, and x=0.01 to 0.1), $Li_2Mn_3MO_8$ (where, M═Fe, Co, Ni, Cu or Zn), $LiMn_2O_4$ in which a portion of Li is substituted with alkaline earth metal ions, a disulfide compound, $Fe_2(MoO_4)_3$, a lithium metal phosphate having an olivine crystal structure of Formula 2: $Li_{1+a}Fe_{1-x}M'_x(PO_{4-b})X_b$ wherein M' is at least one selected from Al, Mg, Ni, Co, Mn, Ti, Ga, Cu, V, Nb, Zr, Ce, In, Zn, and Y, X is at least one selected from F, S, and N, $-0.5 \le a \le +0.5$, $0 \le x \le 0.5$, and $0 \le b \le 0.1$, $LiFePO_4$, Li(Fe, Mn)$PO_4$, Li(Fe, Co)$PO_4$, Li(Fe, Ni)$PO_4$, $LiCoO_2$, $LiNiO_2$, $LiMnO_2$, $LiMn_2O_4$, $LiNi_{1-y}Co_yO_2$, $LiCo_{1-y}Mn_yO_2$, $LiNi_{1-y}Mn_yO_2$($0 \le y \le 1$), $Li(Ni_aCo_bMn_c)O_4$($0<a<2$, $0<b<2$, $0<c<2$, and a+b+c=2), $LiMn_{2-z}Ni_zO_4$, $LiMn_{2-z}Co_zO_4$ ($0<z<2$), $LiCoPO_4$ and $LiFePO_4$, elemental sulfur (S8), sulfur series compounds, $Li_2S_n$ ($n \ge 1$), an organosulfur compound, a carbon-sulfur polymer $((C_2S_x)_n$: x=2.5 to 50, $n \ge 2$), an oxide of lithium and zirconium, a composite oxide of lithium and metal (cobalt, manganese, nickel, or a combination thereof), $Li_aA_{1-b}M_bD_2$ (wherein, $0.90 \le a \le 1$, and $0 \le b \le 0.5$), $Li_aE_{1-b}M_bO_{2-c}D_c$ (wherein, $0.90 \le a \le 1$, $0 \le b \le 0.5$, and $0 \le c \le 0.05$), $LiE_{2-b}M_b O_{4-c}D_c$ (wherein, $0 \le b \le 0.5$, and $0 \le c \le 0.05$), $Li_aNi_{1-b-c}Co_bM_cD_\alpha$ (wherein, $0.90 \le a \le 1$, $0 \le b \le 0.5$, $0 \le c \le 0.05$, and $0 \le \alpha \le 2$), $Li_aNi_{1-b-c}Co_bM_cD_\alpha$ (wherein, $0.90 \le a \le 1$, $0 \le c < 0.05$, and $0<\alpha<2$), $Li_aNi_{1-b-c}Co_bM_cO_{2-\alpha}X_2$ (wherein, $0.90 \le a \le 1$, $0 \le c \le 0.05$, and $0 \le c \le 0.05$, and $0<\alpha<2$), $Li_aNi_{1-b-c}Mn_bM_cD_\alpha$ (wherein, $0.90 \le a \le 1$, $0 \le b \le 0.5$, $0 \le c \le 0.05$, and $0<\alpha<2$), $Li_aNi_{1-b-c}Mn_bM_cO_{2-\alpha}X_\alpha$ (wherein, $0.90 \le a \le 1$, $0 \le b \le 0.5$, $0 \le c \le 0.05$, and $0<\alpha<2$), $Li_aNi_{1-b-c}Mn_bM_cO_{2-\alpha}X_2$ (wherein, $0.90 \le a \le 1$, $0 \le b \le 0.5$, $0 \le c \le 0.05$, and $0<\alpha<2$), $Li_aNi_bE_cG_dO_2$ (wherein, $0.90 \le a \le 1$, $0 \le b \le 0.9$, $0=c \le 0.5$, and $0.001 \le d \le 0.1$), $Li_aNi_bCo_cMn_dGeO_2$ (wherein, $0.90 \le a \le 1$, $0 \le b \le 0.9$, $0 \le c \le 0.5$, and $0.001 \le d \le 0.1$), $Li_aNiG_bO_2$ (wherein, $0.90 \le a \le 1$ and $0.001 \le b \le 0.1$), $Li_aCoG_bO_2$ (wherein, $0.90 \le a \le 1$ and $0.001 \le b \le 0.1$)$Li_aMnG_bO_2$ (wherein, $0.90 \le a \le 1$ and $0.001 \le b \le 0.1$), $Li_aMn_2G_bO_4$ (wherein, $0.90 \le a \le 1$ and $0.001 \le b \le 0.1$), $QO_2$, $QS_2$, $LiQS_2$, $V_2O_5$, $LiV_2O_5$, $LiX'O_2$, $LiNiVO_4$, $Li_{(3-f)}J_2(PO_4)_3$ ($0 \le f \le 2$); $Li_{(3-f)}Fe_2(PO_4)_3$ ($0 \le f \le 2$), $LiFePO_4$. (A is Ni, Co, Mn, or a combination thereof; M is Al, Ni, Co, Mn, Cr, Fe, Mg, Sr, V, a rare-earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof; and J is V, Cr, Mn, Co, Ni, Cu, or a combination thereof), $LiCoO_2$, $LiMn_xO_{2x}$(x=1 or 2), $LiNi_{1-x}Mn_xO_{2x}$ ($0<x<1$), $LiNi_{1-x-y}Co_xMn_yO_2$ ($0 \le x \le 0.5$, $0 \le y \le 0.5$), $FePO_4$, a lithium compound, lithium cobalt oxide, lithium nickel oxide, lithium nickel cobalt oxide, lithium nickel cobalt aluminum oxide, lithium nickel cobalt manganese oxide, lithium manganese oxide, lithium iron phosphate, nickel sulfide, copper sulfide, sulfur, iron oxide, vanadium oxide, a sodium containing material, an oxide of the formula $NaM^1{}_aO_2$ (wherein $M^1$ is at least one transition metal element, and $0 \leq a < 1$), $NaFeO_2$, $NaMnO_2$, $NaNiO_2$, $NaCoO_2$, an oxide represented by the formula $NaMn_{1-a}M^1{}_aO_2$ (wherein $M^1$ is at least one transition metal element, and $0 \leq a < 1$), $Na[Ni_{1/2}Mn_{1/2}]O_2$, $Na_{2/3}[Fe_{1/2}Mn_{1/2}]O_2$, an oxide represented by $Na_{0.44}Mn_{1-a}M^1{}_aO_2$ (wherein $M^1$ is at least one transition metal element, and $0 \leq a < 1$), an oxide represented by $Na_{0.7}Mn_{1-a}M^1a\,O_{2.05}$ an (wherein $M^1$ is at least one transition metal element, and $0 \leq a < 1$) an oxide represented by $Na_bM^2{}_cSi_{12}O_{30}$ (wherein $M^2$ is at least one transition metal element, $2 \leq b \leq 6$, and $2 \leq c \leq 5$), $Na_6Fe_2Si_{12}O_{30}$, $Na_2Fe_5Si_{12}O$ (wherein $M^2$ is at least one transition metal element, $2 \leq b \leq 6$, and $2 \leq c \leq 5$), an oxide represented by $Na_dM^3{}_eSi_6O_{18}$ (wherein $M^3$ is at least one transition metal element, $3 \leq d \leq 6$, and $1 \leq e \leq 2$), $Na_2Fe_2Si_6O_{18}$, $Na_2MnFeSi_6O_{18}$ (wherein $M^3$ is at least one transition metal element, $3 \leq d \leq 6$, and $1 \leq e \leq 2$), an oxide represented by $Na_fM^4{}_gSi_2O_6$ (wherein $M^4$ is at least one element selected from transition metal elements, magnesium (Mg) and aluminum (Al), $1 \leq f \leq 2$ and $1 \leq g \leq 2$), a phosphate, $Na_2FeSiO_6$, $NaFePO_4$, $Na_3Fe_2(PO_4)_3$, $Na_3V_2(PO_4)_3$, $Na_4Co_3(PO_4)_2P_2O_7$, a borate, $NaFeBO_4$ or $Na_3Fe_2(BO_4)_3$, a fluoride, $Na_hM^5F_6$ (wherein $M^5$ is at least one transition metal element, and $2 \leq h \leq_3$), $Na_3FeF_6$, $Na_2MnF_6$, a fluorophosphate, $Na_3V_2(PO_4)_2F_3$, $Na_3V_2(PO_4)_2FO_2$, $NaMnO_2$, $Na[Ni_{1/2}Mn_{1/2}]O_2$, $Na_{2/3}[Fe_{1/2}Mn_{1/2}]O_2$, $Na_3V_2(PO_4)_3$, $Na_4Co_3(PO_4)_2P_2O_7$, $Na_3V_2(PO_4)_2F_3$ and/or $Na_3V_2(PO_4)_2FO_2$, as well as any complex oxides and/or other combinations of the foregoing.

Embodiment 423. The electrode assembly, sealed secondary battery cell, battery pack, or method of any preceding Embodiment, wherein the cathodically active material comprises at least one of a transition metal oxide, transition metal sulfide, transition metal nitride, transition metal phosphate, and transition metal nitride.

Embodiment 424. The electrode assembly, sealed secondary battery cell, battery pack, or method of any preceding Embodiment, wherein the cathodically active material comprises a transition metal oxide containing lithium and at least one of cobalt and nickel.

Embodiment 425. The electrode assembly, sealed secondary battery cell, battery pack, or method of any preceding Embodiment, wherein members of the population of electrode structures comprise anode current collectors comprising at least one of copper, nickel, aluminum, stainless steel, titanium, palladium, baked carbon, calcined carbon, indium, iron, magnesium, cobalt, germanium, lithium, a surface treated material of copper or stainless steel with carbon, nickel, titanium, silver, an aluminum-cadmium alloy, and/or alloys thereof.

Embodiment 426. The electrode assembly, sealed secondary battery cell, battery pack, or method of any preceding Embodiment, wherein members of the population of electrode structures comprise anode current collectors comprising at least one of copper, nickel, stainless steel and alloys thereof.

Embodiment 427. The electrode assembly, sealed secondary battery cell, battery pack, or method of any preceding Embodiment, wherein the counter-electrode structures comprise cathode current collectors comprising at least one of stainless steel, aluminum, nickel, titanium, baked carbon, sintered carbon, a surface treated material of aluminum or stainless steel with carbon, nickel, titanium, silver, or an alloy thereof.

Embodiment 428. The electrode assembly, sealed secondary battery cell, battery pack, or method of any preceding Embodiment, wherein the cathode current collectors comprising at least one of stainless steel, aluminum, nickel, titanium, baked carbon, sintered carbon, a surface treated material of aluminum or stainless steel with carbon, silver, or an alloy thereof.

Embodiment 429. The electrode assembly, sealed secondary battery cell, battery pack, or method of any preceding Embodiment, wherein the cathode current collectors comprising aluminum.

Embodiment 430. The electrode assembly, sealed secondary battery cell, battery pack, or method of any preceding Embodiment, wherein the first and second connecting members of the constraint system comprise any of stainless steel, titanium, or glass fiber composite.

Embodiment 431. The electrode assembly, sealed secondary battery cell, battery pack, or method of any preceding Embodiment, wherein the first and second connecting members of the constraint system comprises stainless steel.

Embodiment 432. The electrode assembly, sealed secondary battery cell, battery pack, or method of any preceding Embodiment, wherein the first and second connecting members of the constraint system comprise a coating of insulating material on inner and outer surfaces thereof.

Embodiment 433. The electrode assembly, sealed secondary battery cell, battery pack, or method of any preceding Embodiment, wherein the electrode assembly comprises at least 5 electrode structures and at least 5 counter-electrode structures.

Embodiment 434. The electrode assembly, sealed secondary battery cell, battery pack, or method of any preceding Embodiment, wherein the electrode assembly comprises at least 10 electrode structures and at least 10 counter-electrode structures.

Embodiment 435. The electrode assembly, sealed secondary battery cell, battery pack, or method of any preceding Embodiment, wherein the electrode assembly comprises at least 50 electrode structures and at least 50 counter-electrode structures.

Embodiment 436. The electrode assembly, sealed secondary battery cell, battery pack, or method of any preceding Embodiment, wherein the electrode assembly comprises at least 100 electrode structures and at least 100 counter-electrode structures.

Embodiment 437. The electrode assembly, sealed secondary battery cell, battery pack, or method of any preceding Embodiment, wherein the electrode assembly comprises at least 500 electrode structures and at least 500 counter-electrode structures.

Embodiment 438. A sealed secondary battery cell that is chargeable between a charged state and a discharged state, the sealed secondary battery cell comprising a hermetically sealed enclosure comprising a polymer enclosure material, an electrode assembly enclosed by the hermetically sealed enclosure, a set of electrode constraints, and a rated capacity of at least 100 mAmp·hr, wherein the electrode assembly has a substantially polyhedral shape with mutually perpendicular transverse, longitudinal and vertical axes corresponding to the x, y and z axes, respectively, of an imaginary three-dimensional Cartesian coordinate system, opposing longitudinal end surfaces that are substantially flat and separated from each other in the longitudinal direction, and a lateral surface surrounding an electrode assembly longitudinal axis $A_{EA}$ and connecting the first and second longitudinal end surfaces, the lateral surface having opposing vertical surfaces that are substantially flat and are separated from each other in the vertical direction on opposing vertical sides of the longitudinal axis, opposing transverse surfaces that are substantially flat and are separated from each other in the transverse direction on opposing transverse sides of the longitudinal axis, wherein the opposing longitudinal surfaces have a combined surface area, $L_{SA}$, the opposing transverse surfaces have a combined surface area, $T_{SA}$, the opposing vertical surfaces have a combined surface area, $V_{SA}$, and the ratio of $V_{SA}$ to each of $L_{SA}$ and $T_{SA}$ is at least 5:1, the electrode assembly further comprises an electrode structure population, an electrically insulating separator population, and a counter-electrode structure population, wherein members of the electrode structure, electrically insulating separator and counter-electrode structure populations are arranged in an alternating sequence, the set of electrode constraints comprises a vertical constraint system comprising first and second vertical growth constraints that are separated from each other in the vertical direction, the first and second vertical growth constraints being connected to members of the population of electrode structures and/or members of the population of counter-electrode structures, and the vertical constraint system being capable of restraining growth of the electrode assembly in the vertical direction, the charged state is at least 75% of a rated capacity of the secondary battery cell, and the discharged state is less than 25% of a rated capacity of the secondary battery cell, and the hermetically sealed enclosure comprises opposing external vertical surfaces separated from each other in the vertical direction.

Embodiment 439: The electrode assembly, sealed secondary battery cell, battery pack, or method according to any preceding Embodiment, wherein members of the population of electrode structures and/or members of the population of counter-electrode structures that are connected to the first and second vertical growth constraints have a thickness as measured in the longitudinal direction that is in a range of between 5 and 50 µm.

Embodiment 440: The electrode assembly, sealed secondary battery cell, battery pack, or method according to any preceding Embodiment, wherein members of the population of electrode structures and/or members of the population of counter-electrode structures that are connected to the first and second vertical growth constraints have a yield strength of greater than 70 MPa.

Embodiment 441: The electrode assembly, sealed secondary battery cell, battery pack, or method according to any preceding Embodiment, wherein members of the population of electrode structures and/or members of the population of counter-electrode structures that are connected to the first and second vertical growth constraints have a yield strength of greater than 100 MPa.

Embodiment 442: The electrode assembly, sealed secondary battery cell, battery pack, or method according to any preceding Embodiment, wherein a thickness of the sealed secondary battery cell as measured in the vertical direction between vertically opposing regions of the external vertical surfaces of the hermetically sealed enclosure, is at least 1 mm.

Embodiment 443: The electrode assembly, sealed secondary battery cell, battery pack, or method according to any preceding Embodiment, wherein a thermal conductivity of the secondary battery cell along a thermally conductive path between the vertically opposing regions of the external vertical surfaces of hermetically sealed enclosure in the vertical direction is at least 2 W/m·K.

Embodiment 444: The electrode assembly, sealed secondary battery cell, battery pack, or method according to any preceding Embodiment, wherein the opposing longitudinal, vertical, and transverse surfaces make up a combined surface area of greater than 66% of the electrode assembly.

Embodiment 445: The electrode assembly, sealed secondary battery cell, battery pack, or method according to any preceding Embodiment, wherein the opposing longitudinal, vertical, and transverse surfaces make up a combined surface area of greater than 75% of the electrode assembly.

Embodiment 446: The electrode assembly, sealed secondary battery cell, battery pack, or method according to any preceding Embodiment, wherein the opposing longitudinal, vertical, and transverse surfaces make up a combined surface area of greater than 80% of the electrode assembly.

Embodiment 447: The electrode assembly, sealed secondary battery cell, battery pack, or method according to any preceding Embodiment, wherein the opposing longitudinal, vertical, and transverse surfaces make up a combined surface area of greater than 95% of the electrode assembly.

Embodiment 448: The electrode assembly, sealed secondary battery cell, battery pack, or method according to any preceding Embodiment, wherein the opposing longitudinal, vertical, and transverse surfaces make up a combined surface area of greater than 99% of the electrode assembly.

Embodiment 449: The electrode assembly, sealed secondary battery cell, battery pack, or method according to any preceding Embodiment, wherein the opposing longitudinal, vertical, and transverse surfaces make up a combined surface area corresponding to substantially the entire surface area of the electrode assembly.

Embodiment 450: The electrode assembly, sealed secondary battery cell, battery pack, or method according to any preceding Embodiment, wherein the set of electrode constraints further comprises first and second longitudinal constraints separated from each other in the longitudinal direction, and connected by a connecting member to restrain growth of the electrode assembly in the longitudinal direction.

Embodiment 451: The electrode assembly, sealed secondary battery cell, battery pack, or method of any previous Embodiment, wherein the sealed secondary battery has a rated capacity of at least 150 mAmp·hr.

Embodiment 452: The electrode assembly, sealed secondary battery cell, battery pack, or method of any preceding Embodiment, wherein the sealed secondary battery has a rated capacity of at least 200 mAmp·hr.

Embodiment 453: The electrode assembly, sealed secondary battery cell, battery pack, or method of any preceding Embodiment, wherein the sealed secondary battery has a rated capacity of at least 400 mAmp·hr.

Embodiment 454: The electrode assembly, sealed secondary battery cell, battery pack, or method of any preceding Embodiment, wherein the sealed secondary battery cell has a rated capacity of at least 0.1 Amp·hr.

Embodiment 455: The electrode assembly, sealed secondary battery cell, battery pack, or method of any preceding Embodiment, wherein the sealed secondary battery cell has a rated capacity of at least 0.5 Amp·hr.

Embodiment 456: The electrode assembly, sealed secondary battery cell, battery pack, or method of any preceding Embodiment, wherein the sealed secondary battery cell has a rated capacity of at least 1 Amp·hr.

Embodiment 457: The electrode assembly, sealed secondary battery cell, battery pack, or method of any preceding Embodiment, wherein the sealed secondary battery cell has a rated capacity of at least 3 Amp·hr.

Embodiment 458: The electrode assembly, sealed secondary battery cell, battery pack, or method of any preceding Embodiment, wherein the sealed secondary battery cell has a rated capacity of at least 5 Amp·hr.

Embodiment 459: The electrode assembly, sealed secondary battery cell, battery pack, or method of any preceding Embodiment, wherein the thickness of the secondary battery cell as measured between opposing regions of the opposing surfaces of the hermetically sealed enclosure in the vertical direction, is at least 2 mm.

Embodiment 460: The electrode assembly, sealed secondary battery cell, battery pack, or method of any preceding Embodiment, wherein the thickness of the secondary battery cell as measured between opposing regions of the opposing surfaces of the hermetically sealed enclosure in the vertical direction, is at least 3 mm.

Embodiment 461: The electrode assembly, sealed secondary battery cell, battery pack, or method of any preceding Embodiment, wherein the thickness of the secondary battery cell as measured between opposing regions of the opposing surfaces of the hermetically sealed enclosure in the vertical direction, is at least 5 mm.

Embodiment 462: The electrode assembly, sealed secondary battery cell, battery pack, or method of any preceding Embodiment, wherein the thickness of the secondary battery cell as measured between opposing regions of the opposing surfaces of the hermetically sealed enclosure in the vertical direction, is at least 8 mm.

Embodiment 463: The electrode assembly, sealed secondary battery cell, battery pack, or method of any preceding Embodiment, wherein the thickness of the secondary battery cell as measured between opposing regions of the opposing surfaces of the hermetically sealed enclosure in the vertical direction, is at least 10 mm.

Embodiment 464: The electrode assembly, sealed secondary battery cell, battery pack, or method of any preceding Embodiment, wherein the thermal conductivity of the secondary battery along the thermally conductive path between opposing regions of the opposing surfaces of the hermetically sealed enclosure in the vertical direction is at least 3 W/m·K.

Embodiment 465: The electrode assembly, sealed secondary battery cell, battery pack, or method of any preceding Embodiment, wherein the thermal conductivity of the secondary battery along the thermally conductive path between opposing regions of the opposing surfaces of the hermetically sealed enclosure in the vertical direction is at least 4 W/m·K.

Embodiment 466: The electrode assembly, sealed secondary battery cell, battery pack, or method of any preceding Embodiment, wherein the thermal conductivity of the secondary battery along the thermally conductive path between opposing regions of the opposing surfaces of the hermetically sealed enclosure in the vertical direction is at least 5 W/m·K.

Embodiment 467: The electrode assembly, sealed secondary battery cell, battery pack, or method of any preceding Embodiment, wherein the thermally conductive path is along the vertical direction of members of the population of electrode structures and/or members of the population of counter-electrode structures that are connected to the first and second vertical growth constraints.

Embodiment 468: The electrode assembly, sealed secondary battery cell, battery pack, or method of any preceding Embodiment, wherein the hermetically sealed enclosure comprises a laminate structure made of sheets of polymeric materials with a flexible sheet of metal material disposed in between.

Embodiment 469: The electrode assembly, sealed secondary battery cell, battery pack, or method of any preceding Embodiment, wherein the hermetically sealed enclosure comprises a laminate structure made of sheets of polypropylene, aluminum, and nylon, with the aluminum sheet being between the polypropylene and nylon polymeric sheets.

Embodiment 470: The electrode assembly, sealed secondary battery cell, battery pack, or method of any preceding Embodiment, wherein the first and second vertical growth constraints and/or first and second longitudinal constraints comprise any of metals, alloys, ceramics, glass, plastics, or a combination thereof.

Embodiment 471: The electrode assembly, sealed secondary battery cell, battery pack, or method of any preceding Embodiment, wherein the first and second vertical growth constraints and/or first and second longitudinal constraints comprise any of stainless steel and aluminum.

Embodiment 472: The electrode assembly, sealed secondary battery cell, battery pack, or method of any preceding Embodiment, wherein first and second vertical growth constraints have a yield strength of at least 70 MPa.

Embodiment 473: The electrode assembly, sealed secondary battery cell, battery pack, or method of any preceding Embodiment, wherein first and second vertical growth constraints have a yield strength of at least 100 MPa.

Embodiment 474: The electrode assembly, sealed secondary battery cell, battery pack, or method of any preceding Embodiment, wherein first and second vertical growth constraints have a yield strength of at least 150 MPa.

Embodiment 475: The electrode assembly, sealed secondary battery cell, battery pack, or method of any preceding Embodiment, wherein first and second vertical growth constraints have a yield strength of at least 200 MPa.

Embodiment 476: The electrode assembly, sealed secondary battery cell, battery pack, or method of any preceding Embodiment, wherein first and second vertical growth constraints have a yield strength of at least 300 MPa.

Embodiment 477: The electrode assembly, sealed secondary battery cell, battery pack, or method of any preceding Embodiment, wherein first and second vertical growth constraints have a yield strength of at least 500 MPa.

Embodiment 478: The electrode assembly, sealed secondary battery cell, battery pack, or method of any preceding Embodiment, wherein first and second vertical growth constraints have a tensile strength of at least 70 MPa.

Embodiment 479: The electrode assembly, sealed secondary battery cell, battery pack, or method of any preceding Embodiment, wherein first and second vertical growth constraints have a tensile strength of at least 100 MPa.

Embodiment 480: The electrode assembly, sealed secondary battery cell, battery pack, or method of any preceding Embodiment, wherein first and second vertical growth constraints have a tensile strength of at least 150 MPa.

Embodiment 481: The electrode assembly, sealed secondary battery cell, battery pack, or method of any preceding Embodiment, wherein first and second vertical growth constraints have a tensile strength of at least 200 MPa.

Embodiment 482: The electrode assembly, sealed secondary battery cell, battery pack, or method of any preceding Embodiment, wherein first and second vertical growth constraints have a tensile strength of at least 300 MPa.

Embodiment 483: The electrode assembly, sealed secondary battery cell, battery pack, or method of any preceding Embodiment, wherein first and second vertical growth constraints, have a tensile strength of at least 500 MPa.

Embodiment 484: The electrode assembly, sealed secondary battery cell, battery pack, or method of any preceding Embodiment, wherein first and second longitudinal growth constraints have a yield strength of at least 70 MPa.

Embodiment 485: The electrode assembly, sealed secondary battery cell, battery pack, or method of any preceding Embodiment, wherein first and second longitudinal growth constraints have a yield strength of at least 100 MPa.

Embodiment 486: The electrode assembly, sealed secondary battery cell, battery pack, or method of any preceding Embodiment, wherein first and second longitudinal growth constraints, have a yield strength of at least 150 MPa.

Embodiment 487: The electrode assembly, sealed secondary battery cell, battery pack, or method of any preceding Embodiment, wherein first and second longitudinal growth constraints, have a yield strength of at least 200 MPa.

Embodiment 488: The electrode assembly, sealed secondary battery cell, battery pack, or method of any preceding Embodiment, wherein first and second longitudinal growth constraints, have a yield strength of at least 300 MPa.

Embodiment 489: The electrode assembly, sealed secondary battery cell, battery pack, or method of any preceding Embodiment, wherein first and second longitudinal growth constraints, have a yield strength of at least 500 MPa.

Embodiment 490: The electrode assembly, sealed secondary battery cell, battery pack, or method of any preceding Embodiment, wherein first and second longitudinal growth constraints have a tensile strength of at least 70 MPa.

Embodiment 491: The electrode assembly, sealed secondary battery cell, battery pack, or method of any preceding Embodiment, wherein first and second longitudinal growth constraints, have a tensile strength of at least 100 MPa.

Embodiment 492: The electrode assembly, sealed secondary battery cell, battery pack, or method of any preceding Embodiment, wherein first and second longitudinal growth constraints, have a tensile strength of at least 150 MPa.

Embodiment 493: The electrode assembly, sealed secondary battery cell, battery pack, or method of any preceding Embodiment, wherein first and second longitudinal growth constraints have a tensile strength of at least 200 MPa.

Embodiment 494: The electrode assembly, sealed secondary battery cell, battery pack, or method of any preceding Embodiment, wherein first and second longitudinal growth constraints have a tensile strength of at least 300 MPa.

Embodiment 495: The electrode assembly, sealed secondary battery cell, battery pack, or method of any preceding Embodiment, wherein first and second longitudinal growth constraints have a tensile strength of at least 500 MPa.

Embodiment 496: The electrode assembly, sealed secondary battery cell, battery pack, or method of any preceding Embodiment, wherein members of the population of electrode structures and/or members of the population of counter-electrode structures that are connected to the upper and lower sidewalls have a yield strength of greater than 150 MPa.

Embodiment 497: The electrode assembly, sealed secondary battery cell, battery pack, or method of any preceding Embodiment, wherein members of the population of electrode structures and/or members of the population of counter-electrode structures that are connected to the upper and lower sidewalls have a yield strength of greater than 200 MPa.

Embodiment 498: The electrode assembly, sealed secondary battery cell, battery pack, or method of any preceding Embodiment, wherein members of the population of electrode structures and/or members of the population of counter-electrode structures that are connected to the upper and lower sidewalls have a yield strength of greater than 300 MPa.

Embodiment 499: The electrode assembly, sealed secondary battery cell, battery pack, or method of any preceding Embodiment, wherein members of the population of electrode structures and/or members of the population of counter-electrode structures that are connected to the upper and lower sidewalls have a yield strength of greater than 500 MPa.

Embodiment 500: The electrode assembly, sealed secondary battery cell, battery pack, or method of any preceding Embodiment, wherein members of the population of electrode structures and/or members of the population of counter-electrode structures that are connected to the upper and lower sidewalls have a tensile strength of greater than 100 MPa.

Embodiment 501: The electrode assembly, sealed secondary battery cell, battery pack, or method of any preceding Embodiment, wherein members of the population of electrode structures and/or members of the population of counter-electrode structures that are connected to the upper and lower sidewalls have a tensile strength of greater than 150 MPa.

Embodiment 502: The electrode assembly, sealed secondary battery cell, battery pack, or method of any preceding Embodiment, wherein members of the population of electrode structures and/or members of the population of counter-electrode structures that are connected to the upper and lower sidewalls have a tensile strength of greater than 200 MPa.

Embodiment 503: The electrode assembly, sealed secondary battery cell, battery pack, or method of any preceding Embodiment, wherein members of the population of electrode structures and/or members of the population of counter-electrode structures that are connected to the upper and lower sidewalls have a tensile strength of greater than 300 MPa.

Embodiment 504: The electrode assembly, sealed secondary battery cell, battery pack, or method of any preceding Embodiment, wherein members of the population of electrode structures and/or members of the population of counter-electrode structures that are connected to the upper and lower sidewalls have a tensile strength of greater than 500 MPa.

Embodiment 505: The electrode assembly, sealed secondary battery cell, battery pack, or method of any preceding Embodiment, wherein the members of the electrode structure and/or counter-electrode structure population that are connected to first and second vertical growth constraints have a yield strength of at least 70 MPa.

Embodiment 506: The electrode assembly, sealed secondary battery cell, battery pack, or method of any preceding Embodiment, wherein the members of the electrode structure and/or counter-electrode structure population that are connected to first and second vertical growth constraints have a yield strength of at least 100 MPa.

Embodiment 507: The electrode assembly, sealed secondary battery cell, battery pack, or method of any preceding Embodiment, wherein the members of the electrode structure and/or counter-electrode structure population that are connected to the first and second vertical growth constraints have a yield strength of at least 150 MPa.

Embodiment 508: The electrode assembly, sealed secondary battery cell, battery pack, or method of any preceding Embodiment, wherein the members of the electrode structure and/or counter-electrode structure population that are connected to the first and second vertical growth constraints have a yield strength of at least 200 MPa.

Embodiment 509: The electrode assembly, sealed secondary battery cell, battery pack, or method of any preceding Embodiment, wherein the members of the electrode structure and/or counter-electrode structure population that are connected to the first and second vertical growth constraints have a yield strength of at least 300 MPa.

Embodiment 510: The electrode assembly, sealed secondary battery cell, battery pack, or method of any preceding Embodiment, wherein the members of the electrode structure and/or counter-electrode structure population that are connected to the first and second vertical growth constraints have a yield strength of at least 500 MPa.

Embodiment 511: The electrode assembly, sealed secondary battery cell, battery pack, or method of any preceding Embodiment, wherein the members of the electrode structure, electrically insulating separator and counter-electrode structure populations are arranged in an alternating sequence in the longitudinal direction.

Embodiment 512: The electrode assembly, sealed secondary battery cell, battery pack, or method of any preceding Embodiment, wherein the members of the electrode structure population comprise electrode active material layers and electrode current collectors, and members of the counter-electrode structure population comprise counter-electrode active material layers and counter-electrode current collectors.

Embodiment 513: The electrode assembly, sealed secondary battery cell, battery pack, or method of any preceding Embodiment, and wherein the first and second vertical growth constraints are connected to upper and lower surfaces of members of the electrode structure population and/or counter-electrode structure population.

Embodiment 514: The electrode assembly, sealed secondary battery cell, battery pack, or method of any preceding Embodiment, and wherein the first and second vertical growth constraints are connected to upper and lower surfaces of electrode current collector layers of members of the electrode structure population, and/or upper and lower surfaces of counter-electrode current collectors of members of the counter-electrode population.

Embodiment 515: The electrode assembly, sealed secondary battery cell, battery pack, or method of any preceding Embodiment, wherein the electrode current collectors and/or counter-electrode current collectors that are connected to the first and second vertical growth constraints comprise a thickness as measured in the longitudinal direction that is in a range of between 5 and 50 µm.

Embodiment 516: The electrode assembly, sealed secondary battery cell, battery pack, or method of any preceding Embodiment, wherein the electrode current collectors and/or counter-electrode current collectors that are connected to the first and second vertical growth constraints comprise a yield strength of greater than 100 MPa.

Embodiment 517: The electrode assembly, sealed secondary battery cell, battery pack, or method of any preceding Embodiment, wherein the first and second vertical growth constraints constrain growth in the vertical direction such that any increase in the Feret diameter of the electrode assembly over 20 consecutive cycles is less than 2%.

Embodiment 518: The electrode assembly, sealed secondary battery cell, battery pack, or method of any preceding Embodiment, wherein the first and second vertical growth constraints constrain growth in the vertical direction such that any increase in the Feret diameter of the electrode assembly over 30 consecutive cycles is less than 2%.

Embodiment 519: The electrode assembly, sealed secondary battery cell, battery pack, or method of any preceding Embodiment, wherein the first and second vertical growth constraints constrain growth in the vertical direction such that any increase in the Feret diameter of the electrode assembly over 50 consecutive cycles is less than 2%.

Embodiment 520: The electrode assembly, sealed secondary battery cell, battery pack, or method of any preceding Embodiment, wherein the first and second vertical growth constraints constrain growth in the vertical direction such that any increase in the Feret diameter of the electrode assembly over 80 consecutive cycles is less than 2%.

Embodiment 521: The electrode assembly, sealed secondary battery cell, battery pack, or method of any preceding Embodiment, wherein the first and second vertical growth constraints constrain growth in the vertical direction such that any increase in the Feret diameter of the electrode assembly over 100 consecutive cycles is less than 2%.

Embodiment 522: The electrode assembly, sealed secondary battery cell, battery pack, or method of any preceding Embodiment, wherein the first and second longitudinal growth constraints comprise a thickness in the longitudinal direction of at least 150 um.

Embodiment 523: The electrode assembly, sealed secondary battery cell, battery pack, or method of any preceding Embodiment, wherein the first and second longitudinal growth constraints comprise a thickness in the longitudinal direction of at least 250 um.

Embodiment 524: The electrode assembly, sealed secondary battery cell, battery pack, or method of any preceding Embodiment, wherein the first and second longitudinal growth constraints comprise a thickness in the longitudinal direction of at least 400 um.

Embodiment 525: The electrode assembly, sealed secondary battery cell, battery pack, or method according to any preceding Embodiment, wherein members of the population of electrode structures and/or members of the population of counter-electrode structures are connected to the first and second vertical growth constraints by any one or more of one or more of adhering, gluing, welding, joining, bonding, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Embodiment 526. The electrode assembly, sealed secondary battery cell, battery pack, or method according to any preceding Embodiment, wherein the first and second vertical growth constraints comprise apertures through the vertical thicknesses thereof.

Embodiment 527. The electrode assembly, sealed secondary battery cell, battery pack, or method according to any preceding Embodiment, where the surface area of the opposing longitudinal end surfaces is less than 33% of the surface area of the electrode assembly.

Embodiment 528. The electrode assembly, sealed secondary battery cell, battery pack, or method according to any preceding Embodiment, wherein, a length $L_E$ of each member of the electrode structure population and a length $L_{CE}$ of each member of the counter-electrode structure population are measured in the transverse direction of their central longitudinal axis $A_E$ and $A_{CE}$, a width $W_E$ of each member of the electrode structure population and a width $W_{CE}$ of each member of the counter-electrode structure population are measured in the longitudinal direction, and a height $H_E$ of each member the electrode structure population and a height $H_{CE}$ of each member of the counter-electrode structure population is measured in the vertical direction that is perpendicular to the central longitudinal axis $A_E$ or $A_{CE}$ of each such member and to the longitudinal direction, the ratio of $L_E$ to each of $W_E$ and $H_E$ of each member of the electrode structure population being at least 5:1, respectively, the ratio of $H_E$ to $W_E$ for each member of the electrode structure population being between 0.4:1 and 1000:1, and the ratio of $L_{CE}$ to each of $W_{CE}$ and $H_{CE}$ of each member of the counter-electrode structure population being at least 5:1, respectively, the ratio of $H_{CE}$ to $W_{CE}$ for each member of the counter-electrode structure population being between 0.4:1 and 1000:1.

Embodiment 529. The electrode assembly, sealed secondary battery cell, battery pack, or method according to any preceding Embodiment, wherein, the electrode assembly has a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, and the ratio of each of $L_{EA}$ and $W_{EA}$ to $H_{EA}$ is at least 2:1.

Embodiment 530. The sealed secondary battery according to any preceding Embodiment, wherein a projection of members of the electrode structure population and the counter-electrode structure populations onto the first longitudinal surface circumscribes a first projected area and a projection of the members of the electrode structure population and the counter-electrode structure population onto the second longitudinal surface circumscribes a second projected area, and wherein the first and second longitudinal growth constraints comprises first and second compression members that overlie the first and second projected areas.

Embodiment 531. The electrode assembly, sealed secondary battery cell, battery pack, or method according to any preceding Embodiment, wherein the first and second longitudinal growth constraints maintain a pressure on the electrode assembly in the longitudinal direction that exceeds the pressure maintained on the electrode assembly in the each of the two directions that are mutually perpendicular and perpendicular to the longitudinal direction.

Embodiment 532. The electrode assembly, sealed secondary battery cell, battery pack, or method according to any preceding Embodiment, wherein the first and second longitudinal growth constraints maintain a pressure on the electrode assembly in the longitudinal direction that exceeds the pressure maintained on the electrode assembly in the each of the two directions that are mutually perpendicular and perpendicular to the longitudinal direction by a factor of at least 3.

Embodiment 533. The electrode assembly, sealed secondary battery cell, battery pack, or method according to any preceding Embodiment, wherein the first and second longitudinal growth constraints maintain a pressure on the electrode assembly in the longitudinal direction that exceeds the pressure maintained on the electrode assembly in the each of the two directions that are mutually perpendicular and perpendicular to the longitudinal direction by a factor of at least 4.

Embodiment 534. The electrode assembly, sealed secondary battery cell, battery pack, or method according to any preceding Embodiment, wherein the first and second longitudinal growth constraints maintain a pressure on the electrode assembly in the longitudinal direction that exceeds the pressure maintained on the electrode assembly in the each of the two directions that are mutually perpendicular and perpendicular to the longitudinal direction by a factor of at least 5.

Embodiment 535. The electrode assembly, sealed secondary battery cell, battery pack, or method according to any preceding Embodiment, wherein the first and second longitudinal growth constraints restrain growth of the electrode assembly in the longitudinal direction such that any increase in the Feret diameter of the electrode assembly in the longitudinal direction over 20 consecutive cycles is less than 20%.

Embodiment 536. The electrode assembly, sealed secondary battery cell, battery pack, or method according to any preceding Embodiment, wherein the first and second longitudinal growth constraints restrain growth of the electrode assembly in the longitudinal direction such that any increase in the Feret diameter of the electrode assembly in the longitudinal direction over 10 consecutive cycles is less than 10%

Embodiment 537. The electrode assembly, sealed secondary battery cell, battery pack, or method according to any preceding Embodiment, wherein the first and second longitudinal growth constraints restrain growth of the electrode assembly in the longitudinal direction such that any increase in the Feret diameter of the electrode assembly in the longitudinal direction over 5 consecutive cycles is less than 10%.

Embodiment 538. The electrode assembly, sealed secondary battery cell, battery pack, or method according to any preceding Embodiment, wherein the first and second longitudinal growth constraints restrain growth of the electrode assembly in the longitudinal direction such that any increase in the Feret diameter of the electrode assembly in the longitudinal direction is less than 1% per cycle.

Embodiment 539. The electrode assembly, sealed secondary battery cell, battery pack, or method according to any preceding Embodiment, wherein the first and second vertical growth constraints restrain growth of the electrode assembly in the vertical direction, such that any increase in the Feret diameter of the electrode assembly in the vertical direction over 20 consecutive cycles is less than 20%

Embodiment 540. The electrode assembly, sealed secondary battery cell, battery pack, or method according to any preceding Embodiment, wherein the first and second vertical growth constraints restrain growth of the electrode assembly in the vertical direction, such that any increase in the Feret diameter of the electrode assembly in the vertical direction over 10 consecutive cycles is less than 10%

Embodiment 541. The electrode assembly, sealed secondary battery cell, battery pack, or method according to any preceding Embodiment, wherein the first and second vertical growth constraints restrain growth of the electrode assembly in the vertical direction, such that any increase in the Feret diameter of the electrode assembly in the vertical direction over 5 consecutive cycles is less than 10%.

Embodiment 542. The electrode assembly, sealed secondary battery cell, battery pack, or method according to any preceding Embodiment, wherein the first and second vertical growth constraints restrain growth of the electrode assembly in the vertical direction, such that any increase in the Feret diameter of the electrode assembly in the vertical direction is less than 1% per cycle.

Embodiment 543. The electrode assembly, sealed secondary battery cell, battery pack, or method according to any preceding Embodiment, wherein (i) members of the population of electrode structures are anode structures and members of the population of counter-electrode structures are cathode structures, or (ii) members of the population of electrode structures are cathode structures and members of the population of electrode structures are anode structures.

Embodiment 544. The electrode assembly, sealed secondary battery cell, battery pack, or method according to Embodiment 106, wherein members of the population of electrode structures are anode structures comprising anodically active material layers, and members of the population of counter-electrode structures are cathode structures comprising cathodically active material layers.

Embodiment 545. The electrode assembly, sealed secondary battery cell, battery pack, or method according to any preceding Embodiment, wherein carrier ions are contained within the hermetically sealed battery enclosure.

Embodiment 546. The electrode assembly, sealed secondary battery cell, battery pack, or method according to any preceding Embodiment, wherein members of the population of electrode structures comprises anode active material comprising any one of more of carbon materials, graphite, soft or hard carbons, metals, semi-metals, alloys, oxides, compounds capable of forming an alloy with lithium, tin, lead, magnesium, aluminum, boron, gallium, silicon, Si/C composites, Si/graphite blends, $SiO_x$, porous Si, intermetallic Si alloys, indium, zirconium, germanium, bismuth, cadmium, antimony, silver, zinc, arsenic, hafnium, yttrium, lithium, sodium, lithium titanate, palladium, lithium metals, carbon, petroleum cokes, activated carbon, graphite, silicon compounds, silicon alloys, tin compounds, non-graphitizable carbon, graphite-based carbon, $Li_xFe_2O_3$ ($0 \leq x \leq 1$), $Li_xWO_2$ ($0 \leq x \leq 1$), $Sn_xMe_{1-x}Me'_y O_z$ (Me: Mn, Fe, Pb, Ge; Me': Al, B, P, Si, elements found in Group 1, Group 2 and Group 3 in a periodic table, halogen; $0 < x \leq 1$; $1 \leq y \leq 3$; $1 \leq z \leq 8$), a lithium alloy, a silicon-based alloy, a tin-based alloy; a metal oxide, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, a conductive polymer, polyacetylene, Li—Co—Ni-based material, crystalline graphite, natural graphite, synthetic graphite, amorphous carbon, Kish graphite, pyrolytic carbon, mesophase pitch-based carbon fibers, meso-carbon microbeads, mesophase pitches, graphitized carbon fiber, high-temperature sintered carbon, petroleum, coal tar pitch derived cokes, tin oxide, titanium nitrate, lithium metal film, an alloy of lithium and one or more types of metals selected from the group consisting of Na, K, Rb, Cs, Fr, Be, Mg, Ca, Sr, Ba, Ra, Al and Sn, a metal compound capable of alloying and/or intercalating with lithium selected from any of Si, Al, C, Pt, Sn, Pb, Ir, Ni, Cu, Ti, Na, K, Rb, Cs, Fr, Be, Ca, Sr, Sb, Ba, Ra, Ge, Zn, Bi, In, Mg, Ga, Cd, a Sn alloy, an Al alloy, a metal oxide capable of doping and dedoping lithium ions, $SiO_v$ ($0 < v < 2$), $SnO_2$, vanadium oxide, lithium vanadium oxide, a composite including a metal compound and carbon material, a Si—C composite, a Sn—C composite, a transition metal oxide, $Li_4/3Ti_5/3O_4$, SnO, a carbonaceous material, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite, and a composition of the formula $Na_xSn_{y-z}M_z$ disposed between layers of the layered carbonaceous material, wherein M is Ti, K, Ge, P, or a combination thereof, and $0 < x \leq 15$, $1 \leq y \leq 5$, and $0 \leq z \leq 1$, as well as oxides, alloys, nitrides, fluorides of any of the foregoing, and any combination of any of the foregoing.

Embodiment 547. The electrode assembly, sealed secondary battery cell, battery pack, or method according to any preceding Embodiment, wherein the anode active material comprises at least one of lithium metal, a lithium metal alloy, silicon, silicon alloy, silicon oxide, tin, tin alloy, tin oxide, and a carbon-containing material.

Embodiment 548. The electrode assembly, sealed secondary battery cell, battery pack, or method according to any preceding Embodiment, wherein the anode active material comprises at least one of silicon and silicon oxide.

Embodiment 549. The electrode assembly, sealed secondary battery cell, battery pack, or method according to any preceding Embodiment, wherein the anode active material comprises at least one of lithium and lithium metal alloy.

Embodiment 550. The electrode assembly, sealed secondary battery cell, battery pack, or method according to any preceding Embodiment, wherein the anode active material comprises a carbon-containing material.

Embodiment 551. The electrode assembly, sealed secondary battery cell, battery pack, or method according to any preceding Embodiment, wherein members of the population of electrically insulating separators comprise microporous separator material permeated with non-aqueous liquid electrolyte.

Embodiment 552. The electrode assembly, sealed secondary battery cell, battery pack, or method according to any preceding Embodiment, wherein members of the population of electrically insulating separators comprise solid electrolyte.

Embodiment 553. The electrode assembly, sealed secondary battery cell, battery pack, or method according to any preceding Embodiment, wherein members of the population of electrically insulating separators comprise a ceramic material, glass, or garnet material.

Embodiment 554. The electrode assembly, sealed secondary battery cell, battery pack, or method according to any preceding Embodiment, the electrode assembly comprising an electrolyte selected from the group consisting of non-aqueous liquid electrolytes, gel electrolytes, solid electrolytes and combinations thereof.

Embodiment 555. The electrode assembly, sealed secondary battery cell, battery pack, or method according to any preceding Embodiment, wherein the electrode assembly comprises a liquid electrolyte.

Embodiment 556. The electrode assembly, sealed secondary battery cell, battery pack, or method according to any preceding Embodiment, wherein the electrode assembly comprises an aqueous liquid electrolyte.

Embodiment 557. The electrode assembly, sealed secondary battery cell, battery pack, or method according to any preceding Embodiment, wherein the electrode assembly comprises a non-aqueous liquid electrolyte.

Embodiment 558. The electrode assembly, sealed secondary battery cell, battery pack, or method according to any preceding Embodiment, wherein the electrode assembly comprises a gel electrolyte.

Embodiment 559. The electrode assembly, sealed secondary battery cell, battery pack, or method according to any preceding Embodiment, wherein the electrically insulating separator comprises a solid electrolyte.

Embodiment 560. The electrode assembly, sealed secondary battery cell, battery pack, or method according to any preceding Embodiment, wherein the electrically insulating separator comprises a solid polymer electrolyte.

Embodiment 561. The electrode assembly, sealed secondary battery cell, battery pack, or method according to any preceding Embodiment, wherein the electrically insulating separator comprises a solid inorganic electrolyte.

Embodiment 562. The electrode assembly, sealed secondary battery cell, battery pack, or method according to any preceding Embodiment, wherein the electrically insulating separator comprises a solid organic electrolyte.

Embodiment 563. The electrode assembly, sealed secondary battery cell, battery pack, or method according to any preceding Embodiment, wherein the electrically insulating separator comprises a ceramic electrolyte.

Embodiment 564. The electrode assembly, sealed secondary battery cell, battery pack, or method according to any preceding Embodiment, wherein the electrically insulating separator comprises an inorganic electrolyte.

Embodiment 565. The electrode assembly, sealed secondary battery cell, battery pack, or method according to any preceding Embodiment, wherein the electrically insulating separator comprises a ceramic.

Embodiment 566. The electrode assembly, sealed secondary battery cell, battery pack, or method according to any preceding embodiment wherein the electrically insulating separator comprises a garnet material.

Embodiment 567. The electrode assembly, sealed secondary battery cell, battery pack, or method according to any preceding Embodiment, comprising an electrolyte selected from the group consisting of aqueous electrolytes, a non-aqueous liquid electrolyte, a solid polymer electrolyte, a solid ceramic electrolyte, a solid glass electrolyte, a solid garnet electrolyte, a gel polymer electrolyte, an inorganic solid electrolyte, and a molten-type inorganic electrolyte.

Embodiment 568. The electrode assembly, sealed secondary battery cell, battery pack, or method according to any preceding Embodiment, wherein members of the population of counter-electrode structures comprise a cathodically active material comprising at least one of transition metal oxides, transition metal sulfides, transition metal nitrides, lithium-transition metal oxides, lithium-transition metal sulfides, lithium-transition metal nitrides, including transition metal oxides, transition metal sulfides, and transition metal nitrides having metal elements having a d-shell or f-shell, and/or where the metal element is any selected from Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au, $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, lithium-containing compounds comprising metal oxides or metal phosphates, compounds comprising lithium, cobalt and oxygen (e.g., $LiCoO_2$), compounds comprising lithium, manganese and oxygen (e.g., $LiMn_2O_4$) compounds comprising lithium iron and phosphate (e.g., LiFePO), lithium manganese oxide, lithium cobalt oxide, lithium nickel oxide, lithium iron phosphate, lithium cobalt oxide ($LiCoO_2$), lithium nickel oxide ($LiNiO_2$), a substituted compound with one or more transition metals, lithium manganese oxide, $Li_{1+x}Mn_{2-x}O_4$ (where, x is 0 to 0.33), $LiMnO_3$, $LiMn_2O_3$, $LiMnO_2$, lithium copper oxide ($Li_2CuO_2$), vanadium oxide, $LiV_3O_8$, $LiFe_3O_4$, $V_2O_5$, $Cu_2V_2O_7$, Ni site-type lithium nickel oxide represented by the chemical formula of $LiNi_{1-x}M_xO_2$ (where, M=Co, Mn, Al, Cu, Fe, Mg, B or Ga, and x=0.01 to 0.3), lithium manganese complex oxide represented by the chemical formula of $LiMn_{2-x}M_xO_2$ (where, M=Co, Ni, Fe, Cr, Zn or Ta, and x=0.01 to 0.1), $Li_2Mn_3MO_8$ (where, M=Fe, Co, Ni, Cu or Zn), $LiMn_2O_4$ in which a portion of Li is substituted with alkaline earth metal ions, a disulfide compound, $Fe_2(MoO_4)_3$, a lithium metal phosphate having an olivine crystal structure of Formula 2: $Li_{1+a}Fe_{1-x}M'_x(PO_{4-b})X_b$ wherein M' is at least one selected from Al, Mg, Ni, Co, Mn, Ti, Ga, Cu, V, Nb, Zr, Ce, In, Zn, and Y, X is at least one selected from F, S, and N, $0 \leq x \leq 0.5$, and $0 \leq b \leq 0.1$, $LiFePO_4$, Li(Fe, Mn)$PO_4$, Li(Fe, Co)$PO_4$, Li(Fe, Ni)$PO_4$, $LiCoO_2$, $LiNiO_2$, $LiMnO_2$, $LiMn_2O_4$, $LiNi_{1-y}Co_yO_2$, $LiCo_{1-y}Mn_yO_2$, $LiNi_{1-y}Mn_yO_2 (0 \leq y \leq 1)$, $Li(Ni_aCo_bMn_c)O_4 (0<a<2, 0<b<2, 0<c<2,$ and $a+b+c=2)$, $LiMn_{2-z}Ni_zO_4$, $LiMn_{2-z}Co_zO_4$ $(0<z<2)$, $LiCoPO_4$ and $LiFePO_4$, elemental sulfur (S8), sulfur series compounds, $Li_2S_n (n \geq 1)$, an organosulfur compound, a carbon-sulfur polymer $((C_2S_x)_n: x=2.5$ to $50, n \geq 2)$, an oxide of lithium and zirconium, a composite oxide of lithium and metal (cobalt, manganese, nickel, or a combination thereof), $Li_aA_{1-b}M_bD_2$ (wherein, $0.90 \leq a \leq 1$, and $0 \leq b \leq 0.5$), $Li_aE_{1-b}M_bO_{2-c}D_c$ (wherein, $0.90 \leq a \leq 1, 0 \leq b \leq 0.5$, and $0 \leq c \leq 0.05$), $LiE_{2-b}M_bO_{4-c}D_c$ (wherein, $0 \leq b \leq 0.5$, and $0 \leq c \leq 0.05$), $Li_aNi_{1-b-c}Co_bM_cD_a$ (wherein, $0.90 \leq a \leq 1$, $0 \leq b \leq 0.5, 0 \leq c \leq 0.05$, and $0<a<2$), $Li_aNi_{1-b-c}Co_bM_cO_{2-a}X_a$ (wherein, $0.90 \leq a \leq 1, 0 \leq b \leq 0.5, 0 \leq c \leq 0.05$, and $0<a<2$), $Li_aNi_{1-b-c}Co_bM_cO_{2-a}X_2$ (wherein, $0.90 \leq a \leq 1, 0 \leq b \leq 0.5, 0 \leq c \leq 0.05$, and $0<a<2$), $Li_aNi_{1-b-c}Mn_bM_cD_a$ (wherein, $0.90 \leq a \leq 1, 0 \leq b \leq 0.5, 0 \leq c \leq 0.05$, and $0<a<2$), $Li_aNi_{1-b-c}Mn_bM_cO_{2-a}X_a$ (wherein, $0.90 \leq a \leq 1, 0 \leq b \leq 0.5, 0 \leq c \leq 0.05$, and $0<a<2$), $Li_aNi_{1-b-c}Mn_bM_cO_{2-a}X_2$ (wherein, $0.90 \leq a \leq 1, 0 \leq b \leq 0.5, 0 \leq c \leq 0.05$, and $0<a<2$), $Li_aNi_bE_cG_dO_2$ (wherein, $0.90 \leq a \leq 1, 0 \leq b \leq 0.9, 0 \leq c \leq 0.5$, and $0.001 \leq d \leq 0.1$), $Li_aNi_bCo_cMn_dGeO_2$ (wherein, $0.90 \leq a \leq 1, \leq b \leq 0.9, 0 \leq c \leq 0.5, 0 \leq d \leq 0.5$, and $0.001 \leq e \leq 0.1$), $Li_aNiG_bO_2$ (wherein, $0.90 \leq a \leq 1$ and $0.001 \leq b \leq 0.1$), $Li_aCoG_bO_2$ (wherein, $0.90 \leq a \leq 1$ and $0.001 \leq b \leq 0.1$), $Li_aMnG_bO_2$ (wherein, $0.90 \leq a \leq 1$ and $0.001 \leq b \leq 0.1$), $Li_aMn_2G_bO_4$ (wherein, $0.90 \leq a \leq 1$ and $0.001 \leq b \leq 0.1$), $QO_2$, $QS_2$, $LiQS_2$, $V_2O_5$, $LiV_2O_5$, $LiX'O_2$, $LiNiVO_4$, $Li_{(3-f)}J_2(PO_4)_3 (0 \leq f \leq 2)$; $Li_{(3-f)}Fe_2(PO_4)_3 (0 \leq f \leq 2)$, $LiFePO_4$. (A is Ni, Co, Mn, or a combination thereof; M is Al, Ni, Co, Mn, Cr, Fe, Mg, Sr, V, a rare-earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof; and J is V, Cr, Mn, Co, Ni, Cu, or a combination thereof), $LiCoO_2$, $LiMn_xO_{2x}$ (x=1 or 2), $LiNi_{1-x}Mn_xO_{2x}$ $(0<x<1)$, $LiNi_{1-x-y}Co_xMn_yO_2$ $(0 \leq x \leq 0.5, 0 \leq y \leq 0.5)$, $FePO_4$, a lithium compound, lithium cobalt oxide, lithium nickel oxide, lithium nickel cobalt oxide, lithium nickel cobalt aluminum oxide, lithium nickel cobalt manganese oxide, lithium manganese oxide, lithium iron phosphate, nickel sulfide, copper sulfide, sulfur, iron oxide, vanadium oxide, a sodium containing material, an oxide of the formula $NaM^1_aO_2$ (wherein $M^1$ is at least one transition metal element, and $0 \leq a<1$), $NaFeO_2$, $NaMnO_2$, $NaNiO_2$, $NaCoO_2$, an oxide represented by the formula $NaMn_{1-a}M^1_aO_2$ (wherein $M^1$ is at least one transition metal element, and $0 \leq a<1$), $Na[Ni_{1/2}Mn_{1/2}]O_2$, $Na_{2/3}[Fe_{1/2}Mn_{1/2}]O_2$, an oxide represented by $Na_{0.44}Mn_{1-a}M^1_aO_2$ (wherein $M^1$ is at least one transition metal element, and $0 \leq a<1$), an oxide represented by $Na_{0.7}Mn_{1-a}M^1_aO_{2.05}$ an (wherein $M^1$ is at least one transition metal element, and $0 \leq a<1$) an oxide represented by $NabM^2_cSi_{12}O_{30}$ (wherein $M^2$ is at least one transition metal element, $2 \leq b \leq 6$, and $2 \leq c \leq 5$), $Na_6Fe_2Si_{12}O_{30}$, $Na_2Fe_5Si_{12}O$ (wherein $M^2$ is at least one transition metal element, $2 \leq b \leq 6$, and $2 \leq c \leq 5$), an oxide represented by $Na_dM^3_eSi_6O_{18}$ (wherein $M^3$ is at least one transition metal element, $3 \leq d \leq 6$, and $1 \leq e \leq 2$), $Na_2Fe_2Si_6O_{18}$, $Na_2MnFeSi_6O_{18}$ (wherein $M^3$ is at least one transition metal element, $3 \leq d \leq 6$, and $1 \leq e \leq 2$), an oxide represented by $Na_fM^4_gSi_2O_6$ (wherein $M^4$ is at least one element selected from transition metal elements, magnesium (Mg) and aluminum (Al), $1 \leq f \leq 2$ and $1 \leq g \leq 2$), a phosphate, $Na_2FeSiO_6$, $NaFePO_4$, $Na_3Fe_2(PO_4)_3$, $Na_3V_2(PO_4)_3$, $Na_4CO_3(PO_4)_2 P_2O_7$, a borate, $NaFeBO_4$ or $Na_3Fe_2(BO_4)_3$, a fluoride, $Na_hM^5F_6$ (wherein $M^5$ is at least one transition metal element, and $2 \leq h \leq 3$), $Na_3FeF_6$, $Na_2MnF_6$, a fluorophosphate, $Na_3V_2(PO_4)_2F_3$, $Na_3V_2(PO_4)_2FO_2$, $NaMnO_2$, $Na[Ni_{1/2}Mn_{1/2}]O_2$, $Na_{2/3}[Fe_{1/2}Mn_{1/2}]O_2$, $Na_3V_2(PO_4)_3$, $Na_4CO_3(PO_4)_2P_2O_7$, $Na_3V_2(PO_4)_2F_3$ and/or $Na_3V_2(PO_4)_2FO_2$, as well as any complex oxides and/or other combinations of the foregoing.

Embodiment 569. The electrode assembly, sealed secondary battery cell, battery pack, or method according to any preceding Embodiment, wherein the cathodically active material comprises at least one of a transition metal oxide, transition metal sulfide, transition metal nitride, transition metal phosphate, and transition metal nitride.

Embodiment 570. The electrode assembly, sealed secondary battery cell, battery pack, or method according to any preceding Embodiment, wherein the cathodically active material comprises a transition metal oxide containing lithium and at least one of cobalt and nickel.

Embodiment 571. The electrode assembly, sealed secondary battery cell, battery pack, or method according to any preceding Embodiment, wherein members of the population of electrode structures comprise anode current collectors comprising at least one of copper, nickel, aluminum, stainless steel, titanium, palladium, baked carbon, calcined carbon, indium, iron, magnesium, cobalt, germanium, lithium, a surface treated material of copper or stainless steel with carbon, nickel, titanium, silver, an aluminum-cadmium alloy, and/or alloys thereof.

Embodiment 572. The electrode assembly, sealed secondary battery cell, battery pack, or method according to any preceding Embodiment, wherein members of the population of electrode structures comprise anode current collectors comprising at least one of copper, nickel, stainless steel and alloys thereof.

Embodiment 573. The electrode assembly, sealed secondary battery cell, battery pack, or method according to any preceding Embodiment, wherein the counter-electrode structures comprise cathode current collectors comprising at least one of stainless steel, aluminum, nickel, titanium, baked carbon, sintered carbon, a surface treated material of aluminum or stainless steel with carbon, nickel, titanium, silver, or an alloy thereof.

Embodiment 574. The electrode assembly, sealed secondary battery cell, battery pack, or method according to any preceding Embodiment, wherein the cathode current collectors comprising at least one of stainless steel, aluminum, nickel, titanium, baked carbon, sintered carbon, a surface treated material of aluminum or stainless steel with carbon, silver, or an alloy thereof.

Embodiment 575. The electrode assembly, sealed secondary battery cell, battery pack, or method according to any preceding Embodiment, wherein the cathode current collectors comprising aluminum.

Embodiment 576. The electrode assembly, sealed secondary battery cell, battery pack, or method according to any preceding Embodiment, wherein the first and second vertical growth constraints comprise any of stainless steel, titanium, or glass fiber composite.

Embodiment 577. The electrode assembly, sealed secondary battery cell, battery pack, or method according to any preceding Embodiment, wherein the first and second vertical growth constraints comprises stainless steel.

Embodiment 578. The electrode assembly, sealed secondary battery cell, battery pack, or method according to any preceding Embodiment, wherein the first and second vertical growth constraints comprise a coating of insulating material on inner and outer surfaces thereof.

Embodiment 579. The electrode assembly, sealed secondary battery cell, battery pack, or method according to any preceding Embodiment, wherein the electrode assembly comprises at least 5 electrode structures and at least 5 counter-electrode structures.

Embodiment 580. The electrode assembly, sealed secondary battery cell, battery pack, or method according to any preceding Embodiment, wherein the electrode assembly comprises at least 10 electrode structures and at least 10 counter-electrode structures.

Embodiment 581. The electrode assembly, sealed secondary battery cell, battery pack, or method according to any preceding Embodiment, wherein the electrode assembly comprises at least 50 electrode structures and at least 50 counter-electrode structures.

Embodiment 582. The electrode assembly, sealed secondary battery cell, battery pack, or method according to any preceding Embodiment, wherein the electrode assembly comprises at least 100 electrode structures and at least 100 counter-electrode structures.

Embodiment 583. The electrode assembly, sealed secondary battery cell, battery pack, or method according to any preceding Embodiment, wherein the electrode assembly comprises at least 500 electrode structures and at least 500 counter-electrode structures.

Embodiment 584. A sealed secondary battery cell chargeable between a charged state and a discharged state, the sealed secondary battery cell comprising a hermetically sealed case, an electrode assembly enclosed by the hermetically sealed case, and a rated capacity of at least 100 mAmp·hr, wherein, the electrode assembly has a substantially polyhedral shape with mutually perpendicular transverse, longitudinal and vertical axes corresponding to the x, y and z axes, respectively, of an imaginary three-dimensional Cartesian coordinate system, opposing longitudinal end surfaces that are substantially flat and separated from each other in the longitudinal direction, and a lateral surface surrounding an electrode assembly longitudinal axis $A_{EA}$ and connecting the first and second longitudinal end surfaces, the lateral surface having opposing vertical surfaces that are substantially flat and separated from each other in the vertical direction on opposing vertical sides of the longitudinal axis, and opposing transverse surfaces that are substantially flat and separated from each other in the transverse direction on opposing transverse sides of the longitudinal axis, wherein the opposing longitudinal surfaces have a combined surface area, $L_{SA}$, the opposing transverse surfaces have a combined surface area, $T_{SA}$, the opposing vertical surfaces have a combined surface area, $V_{SA}$, and the ratio of $V_{SA}$ to each of $L_{SA}$ and $T_{SA}$ is at least 5:1, the electrode assembly further comprises an electrode structure population, an electrically insulating separator population, and a counter-electrode structure population, wherein members of the electrode structure, electrically insulating separator and counter-electrode structure populations are arranged in an alternating sequence, the hermetically sealed case has opposing first and second case ends separated in the longitudinal direction, and a case sidewall that connects the first and second case ends, the opposing first and second case ends and case sidewall forming a hermetic seal about the electrode assembly, wherein the case sidewall comprises upper and lower sidewalls separated from each other in the vertical direction, and first and second transverse sidewalls that are separated from each other in the transverse direction, wherein members of the electrode structure population and/or counter-electrode structure are connected to the upper and lower sidewalls of the hermetically sealed case to restrain growth of the electrode assembly in the vertical direction during cycling of the secondary battery cell between the charged and discharged states, and the charged state is at least 75% of a rated capacity of the secondary battery cell, and the discharged state is less than 25% of a rated capacity of the secondary battery cell.

Embodiment 585: The electrode assembly, sealed secondary battery cell, battery pack, or method according to any preceding Embodiment, wherein members of the population of electrode structures and/or members of the population of counter-electrode structures that are connected to the upper and lower sidewalls have a thickness as measured in the longitudinal direction that is in a range of between 5 and 50 µm.

Embodiment 586: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 70 MPa.

Embodiment 587: The electrode assembly, sealed secondary battery cell, battery pack, or method according to any preceding Embodiment, wherein members of the population of electrode structures and/or members of the population of counter-electrode structures that are connected to the upper and lower sidewalls have a yield strength of greater than 100 MPa.

Embodiment 588: The electrode assembly, sealed secondary battery cell, battery pack, or method according to any preceding Embodiment, wherein a thickness of the secondary battery cell as measured in the vertical direction between vertically opposing regions of external vertical surfaces of the upper and lower sidewalls of the hermetically sealed case, is at least 1 mm.

Embodiment 589: The electrode assembly, sealed secondary battery cell, battery pack, or method according to any preceding Embodiment, wherein a thermal conductivity of the secondary battery cell along a thermally conductive path between the vertically opposing regions of the external vertical surfaces of the upper and lower sidewalls of the hermetically sealed case in the vertical direction is at least 7.5 W/m·K.

Embodiment 590: The electrode assembly, sealed secondary battery cell, battery pack, or method according to any preceding Embodiment, wherein the opposing longitudinal, vertical, and transverse surfaces make up a combined surface area of greater than 66% of the electrode assembly.

Embodiment 591: The electrode assembly, sealed secondary battery cell, battery pack, or method according to any preceding Embodiment, wherein the opposing longitudinal, vertical, and transverse surfaces make up a combined surface area of greater than 75% of the electrode assembly.

Embodiment 592: The electrode assembly, sealed secondary battery cell, battery pack, or method according to any preceding Embodiment, wherein the opposing longitudinal, vertical, and transverse surfaces make up a combined surface area of greater than 80% of the electrode assembly.

Embodiment 593: The electrode assembly, sealed secondary battery cell, battery pack, or method according to any preceding Embodiment, wherein the opposing longitudinal, vertical, and transverse surfaces make up a combined surface area of greater than 95% of the electrode assembly.

Embodiment 594: The electrode assembly, sealed secondary battery cell, battery pack, or method according to any preceding Embodiment, wherein the opposing longitudinal, vertical, and transverse surfaces make up a combined surface area of greater than 99% of the electrode assembly.

Embodiment 595: The electrode assembly, sealed secondary battery cell, battery pack, or method according to any preceding Embodiment, wherein the opposing longitudinal, vertical, and transverse surfaces make up a combined surface area corresponding to substantially the entire surface area of the electrode assembly.

Embodiment 596: The electrode assembly, sealed secondary battery cell, battery pack, or method according to any preceding Embodiment, wherein the opposing first and second case ends are connected together by one or more of the upper and lower sidewalls of the case, and restrain growth of the electrode assembly in the longitudinal direction.

Embodiment 597: The electrode assembly, sealed secondary battery cell, battery pack, or method according to any preceding Embodiment, wherein the sealed secondary battery further comprises a set of electrode constraints internal to the hermetically sealed case, the set of electrode constraints comprising a vertical constraint system comprising first and second vertical growth constraints that are separated from each other in the vertical direction, the first and second vertical growth constraints being connected to members of the population of electrode structures and/or members of the population of counter-electrode structures, and the vertical constraint system being capable of restraining growth of the electrode assembly in the vertical direction, and wherein the first and second vertical growth constraints are connected to the respective upper and lower sidewalls, to indirectly connect the members of the population of electrode structures and/or members of the population of counter-electrode structures to the upper and lower sidewalls.

Embodiment 598: The electrode assembly, sealed secondary battery cell, battery pack, or method according to any preceding Embodiment, wherein the set of electrode constraints that are internal to the hermetically sealed case further comprise a longitudinal constraint system comprising first and second longitudinal constraints separated from each other in the longitudinal direction, and connected by a connecting member to restrain growth of the electrode assembly in the longitudinal direction.

Embodiment 599: The electrode assembly, sealed secondary battery cell, battery pack, or method of any preceding Embodiment, wherein the sealed secondary battery has a rated capacity of at least 150 mAmp·hr.

Embodiment 600: The electrode assembly, sealed secondary battery cell, battery pack, or method of any preceding Embodiment, wherein the sealed secondary battery has a rated capacity of at least 200 mAmp·hr.

Embodiment 601: The electrode assembly, sealed secondary battery cell, battery pack, or method of any preceding Embodiment, wherein the sealed secondary battery has a rated capacity of at least 400 mAmp·hr.

Embodiment 602: The electrode assembly, sealed secondary battery cell, battery pack, or method of any preceding Embodiment, wherein the sealed secondary battery has a rated capacity of at least 0.1 Amp·hr.

Embodiment 603: The electrode assembly, sealed secondary battery cell, battery pack, or method of any preceding Embodiment, wherein the sealed secondary battery has a rated capacity of at least 0.5 Amp·hr.

Embodiment 604: The electrode assembly, sealed secondary battery cell, battery pack, or method of any preceding Embodiment, wherein the sealed secondary battery has a rated capacity of at least 1 Amp·hr.

Embodiment 605: The electrode assembly, sealed secondary battery cell, battery pack, or method of any preceding Embodiment, wherein the sealed secondary battery has a rated capacity of at least 3 Amp·hr.

Embodiment 606: The electrode assembly, sealed secondary battery cell, battery pack, or method of any preceding Embodiment, wherein the sealed secondary battery has a rated capacity of at least 5 Amp·hr.

Embodiment 607: The electrode assembly, sealed secondary battery cell, battery pack, or method of any preceding Embodiment, wherein between vertically opposing regions of external vertical surfaces of the upper and lower sidewalls of the hermetically sealed case, is at least 2 mm.

Embodiment 608: The electrode assembly, sealed secondary battery cell, battery pack, or method of any preceding Embodiment, wherein between vertically opposing regions of external vertical surfaces of the upper and lower sidewalls of the hermetically sealed case, is at least 3 mm.

Embodiment 609: The electrode assembly, sealed secondary battery cell, battery pack, or method of any preceding Embodiment, wherein between vertically opposing regions of external vertical surfaces of the upper and lower sidewalls of the hermetically sealed case, is at least 5 mm.

Embodiment 610: The electrode assembly, sealed secondary battery cell, battery pack, or method of any preceding Embodiment, wherein between vertically opposing regions of external vertical surfaces of the upper and lower sidewalls of the hermetically sealed case, is at least 8 mm.

Embodiment 611: The electrode assembly, sealed secondary battery cell, battery pack, or method of any preceding Embodiment, wherein between vertically opposing regions of external vertical surfaces of the upper and lower sidewalls of the hermetically sealed case, is at least 10 mm.

Embodiment 612: The electrode assembly, sealed secondary battery cell, battery pack, or method of any preceding Embodiment, wherein the thermal conductivity of the secondary battery along the thermally conductive path between vertically opposing regions of external vertical surfaces of the upper and lower sidewalls of the hermetically sealed case in the vertical direction is at least 8 W/m·K.

Embodiment 613: The electrode assembly, sealed secondary battery cell, battery pack, or method of any preceding Embodiment, wherein the thermal conductivity of the secondary battery along the thermally conductive path between vertically opposing regions of external vertical surfaces of the upper and lower sidewalls of the hermetically sealed case in the vertical direction is at least 10 W/m·K.

Embodiment 614: The electrode assembly, sealed secondary battery cell, battery pack, or method of any preceding Embodiment, wherein the thermal conductivity of the secondary battery along the thermally conductive path between vertically opposing regions of external vertical surfaces of the upper and lower sidewalls of the hermetically sealed case in the vertical direction is at least 15 W/m·K.

Embodiment 615: The electrode assembly, sealed secondary battery cell, battery pack, or method of any preceding Embodiment, wherein the thermally conductive path is along the vertical direction of members of the population of electrode structures and/or members of the population of counter-electrode structures that are connected to the upper and lower sidewalls.

Embodiment 616: The electrode assembly, sealed secondary battery cell, battery pack, or method of any preceding Embodiment, wherein the hermetically sealed case comprises a metal material comprising any selected from the group consisting of stainless steel, aluminum, titanium, beryllium, beryllium, copper, nickel, and alloys thereof.

Embodiment 617: The electrode assembly, sealed secondary battery cell, battery pack, or method of any preceding Embodiment, wherein the upper and lower sidewalls comprise any of stainless steel and aluminum.

Embodiment 618: The electrode assembly, sealed secondary battery cell, battery pack, or method of any preceding Embodiment, wherein the first and second vertical growth constraints and/or first and second longitudinal constraints comprise any of metals, alloys, ceramics, glass, plastics, or a combination thereof.

Embodiment 619: The electrode assembly, sealed secondary battery cell, battery pack, or method of any preceding Embodiment, wherein the first and second vertical growth constraints and/or first and second longitudinal constraints comprise any of stainless steel and aluminum.

Embodiment 620: The electrode assembly, sealed secondary battery cell, battery pack, or method of any preceding Embodiment, wherein upper and lower sidewalls, either alone or in combination with first and second vertical growth constraints, have a yield strength of at least 70 MPa.

Embodiment 621: The electrode assembly, sealed secondary battery cell, battery pack, or method of any preceding Embodiment, wherein upper and lower sidewalls, either alone or in combination with first and second vertical growth constraints, have a yield strength of at least 100 MPa.

Embodiment 622: The electrode assembly, sealed secondary battery cell, battery pack, or method of any preceding Embodiment, wherein upper and lower sidewalls, either alone or in combination with first and second vertical growth constraints, have a yield strength of at least 150 MPa.

Embodiment 623: The electrode assembly, sealed secondary battery cell, battery pack, or method of any preceding Embodiment, wherein upper and lower sidewalls, either alone or in combination with first and second vertical growth constraints, have a yield strength of at least 200 MPa.

Embodiment 624: The electrode assembly, sealed secondary battery cell, battery pack, or method of any preceding Embodiment, wherein upper and lower sidewalls, either alone or in combination with first and second vertical growth constraints, have a yield strength of at least 300 MPa.

Embodiment 625: The electrode assembly, sealed secondary battery cell, battery pack, or method of any preceding Embodiment, wherein upper and lower sidewalls, either alone or in combination with first and second vertical growth constraints, have a yield strength of at least 500 MPa.

Embodiment 626: The electrode assembly, sealed secondary battery cell, battery pack, or method of any preceding Embodiment, wherein upper and lower sidewalls, either alone or in combination with first and second vertical growth constraints, have a tensile strength of at least 70 MPa.

Embodiment 627: The electrode assembly, sealed secondary battery cell, battery pack, or method of any preceding Embodiment, wherein upper and lower sidewalls, either alone or in combination with first and second vertical growth constraints, have a tensile strength of at least 100 MPa.

Embodiment 628: The electrode assembly, sealed secondary battery cell, battery pack, or method of any preceding Embodiment, wherein upper and lower sidewalls, either alone or in combination with first and second vertical growth constraints, have a tensile strength of at least 150 MPa.

Embodiment 629: The electrode assembly, sealed secondary battery cell, battery pack, or method of any preceding Embodiment, wherein upper and lower sidewalls, either alone or in combination with first and second vertical growth constraints, have a tensile strength of at least 200 MPa.

Embodiment 630: The electrode assembly, sealed secondary battery cell, battery pack, or method of any preceding Embodiment, wherein upper and lower sidewalls, either alone or in combination with first and second vertical growth constraints, have a tensile strength of at least 300 MPa.

Embodiment 631: The electrode assembly, sealed secondary battery cell, battery pack, or method of any preceding Embodiment, wherein upper and lower sidewalls, either alone or in combination with first and second vertical growth constraints, have a tensile strength of at least 500 MPa.

Embodiment 632: The electrode assembly, sealed secondary battery cell, battery pack, or method of any preceding Embodiment, wherein the first and second case ends, either alone or in combination with first and second longitudinal growth constraints, have a yield strength of at least 70 MPa.

Embodiment 633: The electrode assembly, sealed secondary battery cell, battery pack, or method of any preceding Embodiment, wherein the first and second case ends, either alone or in combination with first and second longitudinal growth constraints, have a yield strength of at least 100 MPa.

Embodiment 634: The electrode assembly, sealed secondary battery cell, battery pack, or method of any preceding Embodiment, wherein the first and second case ends, either alone or in combination with first and second longitudinal growth constraints, have a yield strength of at least 150 MPa.

Embodiment 635: The electrode assembly, sealed secondary battery cell, battery pack, or method of any preceding Embodiment, wherein the first and second case ends, either alone or in combination with first and second longitudinal growth constraints, have a yield strength of at least 200 MPa.

Embodiment 636: The electrode assembly, sealed secondary battery cell, battery pack, or method of any preceding Embodiment, wherein the first and second case ends, either alone or in combination with first and second longitudinal growth constraints, have a yield strength of at least 300 MPa.

Embodiment 637: The electrode assembly, sealed secondary battery cell, battery pack, or method of any preceding Embodiment, wherein the first and second case ends, either alone or in combination with first and second longitudinal growth constraints, have a yield strength of at least 500 MPa.

Embodiment 638: The electrode assembly, sealed secondary battery cell, battery pack, or method of any preceding Embodiment, wherein the first and second case ends, either alone or in combination with first and second longitudinal growth constraints, have a tensile strength of at least 70 MPa.

Embodiment 639: The electrode assembly, sealed secondary battery cell, battery pack, or method of any preceding Embodiment, wherein the first and second case ends, either alone or in combination with first and second longitudinal growth constraints, have a tensile strength of at least 100 MPa.

Embodiment 640: The electrode assembly, sealed secondary battery cell, battery pack, or method of any preceding Embodiment, wherein the first and second case ends, either alone or in combination with first and second longitudinal growth constraints, have a tensile strength of at least 150 MPa.

Embodiment 641: The electrode assembly, sealed secondary battery cell, battery pack, or method of any preceding Embodiment, wherein the first and second case ends, either alone or in combination with first and second longitudinal growth constraints, have a tensile strength of at least 200 MPa.

Embodiment 642: The electrode assembly, sealed secondary battery cell, battery pack, or method of any preceding Embodiment, wherein the first and second case ends, either alone or in combination with first and second longitudinal growth constraints, have a tensile strength of at least 300 MPa.

Embodiment 643: The electrode assembly, sealed secondary battery cell, battery pack, or method of any preceding Embodiment, wherein the first and second case ends, either alone or in combination with first and second longitudinal growth constraints, have a tensile strength of at least 500 MPa.

Embodiment 644: The electrode assembly, sealed secondary battery cell, battery pack, or method of any preceding Embodiment, wherein members of the population of electrode structures and/or members of the population of counter-electrode structures that are connected to the upper and lower sidewalls have a yield strength of greater than 70 MPa.

Embodiment 645: The electrode assembly, sealed secondary battery cell, battery pack, or method of any preceding Embodiment, wherein members of the population of electrode structures and/or members of the population of counter-electrode structures that are connected to the upper and lower sidewalls have a yield strength of greater than 150 MPa.

Embodiment 646: The electrode assembly, sealed secondary battery cell, battery pack, or method of any preceding Embodiment, wherein members of the population of electrode structures and/or members of the population of counter-electrode structures that are connected to the upper and lower sidewalls have a yield strength of greater than 200 MPa.

Embodiment 647: The electrode assembly, sealed secondary battery cell, battery pack, or method of any preceding Embodiment, wherein members of the population of electrode structures and/or members of the population of counter-electrode structures that are connected to the upper and lower sidewalls have a yield strength of greater than 300 MPa.

Embodiment 648: The electrode assembly, sealed secondary battery cell, battery pack, or method of any preceding Embodiment, wherein members of the population of electrode structures and/or members of the population of counter-electrode structures that are connected to the upper and lower sidewalls have a yield strength of greater than 500 MPa.

Embodiment 649: The electrode assembly, sealed secondary battery cell, battery pack, or method of any preceding Embodiment, wherein members of the population of electrode structures and/or members of the population of counter-electrode structures that are connected to the upper and lower sidewalls have a tensile strength of greater than 70 MPa.

Embodiment 650: The electrode assembly, sealed secondary battery cell, battery pack, or method of any preceding Embodiment, wherein members of the population of electrode structures and/or members of the population of counter-electrode structures that are connected to the upper and lower sidewalls have a tensile strength of greater than 100 MPa.

Embodiment 651: The electrode assembly, sealed secondary battery cell, battery pack, or method of any preceding Embodiment, wherein members of the population of electrode structures and/or members of the population of counter-electrode structures that are connected to the upper and lower sidewalls have a tensile strength of greater than 150 MPa.

Embodiment 652: The electrode assembly, sealed secondary battery cell, battery pack, or method of any preceding Embodiment, wherein members of the population of electrode structures and/or members of the population of counter-electrode structures that are connected to the upper and lower sidewalls have a tensile strength of greater than 200 MPa.

Embodiment 653: The electrode assembly, sealed secondary battery cell, battery pack, or method of any preceding Embodiment, wherein members of the population of electrode structures and/or members of the population of counter-electrode structures that are connected to the upper and lower sidewalls have a tensile strength of greater than 300 MPa.

Embodiment 654: The electrode assembly, sealed secondary battery cell, battery pack, or method of any preceding Embodiment, wherein members of the population of electrode structures and/or members of the population of counter-electrode structures that are connected to the upper and lower sidewalls have a tensile strength of greater than 500 MPa.

Embodiment 655: The electrode assembly, sealed secondary battery cell, battery pack, or method of any preceding Embodiment, wherein the members of the electrode structure, electrically insulating separator and counter-electrode structure populations are arranged in an alternating sequence in the longitudinal direction.

Embodiment 656: The electrode assembly, sealed secondary battery cell, battery pack, or method of any preceding Embodiment, wherein the members of the electrode structure population comprise electrode active material layers and electrode current collector layers, and members of the counter-electrode structure population comprise counter-electrode active material layers and counter-electrode current collector layers.

Embodiment 657: The electrode assembly, sealed secondary battery cell, battery pack, or method of any preceding Embodiment, wherein the upper and lower sidewalls are connected to upper and lower surfaces of members of the electrode structure population and/or counter-electrode structure population.

Embodiment 658: The electrode assembly, sealed secondary battery cell, battery pack, or method of any preceding Embodiment, wherein the upper and lower sidewalls are connected to upper and lower surfaces of electrode current collectors of members of the electrode structure population, and/or upper and lower surfaces of counter-electrode current collectors of members of the counter-electrode population.

Embodiment 659: The electrode assembly, sealed secondary battery cell, battery pack, or method of any preceding Embodiment, wherein the first and second vertical growth constraints are connected to upper and lower surfaces of members of the electrode structure population and/or counter-electrode structure population.

Embodiment 660: The electrode assembly, sealed secondary battery cell, battery pack, or method of any preceding Embodiment, wherein the first and second vertical growth constraints are connected to upper and lower surfaces of electrode current collectors of members of the electrode structure population, and/or upper and lower surfaces of counter-electrode current collectors of members of the counter-electrode population.

Embodiment 661: The electrode assembly, sealed secondary battery cell, battery pack, or method of any preceding Embodiment, wherein the electrode and/or counter-electrode current collectors that are connected to the upper and lower sidewalls comprise a thickness as measured in the longitudinal direction that is in a range of between 5 and 50 μm.

Embodiment 662: The electrode assembly, sealed secondary battery cell, battery pack, or method of any preceding Embodiment, wherein the electrode and/or counter-electrode current collectors that are connected to the upper and lower sidewalls comprise a yield strength of greater than 100 MPa.

Embodiment 663: The electrode assembly, sealed secondary battery cell, battery pack, or method of any preceding Embodiment, wherein the upper and lower sidewalls connected to the members of the electrode structure population or counter-electrode structure population, alone or together with the internal vertical constraint system constrain growth in the vertical direction such that any increase in the Feret diameter of the electrode assembly over 20 consecutive cycles is less than 2%.

Embodiment 664: The electrode assembly, sealed secondary battery cell, battery pack, or method of any preceding Embodiment, wherein the upper and lower sidewalls connected to the members of the electrode structure population or counter-electrode structure population, alone or together with the internal vertical constraint system constrain growth in the vertical direction such that any increase in the Feret diameter of the electrode assembly over 30 consecutive cycles is less than 2%.

Embodiment 665: The electrode assembly, sealed secondary battery cell, battery pack, or method of any preceding Embodiment, wherein the upper and lower sidewalls connected to the members of the electrode structure population or counter-electrode structure population, alone or together with the internal vertical constraint system constrain growth in the vertical direction such that any increase in the Feret diameter of the electrode assembly over 50 consecutive cycles is less than 2%.

Embodiment 666: The electrode assembly, sealed secondary battery cell, battery pack, or method of any preceding Embodiment, wherein the upper and lower sidewalls connected to the members of the electrode structure population or counter-electrode structure population, alone or together with the internal vertical constraint system constrain growth in the vertical direction such that any increase in the Feret diameter of the electrode assembly over 80 consecutive cycles is less than 2%.

Embodiment 667: The electrode assembly, sealed secondary battery cell, battery pack, or method of any preceding Embodiment, wherein the upper and lower sidewalls connected to the members of the electrode structure population or counter-electrode structure population, alone or together with the internal vertical constraint system constrain growth in the vertical direction such that any increase in the Feret diameter of the electrode assembly over 100 consecutive cycles is less than 2%.

Embodiment 668: The electrode assembly, sealed secondary battery cell, battery pack, or method of any preceding Embodiment, wherein the first and second longitudinal growth constraints comprise a thickness in the longitudinal direction of at least 150 um.

Embodiment 669: The electrode assembly, sealed secondary battery cell, battery pack, or method of any preceding Embodiment, wherein the first and second longitudinal growth constraints comprise a thickness in the longitudinal direction of at least 250 um.

Embodiment 670: The electrode assembly, sealed secondary battery cell, battery pack, or method of any preceding Embodiment, wherein the first and second longitudinal growth constraints comprise a thickness in the longitudinal direction of at least 400 um.

Embodiment 671: The electrode assembly, sealed secondary battery cell, battery pack, or method according to any preceding Embodiment, wherein members of the population of electrode structures and/or members of the population of counter-electrode structures are connected directly to the upper and lower sidewalls.

Embodiment 672: The electrode assembly, sealed secondary battery cell, battery pack, or method according to any preceding Embodiment, wherein members of the population of electrode structures and/or members of the population of counter-electrode structures are connected directly to the upper and lower sidewalls by any one or more of one or more of adhering, gluing, welding, bonding, joining, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Embodiment 673: The electrode assembly, sealed secondary battery cell, battery pack, or method according to any preceding Embodiment, wherein the members of the population of electrode structures and/or members of the population of counter-electrode structures are connected indirectly to the upper and lower sidewalls.

Embodiment 674: The electrode assembly, sealed secondary battery cell, battery pack, or method according to any preceding Embodiment, wherein members of the population of electrode structures and/or members of the population of counter-electrode structures are connected via first and second vertical growth constraints to the upper and lower sidewalls.

Embodiment 675: The electrode assembly, sealed secondary battery cell, battery pack, or method according to any preceding Embodiment, wherein the members of the population of electrode structures and/or members of the population of counter-electrode structures are connected directly to first and second vertical growth constraints by any one or more of one or more of adhering, gluing, welding, bonding, joining, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Embodiment 676: The electrode assembly, sealed secondary battery cell, battery pack, or method according to any preceding Embodiment, wherein the first and second vertical growth constraints are connected to the respective upper and lower sidewalls by any one or more of adhering, gluing, welding, bonding, soldering, sintering, joining, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Embodiment 677. The electrode assembly, sealed secondary battery cell, battery pack, or method according to any preceding Embodiment, wherein the first and second vertical growth constraints comprise apertures through the vertical thicknesses thereof.

Embodiment 678. The electrode assembly, sealed secondary battery cell, battery pack, or method according to any preceding Embodiment, where the surface area of the opposing longitudinal end surfaces is less than 33% of the surface area of the electrode assembly.

Embodiment 679. The electrode assembly, sealed secondary battery cell, battery pack, or method according to any preceding Embodiment, wherein for members of the secondary battery cell population, a length $L_E$ of each member of the electrode structure population and a length $L_{CE}$ of each member of the counter-electrode structure population are measured in the transverse direction of their central longitudinal axis $A_E$ and $A_{CE}$, a width $W_E$ of each member of the electrode structure population and a width $W_{CE}$ of each member of the counter-electrode structure population are measured in the longitudinal direction, and a height $H_E$ of each member the electrode structure population and a height $H_{CE}$ of each member of the counter-electrode structure population is measured in the vertical direction that is perpendicular to the central longitudinal axis $A_E$ or $A_{CE}$ of each such member and to the longitudinal direction, the ratio of $L_E$ to each of $W_E$ and $H_E$ of each member of the electrode structure population being at least 5:1, respectively, the ratio of $H_E$ to $W_E$ for each member of the electrode structure population being between 0.4:1 and 1000:1, and the ratio of $L_{CE}$ to each of $W_{CE}$ and $H_{CE}$ of each member of the counter-electrode structure population being at least 5:1, respectively, the ratio of $H_{CE}$ to $W_{CE}$ for each member of the counter-electrode structure population being between 0.4:1 and 1000:1.

Embodiment 680. The electrode assembly, sealed secondary battery cell, battery pack, or method according to any preceding Embodiment, wherein for members of the population of secondary battery cells, the electrode assembly has a maximum width WEA measured in the longitudinal direction, a maximum length LEA bounded by the lateral surface and measured in the transverse direction, and a maximum height HEA bounded by the lateral surface and measured in the vertical direction, and the ratio of each of LEA and WEA to HEA is at least 2:1.

Embodiment 681. The electrode assembly, sealed secondary battery cell, battery pack, or method according to any preceding Embodiment, wherein a projection of members of the electrode structure population and the counter electrode structure populations onto the first longitudinal surface circumscribes a first projected area and a projection of the members of the electrode structure population and the counter electrode structure population onto the second longitudinal surface circumscribes a second projected area, and wherein the first and second longitudinal growth constraints comprises first and second compression members that overlie the first and second projected areas.

Embodiment 682. The electrode assembly, sealed secondary battery cell, battery pack, or method according to any preceding Embodiment, wherein the opposing first and second ends of the hermetically sealed case, or the first and second longitudinal growth constraints, either alone or in combination with one another maintain a pressure on the electrode assembly in the longitudinal direction that exceeds the pressure maintained on the electrode assembly in the each of the two directions that are mutually perpendicular and perpendicular to the longitudinal direction.

Embodiment 683. The electrode assembly, sealed secondary battery cell, battery pack, or method according to any preceding Embodiment, wherein the opposing first and second ends of the hermetically sealed case, or the first and second longitudinal growth constraints, either alone or in combination with one another maintain a pressure on the electrode assembly in the longitudinal direction that exceeds the pressure maintained on the electrode assembly in the each of the two directions that are mutually perpendicular and perpendicular to the longitudinal direction by a factor of at least 3.

Embodiment 684. The electrode assembly, sealed secondary battery cell, battery pack, or method according to any preceding Embodiment, wherein the opposing first and second ends of the hermetically sealed case, or the first and second longitudinal growth constraints, either alone or in combination with one another maintain a pressure on the electrode assembly in the longitudinal direction that exceeds the pressure maintained on the electrode assembly in the each of the two directions that are mutually perpendicular and perpendicular to the longitudinal direction by a factor of at least 4.

Embodiment 685. The electrode assembly, sealed secondary battery cell, battery pack, or method according to any preceding Embodiment, wherein the opposing first and second ends of the hermetically sealed case, or the first and second longitudinal growth constraints, either alone or in combination with one another maintain a pressure on the electrode assembly in the longitudinal direction that exceeds the pressure maintained on the electrode assembly in the each of the two directions that are mutually perpendicular and perpendicular to the longitudinal direction by a factor of at least 5.

Embodiment 686. The electrode assembly, sealed secondary battery cell, battery pack, or method according to any preceding Embodiment, wherein the opposing first and second ends of the hermetically sealed case, or the first and second longitudinal growth constraints, either alone or in combination with one another restrain growth of the electrode assembly in the longitudinal direction such that any increase in the Feret diameter of the electrode assembly in the longitudinal direction over 20 consecutive cycles is less than 20%.

Embodiment 687. The electrode assembly, sealed secondary battery cell, battery pack, or method according to any preceding Embodiment, wherein the opposing first and second ends of the hermetically sealed case, or the first and second longitudinal growth constraints, either alone or in combination with one another restrain growth of the electrode assembly in the longitudinal direction such that any increase in the Feret diameter of the electrode assembly in the longitudinal direction over 10 consecutive cycles is less than 10%

Embodiment 688. The electrode assembly, sealed secondary battery cell, battery pack, or method according to any preceding Embodiment, wherein the opposing first and second ends of the hermetically sealed case, or the first and second longitudinal growth constraints, either alone or in combination with one another restrain growth of the electrode assembly in the longitudinal direction such that any increase in the Feret diameter of the electrode assembly in the longitudinal direction over 5 consecutive cycles is less than 10%.

Embodiment 689. The electrode assembly, sealed secondary battery cell, battery pack, or method according to any preceding Embodiment, wherein the opposing first and second ends of the hermetically sealed case, or the first and second longitudinal growth constraints, either alone or in combination with one another restrain growth of the electrode assembly in the longitudinal direction such that any increase in the Feret diameter of the electrode assembly in the longitudinal direction is less than 1% per cycle.

Embodiment 690. The electrode assembly, sealed secondary battery cell, battery pack, or method according to any preceding Embodiment, wherein the upper and lower sidewalls of the hermetically sealed case, or the first and second vertical growth constraints, either alone or in combination with one another, restrain growth of the electrode assembly in the vertical direction, such that any increase in the Feret diameter of the electrode assembly in the vertical direction over 20 consecutive cycles is less than 20%

Embodiment 691. The electrode assembly, sealed secondary battery cell, battery pack, or method according to any preceding Embodiment, wherein the upper and lower sidewalls of the hermetically sealed case, or the first and second vertical growth constraints, either alone or in combination with one another, restrain growth of the electrode assembly in the vertical direction, such that any increase in the Feret diameter of the electrode assembly in the vertical direction over 10 consecutive cycles is less than 10%

Embodiment 692. The electrode assembly, sealed secondary battery cell, battery pack, or method according to any preceding Embodiment, wherein the upper and lower sidewalls of the hermetically sealed case, or the first and second vertical growth constraints, either alone or in combination with one another, restrain growth of the electrode assembly in the vertical direction, such that any increase in the Feret diameter of the electrode assembly in the vertical direction over 5 consecutive cycles is less than 10%.

Embodiment 693. The electrode assembly, sealed secondary battery cell, battery pack, or method according to any preceding Embodiment, wherein the upper and lower sidewalls of the hermetically sealed case, or the first and second vertical growth constraints, either alone or in combination with one another, restrain growth of the electrode assembly in the vertical direction, such that any increase in the Feret diameter of the electrode assembly in the vertical direction is less than 1% per cycle.

Embodiment 694. The electrode assembly, sealed secondary battery cell, battery pack, or method of any preceding Embodiment, wherein (i) members of the population of electrode structures are anode structures and members of the population of counter-electrode structures are cathode structures, or (ii) members of the population of electrode structures are cathode structures and members of the population of electrode structures are anode structures.

Embodiment 695. The electrode assembly, sealed secondary battery cell, battery pack, or method according to any preceding Embodiment, wherein members of the population of electrode structures are anode structures comprising anodically active material layers, and members of the population of counter-electrode structures are cathode structures comprising cathodically active material layers.

Embodiment 696. The electrode assembly, sealed secondary battery cell, battery pack, or method according to any preceding Embodiment, wherein carrier ions are contained within the hermetically sealed battery enclosure.

Embodiment 697. The electrode assembly, sealed secondary battery cell, battery pack, or method according to any preceding Embodiment, wherein members of the population of electrode structures comprises anode active material comprising any one of more of carbon materials, graphite, soft or hard carbons, metals, semi-metals, alloys, oxides, compounds capable of forming an alloy with lithium, tin, lead, magnesium, aluminum, boron, gallium, silicon, Si/C composites, Si/graphite blends, SiOx, porous Si, intermetallic Si alloys, indium, zirconium, germanium, bismuth, cadmium, antimony, silver, zinc, arsenic, hafnium, yttrium, lithium, sodium, lithium titanate, palladium, lithium metals, carbon, petroleum cokes, activated carbon, graphite, silicon compounds, silicon alloys, tin compounds, non-graphitizable carbon, graphite-based carbon, $LixFe_2O_3$ ($0 \leq x \leq 1$), $LixWO_2$ ($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0 < x \leq 1$; $1 \leq y \leq 3$; $1 \leq z \leq 8$), a lithium alloy, a silicon-based alloy, a tin-based alloy; a metal oxide, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, a conductive polymer, polyacetylene, Li—Co—Ni-based material, crystalline graphite, natural graphite, synthetic graphite, amorphous carbon, Kish graphite, pyrolytic carbon, mesophase pitch-based carbon fibers, meso-carbon microbeads, mesophase pitches, graphitized carbon fiber, high-temperature sintered carbon, petroleum, coal tar pitch derived cokes, tin oxide, titanium nitrate, lithium metal film, an alloy of lithium and one or more types of metals selected from the group consisting of Na, K, Rb, Cs, Fr, Be, Mg, Ca, Sr, Ba, Ra, Al and Sn, a metal compound capable of alloying and/or intercalating with lithium selected from any of Si, Al, C, Pt, Sn, Pb, Ir, Ni, Cu, Ti, Na, K, Rb, Cs, Fr, Be, Ca, Sr, Sb, Ba, Ra, Ge, Zn, Bi, In, Mg, Ga, Cd, a Sn alloy, an Al alloy, a metal oxide capable of doping and dedoping lithium ions, $SiO_v$ ($0 < v < 2$), $SnO_2$, vanadium oxide, lithium vanadium oxide, a composite including a metal compound and carbon material, a Si—C composite, a Sn—C composite, a transition metal oxide, $Li_{4/3}Ti_5/3O_4$, SnO, a carbonaceous material, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite, and a composition of the formula $Na_xSn_{y-z}M_z$ disposed between layers of the layered carbonaceous material, wherein M is Ti, K, Ge, P, or a combination thereof, and $0 < x \leq 15$, $1 \leq y \leq 5$, and $0 = z \leq 1$, as well as oxides, alloys, nitrides, fluorides of any of the foregoing, and any combination of any of the foregoing.

Embodiment 698. The electrode assembly, sealed secondary battery cell, battery pack, or method according to any preceding Embodiment, wherein the anode active material comprises at least one of lithium metal, a lithium metal alloy, silicon, silicon alloy, silicon oxide, tin, tin alloy, tin oxide, and a carbon-containing material.

Embodiment 699. The electrode assembly, sealed secondary battery cell, battery pack, or method according to any preceding Embodiment, wherein the anode active material comprises at least one of silicon and silicon oxide.

Embodiment 700. The electrode assembly, sealed secondary battery cell, battery pack, or method according to any preceding Embodiment, wherein the anode active material comprises at least one of lithium and lithium metal alloy.

Embodiment 701. The electrode assembly, sealed secondary battery cell, battery pack, or method according to any preceding Embodiment, wherein the anode active material comprises a carbon-containing material.

Embodiment 702. The electrode assembly, sealed secondary battery cell, battery pack, or method according to any preceding Embodiment, wherein members of the population of electrically insulating separators comprise microporous separator material permeated with non-aqueous liquid electrolyte.

Embodiment 703. The electrode assembly, sealed secondary battery cell, battery pack, or method according to any preceding Embodiment, wherein members of the population of electrically insulating separators comprise solid electrolyte.

Embodiment 704. The electrode assembly, sealed secondary battery cell, battery pack, or method according to any preceding Embodiment, wherein members of the population of electrically insulating separators comprise a ceramic material, glass, or garnet material.

Embodiment 705. The electrode assembly, sealed secondary battery cell, battery pack, or method according to any preceding Embodiment, the electrode assembly comprising an electrolyte selected from the group consisting of non-aqueous liquid electrolytes, gel electrolytes, solid electrolytes and combinations thereof.

Embodiment 706. The electrode assembly, sealed secondary battery cell, battery pack, or method according to any preceding Embodiment, wherein the electrode assembly comprises a liquid electrolyte.

Embodiment 707. The electrode assembly, sealed secondary battery cell, battery pack, or method according to any preceding Embodiment, wherein the electrode assembly comprises an aqueous liquid electrolyte.

Embodiment 708. The electrode assembly, sealed secondary battery cell, battery pack, or method according to any preceding Embodiment, wherein the electrode assembly comprises a non-aqueous liquid electrolyte.

Embodiment 709. The electrode assembly, sealed secondary battery cell, battery pack, or method according to any preceding Embodiment, wherein the electrode assembly comprises a gel electrolyte.

Embodiment 710. The electrode assembly, sealed secondary battery cell, battery pack, or method according to any preceding Embodiment, wherein the electrically insulating separator comprises a solid electrolyte.

Embodiment 711. The electrode assembly, sealed secondary battery cell, battery pack, or method according to any preceding Embodiment, wherein the electrically insulating separator comprises a solid polymer electrolyte.

Embodiment 712. The electrode assembly, sealed secondary battery cell, battery pack, or method according to any preceding Embodiment, wherein the electrically insulating separator comprises a solid inorganic electrolyte.

Embodiment 713. The electrode assembly, sealed secondary battery cell, battery pack, or method according to any preceding Embodiment, wherein the electrically insulating separator comprises a solid organic electrolyte.

Embodiment 714. The electrode assembly, sealed secondary battery cell, battery pack, or method according to any preceding Embodiment, wherein the electrically insulating separator comprises a ceramic electrolyte.

Embodiment 715. The electrode assembly, sealed secondary battery cell, battery pack, or method according to any preceding Embodiment, wherein the electrically insulating separator comprises an inorganic electrolyte.

Embodiment 716. The electrode assembly, sealed secondary battery cell, battery pack, or method according to any preceding Embodiment, wherein the electrically insulating separator comprises a ceramic.

Embodiment 717. The electrode assembly, sealed secondary battery cell, battery pack, or method according to any preceding Embodiment, wherein the electrically insulating separator comprises a garnet material.

Embodiment 718. The electrode assembly, sealed secondary battery cell, battery pack, or method according to any preceding Embodiment, comprising an electrolyte selected from the group consisting of aqueous electrolytes, a non-aqueous liquid electrolyte, a solid polymer electrolyte, a solid ceramic electrolyte, a solid glass electrolyte, a solid garnet electrolyte, a gel polymer electrolyte, an inorganic solid electrolyte, and a molten-type inorganic electrolyte.

Embodiment 719. The electrode assembly, sealed secondary battery cell, battery pack, or method according to any preceding Embodiment, wherein members of the population of counter-electrode structures comprise a cathodically active material comprising at least one of transition metal oxides, transition metal sulfides, transition metal nitrides, lithium-transition metal oxides, lithium-transition metal sulfides, lithium-transition metal nitrides, including transition metal oxides, transition metal sulfides, and transition metal nitrides having metal elements having a d-shell or f-shell, and/or where the metal element is any selected from Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au, $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCoz)O_2$, lithium-containing compounds comprising metal oxides or metal phosphates, compounds comprising lithium, cobalt and oxygen (e.g., $LiCoO_2$), compounds comprising lithium, manganese and oxygen (e.g., $LiMn_2O_4$) compounds comprising lithium iron and phosphate (e.g., LiFePO), lithium manganese oxide, lithium cobalt oxide, lithium nickel oxide, lithium iron phosphate, lithium cobalt oxide ($LiCoO_2$), lithium nickel oxide ($LiNiO_2$), a substituted compound with one or more transition metals, lithium manganese oxide, $Li_{1+x}Mn_{2-x}O_4$ (where, x is 0 to 0.33), $LiMnO_3$, $LiMn_2O_3$, $LiMnO_2$, lithium copper oxide ($Li_2CuO_2$), vanadium oxide, $LiV_3O_8$, $LiFe_3O_4$, $V_2O_5$, $Cu_2V_2O_7$, Ni site-type lithium nickel oxide represented by the chemical formula of $LiNi_{1-x}M_xO_2$ (where, M=Co, Mn, Al, Cu, Fe, Mg, B or Ga, and x=0.01 to 0.3), lithium manganese complex oxide represented by the chemical formula of $LiMn_{2-x}M_xO_2$ (where, M=Co, Ni, Fe, Cr, Zn or Ta, and x=0.01 to 0.1), $Li_2Mn_3MO_8$ (where, M=Fe, Co, Ni, Cu or Zn), $LiMn_2O_4$ in which a portion of Li is substituted with alkaline earth metal ions, a disulfide compound, $Fe_2(MoO_4)_3$, a lithium metal phosphate having an olivine crystal structure of Formula 2: $Li_{1+a}Fe_{1-x}M'_x(PO_{4-b})X_b$ wherein M' is at least one selected from Al, Mg, Ni, Co, Mn, Ti, Ga, Cu, V, Nb, Zr, Ce, In, Zn, and Y, X is at least one selected from F, S, and N, −0.5≤a≤+0.5, 0≤x≤0.5, and 0≤b≤0.1, $LiFePO_4$, $Li(Fe, Mn)PO_4$, $Li(Fe, Co)PO_4$, $Li(Fe, Ni)PO_4$, $LiCoO_2$, $LiNiO_2$, $LiMnO_2$, $LiMn_2O_4$, $LiNi_{1-y}Co_yO_2$, $LiCo_{1-y}Mn_yO_2$, $LiNi_{1-y}Mn_yO_2$(0≤y≤1), $Li(Ni_aCo_bMn_c)O_4$(0<a<2, 0<b<2, 0<c<2, and a+b+c=2), $LiMn_{2-z}Ni_zO_4$, $LiMn_{2-z}Co_zO_4$ (0<z<2), $LiCoPO_4$ and $LiFePO_4$, elemental sulfur (S8), sulfur series compounds, $Li_2Sn$ (n≥1), an organosulfur compound, a carbon-sulfur polymer (($C_2S_x)_n$: x=2.5 to 50, n≥2), an oxide of lithium and zirconium, a composite oxide of lithium and metal (cobalt, manganese, nickel, or a combination thereof), $Li_aA_{1-b}M_bD_2$ (wherein, 0.90≤a≤1, and 0≤b≤0.5), $Li_aE_{1-b}M_bO_{2-c}D_c$ (wherein, 0.90≤a≤1, 0≤b≤0.5, and 0≤c≤0.05), $LiE_{2-b}M_bO_{4-c}D_c$ (wherein, 0≤b≤0.5, and 0≤c≤0.05), $Li_aNi_{1-b-c}Co_bM_cD_\alpha$ (wherein, 0.90≤a≤1, 0≤b≤0.5, 0≤c≤0.05, and 0<α≤2), $Li_aNi_{1-b-c}Co_bM_cO_{2-\alpha}X_\alpha$ (wherein, 0.90≤a≤1, 0≤b≤0.5, 0≤c≤0.05, and 0<α<2), $Li_aNi_{1-b-c}Co_bM_cO_{2-\alpha}X_2$ (wherein, 0.90≤a≤1, 0≤b≤0.5, 0≤c≤0.05, and 0<α<2), $Li_aNi_{1-b-c}Mn_bM_cD_\alpha$ (wherein, 0.90≤a≤1, 0≤b≤0.5, 0≤c≤0.05, and 0<α≤2), $Li_aNi_{1-b-c}Mn_bM_cO_{2-\alpha}X_\alpha$ (wherein, 0.90≤a≤1, 0≤b≤0.5, 0≤c≤0.05, and 0<α<2), $Li_aNi_{1-b-c}Mn_bM_cO_{2-\alpha}X_2$ (wherein, 0.90≤a≤1, 0≤b≤0.5, 0≤c≤0.05, and 0<α<2), $Li_aNi_bE_cG_dO_2$ (wherein, 0.90≤a≤1, 0≤b≤0.9, 0≤c≤0.5, and 0.001≤d≤0.1), $Li_aNi_bCo_cMn_dGeO_2$ (wherein, 0.90≤a≤1, ≤b≤0.9, 0≤c≤0.5, 0≤d≤0.5, and 0.001≤e≤0.1), $Li_aNiG_bO_2$ (wherein, 0.90≤a≤1 and 0.001≤b≤0.1), $Li_aCoG_bO_2$ (wherein, 0.90≤a≤1 and 0.001≤b≤0.1), $Li_aMnG_bO_2$ (wherein, 0.90≤a≤1 and 0.001≤b≤0.1), $Li_aMn_2GbO_4$ (wherein, 0.90≤a≤1 and 0.001≤b≤0.1), $QO_2$, $QS_2$, $LiQS_2$, $V_2O_5$, $LiV_2O_5$, $LiX'O_2$, $LiNiVO_4$, $Li_{(3-f)}J_2(PO_4)_3$ (0≤f≤2); $Li_{(3-f)}Fe_2(PO_4)_3$ (0≤f≤2), $LiFePO_4$. (A is Ni, Co, Mn, or a combination thereof; M is Al, Ni, Co, Mn, Cr, Fe, Mg, Sr, V, a rare-earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof; and J is V, Cr, Mn, Co, Ni, Cu, or a combination thereof), $LiCoO_2$, $LiMn_xO_{2x}$ (x=1 or 2), $LiNi_{1-x}Mn_xO_{2x}$(0<x<1), $LiNi_{1-x-y}Co_xMn_yO_2$ (0≤x≤0.5, 0≤y≤0.5), $FePO_4$, a lithium compound, lithium cobalt oxide, lithium nickel oxide, lithium nickel cobalt oxide, lithium nickel cobalt aluminum oxide, lithium nickel cobalt manganese oxide, lithium manganese oxide, lithium iron phosphate, nickel sulfide, copper sulfide, sulfur, iron oxide, vanadium oxide, a sodium containing material, an oxide of the formula $NaM^1_aO_2$ (wherein $M^1$ is at least one transition metal element, and 0≤a<1), $NaFeO_2$, $NaMnO_2$, $NaNiO_2$, $NaCoO_2$, an oxide represented by the formula $NaMn_{1-a}M^1_aO_2$ (wherein $M^1$ is at least one transition metal element, and 0≤a<1), $Na[Ni_{1/2}Mn_{1/2}]O_2$, $Na_{2/3}[Fe_{1/2}Mn_{1/2}]O_2$, an oxide represented by $Na_{0.44}Mn_{1-a}M^1_aO_2$ (wherein $M^1$ is at least one transition metal element, and 0≤a<1), an oxide represented by $Na_{0.7}Mn_{1-a}M^1_aO_{2.05}$ an (wherein $M^1$ is at least one transition metal element, and 0≤a<1) an oxide represented by $NabM^2_cSi_{12}O_{30}$ (wherein $M^2$ is at least one transition metal element, 2≤b≤6, and 2≤c≤5), $Na_6Fe_2Si_{12}O_{30}$, $Na_2Fe_5Si_{12}O$ (wherein $M^2$ is at least one transition metal element, 2≤b≤6, and 2≤c≤5), an oxide represented by $Na_dM^3_eSi_6O_{18}$ (wherein $M^3$ is at least one transition metal element, 3≤d≤6, and 1≤e≤2), $Na_2Fe_2Si_6O_{18}$, $Na_2MnFeSi_6O_{18}$ (wherein $M^3$ is at least one transition metal element, 3≤d≤6, and 1≤e≤2), an oxide represented by $Na_fM^4_gSi_2O_6$ (wherein $M^4$ is at least one element selected from transition metal elements, magnesium (Mg) and aluminum (Al), 1≤f≤2 and 1≤g≤2), a phosphate, $Na_2FeSiO_6$, $NaFePO_4$, $Na_3Fe_2(PO_4)_3$, $Na_3V_2(PO_4)_3$, $Na_4CO_3(PO_4)_2P_2O_7$, a borate, $NaFeBO_4$ or $Na_3Fe_2(BO_4)_3$, a fluoride, $Na_hM^5F_6$ (wherein $M^5$ is at least one transition metal element, and 2≤h≤3), $Na_3FeF_6$, $Na_2MnF_6$, a fluorophosphate, $Na_3V_2(PO_4)_2F_3$, $Na_3V_2(PO_4)_2FO_2$, $NaMnO_2$, $Na[Ni_{1/2}Mn_{1/2}]O_2$, $Na_{2/3}[Fe_{1/2}Mn_{1/2}]O_2$, $Na_3V_2(PO_4)_3$, $Na_4CO_3(PO_4)_2P_2O_7$, $Na_3V_2(PO_4)_2F_3$ and/or $Na_3V_2(PO_4)_2FO_2$, as well as any complex oxides and/or other combinations of the foregoing.

Embodiment 720. The electrode assembly, sealed secondary battery cell, battery pack, or method according to any preceding Embodiment, wherein the cathodically active material comprises at least one of a transition metal oxide, transition metal sulfide, transition metal nitride, transition metal phosphate, and transition metal nitride.

Embodiment 721. The electrode assembly, sealed secondary battery cell, battery pack, or method according to any preceding Embodiment, wherein the cathodically active material comprises a transition metal oxide containing lithium and at least one of cobalt and nickel.

Embodiment 722. The electrode assembly, sealed secondary battery cell, battery pack, or method according to any preceding Embodiment, wherein members of the population of electrode structures comprise anode current collectors comprising at least one of copper, nickel, aluminum, stainless steel, titanium, palladium, baked carbon, calcined carbon, indium, iron, magnesium, cobalt, germanium, lithium, a surface treated material of copper or stainless steel with carbon, nickel, titanium, silver, an aluminum-cadmium alloy, and/or alloys thereof.

Embodiment 723. The electrode assembly, sealed secondary battery cell, battery pack, or method according to any preceding Embodiment, wherein members of the population of electrode structures comprise anode current collectors comprising at least one of copper, nickel, stainless steel and alloys thereof.

Embodiment 724. The electrode assembly, sealed secondary battery cell, battery pack, or method according to any preceding Embodiment, wherein the counter-electrode structures comprise cathode current collectors comprising at least one of stainless steel, aluminum, nickel, titanium, baked carbon, sintered carbon, a surface treated material of aluminum or stainless steel with carbon, nickel, titanium, silver, or an alloy thereof.

Embodiment 725. The electrode assembly, sealed secondary battery cell, battery pack, or method according to any preceding Embodiment, wherein the cathode current collectors comprising at least one of stainless steel, aluminum, nickel, titanium, baked carbon, sintered carbon, a surface treated material of aluminum or stainless steel with carbon, silver, or an alloy thereof.

Embodiment 726. The electrode assembly, sealed secondary battery cell, battery pack, or method according to any preceding Embodiment, wherein the cathode current collectors comprising aluminum.

Embodiment 727. The electrode assembly, sealed secondary battery cell, battery pack, or method according to any preceding Embodiment, wherein the first and second connecting members of the constraint system comprise any of stainless steel, titanium, or glass fiber composite.

Embodiment 728. The electrode assembly, sealed secondary battery cell, battery pack, or method according to any preceding Embodiment, wherein the first and second connecting members of the constraint system comprises stainless steel.

Embodiment 729. The electrode assembly, sealed secondary battery cell, battery pack, or method according to any preceding Embodiment, wherein the first and second connecting members of the constraint system comprise a coating of insulating material on inner and outer surfaces thereof.

Embodiment 730. The electrode assembly, sealed secondary battery cell, battery pack, or method according to any preceding Embodiment, wherein the electrode assembly comprises at least 5 electrode structures and at least 5 counter-electrode structures.

Embodiment 731. The electrode assembly, sealed secondary battery cell, battery pack, or method according to any preceding Embodiment, wherein the electrode assembly comprises at least 10 electrode structures and at least 10 counter-electrode structures.

Embodiment 732. The electrode assembly, sealed secondary battery cell, battery pack, or method according to any preceding Embodiment, wherein the electrode assembly comprises at least 50 electrode structures and at least 50 counter-electrode structures.

Embodiment 733. The electrode assembly, sealed secondary battery cell, battery pack, or method according to any preceding Embodiment, wherein the electrode assembly comprises at least 100 electrode structures and at least 100 counter-electrode structures.

Embodiment 734. The electrode assembly, sealed secondary battery cell, battery pack, or method according to any preceding Embodiment, wherein the electrode assembly comprises at least 500 electrode structures and at least 500 counter-electrode structures.

INCORPORATION BY REFERENCE

All publications and patents mentioned herein, including those items listed below, are hereby incorporated by reference in their entirety for all purposes as if each individual publication or patent was specifically and individually incorporated by reference. In case of conflict, the present application, including any definitions herein, will control.

EQUIVALENTS

While specific embodiments have been discussed, the above specification is illustrative, and not restrictive. Many variations will become apparent to those skilled in the art upon review of this specification. The full scope of the embodiments should be determined by reference to the claims, along with their full scope of equivalents, and the specification, along with such variations.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained.

What is claimed is:

1. A battery pack comprising a population of secondary battery cells chargeable between a charged state and a discharged state, and a frame to hold secondary battery cells in the battery pack, wherein
    (a) members of the secondary battery cell population have a rated capacity and comprise a hermetically sealed enclosure and an electrode assembly within the hermetically sealed enclosure,
    (b) the electrode assembly has substantially polyhedral shape mutually perpendicular transverse, longitudinal and vertical axes corresponding to the x, y and z axes, respectively, of an imaginary three-dimensional Cartesian coordinate system,
    (c) the electrode assembly comprises opposing longitudinal surfaces that are substantially flat and are separated from each other in the longitudinal direction, and a lateral surface surrounding an electrode assembly longitudinal axis $A_{EA}$ and connecting the opposing longitudinal end surfaces, the lateral surface having opposing vertical surfaces that are substantially flat and are separated from each other in the vertical direction on opposing vertical sides of the longitudinal axis, and opposing transverse surfaces that are substantially flat and are separated from each other in the transverse direction on opposing transverse sides of the longitudinal axis,
    (d) the electrode assembly further comprises an electrode structure population, an electrically insulating separator population, and a counter-electrode structure population, wherein members of the electrode structure, electrically insulating separator and counter-electrode structure populations are arranged in an alternating sequence in the longitudinal direction within the electrode assembly, (e) wherein the frame holds a cell array comprising a subset of the population of secondary battery cells that are arranged adjacent to one another, with the members being arranged in the cell array such that opposing vertical surfaces of adjacent members in the cell array face each other to form an adjacent facing pair of vertical surfaces, each adjacent facing pair of vertical surfaces in the cell array comprising adjacent facing regions thereof, and (f) wherein the adjacent facing regions of each adjacent facing pair of vertical surfaces in the cell array are separated by less than 1 mm from each other in the vertical direction, and are in thermal contact with one another via a thermally conductive pathway having thermally conductive material that has a thermal conductivity of at least 1 W/mK, (g) the battery pack further comprises a cooling tube to cool the cell array, and (h) wherein the cell array comprises opposing cell array end surfaces separated from each other in the vertical direction, and wherein the cooling tube extends in a direction orthogonal to the vertical direction and along at least one of the opposing cell array end surfaces of the cell array to cool the at least one opposing cell array end surface.

2. The battery pack according to claim 1, wherein the substantially flat opposing longitudinal, vertical, and transverse surfaces make up a combined surface area of greater than 66% of a surface area of the electrode assembly.

3. The battery pack according to claim 1, wherein the cell array comprises 2 secondary battery cells.

4. The battery pack according to claim 1, wherein the battery pack comprises a plurality of cell arrays.

5. The battery pack according to claim 1, wherein the cell array comprises at least two secondary battery cells arranged adjacent to one another, such that the opposing vertical surfaces of the at least two secondary battery cells comprise a pair of external surfaces separated from each other in the vertical direction and located towards the opposing cell array end surfaces, and wherein the cooling tube extends in the orthogonal direction along at least one vertical cell array end surface that is adjacent to one of the pair of external surfaces to cool the external surface of the at least two adjacent secondary battery cells.

6. The battery pack according to claim 5, comprising thermally conductive material between the cooling tube and the external surface of the secondary battery cell adjacent to the cooling tube.

7. The battery pack according to claim 6, wherein the thermally conductive material comprises a thermally conductive adhesive.

8. The battery pack according to claim 6, wherein the thermally conductive material comprises a compressible thermal interface material.

9. The battery pack according to claim 5, comprising a first cell array arranged on a first vertical side of the cooling tube, and a second cell array arranged on a second vertical side of the cooling tube, wherein the cooling tube cools the external surfaces of the first and second cell arrays that are adjacent to the cooling tube on each of the first and second vertical sides.

10. The battery pack according to claim 5, wherein the cooling tube comprises a first cooling tube, and wherein the battery pack further comprises a second cooling tube extending in the same or different direction than the first cooling tube, that is orthogonal to the vertical direction, along the other of the cell array end surfaces that is adjacent to the other of the pair of external surfaces, such that both of the pair of external surfaces of the cell array are cooled.

11. The battery pack according to claim 1, wherein the cooling tube has a cooling fluid inlet side into which cooling fluid is introduced, and a cooling fluid outlet side that is downstream of the cooling fluid inlet side, wherein the cooling tube is arranged such that the cooling fluid inlet side of the cooling tube passes along a first cell array end surface in a direction orthogonal to the vertical direction, and the cooling fluid outlet side of the cooling tube passes by an opposing second cell array end surface in a direction orthogonal to the vertical direction.

12. The battery pack according to claim 1, wherein the cooling tube is configured to carry a liquid or gas coolant.

13. The battery pack according to claim 1, wherein the thermally conductive pathway extends across at least 20% of the surface areas of the respective adjacent vertical surfaces of the cell array.

14. The battery pack according to claim 1, wherein the thermally conductive material between each adjacent facing pair of vertical surface forms a contact patch between the adjacent facing pair that extends across at least 20% of the surface areas of the respective adjacent vertical surfaces of the cell array.

15. The battery pack according to claim 1, wherein the thermally conductive material comprises a compressible thermal interface material comprising any selected from the group consisting of a compressible foam and an elastomeric material.

16. The battery pack according to claim 1, wherein the thermally conductive material comprises a thermally conductive adhesive comprising any selected from the group consisting of an epoxy adhesive, a thermoplastic adhesive, silicone adhesive, and polyurethane adhesive.

17. The battery pack according to claim 1, wherein the cell array comprises at least 3 secondary battery cells.

* * * * *